(12) United States Patent
Tanaka et al.

(10) Patent No.: US 11,320,923 B2
(45) Date of Patent: *May 3, 2022

(54) CONTROL CIRCUIT FOR A DISPLAY APPARATUS

(71) Applicant: Japan Display Inc., Tokyo (JP)

(72) Inventors: Chihiro Tanaka, Tokyo (JP); Naoki Takada, Tokyo (JP); Toshihiko Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,226

(22) Filed: Jan. 28, 2021

(65) Prior Publication Data

US 2021/0149516 A1 May 20, 2021

Related U.S. Application Data

(60) Continuation of application No. 16/735,138, filed on Jan. 6, 2020, now Pat. No. 10,942,592, which is a
(Continued)

(30) Foreign Application Priority Data

Feb. 3, 2017 (JP) .............................. JP2017-018579
Sep. 6, 2017 (JP) .............................. JP2017-171475

(51) Int. Cl.
*G06F 3/041* (2006.01)
*G09G 3/36* (2006.01)
(Continued)

(52) U.S. Cl.
CPC .......... *G06F 3/0412* (2013.01); *G06F 3/0446* (2019.05); *G06F 3/04184* (2019.05);
(Continued)

(58) Field of Classification Search
CPC ........... G02F 1/13338; G02F 1/136286; G06F 3/0412; G06F 3/0416; G06F 3/044;
(Continued)

(56) References Cited

U.S. PATENT DOCUMENTS 9,542,039 B2 * 1/2017 Bi ....................... G06F 3/04184
9,727,167 B2 8/2017 Yang et al.
(Continued)

FOREIGN PATENT DOCUMENTS

| JP | 2009-276612 A | 11/2009 |
|---|---|---|
| JP | 2016-177279 | 10/2016 |
| WO | 2016/194107 | 8/2016 |

OTHER PUBLICATIONS

Japanese Office Action dated Mar. 9, 2021 in corresponding Japanese Application No. 2017-171475.
(Continued)

*Primary Examiner* — Dmitriy Bolotin
(74) *Attorney, Agent, or Firm* — K&L Gates LLP

(57) ABSTRACT

A control circuit for a display apparatus is provided and includes a buffer configured to temporarily store therein externally-supplied image data; and a controller configured to output pixel signals to signal lines of the display apparatus based on the image data stored in the buffer and read detection signals generated in detection conductors which extend along the signal lines of the display apparatus due to the pixel signals.

14 Claims, 50 Drawing Sheets

Related U.S. Application Data division of application No. 15/885,251, filed on Jan. 31, 2018, now Pat. No. 10,551,953.

(51) Int. Cl.
  *G06F 3/044* (2006.01)
  *G02F 1/1362* (2006.01)
  *G02F 1/1333* (2006.01)

(52) U.S. Cl.
  CPC ............. *G09G 3/36* (2013.01); *G09G 3/3666* (2013.01); *G02F 1/13338* (2013.01); *G02F 1/136286* (2013.01); *G09G 2310/0264* (2013.01); *G09G 2310/04* (2013.01); *G09G 2310/06* (2013.01); *G09G 2330/06* (2013.01); *G09G 2330/12* (2013.01); *G09G 2370/08* (2013.01); *G09G 2380/10* (2013.01)

(58) Field of Classification Search
  CPC ....... G09G 2310/0264; G09G 2310/04; G09G 2310/06; G09G 2330/06; G09G 2330/12; G09G 2370/08; G09G 2380/10; G09G 3/36; G09G 3/3666

See application file for complete search history.

(56) References Cited

U.S. PATENT DOCUMENTS

| | | | |
|---|---|---|---|
| 10,551,953 | B2 | 2/2020 | Tanaka et al. |
| 10,725,576 | B2 | 7/2020 | Uehara |
| 10,942,592 | B2 * | 3/2021 | Tanaka ................ G06F 3/04184 |
| 2002/0190943 | A1 * | 12/2002 | Kayada ................ G09G 3/3611 345/98 |
| 2004/0113903 | A1 * | 6/2004 | Mikami ............... G09G 3/3648 345/204 |
| 2006/0192752 | A1 | 8/2006 | Ando |
| 2006/0201931 | A1 | 9/2006 | Lee et al. |
| 2012/0038585 | A1 * | 2/2012 | Kim .................... H01L 27/1259 345/174 |
| 2013/0009930 | A1 | 1/2013 | Cho et al. |
| 2013/0021298 | A1 * | 1/2013 | Seo ......... G06F 3/042 345/175 |
| 2013/0207899 | A1 * | 8/2013 | Wang .................. G06F 3/04164 345/173 |
| 2014/0015801 | A1 * | 1/2014 | Chung .................... G06F 3/042 345/175 |
| 2015/0205433 | A1 * | 7/2015 | Mizuhashi ............ G06F 3/0446 345/174 |
| 2015/0277607 | A1 | 10/2015 | Kosugi et al. |
| 2015/0316661 | A1 | 11/2015 | Fujiyoshi et al. |
| 2015/0319382 | A1 | 11/2015 | Kawanabe et al. |
| 2015/0346361 | A1 | 12/2015 | Watanabe et al. |
| 2015/0378471 | A1 * | 12/2015 | Liu ..................... G02F 1/13338 345/174 |
| 2016/0019854 | A1 * | 1/2016 | Liu ....................... G09G 3/3614 345/204 |
| 2016/0188060 | A1 * | 6/2016 | Liu ....................... G06F 3/0445 345/174 |
| 2016/0275837 | A1 * | 9/2016 | Toyoshima .......... G09G 3/3655 |
| 2018/0055464 | A1 | 3/2018 | Watanabe et al. |
| 2018/0122281 | A1 | 5/2018 | Taniguchi |
| 2018/0224986 | A1 | 8/2018 | Tanaka et al. |
| 2018/0246596 | A1 | 8/2018 | Takada et al. |

OTHER PUBLICATIONS

Japanese Office Action dated Oct. 26, 2021 in corresponding Japanese Application No. 2017-171475.

Japanese Office Action dated Mar. 15, 2022 in corresponding Japanese Application No. 2017-171475 and English translation of same. 3 pages.

* cited by examiner

FIG.1
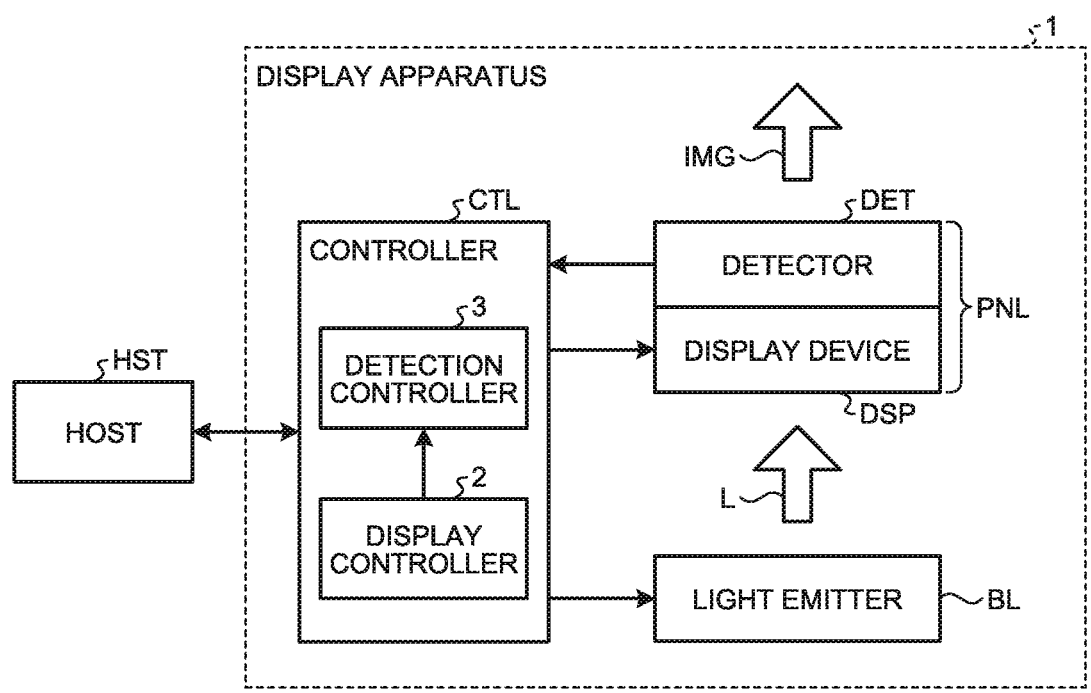
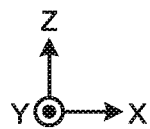

CONTROL CIRCUIT FOR A DISPLAY APPARATUS

CROSS-REFERENCE TO RELATED APPLICATIONS

This application is a Continuation Application of U.S. patent application Ser. No. 16/735,138 filed on Jan. 6, 2020, which is a Divisional Application of U.S. patent application Ser. No. 15/885,251 filed on Jan. 31, 2018, and issued as U.S. Pat. No. 10,551,953 on Feb. 4, 2020, which claims priority from Japanese Application No. 2017-018579, filed on Feb. 3, 2017 and Japanese Application No. 2017-171475, filed on Sep. 6, 2017, the contents of which are incorporated by reference herein in its entirety.

BACKGROUND

1. Technical Field

The present invention relates to a display apparatus.

2. Description of the Related Art

With the development of automatic driving technologies, vehicles have been expected to have higher comfortability in their indoor spaces. As a result, there have been developed a larger number of onboard display devices, such as head-up displays (HUD), digital mirrors, and center information displays (CID). International Organization for Standardization (ISO) 26262, which is a safety standard for electronic control systems of vehicles, defines Automotive Safety Integrity Level (ASIL) indicating the risk classification for electronic control systems of vehicles. Ensuring the safety of onboard display devices will be an important matter.

Japanese Patent Application Laid-open Publication No. 2009-276612 (JP-A-2009-276612) describes a liquid crystal display device that can detect abnormality.

There is a need for a display apparatus and a display apparatus with a touch detection function capable of detecting that an image is not appropriately displayed.

SUMMARY

According to an aspect, a display apparatus includes: a plurality of pixels configured to display an image; a plurality of signal lines configured to supply pixel signals to the pixels; a plurality of detection conductors configured to be capacitively coupled to the signal lines; and a controller configured to output the pixel signals to the signal lines and read detection signals generated in the detection conductors due to the pixel signals.

BRIEF DESCRIPTION OF THE DRAWINGS

FIG. 1 is a block diagram of the configuration of a display apparatus according to a first embodiment;

DETAILED DESCRIPTION

Figure 2:
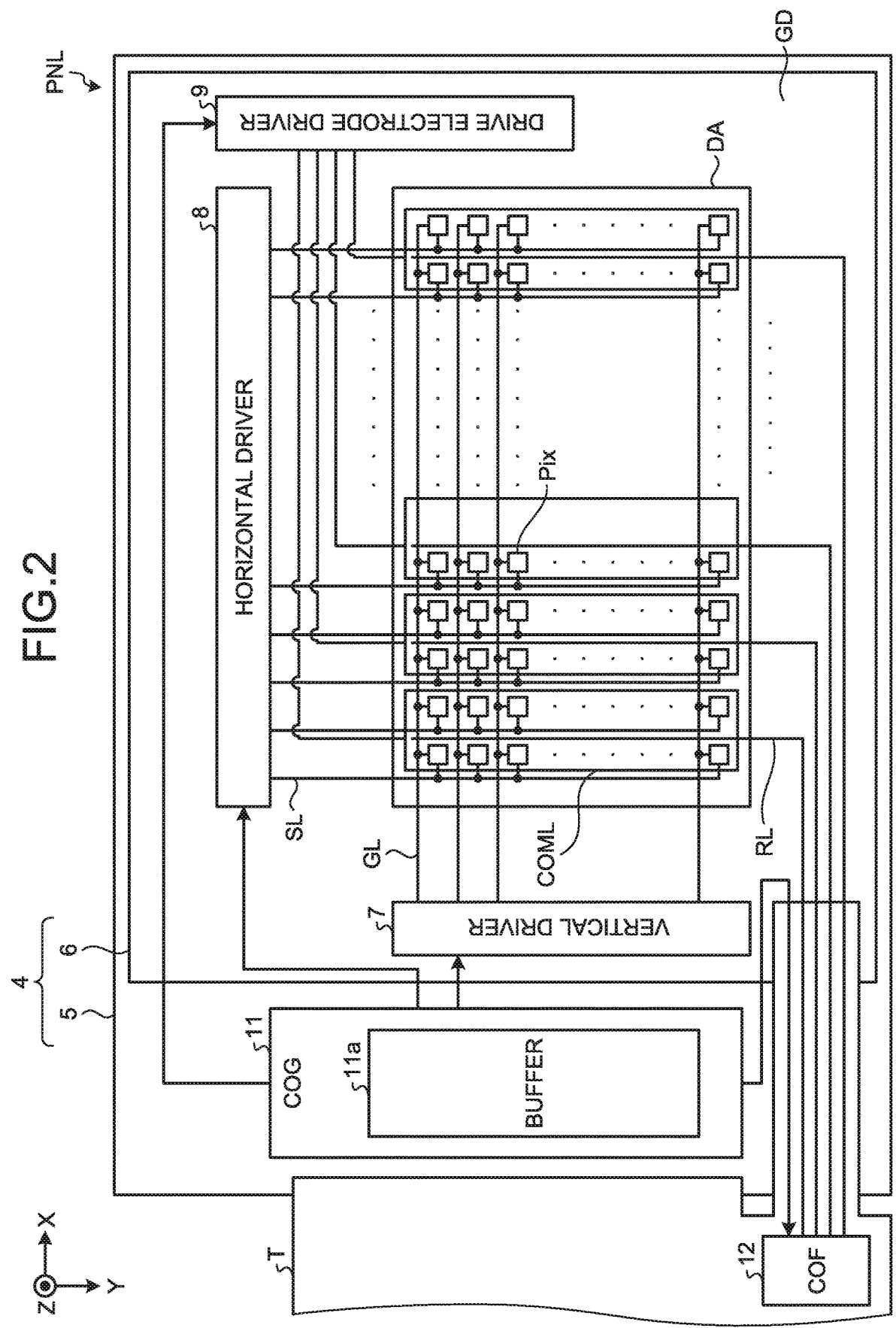
FIG. 2 is a diagram of the module configuration of the display apparatus according to the first embodiment.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the present specification and the figures, components similar to those previously described with reference to previous figures are denoted by the same reference numerals, and overlapping explanation thereof may be appropriately omitted.

In this disclosure, when an element is described as being "on" another element, the element can be directly on the other element, or there can be one or more elements between the element and the other element.

Japanese Patent Application Laid-open Publication No. 2009-276612 (JP-A-2009 276612) describes a liquid crystal display device that can detect abnormality.

There is a need for a display apparatus and a display apparatus with a touch detection function capable of detecting that an image is not appropriately displayed.

1. First Embodiment

FIG. 1 is a block diagram of the configuration of a display apparatus according to a first embodiment.

A display apparatus 1 according to the present embodiment includes a panel PNL, a light emitter BL, and a controller CTL. The panel PNL includes a display device DSP and a detector DET. The display device DSP displays an image. The detector DET detects an image.

The light emitter BL is disposed in an opposite direction of a Z-direction with respect to the panel PNL. The light emitter BL outputs light L in the Z-direction to irradiate the panel PNL.

The display device DSP receives the light L output from the light emitter BL to display an image IMG in the Z-direction. The display device DSP is a transmissive liquid crystal display apparatus, for example, but is not limited thereto. The display device DSP may be a transflective liquid crystal display apparatus, a reflective liquid crystal display apparatus, or an organic electroluminescence (EL) display apparatus. In a case where the display device DSP is a reflective liquid crystal display apparatus or an organic EL display apparatus, the light emitter BL is not necessarily provided.

The detector DET electrically detects the image IMG displayed by the display device DSP. Specifically, the detector DET includes detection lines capacitively coupled to signal lines that supply pixel signals to pixels in the display device DSP. The detector DET generates detection signals in the detection lines due to the pixel signals.

The display apparatus 1 according to the present embodiment has an image display period for displaying an image and an image detection period for detecting an image. The display apparatus 1 according to the present embodiment employs a column inversion driving method of inverting the polarity of image signals alternately in columns (pixel columns) adjacent to each other, which will be described later. Thus, the image detection period includes a period for detecting a positive-polarity image and a period for detecting a negative-polarity image.

The display device DSP and the detector DET may be provided as an in-cell apparatus in which the display device DSP and the detector DET are integrated. Alternatively, the display device DSP and the detector DET may be provided as an on-cell apparatus in which the detector DET is mounted on the display device DSP.

The controller CTL includes a display controller 2 and a detection controller 3. The display controller 2 controls the display device DSP and the light emitter BL. The detection controller 3 reads detection signals from the detector DET and outputs detection image data to a host HST based on the detection signals.

The display controller 2 is an integrated circuit (IC) chip mounted on a glass substrate of the display device DSP, for example. The detection controller 3 is an IC chip mounted on printed circuits (e.g., flexible printed circuits) coupled to the glass substrate of the display device DSP, for example. The display controller 2 and the detection controller 3 cooperate to control the display device DSP and the detector DET. The display controller 2 outputs timing signals each indicating an image detection timing to the detection controller 3.

The host HST outputs image data for displaying the image IMG to the controller CTL. The host HST compares the image data with the detection image data based on the detection signals, thereby determining whether the image IMG is normally displayed. The host HST is a central processing unit (CPU), for example. The host HST may be included in the controller CTL.

Communications between the host HST, the display controller 2, and the detection controller 3 are performed by Inter-Integrated Circuit ($I^2C$) or Serial Peripheral Interface (SPI), for example.

The following describes a specific exemplary configuration of the display device DSP and the detector DET. The exemplary configuration is given by way of example only, and the embodiment is not limited thereto.

FIG. 2 is a diagram of the module configuration of the display apparatus according to the first embodiment.

The panel PNL includes a substrate 4, a chip on glass (COG) 11 serving as a driver IC, and a chip on flexible (COF) 12 serving as a detection IC.

The substrate 4 includes a first substrate 5 and a second substrate 6. The second substrate 6 is disposed in the Z-direction with respect to the first substrate 5 and faces the first substrate 5 with a predetermined space interposed therebetween.

The substrate 4 has a display area DA and a peripheral area GD. In the display area DA, a plurality of pixels Pix including liquid crystal elements are disposed in a matrix (row-column configuration). The peripheral area GD is positioned outside the display area DA. The peripheral area GD is provided with a vertical driver (vertical drive circuit) 7, a horizontal driver (horizontal drive circuit) 8, and a drive electrode driver 9.

The COG 11 is mounted on the first substrate 5 and controls the vertical driver 7, the horizontal driver 8, and the drive electrode driver 9.

The COF 12 is mounted on flexible printed circuits (FPC) T coupled to the first substrate 5.

The COG 11 and the COF 12 are coupled to the host HST (refer to FIG. 1) via the FPC T. The COG 11 includes a buffer 11a that temporarily stores therein image data supplied from the host HST.

The first substrate 5 is provided with a plurality of pixel circuits including active elements (e.g., transistors) and disposed in a matrix (row-column configuration). The second substrate 6 is disposed facing the first substrate 5 with a predetermined space interposed therebetween. The space between the first substrate 5 and the second substrate 6 is maintained by photospacers disposed at respective positions on the first substrate 5 to have a predetermined size. The space between the first substrate 5 and the second substrate 6 is filled with liquid crystals. The positions and the sizes of the components illustrated in FIG. 2 are schematic ones and do not reflect the actual positions, for example.

The display area DA has a matrix (row-column) configuration in which the pixels Pix are arrayed in M-rows and N-columns. In the present specification, a row means a pixel row including N pixels Pix arrayed in an X-direction. A column means a pixel column including M pixels Pix arrayed in a Y-direction orthogonal to the extending direction of the row. M and N are determined based on the display resolution in the vertical direction and that in the horizontal direction, respectively. Examples of the array of the pixels Pix include, but are not limited to, 480 rows×640 columns, 720 rows×1280 columns, 1080 rows×1920 columns, etc.

The display area DA is provided with scanning lines GL and signal lines SL. The scanning lines GL are provided for the respective rows in the array of M×N pixels Pix and extend in the X-direction. The signal lines SL are provided for the respective columns and extend in the Y-direction. In other words, the number of scanning lines GL is M, and the number of signal lines SL is N.

The display area DA is also provided with drive electrodes COML. The drive electrodes COML extending in the Y-direction are arranged one for every two columns of the pixels Pix. In other words, the number of drive electrodes COML is (N/2). The configuration described above is given by way of example only, and the drive electrodes COML are not necessarily arranged one for every two columns of the pixels Pix.

The display area DA is also provided with detection lines RL. The detection lines RL extending in the Y-direction are arranged one for every two columns of the pixels Pix such that the detection lines RL correspond to the respective drive electrodes COML. In other words, the number of detection lines RL is (N/2). The configuration described above is given by way of example only, and the detection lines RL are not necessarily arranged one for every two columns of the pixels Pix.

The COG 11 outputs horizontal synchronization signals and vertical synchronization signals to the vertical driver 7, the horizontal driver 8, and the drive electrode driver 9.

The vertical driver 7 latches digital data output from the COG 11 in units of one horizontal period in synchronization with the vertical synchronization signals and the horizontal synchronization signals. The vertical driver 7 outputs the latched digital data of one line in order as vertical scanning pulses. The vertical driver 7 sequentially supplies the vertical scanning pulses to the scanning lines GL in the display area DA, thereby sequentially selecting the pixels Pix row by row. The vertical driver 7 outputs the digital data in order from the upper part in the vertical scanning direction in the display area DA to the lower part in the vertical scanning direction in the display area DA, for example. The lower part is located in the Y-direction with respect to the upper part. Alternatively, the vertical driver 7 may output the digital data in order from the lower part in the vertical scanning direction in the display area DA, which is closer to the forward side in the Y-direction, to the upper part in the vertical scanning direction in the display area DA, which is closer to the opposite side in the Y-direction, for example.

The horizontal driver 8 is supplied with 6-bit digital image data of R (red), G (green), and B (blue), for example, from the COG 11. The horizontal driver 8 writes pixel signals to the pixels Pix of the row selected in vertical scanning performed by the vertical driver 7 via the signal lines SL in units of a sub-pixel, in units of a plurality of sub-pixels, or in one unit of all the sub-pixels.

The drive electrode COML is made of a transparent material and shared by the pixels Pix of at least one column, for example. The drive electrodes COML are coupled to the drive electrode driver 9. In the image display period, the drive electrode driver 9 supplies constant drive signals VCOM to the drive electrodes COML. In the image detection period, the drive electrode driver 9 brings the drive electrodes COML into a floating state. In the image display period, the drive electrodes COML generate an electric field for driving the liquid crystals between the drive electrodes COML and pixel electrodes, which will be described later.

The COF 12 is coupled to the detection lines RL. The COF 12 outputs detection image data to the host HST based on the detection signals generated in the detection lines RL due to to the pixel signals. The detection lines RL according to the present embodiment are arranged one for every two columns of the pixels Pix. In other words, the number of pieces of detection pixel data in one line of the detection image data is (N/2). The configuration described above is given by way of example only, and the detection lines RL are not necessarily arranged one for every two columns of the pixels Pix. The detection lines RL may be arranged one for every one or every three or more columns of the pixels Pix.

The COG 11, the vertical driver 7, the horizontal driver 8, and the drive electrode driver 9 correspond to the display controller 2 illustrated in FIG. 1. The COF 12 corresponds to the detection controller 3 illustrated in FIG. 1.

In the display apparatus 1, continuous application of a direct-current (DC) voltage of the same polarity to the liquid crystals may possibly deteriorate resistivity (substance-specific resistance) or the like of the liquid crystals. To prevent deterioration in the resistivity (substance-specific resistance) or the like of the liquid crystals, the display apparatus 1 employs a driving method of inverting the polarity of image signals with a predetermined cycle based on the common potential of the drive signals.

Some types of methods for driving a liquid crystal display apparatus are known, including column inversion, line inversion, dot inversion, and frame inversion driving methods. The column inversion driving method is a driving method of inverting the polarity of image signals alternately in columns (pixel columns) adjacent to each other. The line inversion driving method is a driving method of inverting the polarity of image signals on a cycle of 1H (H represents a horizontal period) corresponding to one line (one pixel row). The dot inversion driving method is a driving method of inverting the polarity of image signals alternately in pixels vertically and horizontally adjacent to each other. The frame inversion driving method is a driving method of inverting the polarity of video signals to be written to all the pixels in one frame corresponding to one screen with the same polarity at a time. The display apparatus 1 may employ any one of the driving methods described above. The display apparatus 1 according to the present embodiment employs the column inversion driving method.

Figure 3:
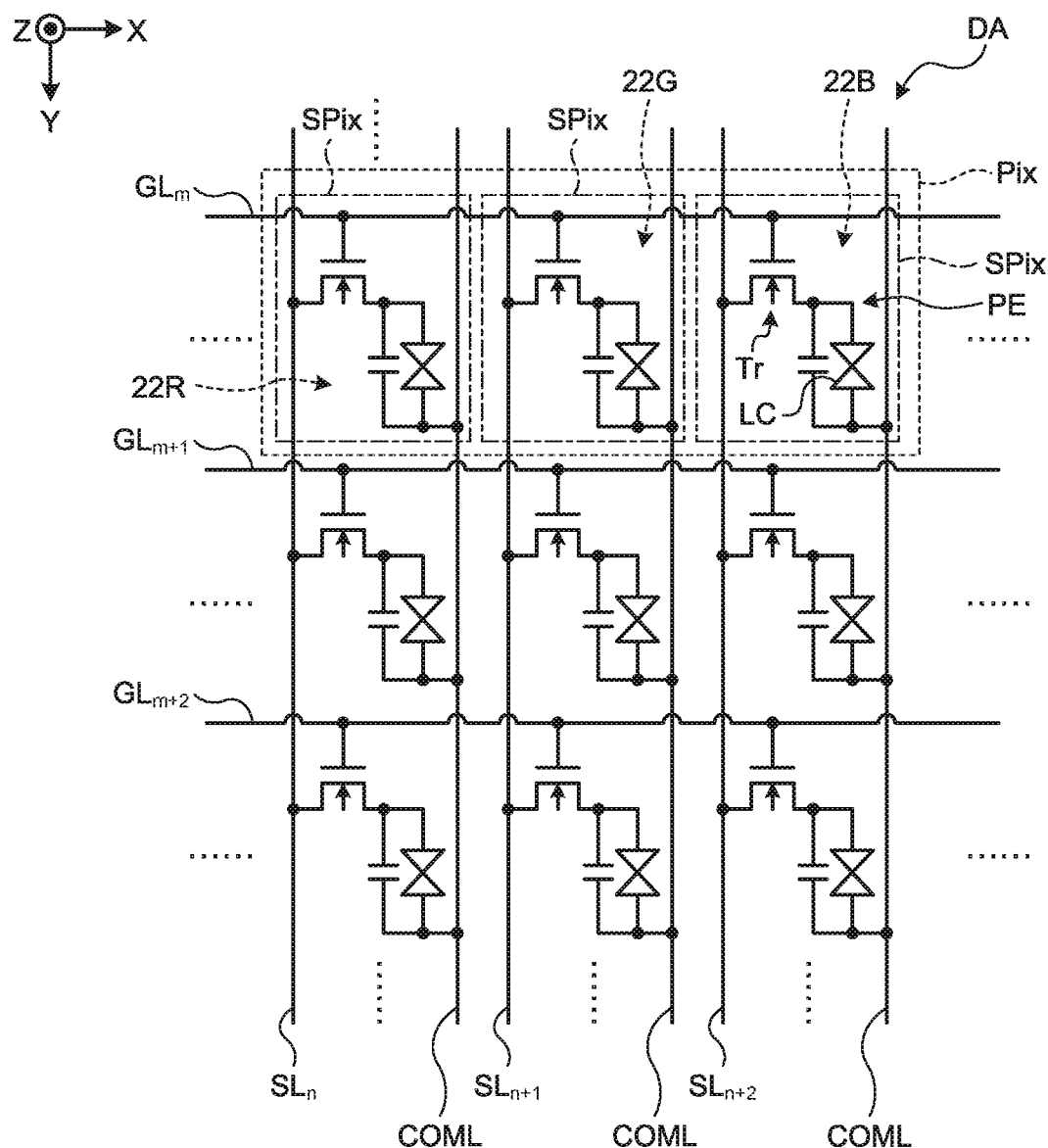
FIG. 3 is a circuit diagram of pixels in a display device of the display apparatus according to the first embodiment.

FIG. 3 is a circuit diagram of pixels in the display device of the display apparatus according to the first embodiment.

The pixels Pix each include a plurality of sub-pixels SPix. The display area DA is provided with signal lines $SL_n$, $SL_{n+1}$, and $SL_{n+2}$ (n is a natural number) and scanning lines $GL_m$, $GL_{m+1}$, and $GL_{m+2}$ (m is a natural number), for example. The signal lines $SL_n$, $SL_{n+1}$, and $SL_{n+2}$ supply pixel signals serving as display data to thin film transistor (TFT) elements Tr in the respective sub-pixels SPix. The scanning lines $GL_m$, $GL_{m+1}$, and $GL_{m+2}$ drive the TFT elements Tr. As described above, the signal lines $SL_n$, $SL_{n+1}$, and $SL_{n+2}$ extend on a plane parallel to a surface of the substrate 4 and supply the pixel signals for displaying an image to the sub-pixels SPix.

The sub-pixels SPix each include the TFT element Tr, a pixel electrode PE, and a liquid crystal LC. The TFT element Tr is a thin film transistor, that is, an n-channel metal oxide semiconductor (MOS) TFT in this example. One of the source and the drain of the TFT element Tr is coupled to the signal line $SL_n$, $SL_{n+1}$, or $SL_{n+2}$, the gate thereof is coupled to the scanning line $GL_m$, $GL_{m+1}$, or $GL_{m+2}$, and the other of the source and the drain thereof is coupled to the pixel electrode PE. A first end of the liquid crystal LC is coupled to the pixel electrode PE, and a second end thereof is coupled to the drive electrode COML. Holding capacitance that holds the voltage between the pixel electrode PE and the drive electrode COML is provided in parallel with the liquid crystal LC.

The sub-pixel SPix is coupled to the other sub-pixels SPix belonging to the same row in the display area DA by the scanning line $GL_m$, $GL_{m+1}$, or $GL_{m+2}$. The scanning lines $GL_m$, $GL_{m+1}$, and $GL_{m+2}$ are coupled to the vertical driver 7 (refer to FIG. 2) and supplied with the vertical scanning pulses of scanning signals from the vertical driver 7. The sub-pixel SPix is also coupled to the other sub-pixels SPix belonging to the same column in the display area DA by the signal line $SL_n$, $SL_{n+1}$, or $SL_{n+2}$. The signal lines $SL_n$, $SL_{n+1}$, and $SL_{n+2}$ are coupled to the horizontal driver 8 (refer to FIG. 2) and supplied with pixel signals from the horizontal driver 8. The sub-pixel SPix is also coupled to the other sub-pixels SPix belonging to the same column in the display area DA by the drive electrode COML. The drive electrodes COML are supplied with the drive signals VCOM from the drive electrode driver 9 (refer to FIG. 2) in the image display period. The drive electrodes COML are brought into a floating state in the image detection period.

The vertical driver 7 illustrated in FIG. 2 applies the vertical scanning pulses to the gates of the TFT elements Tr of the respective sub-pixels SPix via the scanning lines $GL_m$, $GL_{m+1}$, and $GL_{m+2}$ illustrated in FIG. 3. The vertical driver 7 thus sequentially selects one row (one horizontal line) out of the sub-pixels SPix arranged in a matrix (row-column configuration) in the display area DA as a target of display drive. The horizontal driver 8 illustrated in FIG. 2 supplies the pixel signals to the respective sub-pixels SPix included in one horizontal line sequentially selected by the vertical driver 7 via the signal lines $SL_n$, $SL_{n+1}$, and $SL_{n+2}$ illustrated in FIG. 3. With these sub-pixels SPix, display of one horizontal line is performed based on the supplied pixel signals.

As described above, the vertical driver 7 in the display apparatus 1 drives the scanning lines $GL_m$, $GL_{m+1}$, and $GL_{m+2}$ to sequentially scan each of the scanning lines $GL_m$, $GL_{m+1}$, and $GL_{m+2}$, thereby sequentially selecting one horizontal line. The horizontal driver 8 in the display apparatus 1 supplies the pixel signals to the pixels Pix belonging to the one horizontal line, thereby performing display of each horizontal line. To perform the display operation, the drive electrode driver 9 applies the drive signals VCOM to the drive electrodes COML.

The display area DA includes a color filter. The color filter has color areas of three colors (e.g., R (red), G (green), and B (blue)) or four colors corresponding to the respective sub-pixels SPix. In the color filter, a color area 22R colored in red (R), a color area 22G colored in green (G), and a color area 22B colored in blue (B) are periodically arrayed, for example. In a case where the fourth color is white (W), no color is provided for white (W) by the color filter. In a case where the fourth color is another color, the color employed as the fourth color is provided by the color filter.

A set of the color areas 22R, 22G, and 22B in the three colors of R (red), G (green), and B (blue), that is, a set of the total three colors may be provided for one pixel Pix. Alternatively, a set of the color areas 22R, 22G, and 22B in the three colors of R (red), G (green), and B (blue) and the fourth color (e.g., W), that is, a set of the total four colors may be provided for one pixel Pix. Still alternatively, a set of areas colored in other colors may be provided for one pixel Pix. The pixel signal for one pixel Pix according to the present embodiment is a pixel signal corresponding to output of one pixel Pix including the sub-pixels SPix of red (R), green (G), and blue (B). In the description of the present embodiment, red (R), green (G), and blue (B) may be simply referred to as R, G, and B. In a case where the pixels Pix each include the sub-pixels SPix of two or less colors or five or more colors, digital data corresponding to the number of colors is supplied to the pixels Pix based on original image data.

The color filter may have a combination of other colors as long as they are different colors. In typical color filters, the luminance of the color area 22G of green (G) is higher than that of the color area 22R of red (R) and the color area 22B of blue (B). In a case where the fourth color is white (W), the color filter may be made of a light transmissive resin to produce white.

Figure 4:
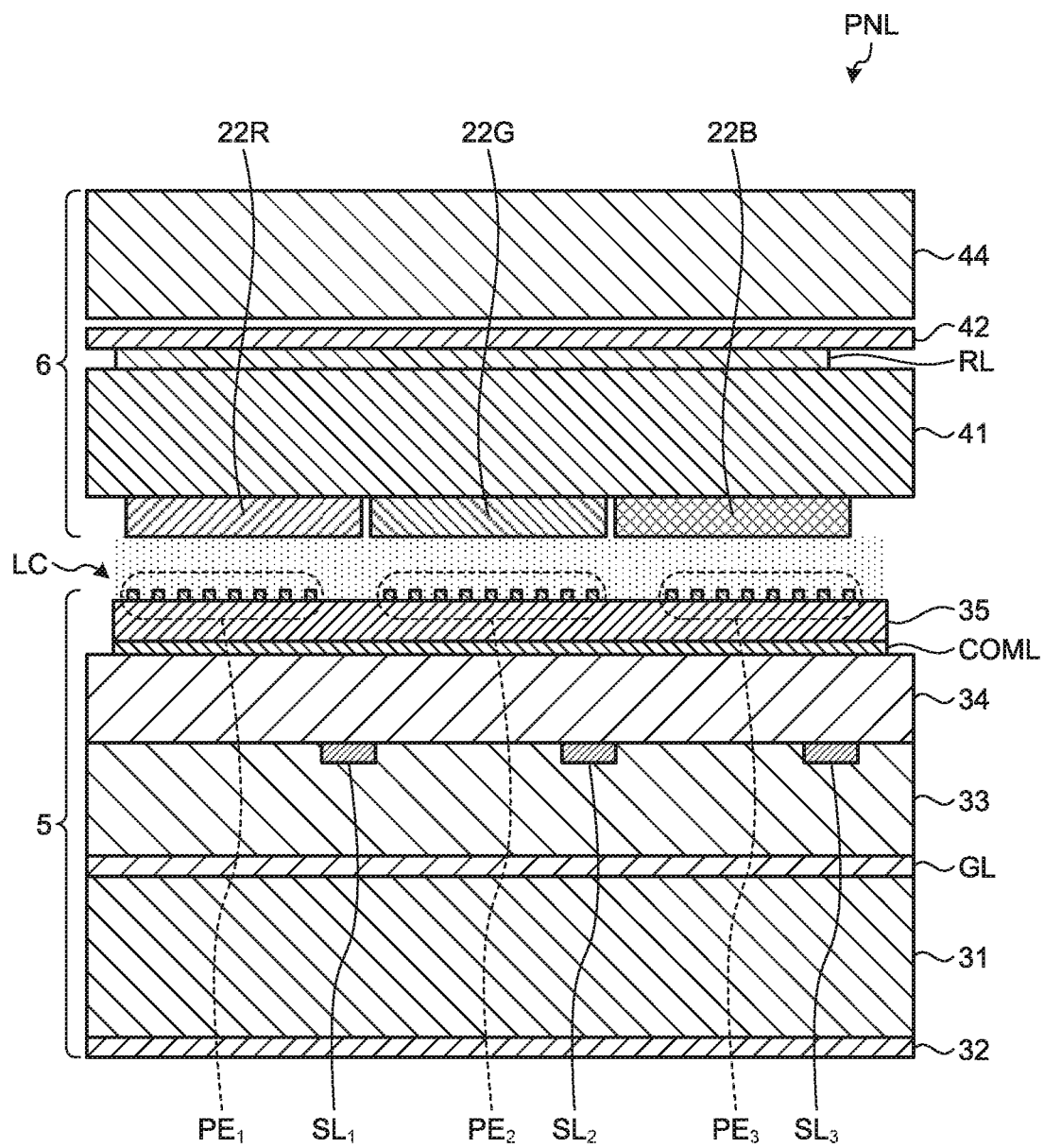
FIG. 4 is a schematic diagram of a sectional structure of a panel of the display apparatus according to the first embodiment.

FIG. 4 is a schematic diagram of a sectional structure of the panel of the display apparatus according to the first embodiment. FIG. 4 is a schematic diagram of a sectional structure of one pixel Pix.

The panel PNL is an in-cell apparatus in which the detector DET is integrated with the display device DSP. Integrating the detector DET with the display device DSP includes a case where part of members, such as substrates and electrodes, for the display device DSP are also used as part of members, such as substrates and electrodes, for the detector DET, for example.

The panel PNL includes the first substrate 5, the second substrate 6, and the liquid crystal LC. The second substrate 6 faces the first substrate 5. The liquid crystal LC is disposed between the first substrate 5 and the second substrate 6.

The first substrate 5 includes a substrate 31 serving as a translucent insulation substrate. The substrate 31 is a glass substrate, for example, but is not limited thereto. A polarization plate 32 is disposed on a surface of the substrate 31 facing in the opposite direction of the Z-direction. The polarization plate 32 allows only polarization components having a certain polarization direction in the light L output from the light emitter BL (refer to FIG. 1) to pass therethrough.

The scanning line GL serving as a first metal layer is provided on a surface of the substrate 31 facing in the Z-direction. The scanning line GL extends in the X-direction (horizontal direction in FIG. 4). An insulation layer 33 is provided on the scanning line GL in the Z-direction. The TFT elements Tr (refer to FIG. 3), which are not illustrated in FIG. 4, may be provided between the scanning line GL and the insulation layer 33.

Signal lines $SL_1$, $SL_2$, and $SL_3$ serving as a second metal layer are provided on the insulation layer 33 in the Z-direction. The signal lines $SL_1$, $SL_2$, and $SL_3$ extend in the Y-direction (direction perpendicular to the plane of FIG. 4). A planarization film 34 is provided on the signal lines $SL_1$, $SL_2$, and $SL_3$.

The drive electrode COML serving as a first transparent conductive film layer is provided on a surface of the planarization film 34 facing in the Z-direction. The drive electrode COML extends in the Y-direction (direction perpendicular to the plane of FIG. 4). The first transparent conductive film layer is made of indium tin oxide (ITO), for example, but is not limited thereto.

An insulation film 35 is provided on the drive electrode COML in the Z-direction. Pixel electrodes $PE_1$, $PE_2$, and $PE_3$ serving as a second transparent conductive film layer are provided on a surface of the insulation film 35 facing in the Z-direction. The second transparent conductive film layer is made of ITO, for example, but is not limited thereto.

The pixel electrodes $PE_1$, $PE_2$, and $PE_3$ each have a plurality of slits extending in the Y-direction (direction perpendicular to the plane of FIG. 4). An electric field is formed between each of the pixel electrodes $PE_1$, $PE_2$, and $PE_3$ and the drive electrode COML via the slits. The electric field causes the molecules of the liquid crystal LC to rotate about the Z-direction, thereby rotating the polarization direction of light having passed through the polarization plate 32. In other words, the panel PNL is a fringe-field switching (FFS) liquid crystal display apparatus, which is a kind of lateral electric field mode liquid crystal display apparatuses. The panel PNL is not limited to an FFS liquid crystal display apparatus and may be an in-plane switching (IPS) liquid crystal display apparatus.

The second substrate 6 includes a substrate 41 serving as a translucent insulation substrate. The substrate 41 is a glass substrate, for example, but is not limited thereto. The color area 22R colored in red (R), the color area 22G colored in green (G), and the color area 22B colored in blue (B) are provided on a surface of the substrate 41 facing in the opposite direction of the Z-direction. The detection line RL is provided on a surface of the substrate 41 facing in the Z-direction. The detection line RL extends in the Y-direction (direction perpendicular to the plane of FIG. 4). The detection line RL corresponds to the detector DET illustrated in FIG. 1. A polarization plate 42 is disposed on the detection line RL in the Z-direction. The polarization plate 42 allows only polarization components having a certain polarization direction in the light having passed through the liquid crystal LC to pass therethrough. A translucent cover member 44 is disposed in the Z-direction with respect to the polarization plate 42. The cover member 44 is made of a glass or a resin, for example.

Figure 5:
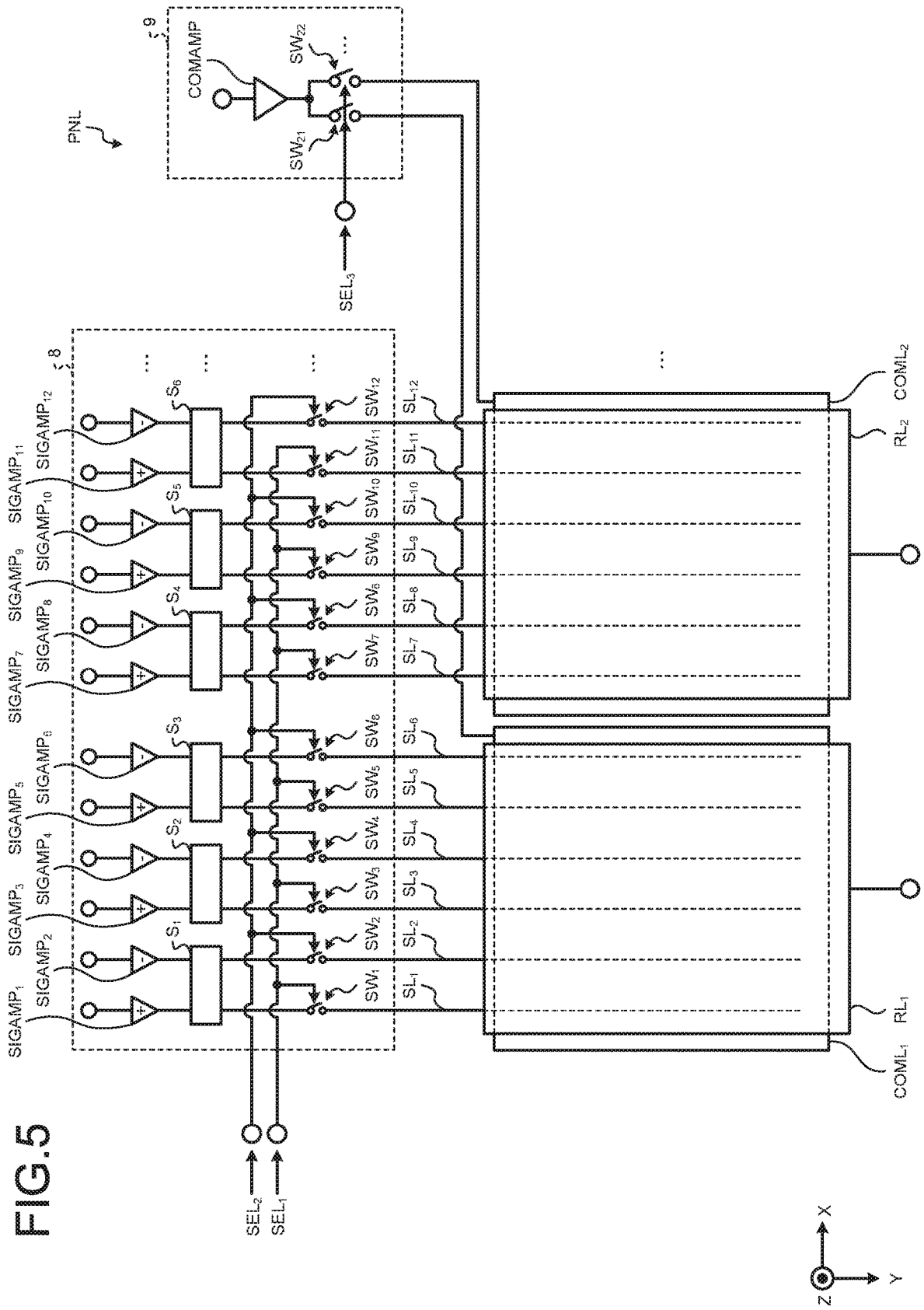
FIG. 5 is a diagram of the configuration of a horizontal driver and a drive electrode driver of the display apparatus according to the first embodiment.

FIG. 5 is a diagram of the configuration of the horizontal driver and the drive electrode driver of the display apparatus according to the first embodiment. FIG. 5 illustrates a portion of the horizontal driver 8 that drives the pixels Pix of four columns and a portion of the drive electrode driver 9 that drives the pixels Pix of four columns.

One pixel Pix according to the present embodiment includes three sub-pixels SPix. The signal line $SL_1$ supplies the pixel signals to the sub-pixels SPix of red (R) in the pixels Pix in the first column. The signal line $SL_2$ supplies the pixel signals to the sub-pixels SPix of green (G) in the pixels Pix in the first column. The signal line $SL_3$ supplies the pixel signals to the sub-pixels SPix of blue (B) in the pixels Pix in the first column.

A signal line $SL_4$ supplies the pixel signals to the sub-pixels SPix of red (R) in the pixels Pix in the second column. A signal line $SL_5$ supplies the pixel signals to the sub-pixels SPix of green (G) in the pixels Pix in the second column. A signal line $SL_6$ supplies the pixel signals to the sub-pixels SPix of blue (B) in the pixels Pix in the second column.

A signal line $SL_7$ supplies the pixel signals to the sub-pixels SPix of red (R) in the pixels Pix in the third column. A signal line $SL_8$ supplies the pixel signals to the sub-pixels SPix of green (G) in the pixels Pix in the third column. A signal line $SL_9$ supplies the pixel signals to the sub-pixels SPix of blue (B) in the pixels Pix in the third column.

A signal line $SL_{10}$ supplies the pixel signals to the sub-pixels SPix of red (R) in the pixels Pix in the fourth column. A signal line $SL_{11}$ supplies the pixel signals to the sub-pixels SPix of green (G) in the pixels Pix in the fourth column. A signal line $SL_{12}$ supplies the pixel signals to the sub-pixels SPix of blue (B) in the pixels Pix in the fourth column.

The drive electrodes COML according to the present embodiment are arranged one for every two columns of the pixels Pix. A drive electrode $COML_1$ supplies the drive signals VCOM to the pixels Pix in the first and the second columns. A drive electrode $COML_2$ supplies the drive signals VCOM to the pixels Pix in the third and the fourth columns.

The detection lines RL according to the present embodiment are arranged one for every two columns of the pixels Pix such that the detection lines RL correspond to the respective drive electrodes COML. A detection line $RL_1$ is capacitively coupled to the signal lines $SL_1$ to $SL_6$ to generate a detection signal due to to the pixel signals supplied to the signal lines $SL_1$ to $SL_6$. A detection line $RL_2$ is capacitively coupled to the signal lines $SL_7$ to $SL_{12}$ to generate a detection signal due to to the pixel signals supplied to the signal lines $SL_7$ to $SL_{12}$.

The horizontal driver 8 includes twelve amplifiers $SIGAMP_1$ to $SIGAMP_{12}$. One pixel Pix according to the present embodiment includes three sub-pixels SPix, that is, a sub-pixel SPix of red (R), a sub-pixel SPix of green (G), and a sub-pixel SPix of blue (B). The twelve amplifiers $SIGAMP_1$ to $SIGAMP_{12}$ output the pixel signals to the pixels Pix in four columns, which is obtained by dividing 12 by 3. The present embodiment employs a column inversion driving method of inverting the polarity of image signals alternately in columns (sub-pixel columns) adjacent to each other. The amplifier $SIGAMP_1$ that outputs positive-polarity pixel signals and the amplifier $SIGAMP_2$ that outputs negative-polarity pixel signals are paired with each other. The output terminal of the amplifier $SIGAMP_1$ and the output terminal of the amplifier $SIGAMP_2$ are coupled to a switcher $S_1$. The switcher $S_1$ couples the amplifier $SIGAMP_1$ to the signal line $SL_1$ and couples the amplifier $SIGAMP_2$ to the signal line $SL_2$ at a display timing. The switcher $S_1$ couples the amplifier $SIGAMP_1$ to the signal line $SL_2$ and couples the amplifier $SIGAMP_2$ to the signal line $SL_1$ at the next display timing.

The amplifier $SIGAMP_3$ that outputs positive-polarity pixel signals and the amplifier $SIGAMP_4$ that outputs negative-polarity pixel signals are paired with each other. The output terminal of the amplifier $SIGAMP_3$ and the output terminal of the amplifier $SIGAMP_4$ are coupled to a switcher $S_2$. The switcher $S_2$ couples the amplifier $SIGAMP_3$ to the signal line $SL_3$ and couples the amplifier $SIGAMP_4$ to the signal line $SL_4$ at a display timing. The switcher Sa couples the amplifier $SIGAMP_3$ to the signal line $SL_4$ and couples the amplifier $SIGAMP_4$ to the signal line $SL_3$ at the next display timing.

The amplifier $SIGAMP_5$ that outputs positive-polarity pixel signals and the amplifier $SIGAMP_6$ that outputs negative-polarity pixel signals are paired with each other. The output terminal of the amplifier $SIGAMP_5$ and the output terminal of the amplifier $SIGAMP_6$ are coupled to a switcher $S_3$. The switcher $S_3$ couples the amplifier $SIGAMP_5$ to the signal line $SL_5$ and couples the amplifier $SIGAMP_6$ to the signal line $SL_6$ at a display timing. The switcher $S_3$ couples the amplifier $SIGAMP_5$ to the signal line $SL_6$ and couples the amplifier $SIGAMP_6$ to the signal line $SL_5$ at the next display timing.

The amplifier $SIGAMP_7$ that outputs positive-polarity pixel signals and the amplifier $SIGAMP_8$ that outputs negative-polarity pixel signals are paired with each other. The output terminal of the amplifier $SIGAMP_7$ and the output terminal of the amplifier $SIGAMP_8$ are coupled to a switcher $S_4$. The switcher $S_4$ couples the amplifier $SIGAMP_7$ to the signal line $SL_7$ and couples the amplifier $SIGAMP_8$ to the signal line $SL_8$ at a display timing. The switcher $S_4$ couples the amplifier $SIGAMP_7$ to the signal line $SL_8$ and couples the amplifier $SIGAMP_8$ to the signal line $SL_7$ at the next display timing.

The amplifier $SIGAMP_9$ that outputs positive-polarity pixel signals and the amplifier $SIGAMP_{10}$ that outputs negative-polarity pixel signals are paired with each other. The output terminal of the amplifier $SIGAMP_9$ and the output terminal of the amplifier $SIGAMP_{10}$ are coupled to a switcher $S_5$. The switcher $S_5$ couples the amplifier $SIGAMP_9$ to the signal line $SL_9$ and couples the amplifier $SIGAMP_{10}$ to the signal line $SL_{10}$ at a display timing. The switcher $S_5$ couples the amplifier $SIGAMP_9$ to the signal line $SL_{10}$ and couples the amplifier $SIGAMP_{10}$ to the signal line $SL_9$ at the next display timing.

The amplifier $SIGAMP_{11}$ that outputs positive-polarity pixel signals and the amplifier $SIGAMP_{12}$ that outputs negative-polarity pixel signals are paired with each other. The output terminal of the amplifier $SIGAMP_{11}$ and the output terminal of the amplifier $SIGAMP_{12}$ are coupled to a switcher $S_6$. The switcher $S_6$ couples the amplifier $SIGAMP_{11}$ to the signal line $SL_{11}$ and couples the amplifier $SIGAMP_{12}$ to the signal line $SL_{12}$ at a display timing. The switcher $S_6$ couples the amplifier $SIGAMP_{11}$ to the signal line $SL_{12}$ and couples the amplifier $SIGAMP_{12}$ to the signal line $SL_{11}$ at the next display timing.

A switch $SW_1$ is disposed between the switcher $S_1$ and the signal line $SL_1$. When a control signal $SEL_1$ supplied from the COG 11 (refer to FIG. 2) is at a high level, the switch $SW_1$ electrically couples the switcher $S_1$ to the signal line $SL_1$. When the control signal $SEL_1$ is at a low level, the switch $SW_1$ cuts off electrical coupling between the switcher $S_1$ and the signal line $SL_1$. In the image display period, the control signal $SEL_1$ is at a high level. As a result, the switch $SW_1$ electrically couples the switcher $S_1$ to the signal line $SL_1$, thereby supplying the pixel signal to the signal line $SL_1$. In an image detection period, the control signal $SEL_1$ is at a high level. As a result, the switch $SW_1$ electrically couples the switcher $S_1$ to the signal line $SL_1$, thereby supplying the pixel signal to the signal line $SL_1$. In another image detection period, the control signal $SEL_1$ is at a low level. As a result, the switch $SW_1$ cuts off electrical coupling between the switcher $S_1$ and the signal line $SL_1$, thereby supplying no pixel signal to the signal line $SL_1$.

A switch $SW_2$ is disposed between the switcher $S_1$ and the signal line $SL_2$. When a control signal $SEL_2$ supplied from the COG 11 (refer to FIG. 2) is at a high level, the switch $SW_2$ electrically couples the switcher $S_1$ to the signal line $SL_2$. When the control signal $SEL_2$ is at a low level, the switch $SW_2$ cuts off electrical coupling between the switcher $S_1$ and the signal line $SL_2$. In the image display period, the control signal $SEL_2$ is at a high level. As a result, the switch $SW_2$ electrically couples the switcher $S_1$ to the signal line $SL_2$, thereby supplying the pixel signal to the signal line $SL_2$. In an image detection period, the control signal $SEL_2$ is at a low level. As a result, the switch $SW_2$ cuts off electrical coupling between the switcher $S_1$ and the signal line $SL_2$, thereby supplying no pixel signal to the signal line $SL_2$. In another image detection period, the control signal $SEL_2$ is at a high level. As a result, the switch $SW_2$ electrically couples the switcher $S_1$ to the signal line $SL_2$, thereby supplying the pixel signal to the signal line $SL_2$.

A switch $SW_3$ is disposed between the switcher $S_2$ and the signal line $SL_3$. When a control signal $SEL_1$ supplied from the COG 11 (refer to FIG. 2) is at a high level, the switch $SW_3$ electrically couples the switcher $S_2$ to the signal line $SL_3$. When the control signal $SEL_1$ is at a low level, the switch $SW_3$ cuts off electrical coupling between the switcher $S_2$ and the signal line $SL_3$. In the image display period, the control signal $SEL_1$ is at a high level. As a result, the switch $SW_3$ electrically couples the switcher $S_2$ to the signal line $SL_3$, thereby supplying the pixel signal to the signal line $SL_3$. In an image detection period, the control signal $SEL_1$ is at a high level. As a result, the switch $SW_3$ electrically couples the switcher $S_2$ to the signal line $SL_3$, thereby supplying the pixel signal to the signal line $SL_3$. In another image detection period, the control signal $SEL_1$ is at a low level. As a result, the switch $SW_3$ cuts off electrical coupling between the switcher $S_2$ and the signal line $SL_3$, thereby supplying no pixel signal to the signal line $SL_3$.

A switch $SW_4$ is disposed between the switcher $S_2$ and the signal line $SL_4$. When a control signal $SEL_2$ supplied from the COG 11 (refer to FIG. 2) is at a high level, the switch $SW_4$ electrically couples the switcher $S_2$ to the signal line $SL_4$. When the control signal $SEL_2$ is at a low level, the switch $SW_4$ cuts off electrical coupling between the switcher $S_2$ and the signal line $SL_4$. In the image display period, the control signal $SEL_2$ is at a high level. As a result, the switch $SW_4$ electrically couples the switcher $S_2$ to the signal line $SL_4$, thereby supplying the pixel signal to the signal line $SL_4$. In an image detection period, the control signal $SEL_2$ is at a low level. As a result, the switch $SW_4$ cuts off electrical coupling between the switcher $S_2$ and the signal line $SL_4$, thereby supplying no pixel signal to the signal line $SL_4$. In another image detection period, the control signal $SEL_2$ is at a high level. As a result, the switch $SW_4$ electrically couples the switcher $S_2$ to the signal line $SL_4$, thereby supplying the pixel signal to the signal line $SL_4$.

A switch $SW_5$ is disposed between the switcher $S_3$ and the signal line $SL_5$. When a control signal $SEL_1$ supplied from the COG 11 (refer to FIG. 2) is at a high level, the switch $SW_5$ electrically couples the switcher $S_3$ to the signal line $SL_5$. When the control signal $SEL_1$ is at a low level, the switch $SW_5$ cuts off electrical coupling between the switcher $S_3$ and the signal line $SL_5$. In the image display period, the control signal $SEL_1$ is at a high level. As a result, the switch $SW_5$ electrically couples the switcher $S_3$ to the signal line $SL_5$, thereby supplying the pixel signal to the signal line $SL_5$. In an image detection period, the control signal $SEL_1$ is at a high level. As a result, the switch $SW_5$ electrically couples the switcher $S_3$ to the signal line $SL_5$, thereby supplying the pixel signal to the signal line $SL_5$. In another image detection period, the control signal $SEL_1$ is at a low level. As a result, the switch $SW_5$ cuts off electrical coupling between the switcher $S_3$ and the signal line $SL_5$, thereby supplying no pixel signal to the signal line $SL_5$.

A switch $SW_6$ is disposed between the switcher $S_3$ and the signal line $SL_6$. When a control signal $SEL_2$ supplied from the COG 11 (refer to FIG. 2) is at a high level, the switch $SW_6$ electrically couples the switcher $S_3$ to the signal line $SL_6$. When the control signal $SEL_2$ is at a low level, the switch $SW_6$ cuts off electrical coupling between the switcher $S_3$ and the signal line $SL_6$. In the image display period, the control signal $SEL_2$ is at a high level. As a result, the switch $SW_6$ electrically couples the switcher $S_3$ to the signal line $SL_6$, thereby supplying the pixel signal to the signal line $SL_6$. In an image detection period, the control signal $SEL_2$ is at a low level. As a result, the switch $SW_6$ cuts off electrical coupling between the switcher $S_3$ and the signal line $SL_6$, thereby supplying no pixel signal to the signal line $SL_6$. In another image detection period, the control signal $SEL_2$ is at a high level. As a result, the switch $SW_6$ electrically couples the switcher $S_3$ to the signal line $SL_6$, thereby supplying the pixel signal to the signal line $SL_6$.

A switch $SW_7$ is disposed between the switcher $S_4$ and the signal line $SL_7$. When a control signal $SEL_1$ supplied from the COG 11 (refer to FIG. 2) is at a high level, the switch $SW_7$ electrically couples the switcher $S_4$ to the signal line $SL_7$. When the control signal $SEL_1$ is at a low level, the switch $SW_7$ cuts off electrical coupling between the switcher $S_4$ and the signal line $SL_7$. In the image display period, the control signal $SEL_1$ is at a high level. As a result, the switch $SW_7$ electrically couples the switcher $S_4$ to the signal line $SL_7$, thereby supplying the pixel signal to the signal line $SL_7$. In an image detection period, the control signal $SEL_1$ is at a high level. As a result, the switch $SW_7$ electrically couples the switcher $S_4$ to the signal line $SL_7$, thereby supplying the pixel signal to the signal line $SL_7$. In another image detection period, the control signal $SEL_1$ is at a low level. As a result, the switch $SW_7$ cuts off electrical coupling between the switcher $S_4$ and the signal line $SL_7$, thereby supplying no pixel signal to the signal line $SL_7$.

A switch $SW_8$ is disposed between the switcher $S_4$ and the signal line $SL_8$. When a control signal $SEL_2$ supplied from the COG 11 (refer to FIG. 2) is at a high level, the switch $SW_8$ electrically couples the switcher $S_4$ to the signal line $SL_8$. When the control signal $SEL_2$ is at a low level, the switch $SW_8$ cuts off electrical coupling between the switcher $S_4$ and the signal line $SL_8$. In the image display period, the control signal $SEL_2$ is at a high level. As a result, the switch $SW_8$ electrically couples the switcher $S_4$ to the signal line $SL_8$, thereby supplying the pixel signal to the signal line $SL_8$. In an image detection period, the control signal $SEL_2$ is at a low level. As a result, the switch $SW_8$ cuts off electrical coupling between the switcher $S_4$ and the signal line $SL_8$, thereby supplying no pixel signal to the signal line $SL_8$. In another image detection period, the control signal $SEL_2$ is at a high level. As a result, the switch $SW_8$ electrically couples the switcher $S_4$ to the signal line $SL_8$, thereby supplying the pixel signal to the signal line $SL_8$.

A switch $SW_9$ is disposed between the switcher $S_5$ and the signal line $SL_9$. When a control signal $SEL_1$ supplied from the COG 11 (refer to FIG. 2) is at a high level, the switch $SW_9$ electrically couples the switcher $S_5$ to the signal line $SL_9$. When the control signal $SEL_1$ is at a low level, the switch $SW_9$ cuts off electrical coupling between the switcher $S_5$ and the signal line $SL_9$. In the image display period, the control signal $SEL_1$ is at a high level. As a result, the switch $SW_9$ electrically couples the switcher $S_5$ to the signal line $SL_9$, thereby supplying the pixel signal to the signal line $SL_9$. In an image detection period, the control signal $SEL_1$ is at a high level. As a result, the switch $SW_9$ electrically couples the switcher $S_5$ to the signal line $SL_9$, thereby supplying the pixel signal to the signal line $SL_9$. In another image detection period, the control signal $SEL_1$ is at a low level. As a result, the switch $SW_9$ cuts off electrical coupling between the switcher $S_5$ and the signal line $SL_9$, thereby supplying no pixel signal to the signal line $SL_9$.

A switch $SW_{10}$ is disposed between the switcher $S_5$ and the signal line $SL_{10}$. When a control signal $SEL_2$ supplied from the COG 11 (refer to FIG. 2) is at a high level, the switch $SW_{10}$ electrically couples the switcher $S_5$ to the signal line $SL_{10}$. When the control signal $SEL_2$ is at a low level, the switch $SW_{10}$ cuts off electrical coupling between the switcher $S_5$ and the signal line $SL_{10}$. In the image display period, the control signal $SEL_2$ is at a high level. As a result, the switch $SW_{10}$ electrically couples the switcher $S_5$ to the signal line $SL_{10}$, thereby supplying the pixel signal to the signal line $SL_{10}$. In an image detection period, the control signal $SEL_2$ is at a low level. As a result, the switch $SW_{10}$ cuts off electrical coupling between the switcher $S_5$ and the signal line $SL_{10}$, thereby supplying no pixel signal to the signal line $SL_{10}$. In another image detection period, the control signal $SEL_2$ is at a high level. As a result, the switch $SW_{10}$ electrically couples the switcher $S_5$ to the signal line $SL_{10}$, thereby supplying the pixel signal to the signal line $SL_{10}$.

A switch $SW_{11}$ is disposed between the switcher $S_6$ and the signal line $SL_{11}$. When a control signal $SEL_1$ supplied from the COG 11 (refer to FIG. 2) is at a high level, the switch $SW_{11}$ electrically couples the switcher $S_6$ to the signal line $SL_{11}$. When the control signal $SEL_1$ is at a low level, the switch $SW_{11}$ cuts off electrical coupling between the switcher $S_6$ and the signal line $SL_{11}$. In the image display period, the control signal $SEL_1$ is at a high level. As a result, the switch $SW_{11}$ electrically couples the switcher $S_6$ to the signal line $SL_{11}$, thereby supplying the pixel signal to the signal line $SL_{11}$. In an image detection period, the control signal $SEL_1$ is at a high level. As a result, the switch $SW_{11}$ electrically couples the switcher $S_6$ to the signal line $SL_{11}$, thereby supplying the pixel signal to the signal line $SL_{11}$. In another image detection period, the control signal $SEL_1$ is at a low level. As a result, the switch $SW_{11}$ cuts off electrical coupling between the switcher $S_6$ and the signal line $SL_{11}$, thereby supplying no pixel signal to the signal line $SL_{11}$.

A switch $SW_{12}$ is disposed between the switcher $S_6$ and the signal line $SL_{12}$. When a control signal $SEL_2$ supplied from the COG 11 (refer to FIG. 2) is at a high level, the switch $SW_{12}$ electrically couples the switcher $S_6$ to the signal line $SL_{12}$. When the control signal $SEL_2$ is at a low level, the switch $SW_{12}$ cuts off electrical coupling between the switcher $S_6$ and the signal line $SL_{12}$. In the image display period, the control signal $SEL_2$ is at a high level. As a result, the switch $SW_{12}$ electrically couples the switcher $S_6$ to the signal line $SL_{12}$, thereby supplying the pixel signal to the signal line $SL_{12}$. In an image detection period, the control signal $SEL_2$ is at a low level. As a result, the switch $SW_{12}$ cuts off electrical coupling between the switcher $S_6$ and the signal line $SL_{12}$, thereby supplying no pixel signal to the signal line $SL_{12}$. In another image detection period, the control signal $SEL_2$ is at a high level. As a result, the switch $SW_{12}$ electrically couples the switcher $S_6$ to the signal line $SL_{12}$, thereby supplying the pixel signal to the signal line $SL_{12}$.

The drive electrode driver 9 includes an amplifier COMAMP that outputs the drive signals VCOM to the drive electrodes $COML_1$ and $COML_2$. The drive signal VCOM is a ground potential GND, for example, but is not limited thereto. The drive signal VCOM may be a positive-polarity constant potential or a negative-polarity constant potential.

A switch $SW_{21}$ is disposed between the amplifier COMAMP and the drive electrode $COML_1$. When a control signal $SEL_3$ supplied from the COG 11 (refer to FIG. 2) is at a high level, the switch $SW_{21}$ electrically couples the amplifier COMAMP to the drive electrode $COML_1$. When the control signal $SEL_3$ is at a low level, the switch $SW_{21}$ cuts off electrical coupling between the amplifier COMAMP and the drive electrode $COML_1$. In the image display period, the control signal $SEL_3$ is at a high level. As a result, the switch $SW_{21}$ electrically couples the amplifier COMAMP to the drive electrode $COML_1$, thereby supplying the drive signal VCOM to the drive electrode $COML_1$. In the image detection period, the control signal $SEL_3$ is at a low level. As a result, the switch $SW_{21}$ cuts off electrical coupling between the amplifier COMAMP and the drive electrode $COML_1$, thereby supplying no drive signal VCOM to the drive electrode $COML_1$.

A switch $SW_{22}$ is disposed between the amplifier COMAMP and the drive electrode $COML_2$. When a control signal $SEL_3$ supplied from the COG 11 (refer to FIG. 2) is at a high level, the switch $SW_{22}$ electrically couples the amplifier COMAMP to the drive electrode $COML_2$. When the control signal $SEL_3$ is at a low level, the switch $SW_{22}$ cuts off electrical coupling between the amplifier COMAMP and the drive electrode $COML_2$. In the image display period, the control signal $SEL_3$ is at a high level. As a result, the switch $SW_{22}$ electrically couples the amplifier COMAMP to the drive electrode $COML_2$, thereby supplying the drive signal VCOM to the drive electrode $COML_2$. In the image detection period, the control signal $SEL_3$ is at a low level. As a result, the switch $SW_{22}$ cuts off electrical coupling between the amplifier COMAMP and the drive electrode $COML_2$, thereby supplying no drive signal VCOM to the drive electrode $COML_2$.

While one of the drive electrodes COML and one of the detection lines RL according to the present embodiment are provided for every two columns of the pixels Pix, the configuration is not limited thereto. The display apparatus 1 according to the present embodiment employs the column inversion driving method, and two amplifiers SIGAMP are paired with each other. One pixel Pix includes three (three-color) sub-pixels SPix, and three signal lines SL are coupled to one pixel Pix. Consequently, one of the drive electrodes COML and one of the detection lines RL are preferably provided for every multiple of six signal lines SL, which is the least common multiple of 2 and 3. In other words, one of the drive electrodes COML and one of the detection lines RL are preferably provided for every two, four, six, . . . columns of the pixels Pix. In a case where one of the drive electrodes COML and one of the detection lines RL are provided for every four columns of the pixels Pix, the number of pieces of detection pixel data in one line of the detection image data is (N/4). In a case where one of the drive electrodes COML and one of the detection lines RL are provided for every six columns of the pixels Pix, the number of pieces of detection pixel data in one line of the detection image data is (N/6).

1-1. First Exemplary Operation Performed by the Display Apparatus According to the First Embodiment The following describes a first exemplary operation performed by the display apparatus 1 according to the first embodiment. In the first exemplary operation, the display apparatus 1 divides the pixels of M rows into L units and performs image display and image detection on a unit-by-unit basis. The signal lines SL and the detection lines RL extend in the column direction intersecting the rows of the pixels. To detect an image, the display apparatus 1 applies data to the signal lines SL on a unit-by-unit basis and detects display data on a unit-by-unit basis with the detection lines RL extending parallel to the signal lines SL.

Figure 6:
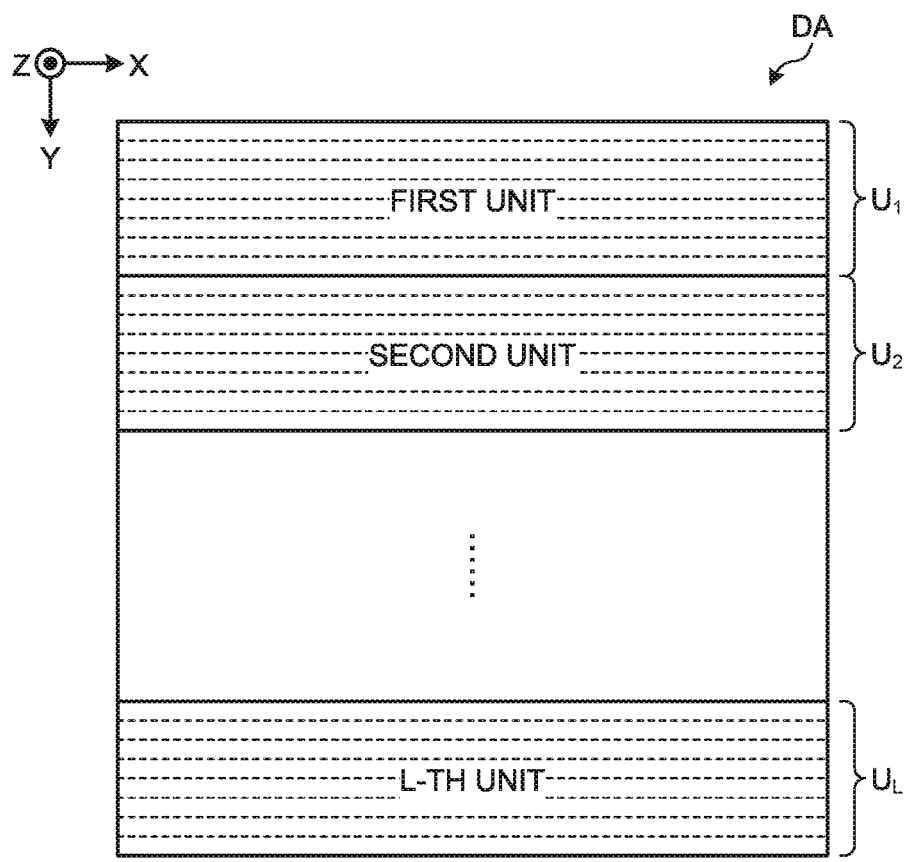
FIG. 6 is a diagram of a display area of the display apparatus according to the first embodiment.

FIG. 6 is a diagram of the display area of the display apparatus according to the first embodiment.

M horizontal lines in the display area DA are divided into L units from the first unit $U_1$ to the L-th (L is an integer of 2 or larger) unit $U_L$. The first unit $U_1$ to the L-th unit $U_L$ each include (M/L) horizontal lines. In a case where the display area DA has 480 horizontal lines and is divided into ten units, for example, each of the ten units includes 48 horizontal lines.

Figure 7:
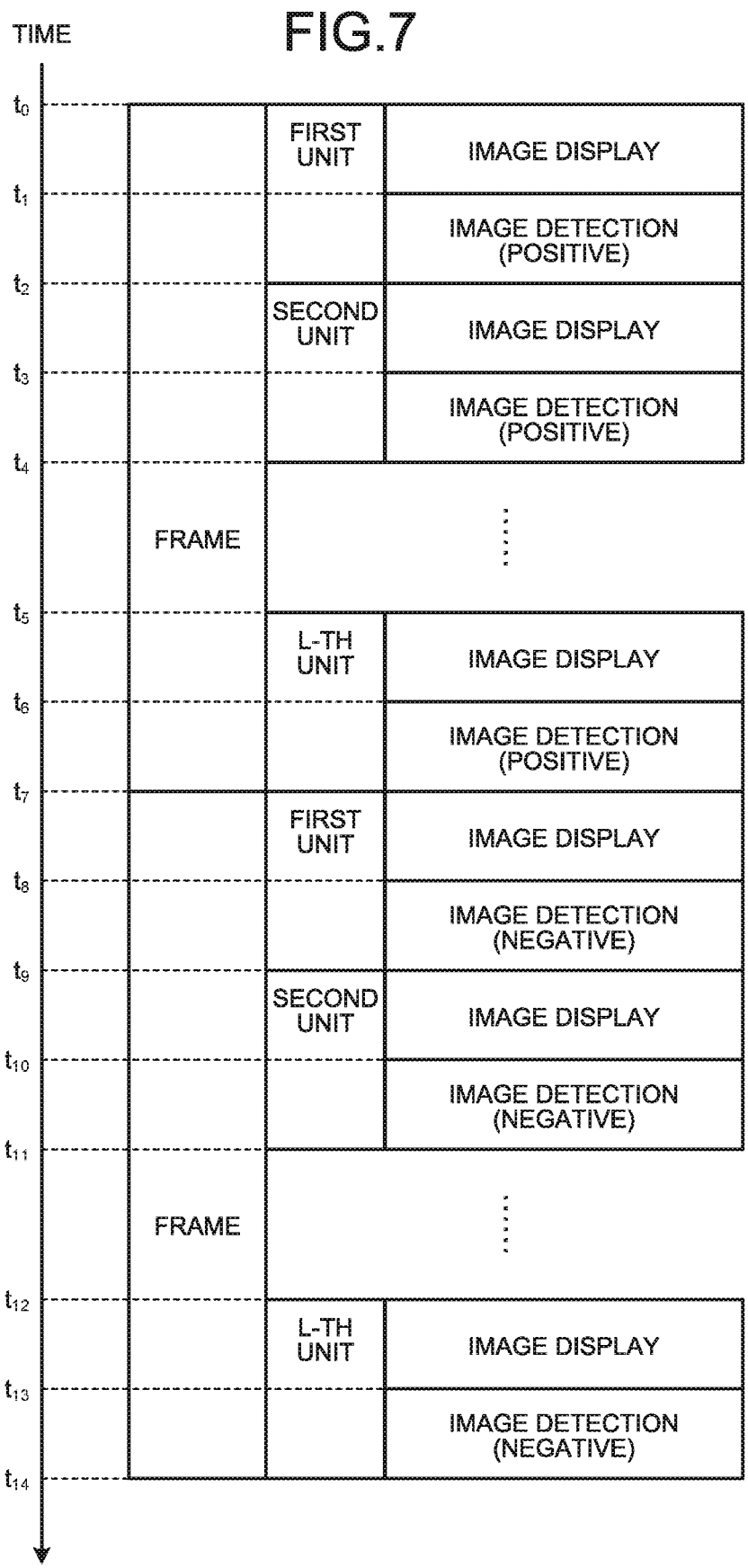
FIG. 7 is a diagram of an operating sequence in a first exemplary operation performed by the display apparatus according to the first embodiment.

FIG. 7 is a diagram of an operating sequence in the first exemplary operation performed by the display apparatus according to the first embodiment. FIG. 7 illustrates an operating sequence of two frames performed by the display apparatus 1. As illustrated in FIG. 7, the display apparatus 1 sequentially performs control on the L units from the first unit $U_1$ to the L-th unit $U_L$. In FIG. 7, the period from timing $t_0$ to timing $t_7$ corresponds to the first frame, and the period from timing $t_7$ to timing $t_{14}$ corresponds to the second frame.

From timing $t_0$ to timing $t_1$, the display apparatus 1 performs image display for the first frame on the (M/L) horizontal lines included in the first unit $U_1$. In the image display performed from timing $t_0$ to timing $t_1$, the display apparatus 1 applies both the positive- and the negative-polarity pixel signals to display an image. From timing $t_1$ to timing $t_2$, the display apparatus 1 performs positive-polarity image detection (detection of the positive-polarity pixel signals) for the first frame on the (M/L) horizontal lines included in the first unit $U_1$. In the image detection performed from timing $t_1$ to timing $t_2$, the display apparatus 1 applies only the positive-polarity pixel signals to perform image detection (detection of the positive-polarity pixel signals).

From timing $t_0$ to timing $t_3$, the display apparatus 1 performs image display for the first frame on the (M/L) horizontal lines included in the second unit $U_2$. From timing $t_3$ to timing $t_4$, the display apparatus 1 performs positive-polarity image detection (detection of the positive-polarity pixel signals) for the first frame on the (M/L) horizontal lines included in the second unit $U_2$.

From timing $t_4$ to timing $t_5$, similarly to from timing $t_0$ to timing $t_4$, the display apparatus 1 performs image display and image detection (detection of the positive-polarity pixel signals). From timing is to timing $t_6$, the display apparatus 1 performs image display for the first frame on the (M/L) horizontal lines included in the L-th unit $U_L$. From timing $t_6$ to timing $t_7$, the display apparatus 1 performs positive-polarity image detection (detection of the positive-polarity pixel signals) for the first frame on the (M/L) horizontal lines included in the L-th unit $U_L$.

From timing $t_7$ to timing $t_8$, the display apparatus 1 performs image display for the second frame on the (M/L) horizontal lines included in the first unit $U_1$. In the image display performed from timing $t_7$ to timing $t_8$, the display apparatus 1 applies both the positive- and the negative-polarity pixel signals to display an image. From timing is to timing $t_9$, the display apparatus 1 performs negative-polarity image detection (detection of the negative-polarity pixel signals) for the second frame on the (M/L) horizontal lines included in the first unit $U_1$. In the image detection performed from timing is to timing $t_9$, the display apparatus 1 applies only the negative-polarity pixel signals to perform image detection (detection of the negative-polarity pixel signals).

From timing $t_9$ to timing $t_{10}$, the display apparatus 1 performs image display for the second frame on the (M/L) horizontal lines included in the second unit $U_2$. From timing $t_{10}$ to timing $t_{11}$, the display apparatus 1 performs negative-polarity image detection (detection of the negative-polarity pixel signals) for the second frame on the (M/L) horizontal lines included in the second unit $U_2$.

From timing $t_{11}$ to timing $t_{12}$, similarly to from timing $t_9$ to timing $t_{11}$, the display apparatus 1 performs image display and image detection (detection of the negative-polarity pixel signals). From timing $t_{12}$ to timing $t_{13}$, the display apparatus 1 performs image display for the second frame on the (M/L) horizontal lines included in the L-th unit $U_L$. From timing $t_{13}$ to timing $t_{14}$, the display apparatus 1 performs negative-polarity image detection (detection of the negative-polarity pixel signals) for the second frame on the (M/L) horizontal lines included in the L-th unit $U_L$.

Figure 8:
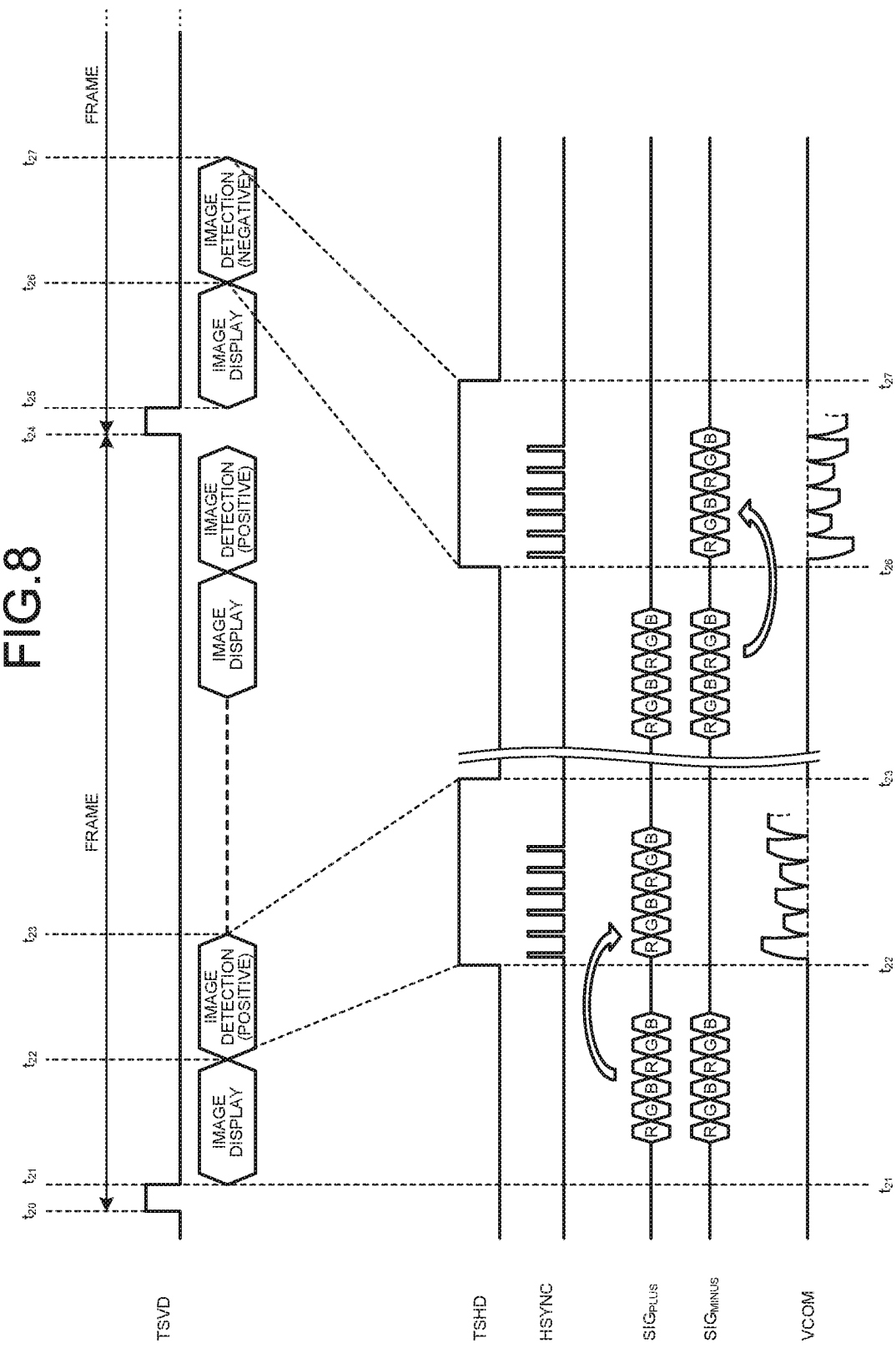
FIG. 8 is a diagram of an operating timing in the first exemplary operation performed by the display apparatus according to the first embodiment.

FIG. 8 is a diagram of an operating timing in the first exemplary operation performed by the display apparatus according to the first embodiment.

A timing signal TSVD for detection control output from the COG 11 to the COF 12 is the same as the vertical synchronization signal for display control for displaying an image on the display device DSP by the COG 11, for example. The period from timing to of the first rising edge of the timing signal TSVD to timing $t_{24}$ of the second rising edge of the timing signal TSVD corresponds to the period of image display and image detection of the first frame. The period after timing $t_{24}$ of the second rising edge of the timing signal TSVD corresponds to the period of image display and image detection of the second frame.

A timing signal TSHD for detection control output from the COG 11 to the COF 12 indicates the image display period and the image detection period. In the image display period, the COG 11 outputs the timing signal TSHD at a low level to the COF 12. In the image detection period, the COG 11 outputs the timing signal TSHD at a high level to the COF 12.

A timing signal HSYNC for detection control output from the COG 11 to the COF 12 has the same frequency as that of the horizontal synchronization signal for display control for displaying an image on the display device DSP by the COG 11, for example. The COF 12 is a circuit that performs not display control but detection control. In the image display period, that is, the period when the timing signal TSHD is at a low level, the COG 11 need not change the timing signal HSYNC. By contrast, in the image detection period, that is, the period when the timing signal TSHD is at a high level, the COG 11 changes the timing signal HSYNC at the same frequency as that of the horizontal synchronization signal for display control.

From timing $t_{21}$ to timing $t_{22}$, the host HST outputs image data for (M/L) horizontal lines of the first unit $U_1$ of the first frame to the COG 11. The COG 11 temporarily stores the image data for (M/L) horizontal lines supplied from the host HST in the buffer 11a (refer to FIG. 2). The buffer 11a simply needs to have storage capacity large enough to store therein image data for (M/L) horizontal lines.

The period from timing $t_{21}$ to timing $t_{22}$ corresponds to the image display period for the first unit $U_1$ of the first frame. From timing $t_{21}$ to timing $t_{22}$, the COG 11 outputs the control signals $SEL_1$ and $SEL_2$ (refer to FIG. 5) at a high level to the horizontal driver 8. As a result, the switches $SW_1$ to $SW_{12}$ are turned on.

The COG 11 causes the horizontal driver 8 to output the pixel signals based on the image data for (M/L) horizontal lines of the first unit $U_1$ of the first frame stored in the buffer 11a. The horizontal driver 8 outputs positive-polarity pixel signals $SIG_{PLUS}$ to one group of two groups (a group of the odd-numbered signal lines SL and a group of the even-numbered signal lines SL) of the N signal lines SL. The horizontal driver 8 outputs negative-polarity pixel signals $SIG_{MINUS}$ to the other group of the two groups of the N signal lines SL.

The horizontal driver 8, for example, outputs the positive-polarity pixel signals $SIG_{PLUS}$ to the group of the odd-numbered signal lines SL (refer to the signal lines $SL_1$, $SL_3$, $SL_5$, ... in FIG. 5) out of the N signal lines SL. The horizontal driver 8 outputs the negative-polarity pixel signals $SIG_{MINUS}$ to the group of the even-numbered signal lines SL (refer to the signal lines $SL_2$, $SL_4$, $SL_6$, ... in FIG. 5) out of the N signal lines SL.

From timing $t_{21}$ to timing $t_{22}$, the COG 11 outputs the control signal $SEL_3$ (refer to FIG. 5) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 4) and the drive electrodes COML, thereby displaying an image.

The period from timing $t_{22}$ to timing $t_{23}$ corresponds to the positive-polarity image detection period for the first unit $U_1$ of the first frame. From timing $t_{22}$ to timing $t_{23}$, the COG 11 outputs the control signal $SEL_1$ at a high level and the control signal $SEL_2$ at a low level (refer to FIG. 5) to the horizontal driver 8. As a result, the odd-numbered switches $SW_1$, $SW_3$, $SW_5$, ... are turned on, and the even-numbered switches $SW_2$, $SW_4$, $SW_6$, ... are turned off.

The COG 11 causes the horizontal driver 8 to output the pixel signals based on the image data for (M/L) horizontal lines of the first unit $U_1$ of the first frame stored in the buffer 11a. In other words, from timing $t_{22}$ to timing $t_{23}$, the horizontal driver 8 outputs again the same signals as the positive-polarity pixel signals $SIG_{PLUS}$ output from timing $t_{21}$ to timing $t_{22}$. The horizontal driver 8 outputs the positive-polarity pixel signals $SIG_{PLUS}$ to the group of the odd-numbered signal lines SL (refer to the signal lines $SL_1$, $SL_3$, $SL_5$, ... in FIG. 5) out of the N signal lines SL.

From timing $t_{22}$ to timing $t_{23}$, the COG 11 outputs the control signal $SEL_3$ (refer to FIG. 5) at a low level to the drive electrode driver 9. As a result, the switches $SW_{21}$ and $SW_{22}$ are turned off. Consequently, all the drive electrodes COML are brought into a floating state. The COG 11 may bring at least only the drive electrode COML at the position corresponding to the detection line RL that is actually performing detection into a floating state.

Referring back to FIG. 5, when the drive electrode $COML_1$ is in a floating state, the electric potential of the drive electrode $COML_1$ changes due to the pixel signals $SIG_{PLUS}$ supplied to the signal lines $SL_1$, $SL_3$, and $SL_5$. Because the signal lines $SL_1$, $SL_3$, and $SL_5$ are capacitively coupled to the detection line $RL_1$, a detection signal is generated in the detection line $RL_1$ due to the pixel signals $SIG_{PLUS}$ supplied to the signal lines $SL_1$, $SL_3$, and $SL_5$. The COF 12 reads the detection signal generated in the detection line $RL_1$ at a timing based on the timing signal HSYNC. The COF 12 performs sampling and A/D (analog/digital) conversion on the detection signal, thereby obtaining positive-polarity detection pixel data.

Similarly, the COG 11 and the COF 12 perform image display and positive-polarity image detection for the first frame on the second unit $U_2$ to the L-th unit $U_L$.

Referring back to FIG. 8, at timing $t_{25}$, the host HST outputs image data for (M/L) horizontal lines of the first unit $U_1$ of the second frame to the COG 11. The COG 11 temporarily stores the image data for (M/L) horizontal lines supplied from the host HST in the buffer 11a (refer to FIG. 2).

The period from timing $t_{25}$ to timing $t_{26}$ corresponds to the image display period for the first unit $U_1$ of the second frame. From timing $t_{25}$ to timing $t_{26}$, the COG 11 outputs the control signals $SEL_1$ and $SEL_2$ (refer to FIG. 5) at a high level to the horizontal driver 8. Because the period from timing $t_{25}$ to timing $t_{26}$ corresponds to the image display period, the switches $SW_1$ to $SW_{12}$ are turned on, and detection lines RL do not relate to the operation.

The COG 11 causes the horizontal driver 8 to output the pixel signals based on the image data for (M/L) horizontal lines of the first unit $U_1$ of the second frame stored in the buffer 11a. The horizontal driver 8 outputs positive-polarity pixel signals $SIG_{PLUS}$ to one group of the two groups (the group of the odd-numbered signal lines SL and the group of the even-numbered signal lines SL) of the N signal lines SL. The horizontal driver 8 outputs negative-polarity pixel signals $SIG_{MINUS}$ to the other group of the two groups of the N signal lines SL.

The horizontal driver 8, for example, outputs the positive-polarity pixel signals $SIG_{PLUS}$ to the group of the odd-numbered signal lines SL (refer to the signal lines $SL_1$, $SL_3$, $SL_5$, ... in FIG. 5) out of the N signal lines SL. The horizontal driver 8 outputs the negative-polarity pixel signals $SIG_{MINUS}$ to the group of the even-numbered signal lines SL (refer to the signal lines $SL_2$, $SL_4$, $SL_6$, ... in FIG. 5) out of the N signal lines SL.

From timing $t_{25}$ to timing $t_{26}$, the COG 11 outputs the control signal $SEL_3$ (refer to FIG. 5) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 4) and the drive electrodes COML, thereby displaying an image.

The period from timing $t_{26}$ to timing $t_{27}$ corresponds to the negative-polarity image detection period for the first unit $U_1$ of the second frame. From timing $t_{26}$ to timing $t_{27}$, the COG 11 outputs the control signal $SEL_1$ at a low level and the control signal $SEL_2$ at a high level (refer to FIG. 5) to the horizontal driver 8. As a result, the odd-numbered switches $SW_1$, $SW_3$, $SW_5$, . . . are turned off, and the even-numbered switches $SW_2$, $SW_4$, $SW_6$, . . . are turned on.

The COG 11 causes the horizontal driver 8 to output the pixel signals based on the image data for (M/L) horizontal lines of the first unit $U_1$ of the second frame stored in the buffer 11a. In other words, from timing $t_{26}$ to timing $t_{27}$, the horizontal driver 8 outputs again the same signals as the negative-polarity pixel signals $SIG_{MINUS}$ output from timing $t_{25}$ to timing $t_{26}$. The horizontal driver 8 outputs the negative-polarity pixel signals $SIG_{MINUS}$ to the group of the even-numbered signal lines SL (refer to the signal lines $SL_2$, $SL_4$, $SL_6$, . . . in FIG. 5) out of the N signal lines SL.

From timing $t_{26}$ to timing $t_{27}$, the COG 11 outputs the control signal $SEL_3$ (refer to FIG. 5) at a low level to the drive electrode driver 9. As a result, the switches $SW_{21}$ and $SW_{22}$ are turned off. Consequently, all the drive electrodes COML are brought into a floating state.

Referring back to FIG. 5, when the drive electrode $COML_1$ is in a floating state, the electric potential of the drive electrode $COML_1$ changes due to the pixel signals $SIG_{MINUS}$ supplied to the signal lines $SL_2$, $SL_4$, and $SL_6$. Because the signal lines $SL_2$, $SL_4$, and $SL_6$ are capacitively coupled to the detection line $RL_1$, a detection signal is generated in the detection line $RL_1$ due to the pixel signals $SIG_{MINUS}$ supplied to the signal lines $SL_2$, $SL_4$, and $SL_6$. The COF 12 reads the detection signal generated in the detection line $RL_1$ at a timing based on the timing signal HSYNC. The COF 12 performs sampling and A/D conversion on the detection signal, thereby obtaining negative-polarity detection pixel data. The COF 12 may read the peak voltage of the detection signal, thereby obtaining the negative-polarity detection pixel data.

Similarly, the COG 11 and the COF 12 perform image display and negative-polarity image detection for the second frame on the second unit $U_2$ to the L-th unit $U_L$.

Figure 9:
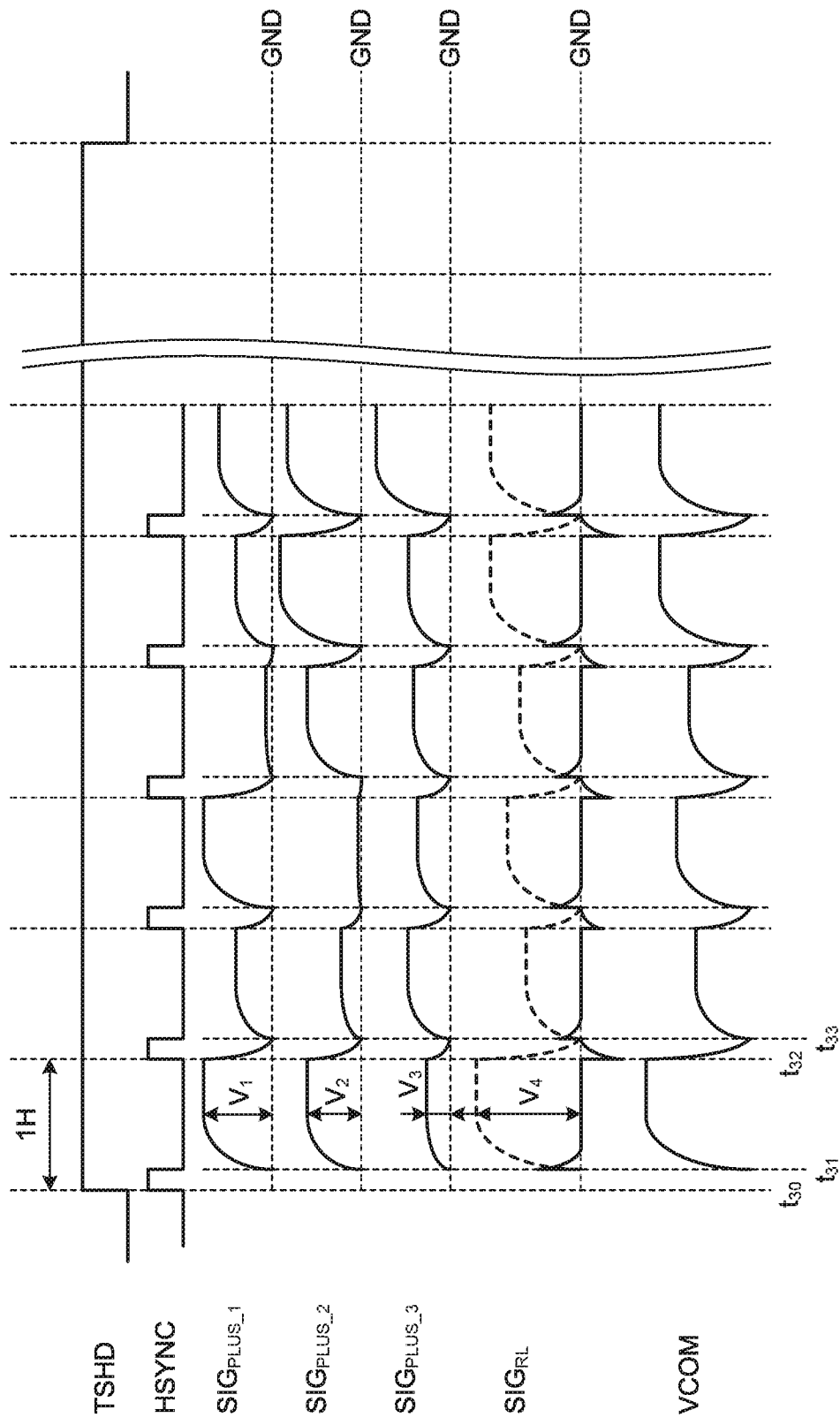
FIG. 9 is another diagram of the operating timing in the first exemplary operation performed by the display apparatus according to the first embodiment.

FIG. 9 is another diagram of the operating timing in the first exemplary operation performed by the display apparatus according to the first embodiment. FIG. 9 illustrates the period from timing $t_{22}$ to timing $t_{23}$ in FIG. 8, that is, the positive-polarity image detection period for the first unit $U_1$ of the first frame in greater detail.

The positive-polarity image detection period for the first unit $U_1$ of the first frame starts at timing $t_{30}$ corresponding to the rising edge of the timing signal TSHD. The period from timing $t_{30}$ corresponding to the first rising edge of the timing signal HSYNC to timing $t_{32}$ corresponding to the second rising edge of the timing signal HSYNC corresponds to the first horizontal period (1H).

The period from timing $t_{30}$ to timing $t_{31}$, which is a predetermined time after timing $t_{30}$, corresponds to a precharge period for the signal lines SL.

From timing $t_{30}$ to timing $t_{31}$, the amplifier $SIGAMP_1$ (refer to FIG. 5) of the horizontal driver 8 outputs the ground potential GND to the signal line $SL_1$, thereby precharging the signal line $SL_1$ with the ground potential GND. From timing $t_{30}$ to timing $t_{31}$, the amplifier $SIGAMP_3$ (refer to FIG. 5) of the horizontal driver 8 outputs the ground potential GND to the signal line $SL_3$, thereby precharging the signal line $SL_3$ with the ground potential GND. From timing $t_{30}$ to timing $t_{31}$, the amplifier $SIGAMP_5$ (refer to FIG. 5) of the horizontal driver 8 outputs the ground potential GND to the signal line $SL_5$, thereby precharging the signal line $SL_5$ with the ground potential GND.

At timing $t_{31}$, the amplifier $SIGAMP_1$ of the horizontal driver 8 outputs a positive-polarity pixel signal $SIG_{PLUS\_1}$ of red (R) to the signal line $SL_1$. At timing $t_{31}$, the amplifier $SIGAMP_3$ of the horizontal driver 8 outputs a positive-polarity pixel signal $SIG_{PLUS\_2}$ of blue (B) to the signal line $SL_3$. At timing $t_{31}$, the amplifier $SIGAMP_5$ of the horizontal driver 8 outputs a positive-polarity pixel signal $SIG_{PLUS\_3}$ of green (G) to the signal line $SL_5$.

When the pixel signals $SIG_{PLUS\_1}$, $SIG_{PLUS\_2}$, and $SIG_{PLUS\_3}$ are output to the signal lines $SL_1$, $SL_3$, and $SL_5$, respectively, a detection signal $SIG_{RL}$ is generated in the detection line $RL_1$ due to the pixel signals $SIG_{PLUS\_1}$, $SIG_{PLUS\_2}$, and $SIG_{PLUS\_3}$. The detection signal $SIG_{RL}$ is a differential signal of a voltage $V_4$. The COF 12 detects the differential waveform to calculate the voltage $V_4$. When $V_1$ is the voltage of the pixel signal $SIG_{PLUS\_1}$, $V_2$ is the voltage of the pixel signal $SIG_{PLUS\_2}$, and $V_3$ is the voltage of the pixel signal $SIG_{PLUS\_3}$, the voltage $V_4$ indicated by the dotted line is expressed by $(V_1+V_2+V_3)/3$, for example. The detection signal $SIG_{RL}$ indicated by the solid line is detected in a case where the detection circuit 12 described in FIG. 17, for example, is coupled to the detection line $RL_1$ and $RL_2$.

At a timing when the detection signal $SIG_{RL}$, becomes stable, that is, when a predetermined time has passed since timing $t_{30}$ corresponding to the rising edge of the timing signal HSYNC, the COF 12 reads the detection signal $SIG_{RL}$. The COF 12 performs sampling and A/D conversion on the detection signal, thereby obtaining the positive-polarity detection pixel data. The COF 12 may read the peak voltage of the detection signal $SIG_{RL}$, indicated by the solid line, thereby obtaining the positive-polarity detection pixel data.

From timing $t_{32}$ to timing $t_{33}$, which is a predetermined time after timing $t_{32}$, the amplifier $SIGAMP_1$ of the horizontal driver 8 outputs the ground potential GND to the signal line $SL_1$, thereby precharging the signal line $SL_1$ with the ground potential GND. From timing $t_{32}$ to timing $t_{33}$, which is a predetermined time after timing $t_{32}$, the amplifier $SIGAMP_3$ of the horizontal driver 8 outputs the ground potential GND to the signal line $SL_3$, thereby precharging the signal line $SL_3$ with the ground potential GND. From timing $t_{32}$ to timing $t_{33}$, which is a predetermined time after timing $t_{32}$, the amplifier $SIGAMP_5$ of the horizontal driver 8 outputs the ground potential GND to the signal line $SL_5$, thereby precharging the signal line $SL_5$ with the ground potential GND.

Similarly, the COF 12 performs positive-polarity image detection on the second and subsequent lines.

As described above, the number of pieces of detection pixel data in one line of the detection image data is (N/2). As illustrated in FIGS. 8 and 9, the display apparatus 1 performs image detection on a line-by-line basis. Consequently, the detection image data includes M×(N/2) pieces of pixel data. The display apparatus 1 may integrate (M/L) pieces of detection pixel data included in one column of one unit U into one piece of data. The display apparatus 1, for example, may perform an arithmetic mean or geometric mean calculation on (M/L) pieces of detection pixel data included in one column of one unit U, thereby obtaining one piece of detection pixel data. In this case, the detection image data includes L×(N/2) pieces of pixel data.

Figure 10:
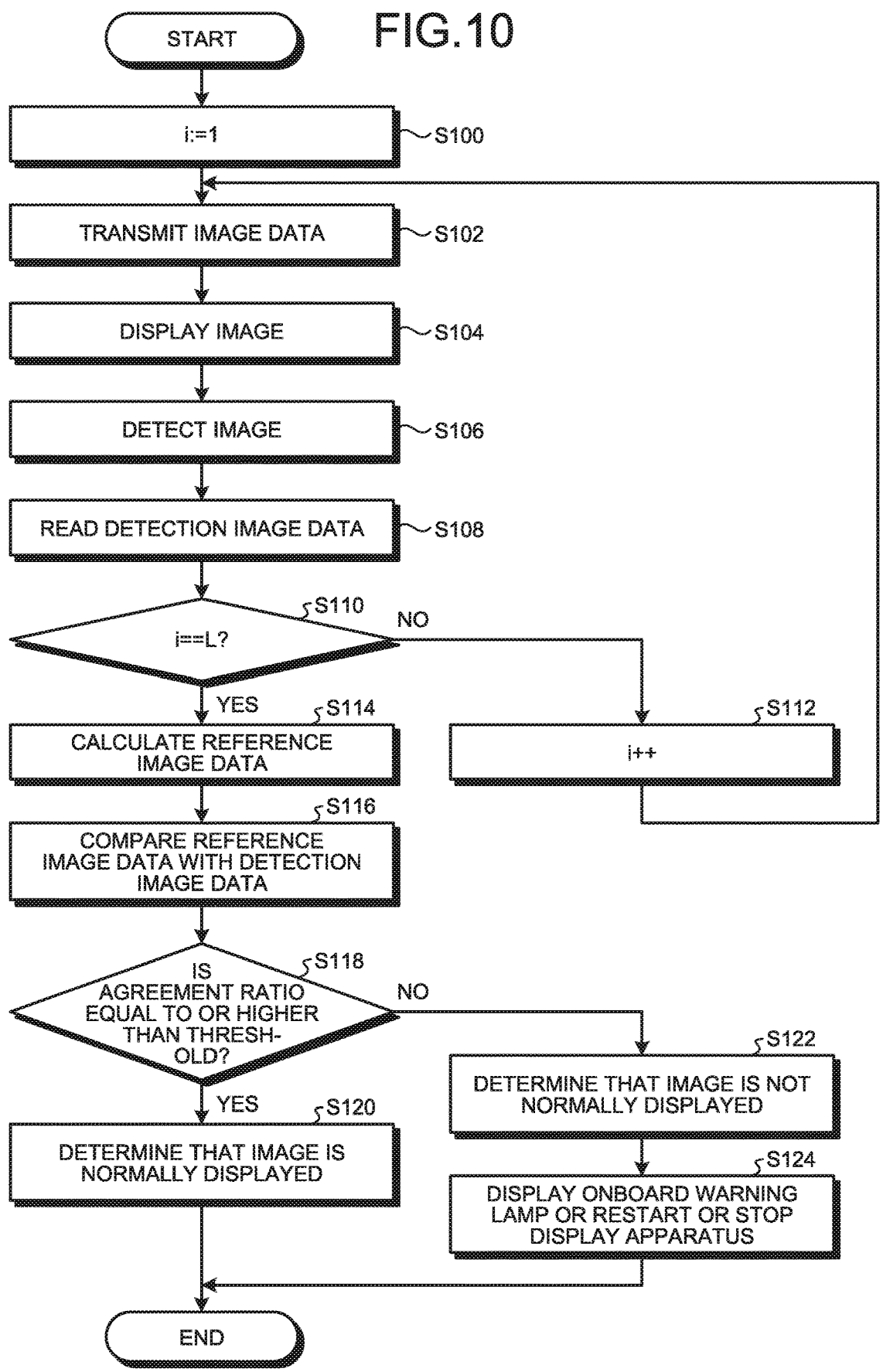
FIG. 10 is a flowchart of an operation in the first exemplary operation performed by the display apparatus according to the first embodiment.

FIG. 10 is a flowchart of an operation in the first exemplary operation performed by the display apparatus according to the first embodiment. The display apparatus 1 performs the operation illustrated in FIG. 10 on a frame-by-frame basis.

At Step S100, the host HST initializes a variable i to 1. The variable i indicates the number of the unit to be subjected to image display and image detection.

At Step S102, the host HST transmits image data for (M/L) horizontal lines of the i-th unit $U_i$ to the COG 11.

At Step S104, the COG 11 displays an image of the i-th unit $U_i$.

At Step S106, the COF 12 detects a positive- or negative-polarity image of the i-th unit At Step S108, the host HST reads positive- or negative-polarity detection image data of the i-th unit $U_i$ from the COF 12.

At Step S110, the host HST determines whether the variable i is equal to L, that is, whether image display and image detection for the L-th unit $U_L$ are finished. If the host HST determines that the variable i is not equal to L (No at Step S110), the host HST performs the processing at Step S112. If the host HST determines that the variable i is equal to L (Yes at Step S110), the host HST performs the processing at Step S114.

If the host HST determines that the variable i is not equal to L (No at Step S110), the host HST increments the variable i at Step S112 and performs the processing at Step S102 again.

If the host HST determines that the variable i is equal to L (Yes at Step S110), the host HST calculates reference image data based on the image data used in image display at Step S114. If a positive-polarity image of the i-th unit is detected from Step S102 to Step S108, the host HST removes pixel data output with the negative polarity from the image data and thus calculates the reference image data including only pixel data output with the positive polarity in the image data. If a negative-polarity image of the i-th unit is detected from Step S102 to Step S108, the host HST removes pixel data output with the positive polarity from the image data and calculates the reference image data including only pixel data output with the negative polarity in the image data.

The image data includes M×N pieces of pixel data because the display area DA includes M×N pixels Pix. By contrast, the detection image data includes M×(N/2) or L×(N/2) pieces of detection pixel data as described above. The host HST performs resizing operation of reducing the number of pixels on the image data, thereby determining the reference image data.

At Step S116, the host HST compares the reference image data with the detection image data. The host HST compares the reference image data with the detection image data on a pixel-by-pixel basis. In other words, the host HST compares the pixel data of the m-th row (m is an integer satisfying 1≤m≤M or 1≤m≤L) and the n-th column (n is an integer satisfying 1≤n≤(N/2)) in the reference image data with the detection pixel data of the m-th row and the n-th column in the detection image data. The host HST may compare the reference image data with the detection image data allowing a predetermined latitude in the pieces of pixel data in the reference image data or those in the detection image data while considering detection error in the detection image data.

When comparing the reference image data with the detection image data, the host HST may perform correction on the reference image data or the detection image data.

Figure 11:
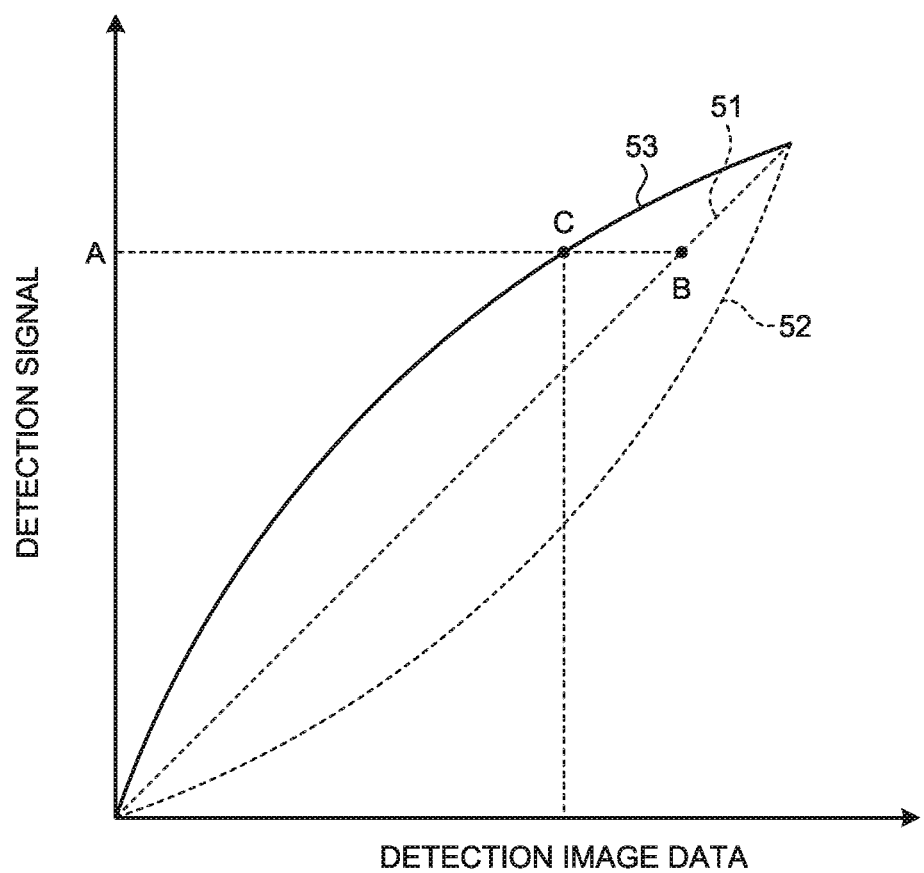
FIG. 11 is a graph of an example of the relation between a detection signal and detection image data.

FIG. 11 is a graph of an example of the relation between the detection signal and the detection image data. The relation between the gradation of image data and the gradation of an image actually displayed on the display device DSP is represented not by a linear shape like a line 51 but by a nonlinear shape like a line 52, for example. Consequently, the pixel signals are subjected to gamma correction as indicated by a line 53. The detection lines RL generate the detection signals due to the pixel signals. As a result, the detection signals are affected by gamma correction. To address this, the host HST may perform reverse correction of the gamma correction on the detection image data and then compare the reference image data with the detection image data. In other words, the host HST may define the detection image data not as an intersection B of a detection signal A and the line 51 but as an intersection C of the detection signal A and the line 53. Alternatively, the host HST may perform gamma correction on the reference image data and then compare the reference image data with the detection image data.

Referring back to FIG. 10, at Step S118, the host HST determines whether the matching ratio between the reference image data and the detection image data is equal to or higher than a predetermined threshold. The host HST divides the number of pieces of detection pixel data matching the reference pixel data by the number of all the pieces of detection pixel data in the detection image data, thereby calculating the matching ratio.

If the host HST determines that the matching ratio is equal to or higher than the predetermined threshold (Yes at Step S118), the host HST performs the processing at Step S120. If the host HST determines that the matching ratio is not equal to or higher than the predetermined threshold (No at Step S118), the host HST performs the processing at Step S122.

If the host HST determines that the matching ratio is equal to or higher than the predetermined threshold (Yes at Step S118), the host HST determines that the image is normally displayed at Step S120 and then finishes the processing.

If the host HST determines that the matching ratio is not equal to or higher than the predetermined threshold (No at Step S118), the host HST determines that the image is not normally displayed at Step S122. The host HST displays an onboard warning lamp or restarts or stops the display apparatus 1 at Step S124 and then finishes the processing.

1-2. Second Exemplary Operation Performed by the Display Apparatus According to the First Embodiment The following describes a second exemplary operation performed by the display apparatus 1 according to the first embodiment. In the second exemplary operation, the display apparatus 1 performs image display and image detection row by row.

Figure 12:
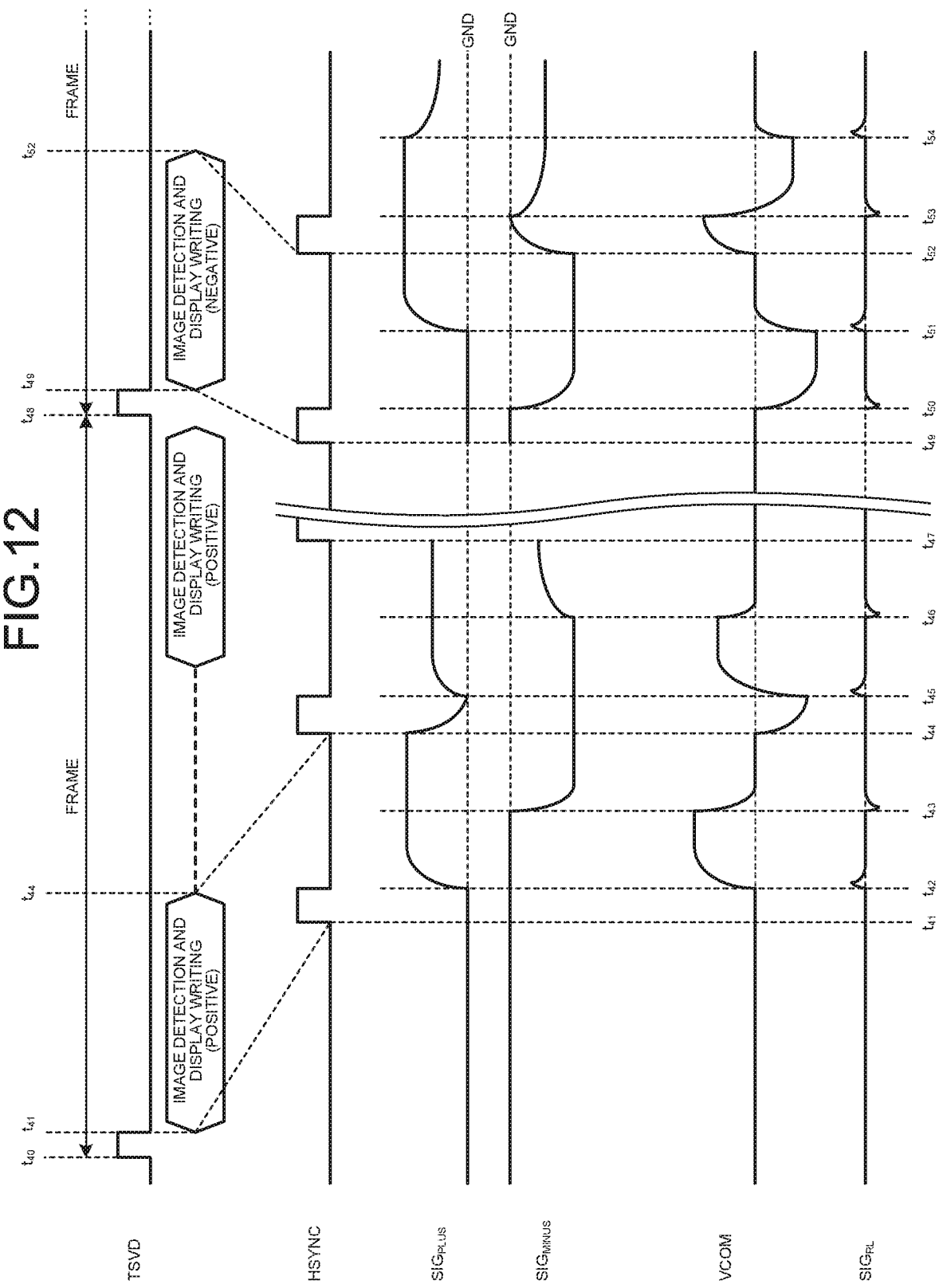
FIG. 12 is a diagram of an operating timing in a second exemplary operation performed by the display apparatus according to the first embodiment.

FIG. 12 is a diagram of an operating timing in the second exemplary operation performed by the display apparatus according to the first embodiment.

The period from timing too of the first rising edge of the timing signal TSVD to timing $t_{48}$ of the second rising edge of the timing signal TSVD corresponds to the period of image display and image detection of the first frame. The period after timing $t_{48}$ of the second rising edge of the timing signal TSVD corresponds to the period of image display and image detection of the second frame.

A timing signal HSYNC for detection control output from the COG 11 to the COF 12 has the same frequency as that of the horizontal synchronization signal for display control for displaying an image on the display device DSP by the COG 11, for example.

During the entire period, the COG 11 outputs the control signals $SEL_1$ and $SEL_2$ (refer to FIG. 5) at a high level to the horizontal driver 8. As a result, the switches $SW_1$ to $SW_{12}$ are turned on.

The period from timing $t_{41}$ to timing $t_{44}$ corresponds to a positive-polarity image detection and display writing (image display) period for the first horizontal line of the first frame.

At timing $t_{41}$, the host HST outputs image data for the first horizontal line of the first frame to the COG 11. The COG 11 temporarily stores the image data for the first horizontal line of the first frame supplied from the host HST in the buffer 11a (refer to FIG. 2). The buffer 11a simply needs to have storage capacity large enough to store therein image data of one horizontal line.

The period from timing $t_{41}$ to timing $t_{42}$, which is a predetermined time after timing $t_{41}$, corresponds to a precharge period for the signal lines SL.

From timing $t_{41}$ to timing $t_{42}$, the horizontal driver 8 outputs the ground potential GND to all the signal lines SL, thereby precharging all the signal lines SL with the ground potential GND.

The period from timing $t_{42}$ to timing $t_{43}$ corresponds to the positive-polarity image detection period for the first horizontal line of the first frame.

At timing $t_{42}$, the COG 11 causes the horizontal driver 8 to output the positive-polarity pixel signals for the first horizontal line of the first frame based on the image data for the first horizontal line of the first frame stored in the buffer 11a. The horizontal driver 8 outputs the positive-polarity pixel signals $SIG_{PLUS}$ for the first horizontal line of the first frame to one group of the two groups (the group of the odd-numbered signal lines SL and the group of the even-numbered signal lines SL) of the N signal lines SL. The horizontal driver 8 maintains the electric potential (ground potential GND) of the other group of the two groups of the N signal lines SL.

The horizontal driver 8, for example, outputs the positive-polarity pixel signals $SIG_{PLUS}$ for the first horizontal line of the first frame to the group of the odd-numbered signal lines SL (refer to the signal lines $SL_1$, $SL_3$, $SL_5$, ... in FIG. 5) out of the N signal lines SL. The horizontal driver 8 maintains the electric potential (ground potential GND) of the group of the even-numbered signal lines SL (refer to the signal lines $SL_2$, $SL_4$, $SL_6$, ... in FIG. 5) out of the N signal lines SL.

From timing $t_{41}$ to timing $t_{43}$, the COG 11 outputs the control signal $SEL_3$ (refer to FIG. 5) at a low level to the drive electrode driver 9. As a result, the switches $SW_{21}$ and $SW_{22}$ are turned off. Consequently, all the drive electrodes COML are brought into a floating state.

Figure 17:
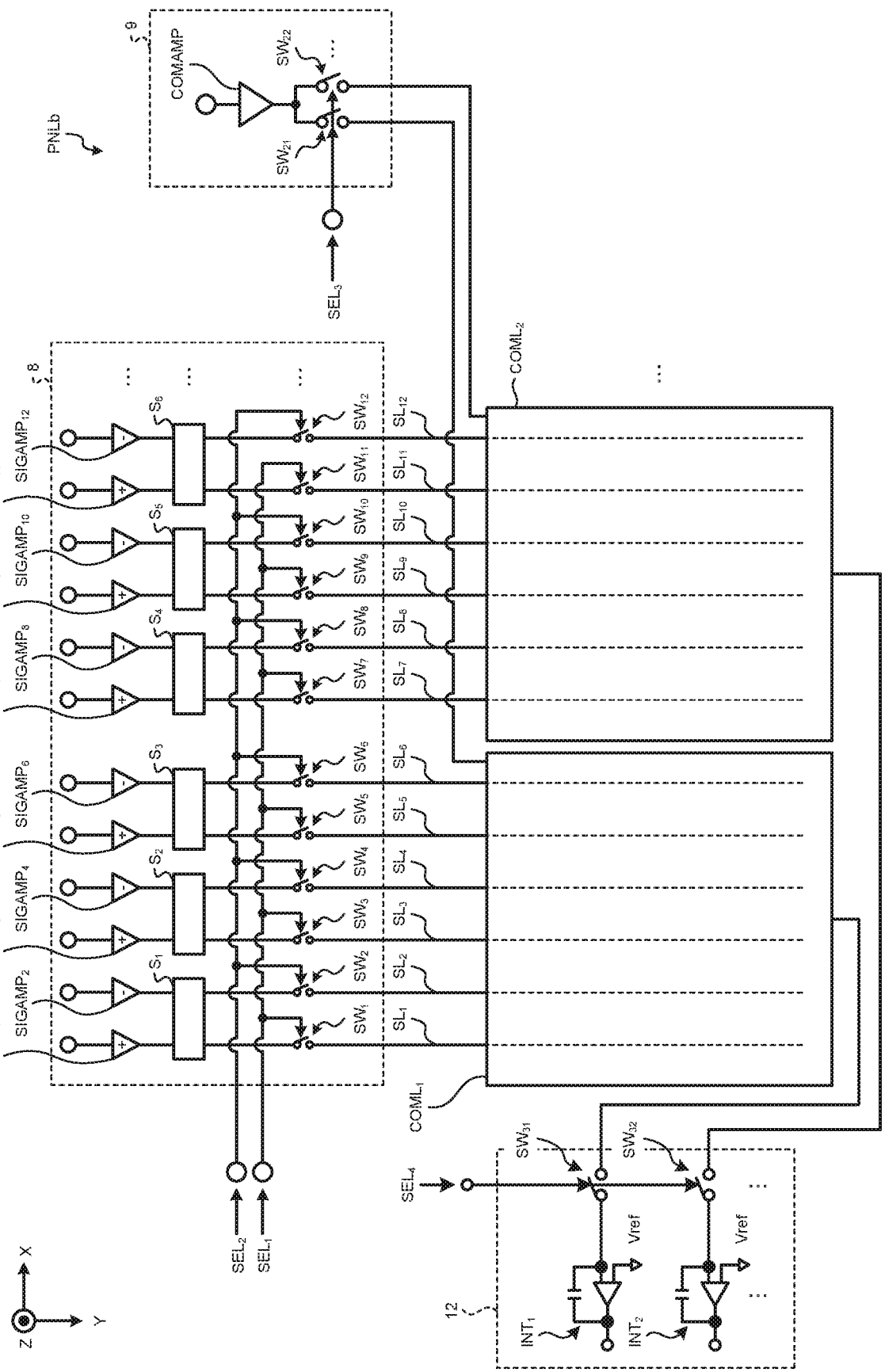
FIG. 17 is a diagram of the configuration of the horizontal driver and the drive electrode driver of the display apparatus according to the second embodiment.

Referring back to FIG. 5, when the drive electrode $COML_1$ is in a floating state, the electric potential of the drive electrode $COML_1$ changes due to the pixel signals $SIG_{PLUS}$ supplied to the signal lines $SL_1$, $SL_3$, and $SL_5$. Because the signal lines $SL_1$, $SL_3$, and $SL_5$ are capacitively coupled to the detection line $RL_1$, the detection signal $SIG_{RL}$ is generated in the detection line $RL_1$ due to the pixel signals $SIG_{PLUS}$ supplied to the signal lines $SL_1$, $SL_3$, and $SL_5$. The COF 12 reads the detection signal $SIG_{RL}$, at a timing based on the timing signal HSYNC, for example, at timing $t_{42}$. The COF 12 performs sampling and A/D conversion on the detection signal, thereby obtaining the positive-polarity detection pixel data. The detection signal $SIG_{RL}$, indicated by the slid line is a spike signal that is detected in a case, for example, where the detection circuit 12 described in FIG. 17 is coupled to the detection line $RL_1$ and $RL_2$. The COF 12 may read the peak voltage of the detection signal $SIG_{RL}$, thereby obtaining the positive-polarity detection pixel data.

The period from timing $t_{43}$ to timing $t_{44}$ corresponds to the display writing (image display) period for the first horizontal line of the first frame.

At timing $t_{43}$, the COG 11 causes the horizontal driver 8 to output the pixel signals based on the image data for the first horizontal line of the first frame stored in the buffer 11a. The horizontal driver 8 maintains the electric potential (positive-polarity pixel signals $SIG_{PLUS}$ for the first horizontal line of the first frame) of one group of the two groups (the group of the odd-numbered signal lines SL and the group of the even-numbered signal lines SL) of the N signal lines SL. The horizontal driver 8 outputs the negative-polarity pixel signals $SIG_{MINUS}$ for the first horizontal line of the first frame to the other group of the two groups of the N signal lines SL.

The horizontal driver 8, for example, maintains the electric potential (positive-polarity pixel signals $SIG_{PLUS}$ for the first horizontal line of the first frame) of the group of the odd-numbered signal lines SL (refer to the signal lines $SL_1$, $SL_3$, $SL_5$, ... in FIG. 5) out of the N signal lines SL. The horizontal driver 8 outputs the negative-polarity pixel signals $SIG_{MINUS}$ for the first horizontal line of the first frame to the group of the even-numbered signal lines SL (refer to the signal lines $SL_2$, $SL_4$, $SL_6$, ... in FIG. 5) out of the N signal lines SL.

From timing $t_{43}$ to timing $t_{44}$, the COG 11 outputs the control signal $SEL_3$ (refer to FIG. 5) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 4) and the drive electrodes COML, thereby displaying an image.

The period from timing $t_{44}$ to timing $t_{47}$ corresponds to a positive-polarity image detection and display writing (image display) period for the second horizontal line of the first frame.

At timing $t_{44}$, the host HST outputs image data for the second horizontal line of the first frame to the COG 11. The COG 11 temporarily stores the image data for the second horizontal line of the first frame supplied from the host HST in the buffer 11a (refer to FIG. 2).

The period from timing $t_{44}$ to timing $t_{45}$, which is a predetermined time after timing $t_{44}$, corresponds to a precharge period for the signal lines SL.

From timing $t_{44}$ to timing $t_{45}$, the horizontal driver 8 outputs the ground potential GND to one group of the two groups (the group of the odd-numbered signal lines SL and the group of the even-numbered signal lines SL) of the N signal lines SL. The horizontal driver 8 thus precharges the group of the odd-numbered or the even-numbered signal lines SL in the N signal lines SL with the ground potential GND. From timing $t_{44}$ to timing $t_{45}$, the horizontal driver 8 maintains the electric potential (negative-polarity pixel signals $SIG_{MINUS}$ for the first horizontal line of the first frame) of the other group of the two groups of the N signal lines SL.

The horizontal driver 8, for example, outputs the ground potential GND to the group of the odd-numbered signal lines SL (refer to the signal lines $SL_1$, $SL_3$, $SL_5$, ... in FIG. 5) out of the N signal lines SL. The horizontal driver 8 maintains the electric potential (negative-polarity pixel signals $SIG_{MINUS}$ for the first horizontal line of the first frame) of the group of the even-numbered signal lines SL (refer to the signal lines $SL_2$, $SL_4$, $SL_6$, ... in FIG. 5) out of the N signal lines SL.

The period from timing $t_{45}$ to timing $t_{46}$ corresponds to the positive-polarity image detection period for the second horizontal line of the first frame.

At timing $t_{45}$, the COG 11 causes the horizontal driver 8 to output the positive-polarity pixel signals based on the image data for the second horizontal line of the first frame stored in the buffer 11a. The horizontal driver 8 outputs the positive-polarity pixel signals $SIG_{PLUS}$ for the second horizontal line of the first frame to one group of the two groups (the group of the odd-numbered signal lines SL and the group of the even-numbered signal lines SL) of the N signal lines SL. The horizontal driver 8 maintains the electric potential (negative-polarity pixel signals $SIG_{MINUS}$ for the first horizontal line of the first frame) of the other group of the two groups of the N signal lines SL.

The horizontal driver 8, for example, outputs the positive-polarity pixel signals $SIG_{PLUS}$ for the second horizontal line of the first frame to the group of the odd-numbered signal lines SL (refer to the signal lines $SL_1$, $SL_3$, $SL_5$, ... in FIG. 5) out of the N signal lines SL. The horizontal driver 8 maintains the electric potential (negative-polarity pixel signals $SIG_{MINUS}$ for the first horizontal line of the first frame) of the group of the even-numbered signal lines SL (refer to the signal lines $SL_2$, $SL_4$, $SL_6$, ... in FIG. 5) out of the N signal lines SL.

From timing $t_{44}$ to timing $t_{46}$, the COG 11 outputs the control signal $SEL_3$ (refer to FIG. 5) at a low level to the drive electrode driver 9. As a result, the switches $SW_{21}$ and $SW_{22}$ are turned off. Consequently, all the drive electrodes COML are brought into a floating state.

Referring back to FIG. 5, when the drive electrode $COML_1$ is in a floating state, the electric potential of the drive electrode $COML_1$ changes due to the pixel signals $SIG_{PLUS}$ supplied to the signal lines $SL_1$, $SL_3$, and $SL_5$. Because the signal lines $SL_1$, $SL_3$, and $SL_5$ are capacitively coupled to the detection line $RL_1$, the detection signal $SIG_{RL}$ is generated in the detection line $RL_1$ due to the pixel signals $SIG_{PLUS}$ supplied to the signal lines $SL_1$, $SL_3$, and $SL_5$. The COF 12 reads the detection signal $SIG_{RL}$, at a timing based on the timing signal HSYNC, for example, at timing $t_{45}$. The COF 12 performs sampling and A/D conversion on the detection signal, thereby obtaining the positive-polarity detection pixel data. The COF 12 may read the peak voltage of the detection signal $SIG_{RL}$, thereby obtaining the positive-polarity detection pixel data.

The period from timing $t_{46}$ to timing $t_{47}$ corresponds to the display writing (image display) period for the second horizontal line of the first frame.

At timing $t_{46}$, the COG 11 causes the horizontal driver 8 to output the pixel signals based on the image data for the second horizontal line of the first frame stored in the buffer 11a. The horizontal driver 8 maintains the electric potential (positive-polarity pixel signals $SIG_{PLUS}$ for the second horizontal line of the first frame) of one group of the two groups (the group of the odd-numbered signal lines SL and the group of the even-numbered signal lines SL) of the N signal lines SL. The horizontal driver 8 outputs the negative-polarity pixel signals $SIG_{MINUS}$ for the second horizontal line of the first frame to the other group of the two groups of the N signal lines SL.

The horizontal driver 8, for example, maintains the electric potential (positive-polarity pixel signals $SIG_{PLUS}$ for the second horizontal line of the first frame) of the group of the odd-numbered signal lines SL (refer to the signal lines $SL_1$, $SL_3$, $SL_5$, ... in FIG. 5) out of the N signal lines SL. The horizontal driver 8 outputs the negative-polarity pixel signals $SIG_{MINUS}$ for the second horizontal line of the first frame to the group of the even-numbered signal lines SL (refer to the signal lines $SL_2$, $SL_4$, $SL_6$, ... in FIG. 5) out of the N signal lines SL.

From timing $t_{46}$ to timing $t_{47}$, the COG 11 outputs the control signal $SEL_3$ (refer to FIG. 5) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 4) and the drive electrodes COML, thereby displaying an image.

Similarly, the COG 11 and the COF 12 perform positive-polarity image detection and display writing (image display) of the third to M-th horizontal lines of the first frame.

The period from timing $t_{49}$ to timing $t_{52}$ corresponds to a negative-polarity image detection and display writing (image display) period for the first horizontal line of the second frame.

At timing $t_{49}$, the host HST outputs image data for the first horizontal line of the second frame to the COG 11. The COG 11 temporarily stores the image data for the first horizontal line of the second frame supplied from the host HST in the buffer 11a (refer to FIG. 2). The buffer 11a simply needs to have storage capacity large enough to store therein image data of one horizontal line.

The period from timing $t_{49}$ to timing $t_{50}$, which is a predetermined time after timing $t_{49}$, corresponds to a pre-charge period for the signal lines SL.

From timing $t_{49}$ to timing $t_{50}$, the horizontal driver 8 outputs the ground potential GND to all the signal lines SL, thereby precharging all the signal lines SL with the ground potential GND. The period from timing $t_{50}$ to timing $t_{51}$ corresponds to the negative-polarity image detection period for the first horizontal line of the second frame.

At timing $t_{50}$, the COG 11 causes the horizontal driver 8 to output the negative-polarity pixel signals for the first horizontal line of the second frame based on the image data for the first horizontal line of the second frame stored in the buffer 11a. The horizontal driver 8 outputs the negative-polarity pixel signals $SIG_{MINUS}$ for the first horizontal line of the second frame to one group of the two groups (the group of the odd-numbered signal lines SL and the group of the even-numbered signal lines SL) of the N signal lines SL. The horizontal driver 8 maintains the electric potential (ground potential GND) of the other group of the two groups of the N signal lines SL.

The horizontal driver 8, for example, outputs the negative-polarity pixel signals $SIG_{MINUS}$ for the first horizontal line of the second frame to the group of the even-numbered signal lines SL (refer to the signal lines $SL_2$, $SL_4$, $SL_6$, ... in FIG. 5) out of the N signal lines SL. The horizontal driver 8 maintains the electric potential (ground potential GND) of the group of the odd-numbered signal lines SL (refer to the signal lines $SL_1$, $SL_3$, $SL_5$, ... in FIG. 5) out of the N signal lines SL.

From timing $t_{50}$ to timing $t_{51}$, the COG 11 outputs the control signal $SEL_3$ (refer to FIG. 5) at a low level to the drive electrode driver 9. As a result, the switches $SW_{21}$ and $SW_{22}$ are turned off. Consequently, all the drive electrodes COML are brought into a floating state.

Referring back to FIG. 5, when the drive electrode $COML_1$ is in a floating state, the electric potential of the drive electrode $COML_1$ changes due to the pixel signals $SIG_{MINUS}$ supplied to the signal lines $SL_2$, $SL_4$, and $SL_6$. Because the signal lines $SL_2$, $SL_4$, and $SL_6$ are capacitively coupled to the detection line $RL_1$, the detection signal $SIG_{RL}$ is generated in the detection line $RL_1$ due to the pixel signals $SIG_{MINUS}$ supplied to the signal lines $SL_2$, $SL_4$, and $SL_6$. The COF 12 reads the detection signal $SIG_{RL}$, at a timing based on the timing signal HSYNC, for example, at timing $t_{50}$. The COF 12 performs sampling and A/D conversion on the detection signal, thereby obtaining the negative-polarity detection pixel data. The COF 12 may read the peak voltage of the detection signal SIG L, thereby obtaining the negative-polarity detection pixel data.

The period from timing $t_{51}$ to timing $t_{52}$ corresponds to the display writing (image display) period for the first horizontal line of the second frame.

At timing $t_{51}$, the COG 11 causes the horizontal driver 8 to output the pixel signals based on the image data for the first horizontal line of the second frame stored in the buffer 11a. The horizontal driver 8 maintains the electric potential (negative-polarity pixel signals $SIG_{MINUS}$ for the first horizontal line of the second frame) of one group of the two groups (the group of the odd-numbered signal lines SL and the group of the even-numbered signal lines SL) of the N signal lines SL. The horizontal driver 8 outputs the positive-polarity pixel signals $SIG_{PLUS}$ for the first horizontal line of the second frame to the other group of the two groups of the N signal lines SL.

The horizontal driver 8, for example, maintains the electric potential (negative-polarity pixel signals $SIG_{MINUS}$ for the first horizontal line of the second frame) of the group of the even-numbered signal lines SL (refer to the signal lines $SL_2$, $SL_4$, $SL_6$, . . . in FIG. 5) out of the N signal lines SL. The horizontal driver 8 outputs the positive-polarity pixel signals $SIG_{PLUS}$ for the first horizontal line of the second frame to the group of the odd-numbered signal lines SL (refer to the signal lines $SL_1$, $SL_3$, $SL_5$, . . . in FIG. 5) out of the N signal lines SL.

From timing $t_{51}$ to timing $t_{52}$, the COG 11 outputs the control signal $SEL_3$ (refer to FIG. 5) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 4) and the drive electrodes COML, thereby displaying an image.

The period after timing $t_{52}$ corresponds to a negative-polarity image detection and display writing (image display) period for the second horizontal line of the second frame.

At timing $t_{52}$, the host HST outputs image data for the second horizontal line of the second frame to the COG 11. The COG 11 temporarily stores the image data for the second horizontal line of the second frame supplied from the host HST in the buffer 11a (refer to FIG. 2).

The period from timing $t_{52}$ to timing $t_{53}$, which is a predetermined time after timing $t_{52}$, corresponds to a precharge period for the signal lines SL.

From timing $t_{52}$ to timing $t_{53}$, the horizontal driver 8 outputs the ground potential GND to one group of the two groups (the group of the odd-numbered signal lines SL and the group of the even-numbered signal lines SL) of the N signal lines SL. The horizontal driver 8 thus precharges the group of the odd-numbered or the even-numbered signal lines SL in the N signal lines SL with the ground potential GND. From timing $t_{52}$ to timing $t_{53}$, the horizontal driver 8 maintains the electric potential (positive-polarity pixel signals $SIG_{PLUS}$ for the first horizontal line of the second frame) of the other group of the two groups of the N signal lines SL.

The horizontal driver 8, for example, outputs the ground potential GND to the group of the even-numbered signal lines SL (refer to the signal lines $SL_2$, $SL_4$, $SL_6$, . . . in FIG. 5) out of the N signal lines SL. The horizontal driver 8 maintains the electric potential (positive-polarity pixel signals $SIG_{PLUS}$ for the first horizontal line of the second frame) of the group of the odd-numbered signal lines SL (refer to the signal lines $SL_1$, $SL_3$, $SL_5$, . . . in FIG. 5) out of the N signal lines SL.

The period from timing $t_{53}$ to timing $t_{54}$ corresponds to the negative-polarity image detection period for the second horizontal line of the second frame.

At timing $t_{53}$, the COG 11 causes the horizontal driver 8 to output the negative-polarity pixel signals based on the image data for the second horizontal line of the second frame stored in the buffer 11a. The horizontal driver 8 outputs the negative-polarity pixel signals $SIG_{MINUS}$ for the second horizontal line of the second frame to one group of the two groups (the group of the odd-numbered signal lines SL and the group of the even-numbered signal lines SL) of the N signal lines SL. The horizontal driver 8 maintains the electric potential (positive-polarity pixel signals $SIG_{PLUS}$ for the first horizontal line of the second frame) of the other group of the two groups of the N signal lines SL.

The horizontal driver 8, for example, outputs the negative-polarity pixel signals $SIG_{MINUS}$ for the second horizontal line of the second frame to the group of the even-numbered signal lines SL (refer to the signal lines $SL_2$, $SL_4$, $SL_6$, . . . in FIG. 5) out of the N signal lines SL. The horizontal driver 8 maintains the electric potential (positive-polarity pixel signals $SIG_{PLUS}$ for the first horizontal line of the second frame) of the group of the odd-numbered signal lines SL (refer to the signal lines $SL_1$, $SL_3$, $SL_5$, . . . in FIG. 5) out of the N signal lines SL.

From timing $t_{52}$ to timing $t_{54}$, the COG 11 outputs the control signal $SEL_3$ (refer to FIG. 5) at a low level to the drive electrode driver 9. As a result, the switches $SW_{21}$ and $SW_{22}$ are turned off. Consequently, all the drive electrodes COML are brought into a floating state.

Referring back to FIG. 5, when the drive electrode $COML_1$ is in a floating state, the electric potential of the drive electrode $COML_1$ changes due to the pixel signals $SIG_{MINUS}$ supplied to the signal lines $SL_2$, $SL_4$, and $SL_6$. Because the signal lines $SL_2$, $SL_4$, and $SL_6$ are capacitively coupled to the detection line $RL_1$, the detection signal $SIG_{RL}$ is generated in the detection line $RL_1$ due to the pixel signals $SIG_{MINUS}$ supplied to the signal lines $SL_2$, $SL_4$, and $SL_6$. The COF 12 reads the detection signal $SIG_{RL}$, at a timing based on the timing signal HSYNC, for example, at timing $t_{53}$. The COF 12 performs sampling and A/D conversion on the detection signal, thereby obtaining the negative-polarity detection pixel data. The COF 12 may read the peak voltage of the detection signal $SIG_{RL}$, thereby obtaining the negative-polarity detection pixel data.

The period after timing $t_{54}$ corresponds to a display writing (image display) period for the second horizontal line of the second frame.

At timing $t_{54}$, the COG 11 causes the horizontal driver 8 to output the pixel signals based on the image data for the second horizontal line of the second frame stored in the buffer 11a. The horizontal driver 8 maintains the electric potential (negative-polarity pixel signals $SIG_{MINUS}$ for the second horizontal line of the second frame) of one group of the two groups (the group of the odd-numbered signal lines SL and the group of the even-numbered signal lines SL) of the N signal lines SL. The horizontal driver 8 outputs the positive-polarity pixel signals $SIG_{PLUS}$ for the second horizontal line of the second frame to the other group of the two groups of the N signal lines SL.

The horizontal driver 8, for example, maintains the electric potential (negative-polarity pixel signals $SIG_{MINUS}$ for the second horizontal line of the second frame) of the group of the even-numbered signal lines SL (refer to the signal lines $SL_2$, $SL_4$, $SL_6$, . . . in FIG. 5) out of the N signal lines SL. The horizontal driver 8 outputs the positive-polarity pixel signals $SIG_{PLUS}$ for the second horizontal line of the second frame to the group of the odd-numbered signal lines SL (refer to the signal lines $SL_1$, $SL_3$, $SL_5$, . . . in FIG. 5) out of the N signal lines SL.

From timing $t_{54}$, the COG 11 outputs the control signal $SEL_3$ (refer to FIG. 5) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 4) and the drive electrodes COML, thereby displaying an image.

Similarly, the COG 11 and the COF 12 perform negative-polarity image detection and display writing (image display) of the third e to M-th horizontal lines of the second frame.

As described above, the number of pieces of detection pixel data in one line of the detection image data is (N/2). As illustrated in FIG. 12, the display apparatus 1 performs image detection on a line-by-line basis. Consequently, the detection image data includes M×(N/2) pieces of pixel data.

Figure 13:
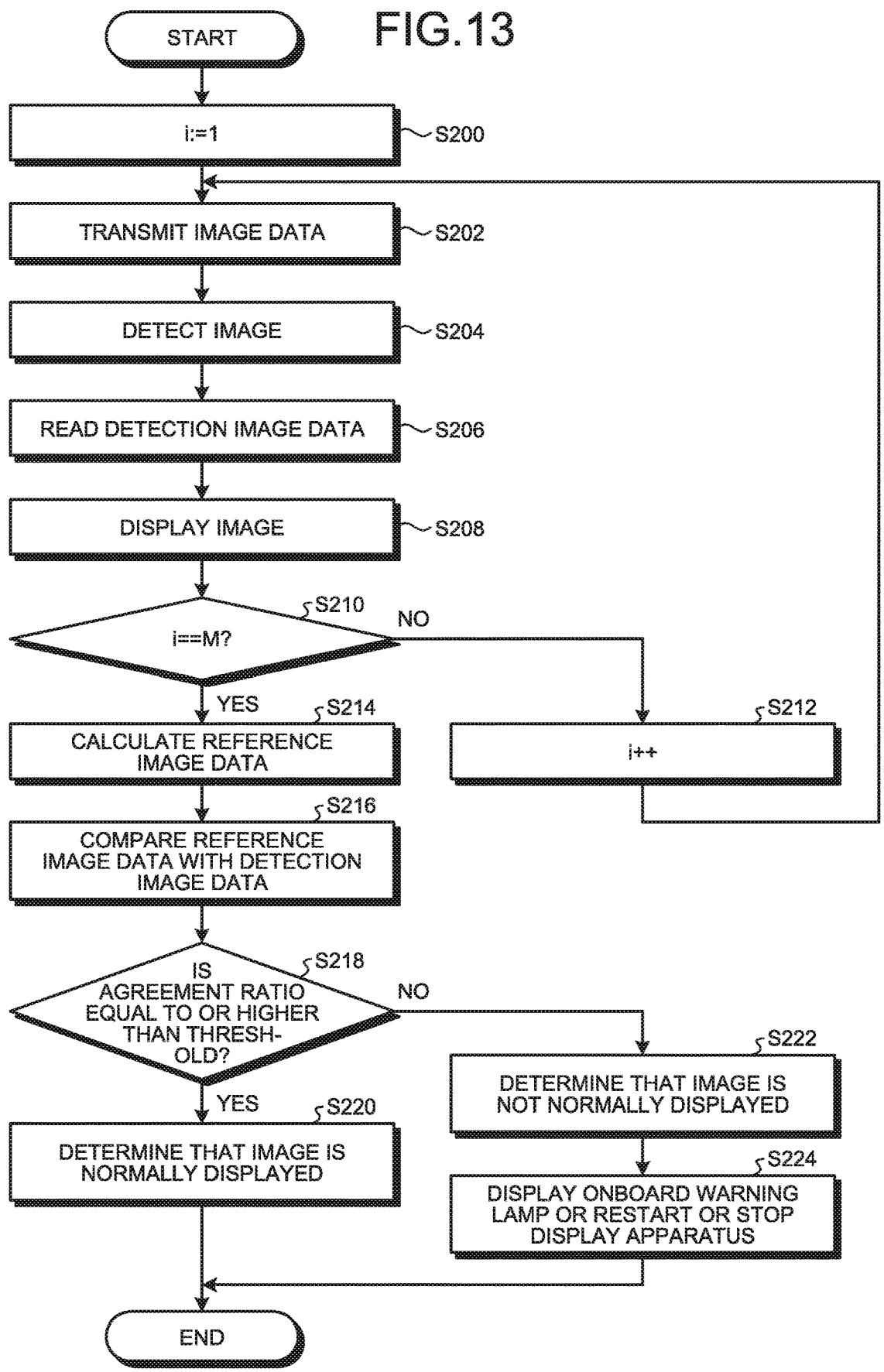
FIG. 13 is a flowchart of an operation in the second exemplary operation performed by the display apparatus according to the first embodiment.

FIG. 13 is a flowchart of an operation in the second exemplary operation performed by the display apparatus according to the first embodiment. The display apparatus 1 performs the operation illustrated in FIG. 13 on a frame-by-frame basis.

At Step S200, the host HST initializes a variable i to 1. The variable i indicates the number of the line to be subjected to image detection and display writing (image display).

At Step S202, the host HST transmits image data for the i-th horizontal line to the COG At Step S204, the COF 12 detects a positive- or negative-polarity image of the i-th horizontal line.

At Step S206, the host HST reads positive- or negative-polarity detection image data of the i-th horizontal line from the COF 12.

At Step S208, the COG 11 displays an image of the i-th horizontal line.

At Step S210, the host HST determines whether the variable i is equal to M. If the host HST determines that the variable i is not equal to M (No at Step S210), the host HST performs the processing at Step S212. If the host HST determines that the variable i is equal to M (Yes at Step S210), the host HST performs the processing at Step S214.

If the host HST determines that the variable i is not equal to M (No at Step S210), the host HST increments the variable i at Step S212 and performs the processing at Step S202 again.

Explanation of the processing from Step S214 to Step S224 is omitted because it is the same as the processing from Step S114 to Step S124 (refer to FIG. 10) in the first exemplary operation.

The display apparatus 1 has the following characteristics. The display apparatus 1 also has characteristics other than those described below. The detection lines RL of the detector DET are capacitively coupled to the signal lines SL of the display device DSP. The detection signals are generated in the detection lines RL due to the pixel signals supplied to the signal lines SL. If no problem occurs in the paths from the COG 11 to the signal lines SL via the horizontal driver 8, the detection image data matches the image data. By contrast, if a problem occurs in the paths from the COG 11 to the signal lines SL via the horizontal driver 8, the detection image data does not match the image data. Consequently, the display apparatus 1 can determine whether any problem occurs in the paths from the COG 11 to the signal lines SL via the horizontal driver 8 based on the detection image data, thereby enhancing the safety.

If a problem occurs in a pixel Pix positioned downstream of the signal lines SL, the display apparatus 1 fails to detect the problem occurring in the pixel Pix. If a problem occurs in a pixel Pix, however, only one dot in the image is affected by the problem, resulting in a slight effect on the safety. By contrast, if a problem occurs in a path from the COG 11 to a signal line SL via the horizontal driver 8, one column in the image is affected by the problem, resulting in a larger effect on the safety. The display apparatus 1 can determine whether any problem occurs in the paths from the COG 11 to the signal lines SL via the horizontal driver 8, thereby enhancing the safety.

The display apparatus 1 detects an image using the detection lines RL disposed in a layer different from that of the signal lines SL. With this configuration, the pixels Pix do not include the detector of the liquid crystal display device disclosed in JP-A-2009-276612. Consequently, the display apparatus 1 can provide desired high-definition display. Unlike the liquid crystal display device disclosed in JP-A-2009-276612, the display apparatus 1 includes neither the X driver for measurement nor the Y driver for measurement. Consequently, the display apparatus 1 requires a smaller number of circuits, has a smaller size, and can be manufactured at a lower cost.

The structure of the panel PNL (refer to FIGS. 2 and 4) has features in common with the structures of widely spread mutual capacitive display apparatuses with a touch detection function. As illustrated in FIG. 2, the extending direction of the detection lines RL is the same as that of the drive electrodes COML in the display apparatus 1. By contrast, in a display apparatus with a touch detection function, the extending direction of touch detection lines intersects that of drive electrodes. A touch is detected at the intersections of the drive electrodes and the touch detection lines. As illustrated in FIG. 4, the layer of the detection lines RL is the same as that of the detection lines of a display apparatus with a touch detection function. Consequently, the panel PNL can be manufactured by changing the extending direction of the detection lines of a display apparatus with a touch detection function. In other words, the panel PNL can be manufactured using the manufacturing process for a display apparatus with a touch detection function. Consequently, the panel PNL can be manufactured at lower development and manufacturing costs.

The COF 12 has features in common with a touch IC of a display apparatuses with a touch detection function. As illustrated in FIG. 2, the COF 12 is coupled to the detection lines RL and reads the detection signals generated in the detection lines RL. In other words, the COF 12 can be manufactured using part or all of the touch IC of a display apparatus with a touch detection function. Consequently, the COF 12 can be manufactured at lower development and manufacturing costs. The display apparatus 1 may supply a positive- or negative-polarity signal to at least one signal line SL and detect a detection signal with at least one detection line RL corresponding to the at least one signal line SL supplied with the positive- or negative-polarity signal.

1-3. Modifications

While the first embodiment describes a case where the present invention is applied to a lateral electric field mode liquid crystal display apparatus, the present invention is not necessarily applied thereto. The present invention is also applicable to a vertical electric field mode liquid crystal display apparatus. Examples of the modes of the vertical electric field mode liquid crystal display apparatus include, but are not limited to, a twisted nematic (TN) mode, a vertical alignment (VA) mode, an electrically controlled birefringence (ECB) mode, etc.

Figure 14:
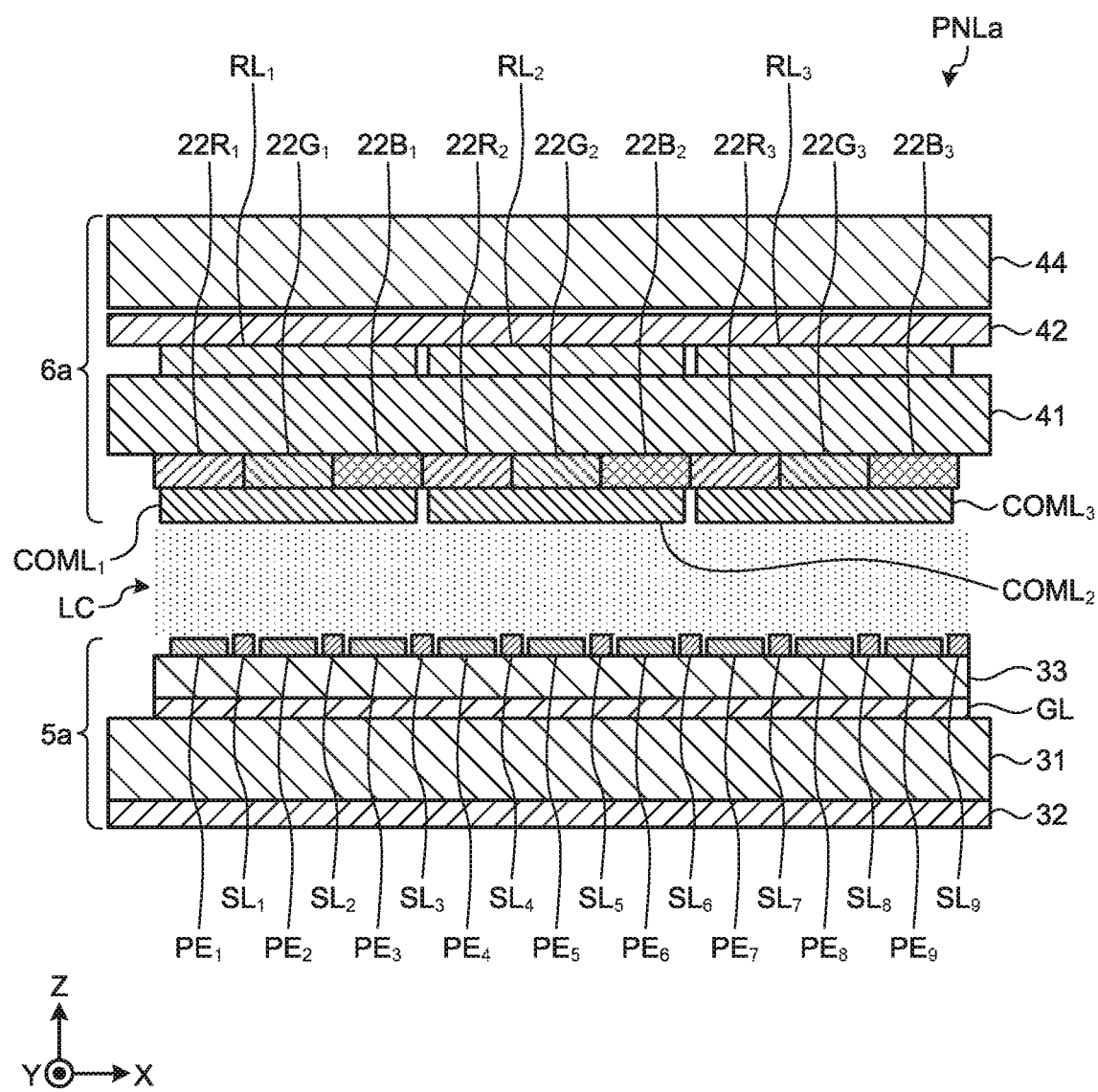
FIG. 14 is a schematic diagram of a sectional structure of a panel of a display apparatus according to a modification of the first embodiment.

FIG. 14 is a schematic diagram of a sectional structure of a panel of a display apparatus according to a modification of the first embodiment. FIG. 14 is a schematic diagram of a sectional structure of three pixels Pix.

A panel PNLa is an in-cell apparatus in which the detector DET is integrated with the display device DSP.

The panel PNLa includes a first substrate 5a, a second substrate 6a, and the liquid crystal LC. The second substrate 6a faces the first substrate 5a. The liquid crystal LC is disposed between the first substrate 5a and the second substrate 6a.

The first substrate 5a includes the substrate 31 serving as a translucent insulation substrate. The polarization plate 32 is disposed on the surface of the substrate 31 facing in the opposite direction of the Z-direction.

The scanning line GL serving as a metal layer is provided on the surface of the substrate 31 facing in the Z-direction. The scanning line GL extends in the X-direction (horizontal direction in FIG. 14). The insulation layer 33 is provided on the scanning line GL in the Z-direction. The TFT elements Tr (refer to FIG. 3), which are not illustrated in FIG. 14, may be provided between the scanning line GL and the insulation layer 33.

Pixel electrodes $PE_1$ to $PE_9$, which serve as a transparent conductive film layer, and signal lines $SL_1$ to $SL_9$ are alternately provided on a surface of the insulation layer 33 facing in the Z-direction. The signal lines SL extend in the Y-direction (direction perpendicular to the plane of FIG. 14).

The second substrate 6a includes the substrate 41 serving as a translucent insulation substrate. A color area $22R_1$ colored in red (R), a color area $22G_1$ colored in green (G), a color area $22B_1$ colored in blue (B), a color area $22R_2$ colored in R, a color area $22G_2$ colored in G, a color area $22B_2$ colored in B, a color area $22R_3$ colored in R, a color area $22G_3$ colored in G, and a color area $22B_3$ colored in B are provided on the surface of the substrate 41 facing in the opposite direction of in the Z-direction.

The drive electrode $COML_1$ is provided on surfaces of the color areas $22R_1$, $22G_1$, and $22B_1$ facing in the opposite direction of the Z-direction. The drive electrode $COML_1$ extends in the Y-direction (direction perpendicular to the plane of FIG. 14).

The drive electrode $COML_2$ is provided on surfaces of the color areas $22R_2$, $22G_2$, and $22B_2$ facing in the opposite direction of the Z-direction. The drive electrode $COML_2$ extends in the Y-direction (direction perpendicular to the plane of FIG. 14).

The drive electrode $COML_3$ is provided on surfaces of the color areas $22R_3$, $22G_3$, and $22B_3$ facing in the opposite direction of the Z-direction. The drive electrode $COML_3$ extends in the Y-direction (direction perpendicular to the plane of FIG. 14).

Detection lines $RL_1$ to $RL_3$ are provided on the surface of the substrate 41 facing in the Z-direction. The detection lines $RL_1$ to $RL_3$ extend in the Y-direction (direction perpendicular to the plane of FIG. 14). The detection lines $RL_1$ to $RL_3$ correspond to the detector DET illustrated in FIG. 1.

The polarization plate 42 is disposed on the detection lines $RL_1$ to $RL_3$ in the Z-direction. The polarization plate 42 allows only polarization components having a certain polarization direction in the light having passed through the liquid crystal LC to pass therethrough. The translucent cover member 44 is disposed in the Z-direction with respect to the polarization plate 42. The cover member 44 is made of a glass or a resin, for example.

An electric field is formed between the drive electrode $COML_1$ and each of the pixel electrodes $PE_1$, $PE_2$, $PE_3$. The electric field causes the molecules of the liquid crystal LC to rise and fall along the Z-direction, thereby rotating the polarization direction of light having passed through the polarization plate 32. An electric field is formed between the drive electrode $COML_2$ and each of the pixel electrodes $PE_4$, $PE_5$, and $PE_6$. The electric field causes the molecules of the liquid crystal LC to rise and fall along the Z-direction, thereby rotating the polarization direction of light having passed through the polarization plate 32. An electric field is formed between the drive electrode $COML_3$ and each of the pixel electrodes $PE_7$, $PE_8$, and $PE_9$. The electric field causes the molecules of the liquid crystal LC to rise and fall along the Z-direction, thereby rotating the polarization direction of light having passed through the polarization plate 32. In other words, the panel PNLa is a vertical electric field mode liquid crystal display apparatus.

2. Second Embodiment

Figure 15:
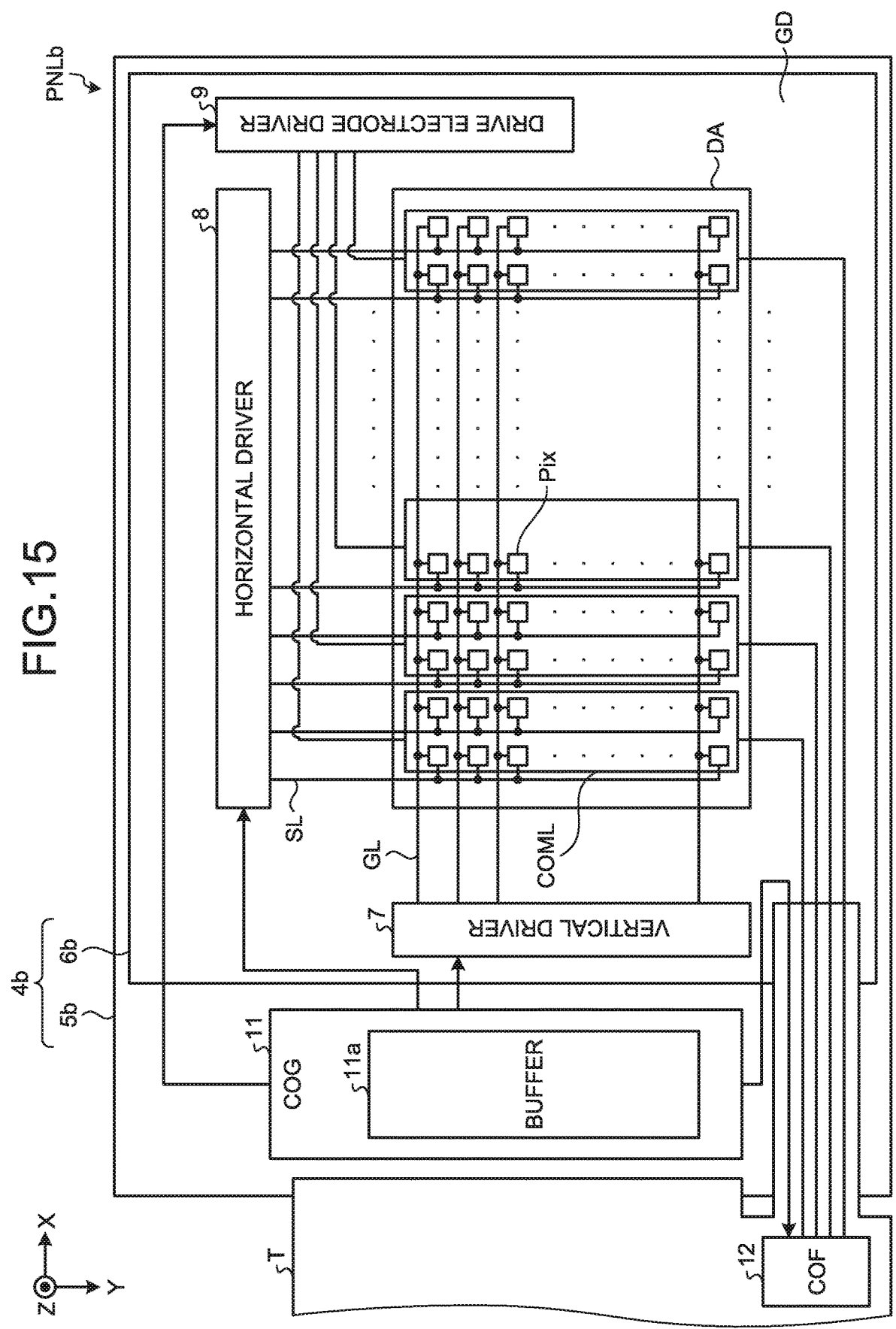
FIG. 15 is a diagram of the module configuration of a display apparatus according to a second embodiment.

FIG. 15 is a diagram of the module configuration of a display apparatus according to a second embodiment. In the second and subsequent embodiments, description of elements common to the first embodiment is appropriately omitted.

A panel PNLb includes a substrate 4b, the COG 11 serving as a driver IC, and the COF 12 serving as a detection IC. The substrate 4b includes a first substrate 5b and a second substrate 6b. The second substrate 6b is disposed in the Z-direction with respect to the first substrate 5b and faces the first substrate 5b with a predetermined space interposed therebetween.

The substrate 4b has the display area DA and the peripheral area GD. In the display area DA, a plurality of pixels Pix including liquid crystal elements are disposed in a matrix (row-column configuration). The peripheral area GD is positioned outside the display area DA. The peripheral area GD is provided with the vertical driver (vertical drive circuit) 7, the horizontal driver (horizontal drive circuit) 8, and the drive electrode driver 9.

The COG 11 is mounted on the first substrate 5b and controls the vertical driver 7, the horizontal driver 8, and the drive electrode driver 9. The COF 12 is mounted on the FPC T coupled to the first substrate 5b. The COG 11 and the COF 12 are coupled to the host HST (refer to FIG. 1) via the FPC T. The COG 11 includes the buffer 11a that temporarily stores therein image data supplied from the host HST.

The display area DA has a matrix (row-column) configuration in which the pixels Pix are arrayed in M-rows and N-columns. The display area DA is provided with the scanning lines GL and the signal lines SL. The scanning lines GL are provided for the respective rows in the array of M×N pixels Pix and extend in the X-direction. The signal lines SL are provided for the respective columns and extend in the Y-direction. In other words, the number of scanning lines GL is M, and the number of signal lines SL is N.

The display area DA is also provided with drive electrodes COML. The drive electrodes COML extending in the Y-direction are arranged one for every two columns of the pixels Pix. In other words, the number of drive electrodes COML is (N/2). The configuration described above is given by way of example only, and the drive electrodes COML are not necessarily arranged one for every two columns of the pixels Pix.

The drive electrode COML is made of a transparent material and shared by the pixels Pix of at least one column, for example. The drive electrodes COML are coupled to the drive electrode driver 9. In the image display period, the drive electrode driver 9 supplies the constant drive signals VCOM to the drive electrodes COML. In the image detection period, the drive electrode driver 9 brings the drive electrodes COML into a floating state (high-impedance state). In the image display period, the drive electrodes COML generate an electric field for driving the liquid crystals between the drive electrodes COML and the pixel electrodes PE (refer to FIG. 3).

The drive electrodes COML according to the present embodiment are capacitively coupled to the signal lines SL. In the image detection period, the drive electrodes COML generate detection signals due to the pixel signals supplied to the signal lines SL.

The drive electrodes COML according to the present embodiment correspond to the detector DET illustrated in FIG. 1.

The COF 12 is coupled to the drive electrodes COML. In the image detection period, the COF 12 outputs detection image data to the host HST based on the detection signals generated in the drive electrodes COML due to the pixel signals. The drive electrodes COML according to the present embodiment are arranged one for every two columns of the pixels Pix. In other words, the number of pieces of detection pixel data in one line of the detection image data is (N/2). The configuration described above is given by way of example only, and the drive electrodes COML are not necessarily arranged one for every two columns of the pixels Pix. The drive electrodes COML may be arranged one for every one or every three or more columns of the pixels Pix.

Figure 16:
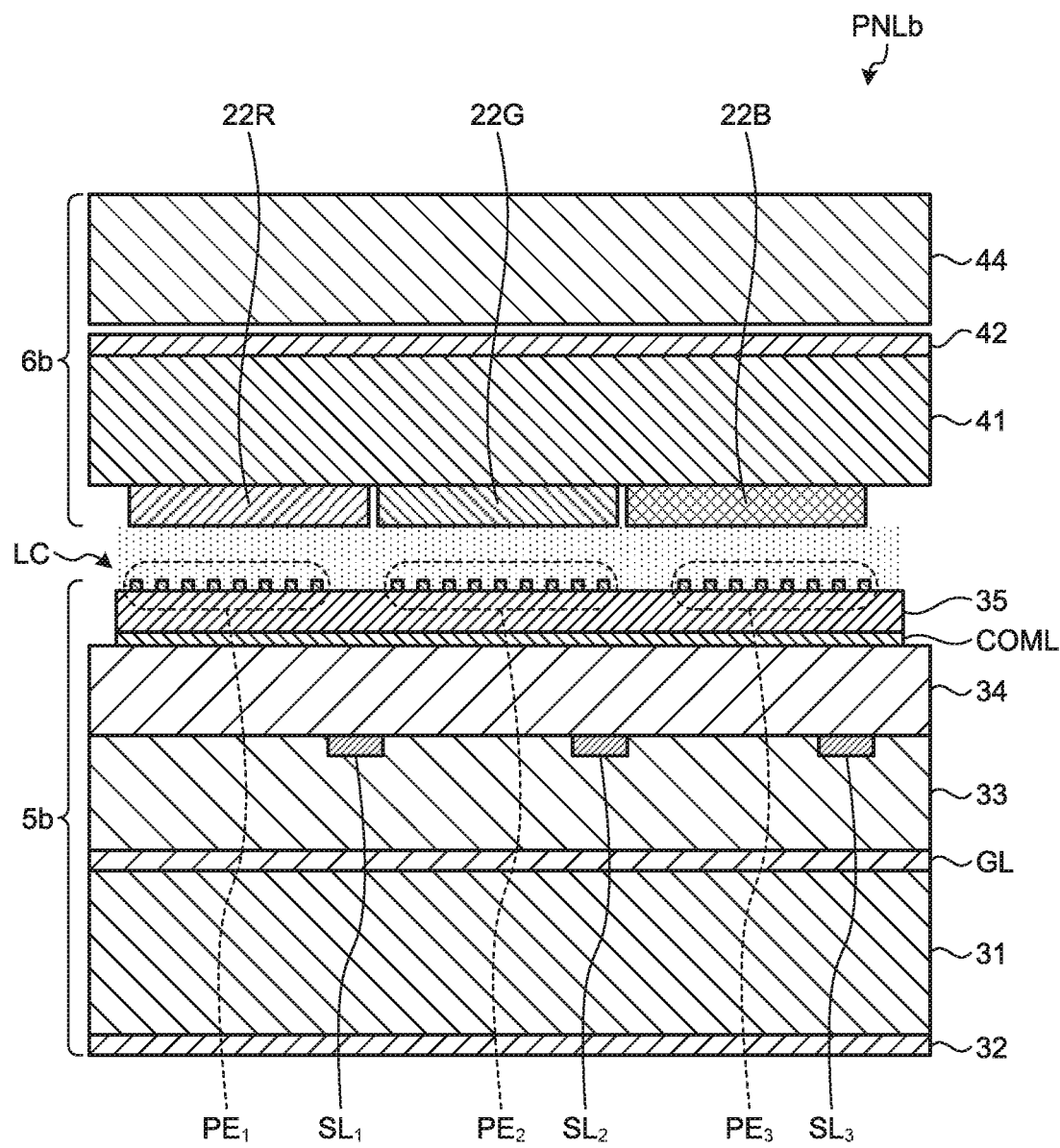
FIG. 16 is a schematic diagram of a sectional structure of a panel of the display apparatus according to the second embodiment.

FIG. 16 is a schematic diagram of a sectional structure of a panel of the display apparatus according to the second embodiment. FIG. 16 is a schematic diagram of a sectional structure of one pixel Pix.

The panel PNLb is an in-cell apparatus in which the detector DET is integrated with the display device DSP. The panel PNLb includes the first substrate 5*b*, the second substrate 6*b*, and the liquid crystal LC. The second substrate 6*b* faces the first substrate 5*b*. The liquid crystal LC is disposed between the first substrate 5*b* and the second substrate 6*b*.

Explanation of the configuration of the first substrate 5*b* is omitted because it is the same as the configuration of the first substrate 5 according to the first embodiment.

The configuration of the second substrate 6*b* is different from that of the second substrate 6 according to the first embodiment in that no detection line RL is provided.

FIG. 17 is a diagram of the configuration of the horizontal driver, the drive electrode driver, and the COF of the display apparatus according to the second embodiment. FIG. 17 illustrates a portion of the horizontal driver 8 that drives the pixels Pix of four columns, a portion of the drive electrode driver 9 that drives the pixels Pix of four columns, and a portion of the COF 12 that reads detection signals of the pixels Pix of four columns.

The switch $SW_{21}$ is disposed between the amplifier COMAMP serving as a drive circuit and the drive electrode $COML_1$. When the control signal $SEL_3$ supplied from the COG 11 (refer to FIG. 15) is at a high level, the switch $SW_{21}$ electrically couples the amplifier COMAMP to the drive electrode $COML_1$. When the control signal $SEL_3$ is at a low level, the switch $SW_{21}$ cuts off electrical coupling between the amplifier COMAMP and the drive electrode $COML_1$.

In the image display period, the control signal $SEL_3$ is at a high level. As a result, the switch $SW_{21}$ electrically couples the amplifier COMAMP to the drive electrode $COML_1$, thereby supplying the drive signal VCOM to the drive electrode $COML_1$. In the image detection period, the control signal $SEL_3$ is at a low level. As a result, the switch $SW_{21}$ cuts off electrical coupling between the amplifier COMAMP and the drive electrode $COML_1$, thereby supplying no drive signal VCOM to the drive electrode $COML_1$.

A switch $SW_{22}$ is disposed between the amplifier COMAMP and the drive electrode $COML_2$. When a control signal $SEL_3$ supplied from the COG 11 (refer to FIG. 15) is at a high level, the switch $SW_{22}$ electrically couples the amplifier COMAMP to the drive electrode $COML_2$. When the control signal $SEL_3$ is at a low level, the switch $SW_{22}$ cuts off electrical coupling between the amplifier COMAMP and the drive electrode $COML_2$.

In the image display period, the control signal $SEL_3$ is at a high level. As a result, the switch $SW_{22}$ electrically couples the amplifier COMAMP to the drive electrode $COML_2$, thereby supplying the drive signal VCOM to the drive electrode $COML_2$. In the image detection period, the control signal $SEL_3$ is at a low level. As a result, the switch $SW_{22}$ cuts off electrical coupling between the amplifier COMAMP and the drive electrode $COML_2$, thereby supplying no drive signal VCOM to the drive electrode $COML_2$.

The drive electrodes COML according to the present embodiment are arranged one for every two columns of the pixels Pix. In the image display period, the drive electrode $COML_1$ supplies the drive signals VCOM to the pixels Pix in the first and the second columns. In the image display period, the drive electrode $COML_2$ supplies the drive signals VCOM to the pixels Pix in the third and the fourth columns.

The drive electrodes COML according to the present embodiment are arranged one for every two columns of the pixels Pix. The drive electrode $COML_1$ is capacitively coupled to the signal lines $SL_1$ to $SL_6$. In the image detection period, the drive electrode $COML_1$ generates detection signal due to the pixel signals supplied to the signal lines $SL_1$ to $SL_6$. The drive electrode $COML_2$ is capacitively coupled to the signal lines $SL_7$ to $SL_{12}$ to generate detection signal due to the pixel signals supplied to the signal lines $SL_7$ to $SL_{12}$.

The COF 12 (refer to FIG. 15) includes detection circuits $INT_1$ and $INT_2$ serving as integration circuits. A switch $SW_{31}$ is disposed between the detection circuit $INT_1$ and the drive electrode $COML_1$. When a control signal $SEL_4$ supplied from the COG 11 (refer to FIG. 15) is at a high level, the switch $SW_{31}$ electrically couples the detection circuit $INT_1$ to the drive electrode $COML_1$. When the control signal $SEL_4$ is at a low level, the switch $SW_{31}$ cuts off electrical coupling between the detection circuit $INT_1$ and the drive electrode $COML_1$.

In the image display period, the control signal $SEL_4$ is at a low level. As a result, the switch $SW_{31}$ cuts off electrical coupling between the detection circuit $INT_1$ and the drive electrode $COML_1$. In the image detection period, the control signal $SEL_4$ is at a high level. As a result, the switch $SW_{31}$ electrically couples the detection circuit $INT_1$ to the drive electrode $COML_1$, thereby supplying the detection signal to the detection circuit $INT_1$. The detection circuit $INT_1$ compares the detection signal with a reference potential Vref to read the detection signal.

A switch $SW_{32}$ is disposed between the detection circuit $INT_2$ and the drive electrode $COML_2$. When the control signal $SEL_4$ supplied from the COG 11 (refer to FIG. 15) is at a high level, the switch $SW_{32}$ electrically couples the detection circuit $INT_2$ to the drive electrode $COML_2$. When the control signal $SEL_4$ is at a low level, the switch $SW_{32}$ cuts off electrical coupling between the detection circuit $INT_2$ and the drive electrode $COML_2$.

In the image display period, the control signal $SEL_4$ is at a low level. As a result, the switch $SW_{32}$ cuts off electrical coupling between the detection circuit $INT_2$ and the drive electrode $COML_2$. In the image detection period, the control signal $SEL_4$ is at a high level. As a result, the switch $SW_{32}$ electrically couples the detection circuit $INT_2$ to the drive electrode $COML_2$, thereby supplying the detection signal to the detection circuit $INT_2$. The detection circuit $INT_2$ compares the detection signal with a reference potential Vref to read the detection signal.

2-1. Exemplary Operation Performed by the Display Apparatus According to the Second Embodiment The following describes an exemplary operation performed by the display apparatus according to the second embodiment. In the present exemplary operation, the display apparatus performs image display and image detection row by row.

Figure 18:
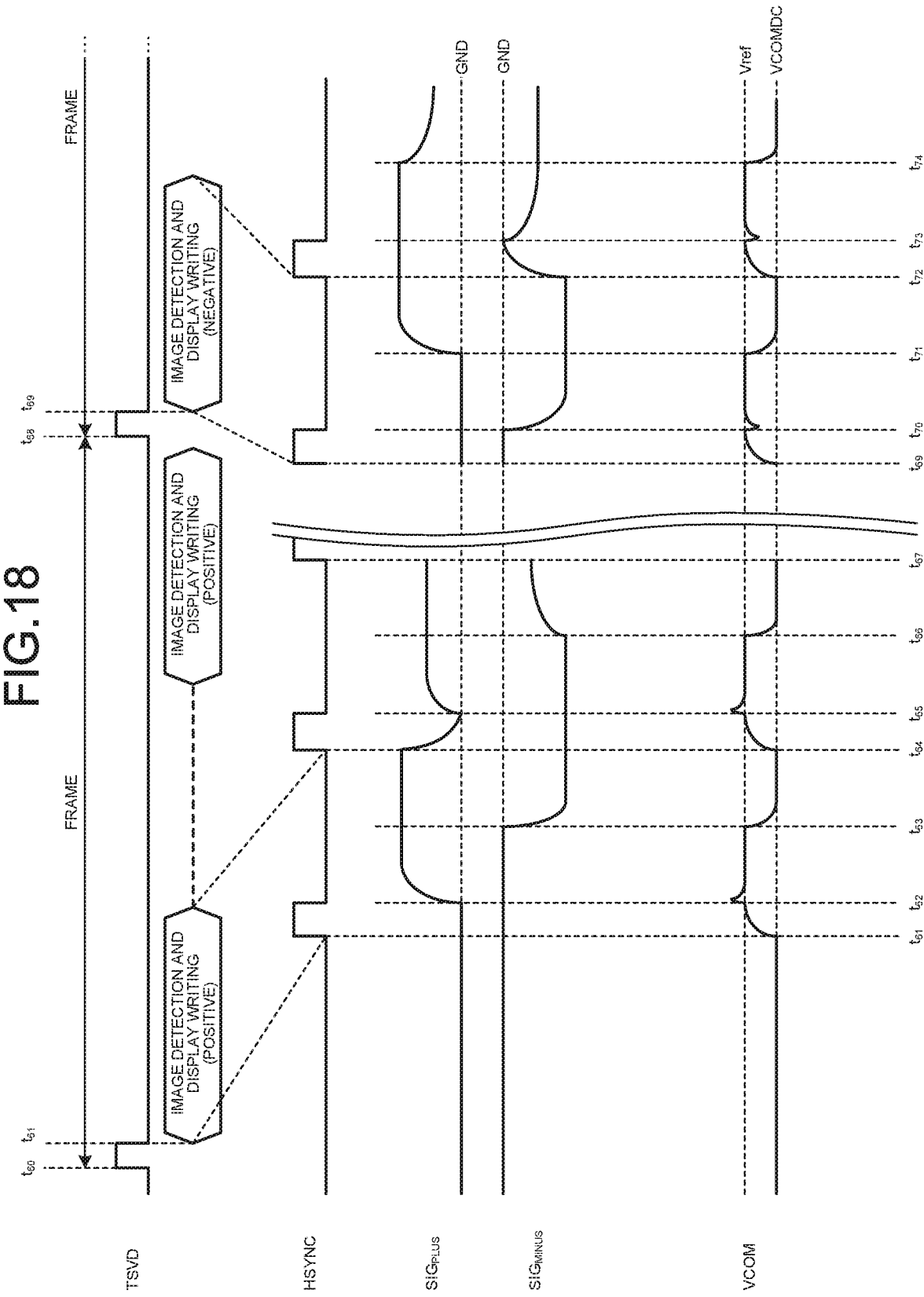
FIG. 18 is a diagram of an operating timing in an exemplary operation performed by the display apparatus according to the second embodiment.

FIG. 18 is a diagram of an operating timing in an exemplary operation performed by the display apparatus according to the second embodiment.

The period from timing $t_{60}$ of the first rising edge of the timing signal TSVD to timing $t_{68}$ of the second rising edge of the timing signal TSVD corresponds to the period of image display and image detection of the first frame. The period after timing $t_{68}$ of the second rising edge of the timing signal TSVD corresponds to the period of image display and image detection of the second frame.

A timing signal HSYNC for detection control output from the COG 11 to the COF 12 has the same frequency as that of the horizontal synchronization signal for display control of displaying an image on the display device DSP by the COG 11, for example.

During the entire period, the COG 11 outputs the control signals $SEL_1$ and $SEL_2$ (refer to FIG. 17) at a high level to the horizontal driver 8. As a result, the switches $SW_1$ to $SW_{12}$ are turned on.

The period from timing $t_{61}$ to timing $t_{64}$ corresponds to a positive-polarity image detection and display writing (image display) period for the first horizontal line of the first frame.

At timing $t_{61}$, the host HST outputs image data for the first horizontal line of the first frame to the COG 11. The COG 11 temporarily stores the image data for the first horizontal line of the first frame supplied from the host HST in the buffer 11a (refer to FIG. 15). The buffer 11a simply needs to have storage capacity large enough to store therein image data of one horizontal line.

The period from timing $t_{61}$ to timing $t_{62}$, which is a predetermined time after timing $t_{61}$, corresponds to a pre-charge period for the signal lines SL and the drive electrodes COML.

From timing $t_{61}$ to timing $t_{62}$, the horizontal driver 8 outputs the ground potential GND to all the signal lines SL, thereby precharging all the signal lines SL with the ground potential GND.

From timing $t_{61}$ to timing $t_{62}$, the COG 11 outputs the control signal $SEL_3$ at a high level to the drive electrode driver 9. From timing $t_{61}$ to timing $t_{62}$, the amplifier COMAMP outputs the drive signals VCOM at a high level (reference potential Vref) to all the drive electrodes COML, thereby precharging all the drive electrodes COML at a high level (reference potential Vref).

The period from timing $t_{62}$ to timing $t_{63}$ corresponds to the positive-polarity image detection period for the first horizontal line of the first frame.

At timing $t_{62}$, the COG 11 causes the horizontal driver 8 to output the positive-polarity pixel signals for the first horizontal line of the first frame based on the image data for the first horizontal line of the first frame stored in the buffer 11a. The horizontal driver 8 outputs the positive-polarity pixel signals $SIG_{PLUS}$ for the first horizontal line of the first frame to one group of the two groups (the group of the odd-numbered signal lines SL and the group of the even-numbered signal lines SL) of the N signal lines SL. The horizontal driver 8 maintains the electric potential (ground potential GND) of the other group of the two groups of the N signal lines SL.

The horizontal driver 8, for example, outputs the positive-polarity pixel signals $SIG_{PLUS}$ for the first horizontal line of the first frame to the group of the odd-numbered signal lines SL (refer to the signal lines $SL_1$, $SL_3$, $SL_5$, . . . in FIG. 17) out of the N signal lines SL. The horizontal driver 8 maintains the electric potential (ground potential GND) of the group of the even-numbered signal lines SL (refer to the signal lines $SL_2$, $SL_4$, $SL_6$, . . . in FIG. 17) out of the N signal lines SL.

From timing $t_{62}$ to timing $t_{63}$, the COG 11 outputs the control signal $SEL_3$ (refer to FIG. 17) at a low level to the drive electrode driver 9. As a result, the switches $SW_{21}$ and $SW_{22}$ are turned off. Consequently, all the drive electrodes COML are brought into a floating state from timing $t_{62}$ to timing $t_{63}$.

Referring back to FIG. 17, when the drive electrode $COML_1$ is in a floating state, the signal lines $SL_1$, $SL_3$, and $SL_5$ are capacitively coupled to the drive electrode $COML_1$. As a result, the detection signal is generated in the drive electrode $COML_1$ due to the pixel signals $SIG_{PLUS}$ supplied to the signal lines $SL_1$, $SL_3$, and $SL_5$. Subsequently, the voltage of the drive electrode $COML_1$ returns to a voltage corresponding to the reference potential (Vref) of an operational amplifier included in the detection circuit of the COF 12. The COG 11 changes the control signal $SEL_4$ to a high level at a timing based on the timing signal HSYNC, for example, at timing $t_{62}$. As a result, the switch $SW_{31}$ is turned on at timing $t_{62}$. The detection circuit $INT_1$ reads the detection signal at timing $t_{62}$. The COF 12 performs sampling and A/D conversion on the detection signal, thereby obtaining the positive-polarity detection pixel data. The detection signal is a spike signal. The COF 12 may read the peak voltage of the detection signal, thereby obtaining the positive-polarity detection pixel data.

The period from timing $t_{63}$ to timing $t_{64}$ corresponds to the display writing (image display) period for the first horizontal line of the first frame.

At timing $t_{63}$, the COG 11 causes the horizontal driver 8 to output the pixel signals based on the image data for the first horizontal line of the first frame stored in the buffer 11a. The horizontal driver 8 maintains the electric potential (positive-polarity pixel signals $SIG_{PLUS}$ for the first horizontal line of the first frame) of one group of the two groups (the group of the odd-numbered signal lines SL and the group of the even-numbered signal lines SL) of the N signal lines SL. The horizontal driver 8 outputs the negative-polarity pixel signals $SIG_{MINUS}$ for the first horizontal line of the first frame to the other group of the two groups of the N signal lines SL.

The horizontal driver 8, for example, maintains the electric potential (positive-polarity pixel signals $SIG_{PLUS}$ for the first horizontal line of the first frame) of the group of the odd-numbered signal lines SL (refer to the signal lines $SL_1$, $SL_3$, $SL_5$, . . . in FIG. 17) out of the N signal lines SL. The horizontal driver 8 outputs the negative-polarity pixel signals $SIG_{MINUS}$ for the first horizontal line of the first frame to the group of the even-numbered signal lines SL (refer to the signal lines $SL_2$, $SL_4$, $SL_6$, . . . in FIG. 17) out of the N signal lines SL.

From timing $t_{63}$ to timing $t_{64}$, the COG 11 outputs the control signal $SEL_3$ (refer to FIG. 17) at a high level to the drive electrode driver 9. As a result, the switches $SW_{21}$ and $SW_{22}$ are turned on. The drive electrode driver 9 outputs the drive signals VCOM at a low level (electric potential VCOMDC) to all the drive electrodes COML. Consequently, an electric field is formed between the pixel electrodes PE (refer to FIG. 3) and the drive electrodes COML, thereby displaying an image.

From timing $t_{63}$ to timing $t_{64}$, the COG 11 changes the control signal $SEL_4$ (refer to FIG. 17) to a low level. As a result, the switches $SW_{31}$ and $SW_{32}$ are turned off, whereby neither the detection circuit $INT_1$ nor the detection circuit $INT_2$ reads the drive signals VCOM at a low level (electric potential VCOMDC).

The period from timing $t_{64}$ to timing $t_{67}$ corresponds to a positive-polarity image detection and display writing (image display) period for the second horizontal line of the first frame.

At timing $t_{64}$, the host HST outputs image data for the second horizontal line of the first frame to the COG 11. The COG 11 temporarily stores the image data for the second horizontal line of the first frame supplied from the host HST in the buffer 11a (refer to FIG. 17).

The period from timing $t_{64}$ to timing $t_{65}$, which is a predetermined time after timing $t_{64}$, corresponds to a precharge period for the signal lines SL and the drive electrodes COML.

From timing $t_{64}$ to timing $t_{65}$, the horizontal driver 8 outputs the ground potential GND to one group of the two groups (the group of the odd-numbered signal lines SL and the group of the even-numbered signal lines SL) of the N signal lines SL. The horizontal driver 8 thus precharges the group of the odd-numbered or the even-numbered signal lines SL in the N signal lines SL with the ground potential GND. From timing $t_{64}$ to timing $t_{65}$, the horizontal driver 8 maintains the electric potential (negative-polarity pixel signals $SIG_{MINUS}$ for the first horizontal line of the first frame) of the other group of the two groups of the N signal lines SL.

The horizontal driver 8, for example, outputs the ground potential GND to the group of the odd-numbered signal lines SL (refer to the signal lines $SL_1$, $SL_3$, $SL_5$, . . . in FIG. 17) out of the N signal lines SL. The horizontal driver 8 maintains the electric potential (negative-polarity pixel signals $SIG_{MINUS}$ for the first horizontal line of the first frame) of the group of the even-numbered signal lines SL (refer to the signal lines $SL_2$, $SL_4$, $SL_6$, . . . in FIG. 17) out of the N signal lines SL.

From timing $t_{64}$ to timing $t_{65}$, the COG 11 outputs the control signal $SEL_3$ at a high level to the drive electrode driver 9. From timing $t_{64}$ to timing $t_{65}$, the amplifier COMAMP outputs the drive signals VCOM at a high level (reference potential Vref) to all the drive electrodes COML, thereby precharging all the drive electrodes COML at a high level (reference potential Vref).

The period from timing $t_{65}$ to timing $t_{66}$ corresponds to the positive-polarity image detection period for the second horizontal line of the first frame.

At timing $t_{65}$, the COG 11 causes the horizontal driver 8 to output the positive-polarity pixel signals based on the image data for the second horizontal line of the first frame stored in the buffer 11a. The horizontal driver 8 outputs the positive-polarity pixel signals $SIG_{PLUS}$ for the second horizontal line of the first frame to one group of the two groups (the group of the odd-numbered signal lines SL and the group of the even-numbered signal lines SL) of the N signal lines SL. The horizontal driver 8 maintains the electric potential (negative-polarity pixel signals $SIG_{MINUS}$ for the first horizontal line of the first frame) of the other group of the two groups of the N signal lines SL.

The horizontal driver 8, for example, outputs the positive-polarity pixel signals $SIG_{PLUS}$ for the second horizontal line of the first frame to the group of the odd-numbered signal lines SL (refer to the signal lines $SL_1$, $SL_3$, $SL_5$, . . . in FIG. 17) out of the N signal lines SL. The horizontal driver 8 maintains the electric potential (negative-polarity pixel signals $SIG_{MINUS}$ for the first horizontal line of the first frame) of the group of the even-numbered signal lines SL (refer to the signal lines $SL_2$, $SL_4$, $SL_6$, . . . in FIG. 17) out of the N signal lines SL.

From timing $t_{65}$ to timing $t_{66}$, the COG 11 outputs the control signal $SEL_3$ (refer to FIG. 17) at a low level to the drive electrode driver 9. As a result, the switches $SW_{21}$ and $SW_{22}$ are turned off. Consequently, all the drive electrodes COML are brought into a floating state from timing $t_{65}$ to timing $t_{66}$.

Referring back to FIG. 17, when the drive electrode $COML_1$ is in a floating state, the signal lines $SL_1$, $SL_3$, and $SL_5$ are capacitively coupled to the drive electrode $COML_1$. As a result, the detection signal is generated in the drive electrode $COML_1$ due to the pixel signals $SIG_{PLUS}$ supplied to the signal lines $SL_1$, $SL_3$, and $SL_5$. Subsequently, the voltage level of the drive electrode $COML_1$ returns to a voltage level corresponding to the reference potential (Vref) of an operational amplifier included in the detection circuit of the COF 12. The COG 11 changes the control signal $SEL_4$ to a high level at a timing based on the timing signal HSYNC, for example, at timing $t_{65}$. As a result, the switch $SW_{31}$ is turned on at timing $t_{65}$. The detection circuit $INT_1$ reads the detection signal at timing $t_{65}$. The COF 12 performs sampling and A/D conversion on the detection signal, thereby obtaining the positive-polarity detection pixel data. The COF 12 may read the peak voltage of the detection signal, thereby obtaining the positive-polarity detection pixel data.

The period from timing $t_{66}$ to timing $t_{67}$ corresponds to the display writing (image display) period for the second horizontal line of the first frame.

At timing $t_{66}$, the COG 11 causes the horizontal driver 8 to output the pixel signals based on the image data for the second horizontal line of the first frame stored in the buffer 11a. The horizontal driver 8 maintains the electric potential (positive-polarity pixel signals $SIG_{PLUS}$ for the second horizontal line of the first frame) of one group of the two groups (the group of the odd-numbered signal lines SL and the group of the even-numbered signal lines SL) of the N signal lines SL. The horizontal driver 8 outputs the negative-polarity pixel signals $SIG_{MINUS}$ for the second horizontal line of the first frame to the other group of the two groups of the N signal lines SL.

The horizontal driver 8, for example, maintains the electric potential (positive-polarity pixel signals $SIG_{PLUS}$ for the second horizontal line of the first frame) of the group of the odd-numbered signal lines SL (refer to the signal lines $SL_1$, $SL_3$, $SL_5$, . . . in FIG. 17) out of the N signal lines SL. The horizontal driver 8 outputs the negative-polarity pixel signals $SIG_{MINUS}$ for the second horizontal line of the first frame to the group of the even-numbered signal lines SL (refer to the signal lines $SL_2$, $SL_4$, $SL_6$, . . . in FIG. 17) out of the N signal lines SL.

From timing $t_{66}$ to timing $t_{67}$, the COG 11 outputs the control signal $SEL_3$ (refer to FIG. 17) at a high level to the drive electrode driver 9. As a result, the switches $SW_{21}$ and $SW_{22}$ are turned on. The drive electrode driver 9 outputs the drive signals VCOM at a low level (electric potential VCOMDC) to all the drive electrodes COML. Consequently, an electric field is formed between the pixel electrodes PE (refer to FIG. 3) and the drive electrodes COML, thereby displaying an image.

From timing $t_{66}$ to timing $t_{67}$, the COG 11 changes the control signal $SEL_4$ (refer to FIG. 17) to a low level. As a result, the switch $SW_{31}$ is turned off, whereby the detection circuit $INT_1$ does not read the drive signals VCOM at a low level (electric potential VCOMDC).

Similarly, the COG 11 and the COF 12 perform positive-polarity image detection and display writing (image display) of the third to M-th horizontal lines of the first frame.

The period from timing $t_{69}$ to timing $t_{72}$ corresponds to a negative-polarity image detection and display writing (image display) period for the first horizontal line of the second frame.

At timing $t_{69}$, the host HST outputs image data for the first horizontal line of the second frame to the COG 11. The COG 11 temporarily stores the image data for the first horizontal line of the second frame supplied from the host HST in the buffer 11a (refer to FIG. 15). The buffer 11a simply needs to have storage capacity large enough to store therein image data of one horizontal line.

The period from timing $t_{69}$ to timing to, which is a predetermined time after timing $t_{69}$, corresponds to a precharge period for the signal lines SL and the drive electrodes COML.

From timing $t_{69}$ to timing to, the horizontal driver 8 outputs the ground potential GND to all the signal lines SL, thereby precharging all the signal lines SL with the ground potential GND.

From timing $t_{69}$ to timing to, the COG 11 outputs the control signal $SEL_3$ at a high level to the drive electrode driver 9. From timing $t_{69}$ to timing to, the amplifier COMAMP outputs the drive signals VCOM at a high level (reference potential Vref) to all the drive electrodes COML, thereby precharging all the drive electrodes COML at a high level (reference potential Vref).

The period from timing $t_0$ to timing $t_{71}$ corresponds to the negative-polarity image detection period for the first horizontal line of the second frame.

At timing to, the COG 11 causes the horizontal driver 8 to output the negative-polarity pixel signals for the first horizontal line of the second frame based on the image data for the first horizontal line of the second frame stored in the buffer 11a. The horizontal driver 8 outputs the negative-polarity pixel signals $SIG_{MINUS}$ for the first horizontal line of the second frame to one group of the two groups (the group of the odd-numbered signal lines SL and the group of the even-numbered signal lines SL) of the N signal lines SL. The horizontal driver 8 maintains the electric potential (ground potential GND) of the other group of the two groups of the N signal lines SL.

The horizontal driver 8, for example, outputs the negative-polarity pixel signals $SIG_{MINUS}$ for the first horizontal line of the second frame to the group of the even-numbered signal lines SL (refer to the signal lines $SL_2$, $SL_4$, $SL_6$, . . . in FIG. 17) out of the N signal lines SL. The horizontal driver 8 maintains the electric potential (ground potential GND) of the group of the odd-numbered signal lines SL (refer to the signal lines $SL_1$, $SL_3$, $SL_5$, . . . in FIG. 17) out of the N signal lines SL.

From timing $t_{70}$ to timing $t_{71}$, the COG 11 outputs the control signal $SEL_3$ (refer to FIG. 17) at a low level to the drive electrode driver 9. As a result, the switches $SW_{21}$ and $SW_{22}$ are turned off. Consequently, all the drive electrodes COML are brought into a floating state from timing $t_{70}$ to timing $t_{71}$.

Referring back to FIG. 17, when the drive electrode $COML_1$ is in a floating state, the signal lines $SL_2$, $SL_4$, and $SL_6$ are capacitively coupled to the drive electrode $COML_1$. As a result, the detection signal is generated in the drive electrode $COML_1$ due to the pixel signals $SIG_{MINUS}$ supplied to the signal lines $SL_2$, $SL_4$, and $SL_6$. Subsequently, the voltage of the drive electrode $COML_1$ returns to a voltage corresponding to the reference potential (Vref) of the operational amplifier included in the detection circuit of the COF 12. The COG 11 changes the control signal $SEL_4$ to a high level at a timing based on the timing signal HSYNC, for example, at timing $t_{70}$. As a result, the switch $SW_{31}$ is turned on at timing $t_{70}$. The detection circuit $INT_1$ reads the detection signal at timing $t_{70}$. The COF 12 performs sampling and A/D conversion on the detection signal, thereby obtaining the negative-polarity detection pixel data. The COF 12 may read the peak voltage of the detection signal, thereby obtaining the negative-polarity detection pixel data.

The period from timing $t_{71}$ to timing $t_{72}$ corresponds to the display writing (image display) period for the first horizontal line of the second frame.

At timing $t_{71}$, the COG 11 causes the horizontal driver 8 to output the pixel signals based on the image data for the first horizontal line of the second frame stored in the buffer 11a. The horizontal driver 8 maintains the electric potential (negative-polarity pixel signals $SIG_{MINUS}$ for the first horizontal line of the second frame) of one group of the two groups (the group of the odd-numbered signal lines SL and the group of the even-numbered signal lines SL) of the N signal lines SL. The horizontal driver 8 outputs the positive-polarity pixel signals $SIG_{PLUS}$ for the first horizontal line of the second frame to the other group of the two groups of the N signal lines SL.

The horizontal driver 8, for example, maintains the electric potential (negative-polarity pixel signals $SIG_{MINUS}$ for the first horizontal line of the second frame) of the group of the even-numbered signal lines SL (refer to the signal lines $SL_2$, $SL_4$, $SL_6$, . . . in FIG. 17) out of the N signal lines SL. The horizontal driver 8 outputs the positive-polarity pixel signals $SIG_{PLUS}$ for the first horizontal line of the second frame to the group of the odd-numbered signal lines SL (refer to the signal lines $SL_1$, $SL_3$, $SL_5$, . . . in FIG. 17) out of the N signal lines SL.

From timing $t_{71}$ to timing $t_{72}$, the COG 11 outputs the control signal $SEL_3$ (refer to FIG. 17) at a high level to the drive electrode driver 9. As a result, the switches $SW_{21}$ and $SW_{22}$ are turned on. The drive electrode driver 9 outputs the drive signals VCOM at a low level (electric potential VCOMDC) to all the drive electrodes COML. Consequently, an electric field is formed between the pixel electrodes PE (refer to FIG. 3) and the drive electrodes COML, thereby displaying an image.

From timing $t_{71}$ to timing $t_{72}$, the COG 11 changes the control signal $SEL_4$ (refer to FIG. 17) to a low level. As a result, the switches $SW_{31}$ and $SW_{32}$ are turned off, whereby neither the detection circuit $INT_1$ nor the detection circuit $INT_2$ reads the drive signals VCOM at a low level (electric potential VCOMDC).

The period after timing $t_{72}$ corresponds to a negative-polarity image detection and display writing (image display) period for the second horizontal line of the second frame.

At timing $t_{72}$, the host HST outputs image data for the second horizontal line of the second frame to the COG 11. The COG 11 temporarily stores the image data for the second horizontal line of the second frame supplied from the host HST in the buffer 11a (refer to FIG. 2).

The period from timing $t_{72}$ to timing $t_{73}$, which is a predetermined time after timing $t_{72}$, corresponds to a pre-charge period for the signal lines SL and the drive electrodes COML.

From timing $t_{72}$ to timing $t_{73}$, the horizontal driver 8 outputs the ground potential GND to one group of the two groups (the group of the odd-numbered signal lines SL and the group of the even-numbered signal lines SL) of the N signal lines SL. The horizontal driver 8 thus precharges the group of the odd-numbered or the even-numbered signal lines SL in the N signal lines SL with the ground potential GND. From timing $t_{72}$ to timing $t_{73}$, the horizontal driver 8 maintains the electric potential (positive-polarity pixel signals $SIG_{PLUS}$ for the first horizontal line of the second frame) of the other group of the two groups of the N signal lines SL.

The horizontal driver 8, for example, outputs the ground potential GND to the group of the even-numbered signal lines SL (refer to the signal lines $SL_2$, $SL_4$, $SL_6$, ... in FIG. 17) out of the N signal lines SL. The horizontal driver 8 maintains the electric potential (positive-polarity pixel signals $SIG_{PLUS}$ for the first horizontal line of the second frame) of the group of the odd-numbered signal lines SL (refer to the signal lines $SL_1$, $SL_3$, $SL_5$, ... in FIG. 17) out of the N signal lines SL.

From timing $t_{72}$ to timing $t_{73}$, the COG 11 outputs the control signal $SEL_3$ at a high level to the drive electrode driver 9. From timing $t_{72}$ to timing $t_{73}$, the amplifier COMAMP outputs the drive signals VCOM at a high level (reference potential Vref) to all the drive electrodes COML, thereby precharging all the drive electrodes COML at a high level (reference potential Vref).

The period from timing $t_{73}$ to timing $t_{74}$ corresponds to the negative-polarity image detection period for the second horizontal line of the second frame.

At timing $t_{73}$, the COG 11 causes the horizontal driver 8 to output the negative-polarity pixel signals based on the image data for the second horizontal line of the second frame stored in the buffer 11a. The horizontal driver 8 outputs the negative-polarity pixel signals $SIG_{MINUS}$ for the second horizontal line of the second frame to one group of the two groups (the group of the odd-numbered signal lines SL and the group of the even-numbered signal lines SL) of the N signal lines SL. The horizontal driver 8 maintains the electric potential (positive-polarity pixel signals $SIG_{PLUS}$ for the first horizontal line of the second frame) of the other group of the two groups of the N signal lines SL.

The horizontal driver 8, for example, outputs the negative-polarity pixel signals $SIG_{MINUS}$ for the second horizontal line of the second frame to the group of the even-numbered signal lines SL (refer to the signal lines $SL_2$, $SL_4$, $SL_6$, ... in FIG. 17) out of the N signal lines SL. The horizontal driver 8 maintains the electric potential (positive-polarity pixel signals $SIG_{PLUS}$ for the first horizontal line of the second frame) of the group of the odd-numbered signal lines SL (refer to the signal lines $SL_1$, $SL_3$, $SL_5$, ... in FIG. 17) out of the N signal lines SL.

From timing $t_{73}$ to timing $t_{74}$, the COG 11 outputs the control signal $SEL_3$ (refer to FIG. 17) at a low level to the drive electrode driver 9. As a result, the switches $SW_{21}$ and $SW_{22}$ are turned off. Consequently, all the drive electrodes COML are brought into a floating state from timing $t_{73}$ to timing $t_{74}$.

Referring back to FIG. 17, when the drive electrode $COML_1$ is in a floating state, the signal lines $SL_2$, $SL_4$, and $SL_6$ are capacitively coupled to the drive electrode $COML_1$. As a result, the detection signal is generated in the drive electrode $COML_1$ due to the pixel signals $SIG_{MINUS}$ supplied to the signal lines $SL_2$, $SL_4$, and $SL_6$. Subsequently, the voltage of the drive electrode $COML_1$ returns to a voltage corresponding to the reference potential (Vref) of an operational amplifier included in the detection circuit of the COF 12. The COG 11 changes the control signal $SEL_4$ to a high level at a timing based on the timing signal HSYNC, for example, at timing $t_{73}$. As a result, the switch $SW_{31}$ is turned on at timing $t_{73}$. The detection circuit $INT_1$ reads the detection signal at timing $t_{73}$. The COF 12 performs sampling and A/D conversion on the detection signal, thereby obtaining the negative-polarity detection pixel data. The detection signal is a spike signal. The COF 12 may read the peak voltage of the detection signal, thereby obtaining the negative-polarity detection pixel data.

The period after timing $t_{74}$ corresponds to a display writing (image display) period for the second horizontal line of the second frame.

At timing $t_{74}$, the COG 11 causes the horizontal driver 8 to output the pixel signals based on the image data for the second horizontal line of the second frame stored in the buffer 11a. The horizontal driver 8 maintains the electric potential (negative-polarity pixel signals $SIG_{MINUS}$ for the second horizontal line of the second frame) of one group of the two groups (the group of the odd-numbered signal lines SL and the group of the even-numbered signal lines SL) of the N signal lines SL. The horizontal driver 8 outputs the positive-polarity pixel signals $SIG_{PLUS}$ for the second horizontal line of the second frame to the other group of the two groups of the N signal lines SL.

The horizontal driver 8, for example, maintains the electric potential (negative-polarity pixel signals $SIG_{MINUS}$ for the second horizontal line of the second frame) of the group of the even-numbered signal lines SL (refer to the signal lines $SL_2$, $SL_4$, $SL_6$, ... in FIG. 17) out of the N signal lines SL. The horizontal driver 8 outputs the positive-polarity pixel signals $SIG_{PLUS}$ for the second horizontal line of the second frame to the group of the odd-numbered signal lines SL (refer to the signal lines $SL_1$, $SL_3$, $SL_5$, ... in FIG. 17) out of the N signal lines SL.

From timing $t_{74}$, the COG 11 outputs the control signal $SEL_3$ (refer to FIG. 17) at a high level to the drive electrode driver 9. As a result, the switches $SW_{21}$ and $SW_{22}$ are turned on. The drive electrode driver 9 outputs the drive signals VCOM at a low level (electric potential VCOMDC) to all the drive electrodes COML. Consequently, an electric field is formed between the pixel electrodes PE (refer to FIG. 3) and the drive electrodes COML, thereby displaying an image.

Similarly, the COG 11 and the COF 12 perform negative-polarity image detection and display writing (image display) of the third to M-th horizontal lines of the second frame.

As described above, the number of pieces of detection pixel data in one line of the detection image data is (N/2). As illustrated in FIG. 18, the display apparatus 1 performs image detection on a line-by-line basis. Consequently, the detection image data includes M×(N/2) pieces of pixel data.

Illustration and explanation of the flowchart of the exemplary operation performed by the display apparatus according to the second embodiment are omitted because it is the same as the flowchart (refer to FIG. 13) of the second exemplary operation performed by the display apparatus according to the first embodiment.

Similarly to the first exemplary operation performed by the display apparatus according to the first embodiment, the display apparatus according to the second embodiment can perform image detection and image display on each of the L units (refer to FIG. 6). Illustration and explanation of the flowchart of the operation performed by the display apparatus according to the second embodiment in this case are omitted because it is the same as the flowchart (refer to FIG. 10) of the first exemplary operation performed by the display apparatus according to the first embodiment.

While the second embodiment describes a case where the present invention is applied to a lateral electric field mode liquid crystal display apparatus, the present invention is not necessarily applied thereto. As described in the first embodiment, the present invention is also applicable to a vertical electric field mode liquid crystal display apparatus.

The display apparatus according to the second embodiment has the following characteristics besides the characteristics of the display apparatus according to the first embodiment. The display apparatus according to the second embodiment also has characteristics other than those described below. The display apparatus according to the second embodiment requires no detection line RL. Consequently, the display apparatus according to the second embodiment can be manufactured in a simpler process at a lower cost. Furthermore, the display apparatus according to the second embodiment can increase the transmittance of the image IMG (refer to FIG. 1) and improve the display quality because it requires no detection line RL. The display apparatus may supply a positive- or negative-polarity signal to at least one signal line SL and detect a detection signal with at least one drive electrode COML corresponding to the at least one signal line SL supplied with the positive- or negative-polarity signal.

3. Third Embodiment

Figure 19:
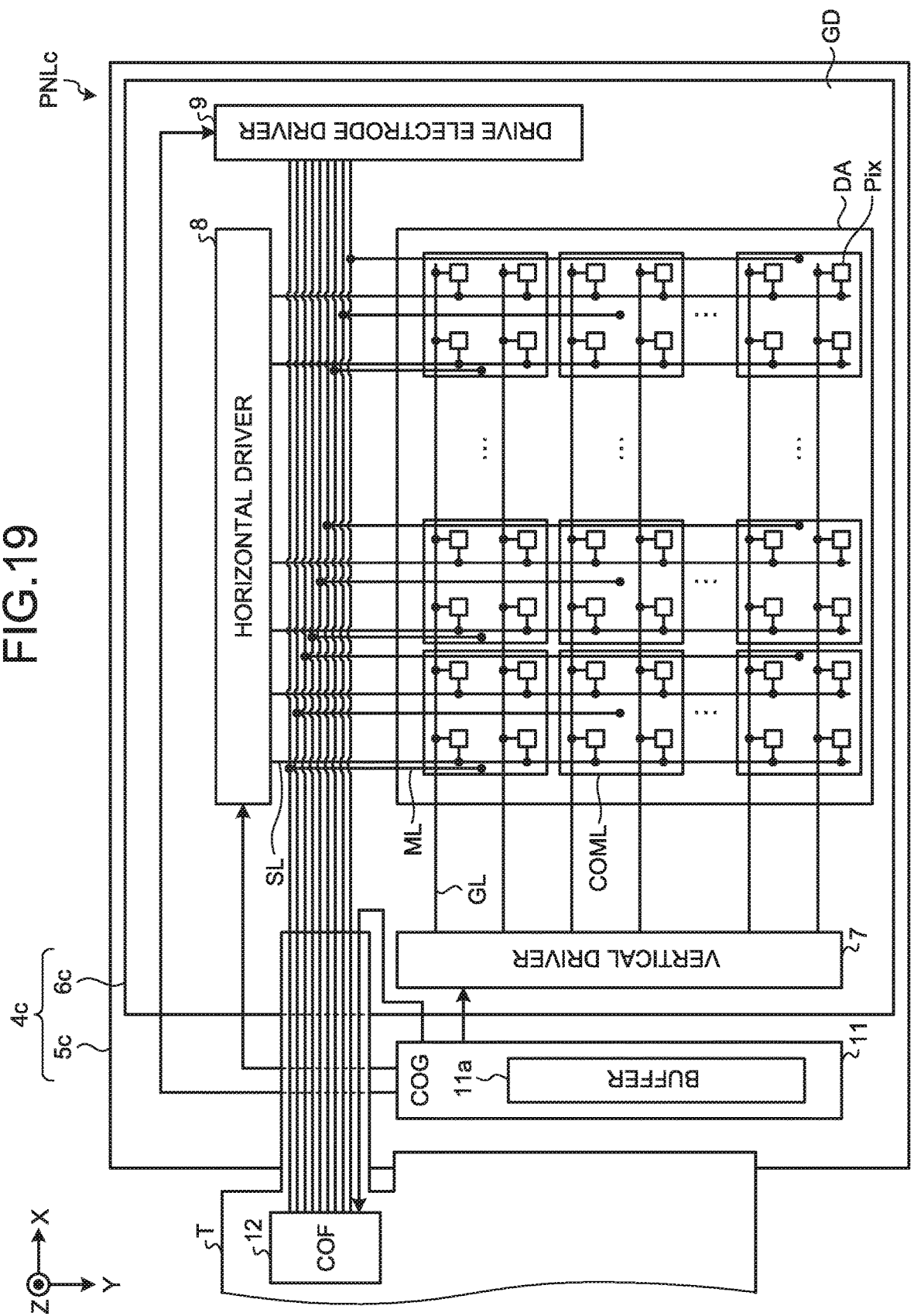
FIG. 19 is a diagram of the module configuration of a display apparatus according to a third embodiment.

FIG. 19 is a diagram of the module configuration of a display apparatus according to a third embodiment. A panel PNLc includes a substrate 4c, the COG 11 serving as a driver IC, and the COF 12 serving as a detection IC. The substrate 4c includes a first substrate 5c and a second substrate 6c. The second substrate 6c is disposed in the Z-direction with respect to the first substrate 5c and faces the first substrate 5c with a predetermined space interposed therebetween.

The substrate 4c has the display area DA and the peripheral area GD. In the display area DA, a plurality of pixels Pix including liquid crystal elements are disposed in a matrix (row-column configuration). The peripheral area GD is positioned outside the display area DA. The peripheral area GD is provided with the vertical driver (vertical drive circuit) 7, the horizontal driver (horizontal drive circuit) 8, and the drive electrode driver 9.

The COG 11 is mounted on the first substrate 5c and controls the vertical driver 7, the horizontal driver 8, and the drive electrode driver 9. The COF 12 is mounted on the FPC T coupled to the first substrate 5c. The COG 11 and the COF 12 are coupled to the host HST (refer to FIG. 1) via the FPC T. The COG 11 includes the buffer 11a that temporarily stores therein image data supplied from the host HST.

The display area DA has a matrix (row-column) configuration in which the pixels Pix are arrayed in M-rows and N-columns. The display area DA is provided with the scanning lines GL and the signal lines SL. The scanning lines GL are provided for the respective rows in the array of M×N pixels Pix and extend in the X-direction. The signal lines SL are provided for the respective columns and extend in the Y-direction. In other words, the number of scanning lines GL is M, and the number of signal lines SL is N.

The display area DA is also provided with the drive electrodes COML. The drive electrodes COML are arranged one for every two rows and two columns of the pixels Pix. In other words, the number of drive electrodes COML is (M/2)×(N/2). The configuration described above is given by way of example only, and the drive electrodes COML are not necessarily arranged one for every two rows and two columns of the pixels Pix.

The drive electrode COML is made of a transparent material and shared by the pixels Pix of at least one row and one column, for example. The drive electrodes COML are coupled to the drive electrode driver 9 via wires ML. In the image display period, the drive electrode driver 9 supplies the constant drive signals VCOM to the drive electrodes COML. In the image detection period, the drive electrode driver 9 brings the drive electrodes COML into a floating state. In the image display period, the drive electrodes COML generate an electric field for driving the liquid crystals between the drive electrodes COML and the pixel electrodes PE (refer to FIG. 3).

The drive electrodes COML according to the present embodiment are capacitively coupled to the signal lines SL. The drive electrodes COML generate detection signals due to the pixel signals supplied to the signal lines SL.

The drive electrodes COML according to the present embodiment correspond to the detector DET illustrated in FIG. 1.

The COF 12 is coupled to the drive electrodes COML via the wires ML. The COF 12 outputs detection image data to the host HST based on the detection signals generated in the drive electrodes COML due to the pixel signals. The drive electrodes COML according to the present embodiment are arranged one for every two rows and two columns of the pixels Pix. In other words, the number of lines in the detection image data is (M/2). The number of pieces of detection pixel data in one line of the detection image data is (N/2). In other words, the number of elements in the detection image data is (M/2)×(N/2). The configuration described above is given by way of example only, and the drive electrodes COML are not necessarily arranged one for every two rows and two columns of the pixels Pix. The drive electrodes COML may be arranged one for every one row and one column or every three or more rows and three or more columns of the pixels Pix.

Figure 20:
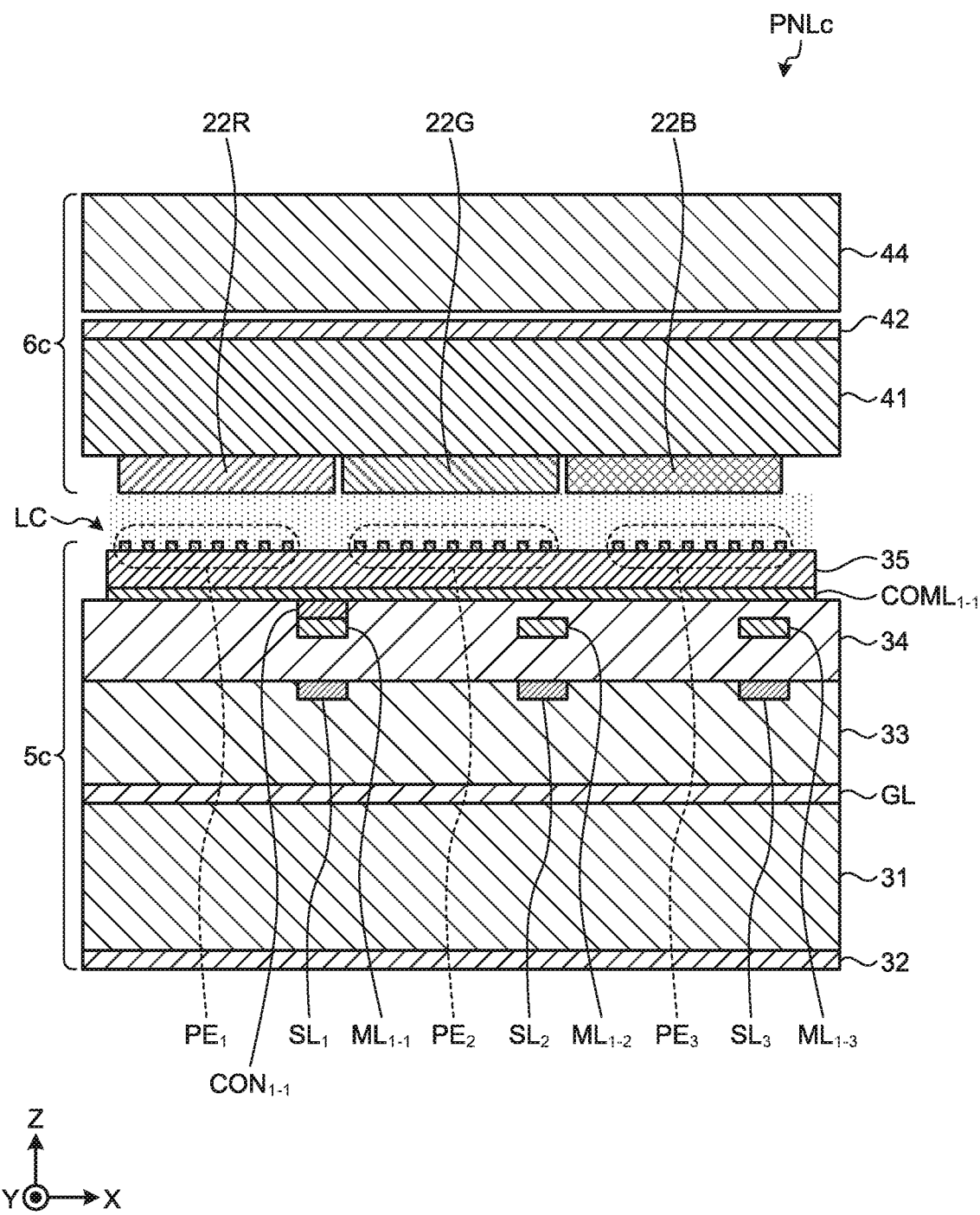
FIG. 20 is a schematic diagram of a sectional structure of a panel of the display apparatus according to the third embodiment.

FIG. 20 is a schematic diagram of a sectional structure of a panel of the display apparatus according to the third embodiment. FIG. 20 is a schematic diagram of a sectional structure of one pixel Pix.

The panel PNLc is an in-cell apparatus in which the detector DET is integrated with the display device DSP. The panel PNLc includes the first substrate $5c$, the second substrate $6c$, and the liquid crystal LC. The second substrate $6c$ faces the first substrate $5c$. The liquid crystal LC is disposed between the first substrate $5c$ and the second substrate $6c$.

The first substrate $5c$ includes the substrate 31 serving as a translucent insulation substrate. The polarization plate 32 is disposed on the surface of the substrate 31 facing in the opposite direction of the Z-direction. The polarization plate 32 allows only polarization components having a certain polarization direction in the light L output from the light emitter BL (refer to FIG. 1) to pass therethrough.

The scanning line GL serving as a first metal layer is provided on the surface of the substrate 31 facing in the Z-direction. The scanning line GL extends in the X-direction (horizontal direction in FIG. 20). An insulation layer 33 is provided on the scanning line GL in the Z-direction. The TFT elements Tr (refer to FIG. 3), which are not illustrated in FIG. 20, may be provided between the scanning line GL and the insulation layer 33.

Signal lines $SL_1$, $SL_2$, and $SL_3$ serving as a second metal layer are provided on the insulation layer 33 in the Z-direction. The signal lines $SL_1$, $SL_2$, and $SL_3$ extend in the Y-direction (direction perpendicular to the plane of FIG. 20). A planarization film 34 is provided on the signal lines $SL_1$, $SL_2$, and $SL_3$.

Wires $ML_{1-1}$, $ML_{1-2}$, and $ML_{1-3}$ serving as a third metal layer are provided in the Z-direction with respect to the signal lines $SL_1$, $SL_2$, and $SL_3$. Specifically, the wires $ML_{1-1}$, $ML_{1-2}$, and $ML_{1-3}$ are provided in the planarization film 34. The wires $ML_{1-1}$, $ML_{1-2}$, and $ML_{1-3}$ extend in the Y-direction (direction perpendicular to the plane of FIG. 20).

A drive electrode $COML_{1-1}$ serving as the first transparent conductive film layer is provided on the surface of the planarization film 34 facing in the Z-direction. The drive electrode $COML_{1-1}$ is coupled to the wire $ML_{1-1}$ via a contact $CON_{1-1}$. The wires $ML_{1-2}$ and $ML_{1-3}$ are coupled not to the drive electrode $COML_{1-1}$ but to corresponding drive electrodes COML in other rows.

The insulation film 35 is provided on the drive electrode $COML_{1-1}$ in the Z-direction. The pixel electrodes $PE_1$, $PE_2$, and $PE_3$ serving as the second transparent conductive film layer are provided on the surface of the insulation film 35 facing in the Z-direction.

Explanation of the configuration of the second substrate $6c$ is omitted because it is the same as the configuration of the second substrate $6b$ according to the second embodiment.

Figure 21:
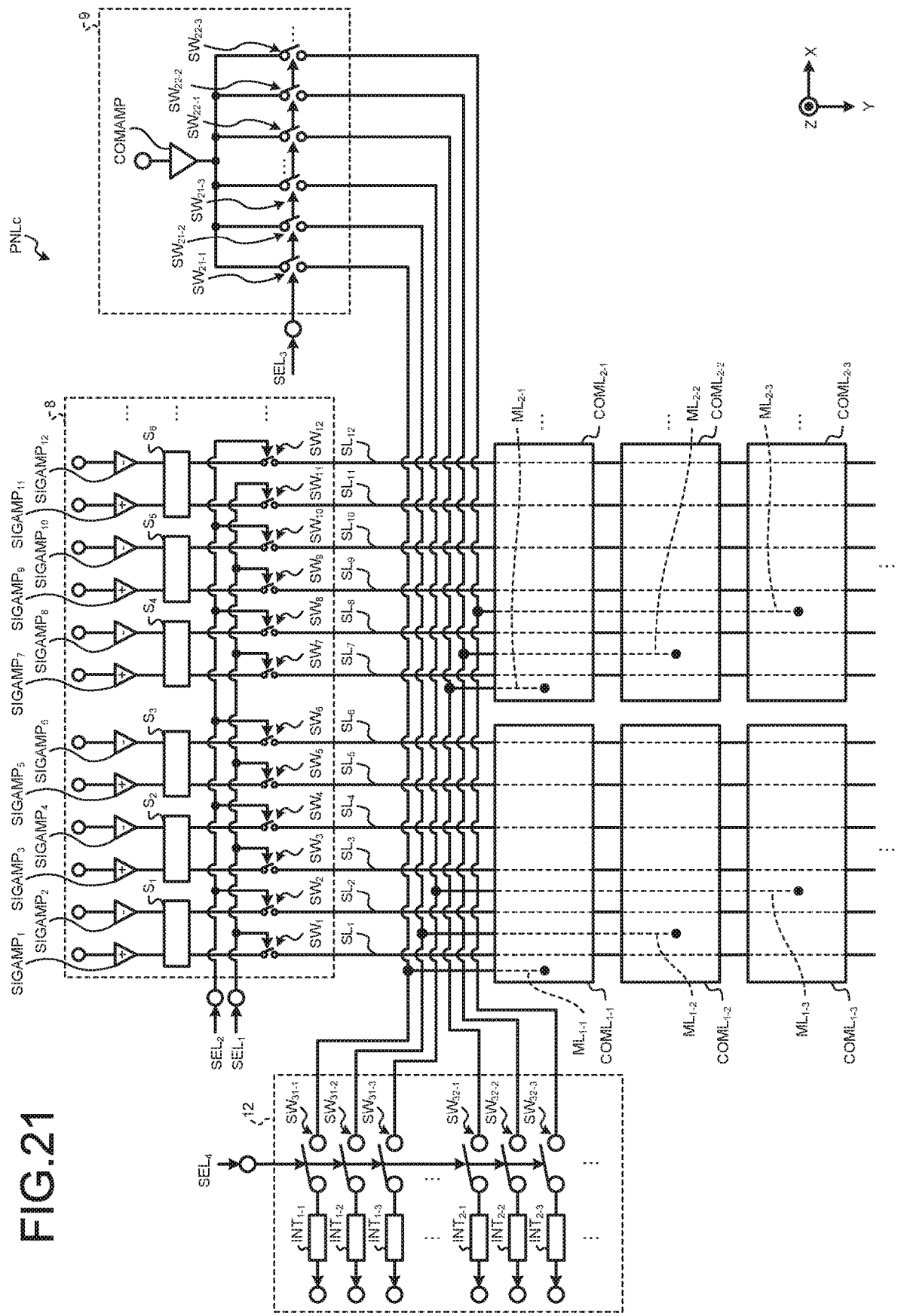
FIG. 21 is a diagram of the configuration of the horizontal driver, the drive electrode driver, and a COF of the display apparatus according to the third embodiment.

FIG. 21 is a diagram of the configuration of the horizontal driver, the drive electrode driver, and the COF of the display apparatus according to the third embodiment. FIG. 21 illustrates a portion of the horizontal driver 8 that drives the pixels Pix of four columns, a portion of the drive electrode driver 9 that drives the pixels Pix of four columns, and a portion of the COF 12 that reads detection signals of the pixels Pix of four columns.

The drive electrode $COML_{1-1}$ is coupled to the drive electrode driver 9 and the COF 12 via the wire $ML_{1-1}$. A drive electrode $COML_{1-2}$ is coupled to the drive electrode driver 9 and the COF 12 via the wire $ML_{1-2}$. A drive electrode $COML_{1-3}$ is coupled to the drive electrode driver 9 and the COF 12 via the wire $ML_{1-3}$.

The drive electrode $COML_{2-1}$ is coupled to the drive electrode driver 9 and the COF 12 via the wire $ML_{2-1}$. The drive electrode $COML_{2-2}$ is coupled to the drive electrode driver 9 and the COF 12 via the wire $ML_{2-2}$. The drive electrode $COML_{2-3}$ is coupled to the drive electrode driver 9 and the COF 12 via the wire $ML_{2-3}$.

A switch $SW_{21-1}$ is disposed between the amplifier COMAMP and the drive electrode $COML_{1-1}$. When the control signal $SEL_3$ supplied from the COG 11 (refer to FIG. 19) is at a high level, the switch $SW_{21-1}$ electrically couples the amplifier COMAMP to the drive electrode $COML_{1-1}$. When the control signal $SEL_3$ is at a low level, the switch $SW_{21-1}$ cuts off electrical coupling between the amplifier COMAMP and the drive electrode $COML_{1-1}$.

In the image display period, the control signal $SEL_3$ is at a high level. As a result, the switch $SW_{21-1}$ electrically couples the amplifier COMAMP to the drive electrode $COML_{1-1}$, thereby supplying the drive signal VCOM to the drive electrode $COML_{1-1}$. In the image detection period, the control signal $SEL_3$ is at a low level. As a result, the switch $SW_{21-1}$ cuts off electrical coupling between the amplifier COMAMP and the drive electrode $COML_{1-1}$, thereby supplying no drive signal VCOM to the drive electrode $COML_{1-1}$.

A switch $SW_{21-2}$ is disposed between the amplifier COMAMP and the drive electrode $COML_{1-2}$. When the control signal $SEL_3$ supplied from the COG 11 (refer to FIG. 19) is at a high level, the switch $SW_{21-2}$ electrically couples the amplifier COMAMP to the drive electrode $COML_{1-2}$. When the control signal $SEL_3$ is at a low level, the switch $SW_{21-2}$ cuts off electrical coupling between the amplifier COMAMP and the drive electrode $COML_{1-2}$.

In the image display period, the control signal $SEL_3$ is at a high level. As a result, the switch $SW_{21-2}$ electrically couples the amplifier COMAMP to the drive electrode $COML_{1-2}$, thereby supplying the drive signal VCOM to the drive electrode $COML_{1-2}$. In the image detection period, the control signal $SEL_3$ is at a low level. As a result, the switch $SW_{21-2}$ cuts off electrical coupling between the amplifier COMAMP and the drive electrode $COML_{1-2}$, thereby supplying no drive signal VCOM to the drive electrode $COML_{1-2}$.

A switch $SW_{21-3}$ is disposed between the amplifier COMAMP and the drive electrode $COML_{1-3}$. When the control signal $SEL_3$ supplied from the COG 11 (refer to FIG. 19) is at a high level, the switch $SW_{21-3}$ electrically couples the amplifier COMAMP to the drive electrode $COML_{1-3}$. When the control signal $SEL_3$ is at a low level, the switch $SW_{21-3}$ cuts off electrical coupling between the amplifier COMAMP and the drive electrode $COML_{1-3}$.

In the image display period, the control signal $SEL_3$ is at a high level. As a result, the switch $SW_{21-3}$ electrically couples the amplifier COMAMP to the drive electrode $COML_{1-3}$, thereby supplying the drive signal VCOM to the drive electrode $COML_{1-3}$. In the image detection period, the control signal $SEL_3$ is at a low level. As a result, the switch $SW_{21-3}$ cuts off electrical coupling between the amplifier COMAMP and the drive electrode $COML_{1-3}$, thereby supplying no drive signal VCOM to the drive electrode $COML_{1-3}$.

A switch $SW_{22-1}$ is disposed between the amplifier COMAMP and the drive electrode $COML_{2-1}$. When the control signal $SEL_3$ supplied from the COG 11 (refer to FIG. 19) is at a high level, the switch $SW_{22-1}$ electrically couples the amplifier COMAMP to the drive electrode $COML_{2-1}$.

When the control signal $SEL_3$ is at a low level, the switch $SW_{22-1}$ cuts off electrical coupling between the amplifier COMAMP and the drive electrode $COML_{2-1}$.

In the image display period, the control signal $SEL_3$ is at a high level. As a result, the switch $SW_{22-1}$ electrically couples the amplifier COMAMP to the drive electrode $COML_{2-1}$, thereby supplying the drive signal VCOM to the drive electrode $COML_{2-1}$. In the image detection period, the control signal $SEL_3$ is at a low level. As a result, the switch $SW_{22-1}$ cuts off electrical coupling between the amplifier COMAMP and the drive electrode $COML_{2-1}$, thereby supplying no drive signal VCOM to the drive electrode $COML_{2-1}$.

A switch $SW_{22-2}$ is disposed between the amplifier COMAMP and the drive electrode $COML_{2-2}$. When the control signal $SEL_3$ supplied from the COG 11 (refer to FIG. 19) is at a high level, the switch $SW_{22-2}$ electrically couples the amplifier COMAMP to the drive electrode $COML_{2-2}$. When the control signal $SEL_3$ is at a low level, the switch $SW_{22-2}$ cuts off electrical coupling between the amplifier COMAMP and the drive electrode $COML_{2-2}$.

In the image display period, the control signal $SEL_3$ is at a high level. As a result, the switch $SW_{22-2}$ electrically couples the amplifier COMAMP to the drive electrode $COML_{2-2}$, thereby supplying the drive signal VCOM to the drive electrode $COML_{2-2}$. In the image detection period, the control signal $SEL_3$ is at a low level. As a result, the switch $SW_{22-2}$ cuts off electrical coupling between the amplifier COMAMP and the drive electrode $COML_{2-2}$, thereby supplying no drive signal VCOM to the drive electrode $COML_{2-2}$.

A switch $SW_{22-3}$ is disposed between the amplifier COMAMP and the drive electrode $COML_{2-3}$. When the control signal $SEL_3$ supplied from the COG 11 (refer to FIG. 19) is at a high level, the switch $SW_{22-3}$ electrically couples the amplifier COMAMP to the drive electrode $COML_{2-3}$. When the control signal $SEL_3$ is at a low level, the switch $SW_{22-3}$ cuts off electrical coupling between the amplifier COMAMP and the drive electrode $COML_{2-3}$.

In the image display period, the control signal $SEL_3$ is at a high level. As a result, the switch $SW_{22-3}$ electrically couples the amplifier COMAMP to the drive electrode $COML_{2-3}$, thereby supplying the drive signal VCOM to the drive electrode $COML_{2-3}$. In the image detection period, the control signal $SEL_3$ is at a low level. As a result, the switch $SW_{22-3}$ cuts off electrical coupling between the amplifier COMAMP and the drive electrode $COML_{2-3}$, thereby supplying no drive signal VCOM to the drive electrode $COML_{2-3}$.

The drive electrodes COML according to the present embodiment are arranged one for every two rows and two columns of the pixels Pix. In the image display period, the drive electrodes $COML_{1-1}$, $COML_{1-2}$, and $COML_{1-3}$ supply the drive signals VCOM to the pixels Pix in the first and the second columns. Drive electrodes $COML_{2-1}$, $COML_{2-2}$, and $COML_{2-3}$ supply the drive signals VCOM to the pixels Pix in the third and the fourth columns.

The drive electrodes COML according to the present embodiment are arranged one for every two rows and two columns of the pixels Pix. The drive electrodes $COML_{1-1}$, $COML_{1-2}$, and $COML_{1-3}$ are capacitively coupled to the signal lines $SL_1$ to $SL_6$ to generate detection signals due to the pixel signals supplied to the signal lines $SL_1$ to $SL_6$. The drive electrodes $COML_{2-1}$, $COML_{2-2}$, and $COML_{2-3}$ are capacitively coupled to the signal lines $SL_7$ to $SL_{12}$ to generate detection signals due to the pixel signals supplied to the signal lines $SL_7$ to $SL_{12}$.

The COF 12 (refer to FIG. 19) includes detection circuits $INT_{1-1}$ to $INT_{1-3}$ and $INT_{2-1}$ to $INT_{2-3}$ serving as integration circuits. The integration circuits are each the detection circuit $INT_1$ or $INT_2$ illustrated in FIG. 17, for example.

A switch $SW_{31-1}$ is disposed between the detection circuit $INT_{1-1}$ and the drive electrode $COML_{1-1}$. When the control signal $SEL_4$ supplied from the COG 11 (refer to FIG. 19) is at a high level, the switch $SW_{31-1}$ electrically couples the detection circuit $INT_{1-1}$ to the drive electrode $COML_{1-1}$. When the control signal $SEL_4$ is at a low level, the switch $SW_{31-1}$ cuts off electrical coupling between the detection circuit $INT_{1-1}$ and the drive electrode $COML_{1-1}$.

In the image display period, the control signal $SEL_4$ is at a low level. As a result, the switch $SW_{31-1}$ cuts off electrical coupling between the detection circuit $INT_{1-1}$ and the drive electrode $COML_{1-1}$. In the image detection period, the control signal $SEL_4$ is at a high level. As a result, the switch $SW_{31-1}$ electrically couples the detection circuit $INT_{1-1}$ to the drive electrode $COML_{1-1}$, thereby supplying the detection signal to the detection circuit $INT_{1-1}$. The detection circuit $INT_{1-1}$ compares the detection signal with the reference potential Vref to read the detection signal.

A switch $SW_{31-2}$ is disposed between the detection circuit $INT_{1-2}$ and the drive electrode $COML_{1-2}$. When the control signal $SEL_4$ supplied from the COG 11 (refer to FIG. 19) is at a high level, the switch $SW_{31-2}$ electrically couples the detection circuit $INT_{1-2}$ to the drive electrode $COML_{1-2}$. When the control signal $SEL_4$ is at a low level, the switch $SW_{31-2}$ cuts off electrical coupling between the detection circuit $INT_{1-2}$ and the drive electrode $COML_{1-2}$.

In the image display period, the control signal $SEL_4$ is at a low level. As a result, the switch $SW_{31-2}$ cuts off electrical coupling between the detection circuit $INT_{1-2}$ and the drive electrode $COML_{1-2}$. In the image detection period, the control signal $SEL_4$ is at a high level. As a result, the switch $SW_{31-2}$ electrically couples the detection circuit $INT_{1-2}$ to the drive electrode $COML_{1-2}$, thereby supplying the detection signal to the detection circuit $INT_{1-2}$. The detection circuit $INT_{1-2}$ compares the detection signal with the reference potential Vref to read the detection signal.

A switch $SW_{31-3}$ is disposed between the detection circuit $INT_{1-3}$ and the drive electrode $COML_{1-3}$. When the control signal $SEL_4$ supplied from the COG 11 (refer to FIG. 19) is at a high level, the switch $SW_{31-3}$ electrically couples the detection circuit $INT_{1-3}$ to the drive electrode $COML_{1-3}$. When the control signal $SEL_4$ is at a low level, the switch $SW_{31-3}$ cuts off electrical coupling between the detection circuit $INT_{1-3}$ and the drive electrode $COML_{1-3}$.

In the image display period, the control signal $SEL_4$ is at a low level. As a result, the switch $SW_{31-3}$ cuts off electrical coupling between the detection circuit $INT_{1-3}$ and the drive electrode $COML_{1-3}$. In the image detection period, the control signal $SEL_4$ is at a high level. As a result, the switch $SW_{31-3}$ electrically couples the detection circuit $INT_{1-3}$ to the drive electrode $COML_{1-3}$, thereby supplying the detection signal to the detection circuit $INT_{1-3}$. The detection circuit $INT_{1-3}$ compares the detection signal with the reference potential Vref to read the detection signal.

A switch $SW_{32-1}$ is disposed between the detection circuit $INT_{2-1}$ and the drive electrode $COML_{2-1}$. When the control signal $SEL_4$ supplied from the COG 11 (refer to FIG. 19) is at a high level, the switch $SW_{32-1}$ electrically couples the detection circuit $INT_{2-1}$ to the drive electrode $COML_{2-1}$. When the control signal $SEL_4$ is at a low level, the switch $SW_{32-1}$ cuts off electrical coupling between the detection circuit $INT_{2-1}$ and the drive electrode $COML_{2-1}$.

In the image display period, the control signal $SEL_4$ is at a low level. As a result, the switch $SW_{32-1}$ cuts off electrical coupling between the detection circuit $INT_{2-1}$ and the drive electrode $COML_{2-1}$. In the image detection period, the control signal $SEL_4$ is at a high level. As a result, the switch $SW_{32-1}$ electrically couples the detection circuit $INT_{2-1}$ to the drive electrode $COML_{2-1}$, thereby supplying the detection signal to the detection circuit $INT_{2-1}$. The detection circuit $INT_{2-1}$ compares the detection signal with the reference potential Vref to read the detection signal.

A switch $SW_{32-2}$ is disposed between the detection circuit $INT_{2-2}$ and the drive electrode $COML_{2-2}$. When the control signal $SEL_4$ supplied from the COG 11 (refer to FIG. 19) is at a high level, the switch $SW_{32-2}$ electrically couples the detection circuit $INT_{2-2}$ to the drive electrode $COML_{2-2}$. When the control signal $SEL_4$ is at a low level, the switch $SW_{32-2}$ cuts off electrical coupling between the detection circuit $INT_{2-2}$ and the drive electrode $COML_{2-2}$.

In the image display period, the control signal $SEL_4$ is at a low level. As a result, the switch $SW_{32-2}$ cuts off electrical coupling between the detection circuit $INT_{2-2}$ and the drive electrode $COML_{2-2}$. In the image detection period, the control signal $SEL_4$ is at a high level. As a result, the switch $SW_{32-2}$ electrically couples the detection circuit $INT_{2-2}$ to the drive electrode $COML_{2-2}$, thereby supplying the detection signal to the detection circuit $INT_{2-2}$. The detection circuit $INT_{2-2}$ compares the detection signal with the reference potential Vref to read the detection signal.

A switch $SW_{32-3}$ is disposed between the detection circuit $INT_{2-3}$ and the drive electrode $COML_{2-3}$. When the control signal $SEL_4$ supplied from the COG 11 (refer to FIG. 19) is at a high level, the switch $SW_{32-3}$ electrically couples the detection circuit $INT_{2-3}$ to the drive electrode $COML_{2-3}$. When the control signal $SEL_4$ is at a low level, the switch $SW_{32-3}$ cuts off electrical coupling between the detection circuit $INT_{2-3}$ and the drive electrode $COML_{2-3}$.

In the image display period, the control signal $SEL_4$ is at a low level. As a result, the switch $SW_{32-3}$ cuts off electrical coupling between the detection circuit $INT_{2-3}$ and the drive electrode $COML_{2-3}$. In the image detection period, the control signal $SEL_4$ is at a high level. As a result, the switch $SW_{32-3}$ electrically couples the detection circuit $INT_{2-3}$ to the drive electrode $COML_{2-3}$, thereby supplying the detection signal to the detection circuit $INT_{2-3}$. The detection circuit $INT_{2-3}$ compares the detection signal with the reference potential Vref to read the detection signal.

Illustration and explanation of the operation performed by the display apparatus according to the third embodiment are omitted because it is the same as the operation performed by the display apparatus according to the second embodiment. Similarly to the first exemplary operation performed by the display apparatus according to the first embodiment, the display apparatus according to the third embodiment can perform image detection and image display on each of the L units (refer to FIG. 6).

While the third embodiment describes a case where the present invention is applied to a lateral electric field mode liquid crystal display apparatus, the present invention is not necessarily applied thereto. As described in the first embodiment, the present invention is also applicable to a vertical electric field mode liquid crystal display apparatus.

The display apparatus according to the third embodiment has the following characteristics besides the characteristics of the display apparatus according to the first embodiment. The display apparatus according to the third embodiment also has characteristics other than those described below. The display apparatus according to the third embodiment requires no detection line RL. Consequently, the display apparatus according to the third embodiment can be manufactured in a simpler process at a lower cost. Furthermore, the display apparatus according to the third embodiment can increase the transmittance of the image IMG (refer to FIG. 1) and improve the display quality because it requires no detection line RL. The display apparatus may supply a positive- or negative-polarity signal to at least one signal line SL and detect a detection signal with at least one drive electrode COML corresponding to the at least one signal line SL supplied with the positive- or negative-polarity signal.

4. Fourth Embodiment

Figure 22:
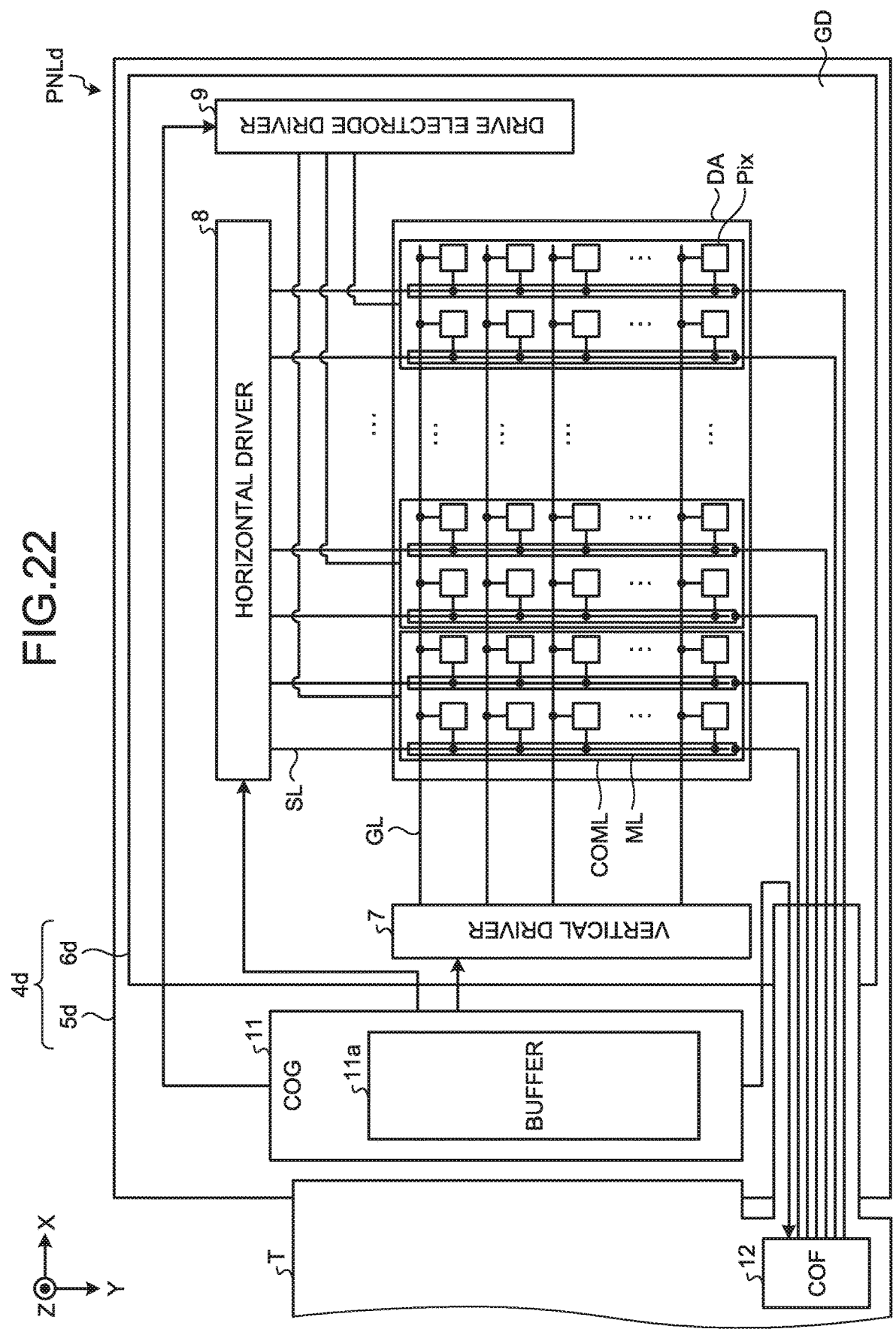
FIG. 22 is a diagram of the module configuration of a display apparatus according to a fourth embodiment.

FIG. 22 is a diagram of the module configuration of a display apparatus according to a fourth embodiment. A panel PNLd includes a substrate 4d, the COG 11 serving as a driver IC, and the COF 12 serving as a detection IC. The substrate 4d includes a first substrate 5d and a second substrate 6d. The second substrate 6d is disposed in the Z-direction with respect to the first substrate 5d and faces the first substrate 5d with a predetermined space interposed therebetween.

The substrate 4d has the display area DA and the peripheral area GD. In the display area DA, a plurality of pixels Pix including liquid crystal elements are disposed in a matrix (row-column configuration). The peripheral area GD is positioned outside the display area DA. The peripheral area GD is provided with the vertical driver (vertical drive circuit) 7, the horizontal driver (horizontal drive circuit) 8, and the drive electrode driver 9.

The COG 11 is mounted on the first substrate 5d and controls the vertical driver 7, the horizontal driver 8, and the drive electrode driver 9. The COF 12 is mounted on the FPC T coupled to the first substrate 5d. The COG 11 and the COF 12 are coupled to the host HST (refer to FIG. 1) via the FPC T. The COG 11 includes the buffer 11a that temporarily stores therein image data supplied from the host HST.

The display area DA has a matrix (row-column) configuration in which the pixels Pix are arrayed in M-rows and N-columns. The display area DA is provided with the scanning lines GL and the signal lines SL. The scanning lines GL are provided for the respective rows in the array of M×N pixels Pix and extend in the X-direction. The signal lines SL are provided for the respective columns and extend in the Y-direction. In other words, the number of scanning lines GL is M, and the number of signal lines SL is N.

The display area DA is also provided with drive electrodes COML. The drive electrodes COML extending in the Y-direction are arranged one for every two columns of the pixels Pix. In other words, the number of drive electrodes COML is (N/2). The configuration described above is given by way of example only, and the drive electrodes COML are not necessarily arranged one for every two columns of the pixels Pix.

The drive electrode COML is made of a transparent material and shared by the pixels Pix of at least one column, for example. The drive electrodes COML are coupled to the drive electrode driver 9. In the image display period, the drive electrode driver 9 supplies constant drive signals VCOM to the drive electrodes COML. In the image detection period, the drive electrode driver 9 brings the drive electrodes COML into a floating state. In the image display period, the drive electrodes COML generate an electric field for driving the liquid crystals between the drive electrodes COML and the pixel electrodes PE (refer to FIG. 3).

The wires ML are provided to the first substrate $5d$ along the respective signal lines SL. Each of the wires ML is provided above the corresponding one of the signal lines SL in the Z-direction so as to overlap the signal line SL. While the wires ML are disposed in a layer on the signal lines SL in the Z-direction, they may be disposed in a layer under the signal lines SL.

The wires ML according to the present embodiment are capacitively coupled to the signal lines SL to generate detection signals due to the pixel signals supplied to the signal lines SL.

The wires ML according to the present embodiment correspond to the detector DET illustrated in FIG. 1.

The COF 12 is coupled to the wires ML. The COF 12 outputs detection image data to the host HST based on the detection signals generated in the wires ML due to the pixel signals. The wires ML according to the present embodiment are arranged one for every one column of the pixels Pix. In other words, the number of pieces of detection pixel data in one line of the detection image data is N. The configuration described above is given by way of example only, and the wires ML are not necessarily arranged one for every one column of the pixels Pix. The drive electrodes COML may be arranged one for every two or more columns of the pixels Pix.

Figure 23:
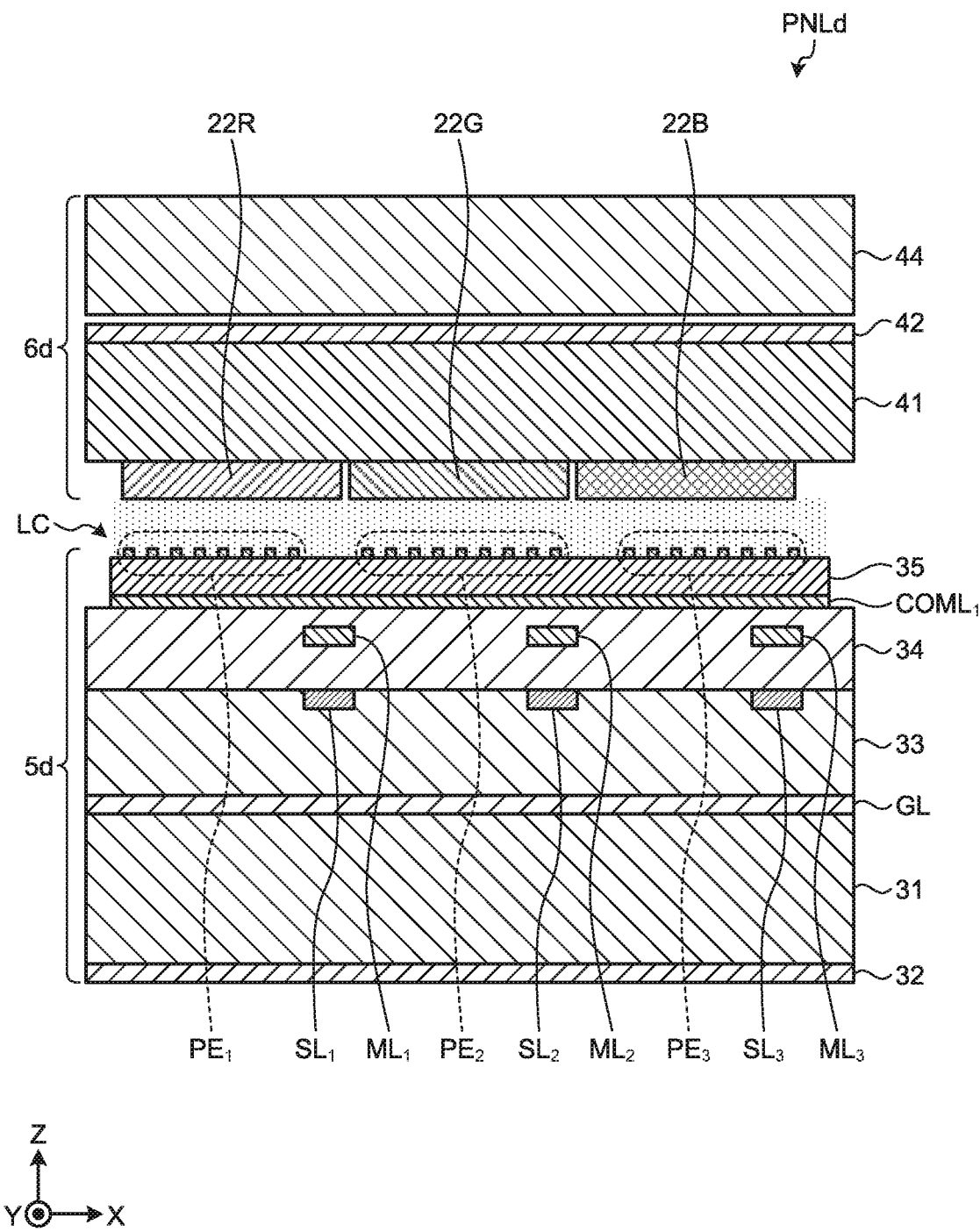
FIG. 23 is a schematic diagram of a sectional structure of a panel of the display apparatus according to the fourth embodiment.

FIG. 23 is a schematic diagram of a sectional structure of a panel of the display apparatus according to the fourth embodiment. FIG. 23 is a schematic diagram of a sectional structure of one pixel Pix.

The panel PNLd is an in-cell apparatus in which the detector DET is integrated with the display device DSP. The panel PNLd includes the first substrate $5d$, the second substrate $6d$, and the liquid crystal LC. The second substrate $6d$ faces the first substrate $5d$. The liquid crystal LC is disposed between the first substrate $5d$ and the second substrate $6d$.

Explanation of the configuration of the first substrate $5d$ from the polarization plate 32 to the insulation layer 33 is omitted because it is the same as the configuration of the first substrate $5c$ according to the third embodiment. The signal lines $SL_1$, $SL_2$, and $SL_3$ serving as the second metal layer are provided on the insulation layer 33 of the first substrate $5d$ in the Z-direction. The signal lines $SL_1$, $SL_2$, and $SL_3$ extend in the Y-direction (direction perpendicular to the plane of FIG. 23). The planarization film 34 is provided on the signal lines $SL_1$, $SL_2$, and $SL_3$.

Wires $ML_1$, $ML_2$, and $ML_3$ are provided in the Z-direction with respect to the signal lines $SL_1$, $SL_2$, and $SL_3$. Specifically, the wires $ML_1$, $ML_2$, and $ML_3$ are provided in the planarization film 34. The wires $ML_1$, $ML_2$, and $ML_3$ extend in the Y-direction (direction perpendicular to the plane of FIG. 23).

The drive electrode $COML_1$ serving as the first transparent conductive film layer is provided on the surface of the planarization film 34 facing in the Z-direction. The wires $ML_1$, $ML_2$, and $ML_3$ are not coupled to the drive electrode $COML_1$.

The insulation film 35 is provided on the drive electrode $COML_1$ in the Z-direction. The pixel electrodes $PE_1$, $PE_2$, and $PE_3$ serving as the second transparent conductive film layer are provided on the surface of the insulation film 35 facing in the Z-direction.

Explanation of the configuration of the second substrate $6d$ is omitted because it is the same as the configuration of the second substrate $6c$ according to the third embodiment.

Figure 24:
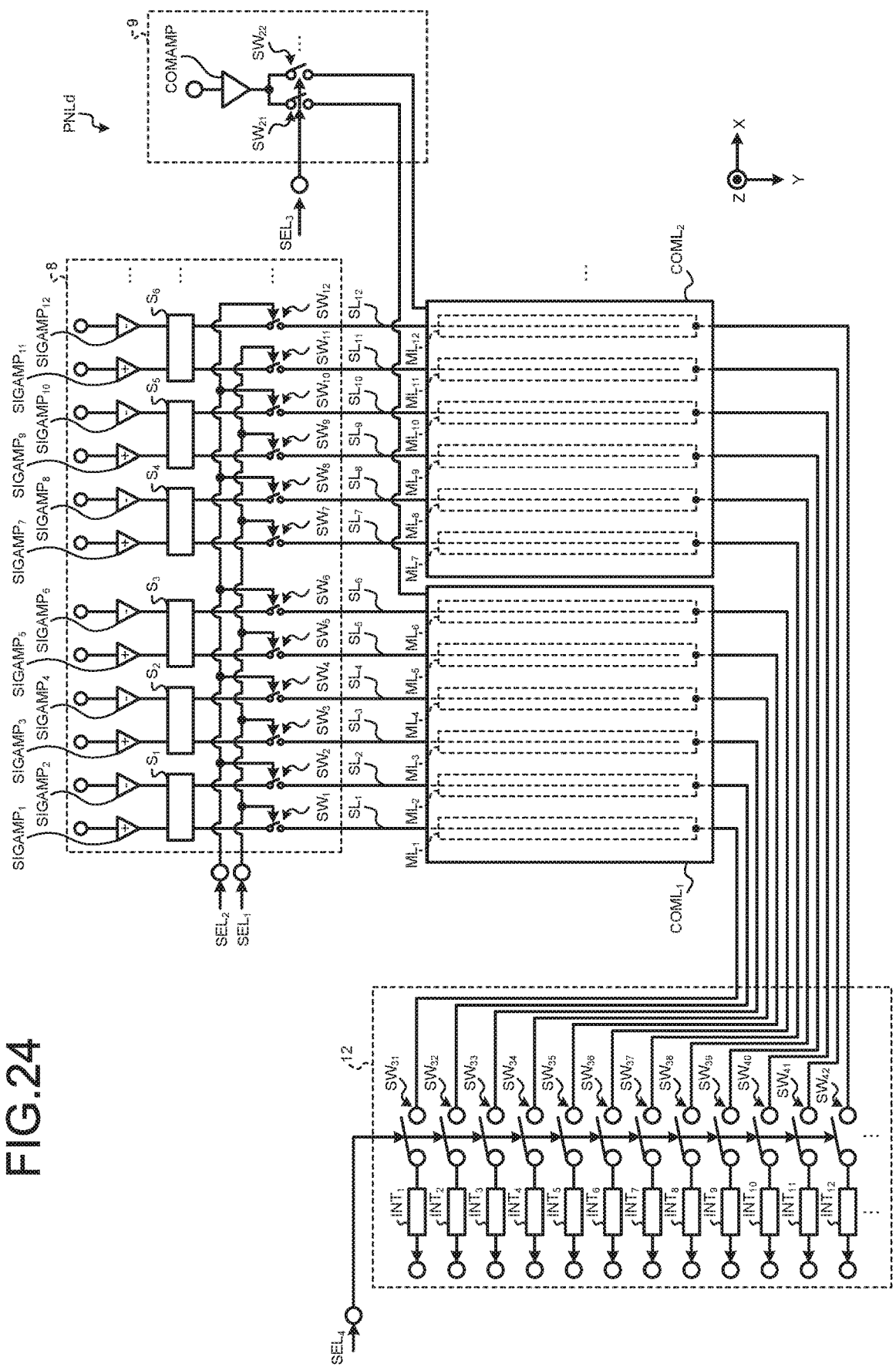
FIG. 24 is a diagram of the configuration of the horizontal driver, the drive electrode driver, and the COF of the display apparatus according to the fourth embodiment.

FIG. 24 is a diagram of the configuration of the horizontal driver, the drive electrode driver, and the COF of the display apparatus according to the fourth embodiment. FIG. 24 illustrates a portion of the horizontal driver 8 that drives the pixels Pix of four columns, a portion of the drive electrode driver 9 that drives the pixels Pix of four columns, and a portion of the COF 12 that reads detection signals of the pixels Pix of four columns.

Explanation of the coupling form between the amplifier COMAMP and the drive electrodes $COML_1$ and $COML_2$ is omitted because it is the same as the coupling form of the second embodiment.

The wires ML according to the present embodiment are arranged one for every one column of the pixels Pix. The wires $ML_1$ to $ML_{12}$ are coupled to the signal lines $SL_1$ to $SL_{12}$, respectively. The wires $ML_1$ to $ML_{12}$ generate detection signals due to the pixel signals supplied to the signal lines $SL_1$ to $SL_{12}$, respectively.

The COF 12 (refer to FIG. 22) includes detection circuits $INT_1$ to $INT_{12}$ serving as integration circuits. The integration circuits are each the detection circuit $INT_1$ or $INT_2$ illustrated in FIG. 17, for example.

Switches $SW_{31}$ to $SW_{36}$ are disposed between the respective detection circuits $INT_1$ to $INT_6$ and the drive electrode $COML_1$. Switches $SW_{37}$ to $SW_{42}$ are disposed between the respective detection circuits $INT_7$ to $INT_{12}$ and the drive electrode $COML_2$. When the control signal $SEL_4$ supplied from the COG 11 (refer to FIG. 22) is at a high level, each of the switches $SW_{31}$ to $SW_{42}$ electrically couples a corresponding one of the detection circuits $INT_1$ to $INT_{12}$ to a corresponding one of the drive electrodes $COML_1$ and $COML_2$. When the control signal $SEL_4$ is at a low level, each of the switches $SW_{31}$ to $SW_{42}$ cuts off electrical coupling between the corresponding one of the detection circuits $INT_1$ to $INT_{12}$ and the corresponding one of the drive electrodes $COML_1$ and $COML_2$.

In the image display period, the control signal $SEL_4$ is at a low level. As a result, each of the switches $SW_{31}$ to $SW_{42}$ cuts off electrical coupling between the corresponding one of the detection circuits $INT_1$ to $INT_{12}$ and the corresponding one of the drive electrodes $COML_1$ and $COML_2$. In the image detection period, the control signal $SEL_4$ is at a high level. As a result, each of the switches $SW_{31}$ to $SW_{42}$ electrically couples the corresponding one of the detection circuits $INT_1$ to $INT_{12}$ with the corresponding one of the drive electrodes $COML_1$ and $COML_2$, thereby supplying the detection signal to the corresponding one of the detection circuits $INT_1$ to $INT_{12}$. Each of the detection circuits $INT_1$ to $INT_{12}$ compares the detection signal with the reference potential Vref to read the detection signal.

4-1. Exemplary Operation Performed by the Display Apparatus According to the Fourth Embodiment The following describes an exemplary operation performed by the display apparatus according to the fourth embodiment. In the present exemplary operation, the display apparatus performs image display and image detection row by row.

Figure 25:
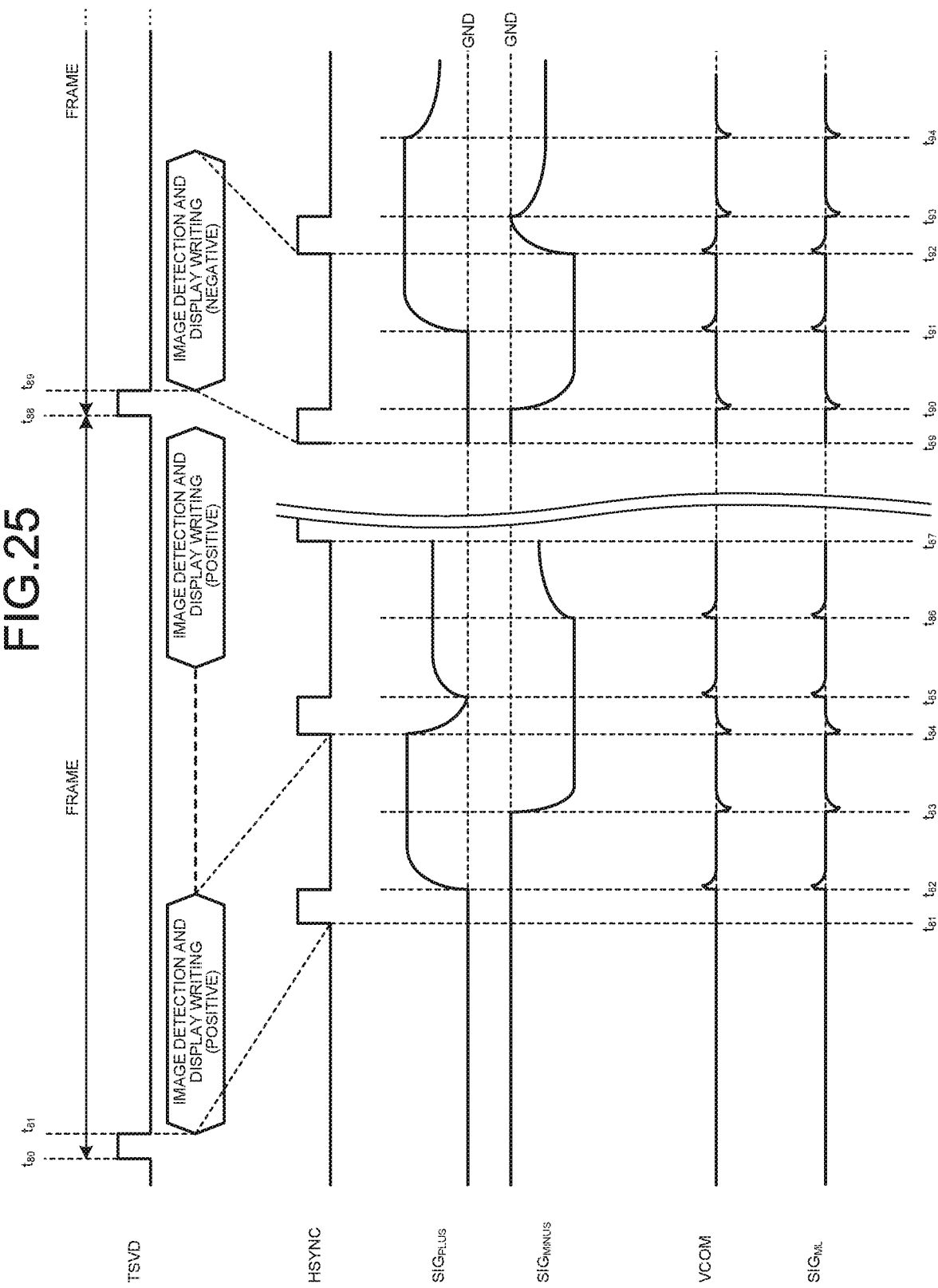
FIG. 25 is a diagram of an operating timing in an exemplary operation performed by the display apparatus according to the fourth embodiment.

FIG. 25 is a diagram of an operating timing in an exemplary operation performed by the display apparatus according to the fourth embodiment.

The period from timing $t_{50}$ of the first rising edge of the timing signal TSVD to timing $t_{88}$ of the second rising edge of the timing signal TSVD corresponds to the period of image display and image detection of the first frame. The period after timing $t_{88}$ of the second rising edge of the timing signal TSVD corresponds to the period of image display and image detection of the second frame.

A timing signal HSYNC for detection control output from the COG 11 to the COF 12 has the same frequency as that of the horizontal synchronization signal for display control for displaying an image on the display device DSP by the COG 11, for example.

During the entire period, the COG 11 outputs the control signals $SEL_1$ and $SEL_2$ (refer to FIG. 24) at a high level to the horizontal driver 8. As a result, the switches $SW_1$ to $SW_{12}$ are turned on.

The period from timing $t_{81}$ to timing $t_{84}$ corresponds to a positive-polarity image detection and display writing (image display) period for the first horizontal line of the first frame.

At timing $t_{81}$, the host HST outputs image data for the first horizontal line of the first frame to the COG 11. The COG 11 temporarily stores the image data for the first horizontal line of the first frame supplied from the host HST in the buffer 11a (refer to FIG. 22). The buffer 11a simply needs to have storage capacity large enough to store therein image data of one horizontal line.

The period from timing $t_{81}$ to timing $t_{82}$, which is a predetermined time after timing $t_{81}$, corresponds to a precharge period for the signal lines SL.

From timing $t_{81}$ to timing $t_{82}$, the horizontal driver 8 outputs the ground potential GND to all the signal lines SL, thereby precharging all the signal lines SL with the ground potential GND. The period from timing $t_{82}$ to timing $t_{83}$ corresponds to the positive-polarity image detection period for the first horizontal line of the first frame.

At timing $t_{82}$, the COG 11 causes the horizontal driver 8 to output the positive-polarity pixel signals for the first horizontal line of the first frame based on the image data for the first horizontal line of the first frame stored in the buffer 11a. The horizontal driver 8 outputs the positive-polarity pixel signals $SIG_{PLUS}$ for the first horizontal line of the first frame to one group of the two groups (the group of the odd-numbered signal lines SL and the group of the even-numbered signal lines SL) of the N signal lines SL. The horizontal driver 8 maintains the electric potential (ground potential GND) of the other group of the two groups of the N signal lines SL.

The horizontal driver 8, for example, outputs the positive-polarity pixel signals $SIG_{PLUS}$ for the first horizontal line of the first frame to the group of the odd-numbered signal lines SL (refer to the signal lines $SL_1$, $SL_3$, $SL_5$, . . . in FIG. 24) out of the N signal lines SL. The horizontal driver 8 maintains the electric potential (ground potential GND) of the group of the even-numbered signal lines SL (refer to the signal lines $SL_2$, $SL_4$, $SL_6$, . . . in FIG. 24) out of the N signal lines SL.

From timing $t_{81}$ to timing $t_{83}$, the COG 11 outputs the control signal $SEL_3$ (refer to FIG. 24) at a low level to the drive electrode driver 9. As a result, the switches $SW_{21}$ and $SW_{22}$ are turned off. Consequently, all the drive electrodes COML are brought into a floating state.

Referring back to FIG. 24, the signal lines $SL_1$ to $SL_{12}$ are capacitively coupled to the wires $ML_1$ to $ML_{12}$, respectively. As a result, detection signals $SIG_{ML}$ are generated in the wires $ML_1$, $ML_3$, $ML_5$, $ML_7$, $ML_9$, and $ML_{11}$ due to the pixel signals $SIG_{PLUS}$ supplied to the signal lines $SL_1$, $SL_3$, $SL_5$, $SL_7$, $SL_9$, and $SL_{11}$ respectively. The COG 11 changes the control signal $SEL_4$ to a high level at a timing based on the timing signal HSYNC, for example, at timing $t_{82}$. As a result, the switches $SW_{31}$ to $SW_{42}$ are turned on at timing $t_{82}$. The detection circuits $INT_1$, $INT_3$, $INT_5$, $INT_7$, $INT_9$ and $INT_{11}$ read the corresponding detection signals $SIG_{ML}$ at timing $t_{82}$. The COF 12 performs sampling and A/D conversion on the detection signals $SIG_{ML}$, thereby obtaining the positive-polarity detection pixel data. The detection signal $SIG_{ML}$ is a spike signal. The COF 12 may read the peak voltage of the detection signals $SIG_{ML}$, thereby obtaining the positive-polarity detection pixel data.

The period from timing $t_{83}$ to timing $t_{84}$ corresponds to the display writing (image display) period for the first horizontal line of the first frame.

At timing $t_{83}$, the COG 11 causes the horizontal driver 8 to output the pixel signals based on the image data for the first horizontal line of the first frame stored in the buffer 11a. The horizontal driver 8 maintains the electric potential (positive-polarity pixel signals $SIG_{PLUS}$ for the first horizontal line of the first frame) of one group of the two groups (the group of the odd-numbered signal lines SL and the group of the even-numbered signal lines SL) of the N signal lines SL. The horizontal driver 8 outputs the negative-polarity pixel signals $SIG_{MINUS}$ for the first horizontal line of the first frame to the other group of the two groups of the N signal lines SL.

The horizontal driver 8, for example, maintains the electric potential (positive-polarity pixel signals $SIG_{PLUS}$ for the first horizontal line of the first frame) of the group of the odd-numbered signal lines SL (refer to the signal lines $SL_1$, $SL_3$, $SL_5$, . . . in FIG. 24) out of the N signal lines SL. The horizontal driver 8 outputs the negative-polarity pixel signals $SIG_{MINUS}$ for the first horizontal line of the first frame to the group of the even-numbered signal lines SL (refer to the signal lines $SL_2$, $SL_4$, $SL_6$, . . . in FIG. 24) out of the N signal lines SL.

From timing $t_{83}$ to timing $t_{84}$, the COG 11 outputs the control signal $SEL_3$ (refer to FIG. 24) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 3) and the drive electrodes COML, thereby displaying an image.

From timing $t_{83}$ to timing $t_{84}$, the COG 11 changes the control signal $SEL_4$ (refer to FIG. 24) to a low level. As a result, the switches $SW_{31}$ to $SW_{42}$ are turned off, whereby the detection circuits $INT_1$ to $INT_{12}$ do not read the detection signals $SIG_{ML}$.

The period from timing $t_{84}$ to timing $t_{87}$ corresponds to a positive-polarity image detection and display writing (image display) period for the second horizontal line of the first frame.

At timing $t_{84}$, the host HST outputs image data for the second horizontal line of the first frame to the COG 11. The COG 11 temporarily stores the image data for the second horizontal line of the first frame supplied from the host HST in the buffer 11a (refer to FIG. 22).

The period from timing $t_{84}$ to timing $t_{85}$, which is a predetermined time after timing $t_{84}$, corresponds to a precharge period for the signal lines SL.

From timing $t_{84}$ to timing $t_{85}$, the horizontal driver 8 outputs the ground potential GND to one group of the two groups (the group of the odd-numbered signal lines SL and the group of the even-numbered signal lines SL) of the N signal lines SL. The horizontal driver 8 thus precharges the group of the odd-numbered or the even-numbered signal lines SL in the N signal lines SL with the ground potential GND. From timing $t_{84}$ to timing $t_{85}$, the horizontal driver 8 maintains the electric potential (negative-polarity pixel signals $SIG_{MINUS}$ for the first horizontal line of the first frame) of the other group of the two groups of the N signal lines SL.

The horizontal driver 8, for example, outputs the ground potential GND to the group of the odd-numbered signal lines SL (refer to the signal lines $SL_1$, $SL_3$, $SL_5$, ... in FIG. 24) out of the N signal lines SL. The horizontal driver 8 maintains the electric potential (negative-polarity pixel signals $SIG_{MINUS}$ for the first horizontal line of the first frame) of the group of the even-numbered signal lines SL (refer to the signal lines $SL_2$, $SL_4$, $SL_6$, ... in FIG. 24) out of the N signal lines SL.

The period from timing $t_{85}$ to timing $t_{86}$ corresponds to the positive-polarity image detection period for the second horizontal line of the first frame.

At timing $t_{85}$, the COG 11 causes the horizontal driver 8 to output the positive-polarity pixel signals based on the image data for the second horizontal line of the first frame stored in the buffer 11a. The horizontal driver 8 outputs the positive-polarity pixel signals $SIG_{PLUS}$ for the second horizontal line of the first frame to one group of the two groups (the group of the odd-numbered signal lines SL and the group of the even-numbered signal lines SL) of the N signal lines SL. The horizontal driver 8 maintains the electric potential (negative-polarity pixel signals $SIG_{MINUS}$ for the first horizontal line of the first frame) of the other group of the two groups of the N signal lines SL.

The horizontal driver 8, for example, outputs the positive-polarity pixel signals $SIG_{PLUS}$ for the second horizontal line of the first frame to the group of the odd-numbered signal lines SL (refer to the signal lines $SL_1$, $SL_3$, $SL_5$, ... in FIG. 24) out of the N signal lines SL. The horizontal driver 8 maintains the electric potential (negative-polarity pixel signals $SIG_{MINUS}$ for the first horizontal line of the first frame) of the group of the even-numbered signal lines SL (refer to the signal lines $SL_2$, $SL_4$, $SL_6$, ... in FIG. 24) out of the N signal lines SL.

From timing $t_{85}$ to timing $t_{86}$, the COG 11 outputs the control signal $SEL_3$ (refer to FIG. 24) at a low level to the drive electrode driver 9. As a result, the switches $SW_{21}$ and $SW_{22}$ are turned off. Consequently, all the drive electrodes COML are brought into a floating state.

Referring back to FIG. 24, the signal lines $SL_1$ to $SL_{12}$ are capacitively coupled to the wires $ML_1$ to $ML_{12}$, respectively. As a result, detection signals $SIG_{ML}$ are generated in the wires $ML_1$, $ML_3$, $ML_5$, $ML_7$, $ML_9$, and $ML_{11}$ due to the pixel signals $SIG_{PLUS}$ supplied to the signal lines $SL_1$, $SL_3$, $SL_5$, $SL_7$, $SL_9$, and $SL_{11}$ respectively. The COG 11 changes the control signal $SEL_4$ to a high level at a timing based on the timing signal HSYNC, for example, at timing $t_{85}$. As a result, the switches $SW_{31}$ to $SW_{42}$ are turned on at timing $t_{85}$. The detection circuits $INT_1$, $INT_3$, $INT_5$, $INT_7$, $INT_9$ and $INT_{11}$ read the detection signals $SIG_{ML}$ at timing $t_{85}$. The COF 12 performs sampling and A/D conversion on the detection signals $SIG_{ML}$, thereby obtaining the positive-polarity detection pixel data. The COF 12 may read the peak voltage of the detection signals $SIG_{ML}$, thereby obtaining the positive-polarity detection pixel data.

The period from timing $t_{86}$ to timing $t_{87}$ corresponds to the display writing (image display) period for the second horizontal line of the first frame.

At timing $t_{86}$, the COG 11 causes the horizontal driver 8 to output the pixel signals based on the image data for the second horizontal line of the first frame stored in the buffer 11a. The horizontal driver 8 maintains the electric potential (positive-polarity pixel signals $SIG_{PLUS}$ for the second horizontal line of the first frame) of one group of the two groups (the group of the odd-numbered signal lines SL and the group of the even-numbered signal lines SL) of the N signal lines SL. The horizontal driver 8 outputs the negative-polarity pixel signals $SIG_{MINUS}$ for the second horizontal line of the first frame to the other group of the two groups of the N signal lines SL.

The horizontal driver 8, for example, maintains the electric potential (positive-polarity pixel signals $SIG_{PLUS}$ for the second horizontal line of the first frame) of the group of the odd-numbered signal lines SL (refer to the signal lines $SL_1$, $SL_3$, $SL_5$, ... in FIG. 24) out of the N signal lines SL. The horizontal driver 8 outputs the negative-polarity pixel signals $SIG_{MINUS}$ for the second horizontal line of the first frame to the group of the even-numbered signal lines SL (refer to the signal lines $SL_2$, $SL_4$, $SL_6$, ... in FIG. 24) out of the N signal lines SL.

From timing $t_{86}$ to timing $t_{87}$, the COG 11 outputs the control signal $SEL_3$ (refer to FIG. 24) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 3) and the drive electrodes COML, thereby displaying an image.

From timing $t_{86}$ to timing $t_{87}$, the COG 11 changes the control signal $SEL_4$ (refer to FIG. 24) to a low level. As a result, the switches $SW_{31}$ to $SW_{42}$ are turned off, whereby the detection circuits $INT_1$ to $INT_{12}$ do not read the detection signals $SIG_{ML}$.

Similarly, the COG 11 and the COF 12 perform positive-polarity image detection and display writing (image display) of the third to M-th horizontal lines of the first frame.

The period from timing $t_{89}$ to timing $t_{92}$ corresponds to a negative-polarity image detection and display writing (image display) period for the first horizontal line of the second frame.

At timing $t_{89}$, the host HST outputs image data for the first horizontal line of the second frame to the COG 11. The COG 11 temporarily stores the image data for the first horizontal line of the second frame supplied from the host HST in the buffer 11a (refer to FIG. 22). The buffer 11a simply needs to have storage capacity large enough to store therein image data of one horizontal line.

The period from timing $t_{89}$ to timing $t_{90}$, which is a predetermined time after timing $t_{89}$, corresponds to a precharge period for the signal lines SL.

From timing $t_{89}$ to timing $t_{90}$, the horizontal driver 8 outputs the ground potential GND to all the signal lines SL, thereby precharging all the signal lines SL with the ground potential GND.

The period from timing $t_{90}$ to timing $t_{91}$ corresponds to the negative-polarity image detection period for the first horizontal line of the second frame.

At timing $t_{90}$, the COG 11 causes the horizontal driver 8 to output the negative-polarity pixel signals for the first horizontal line of the second frame based on the image data for the first horizontal line of the second frame stored in the buffer 11a. The horizontal driver 8 outputs the negative-polarity pixel signals $SIG_{MINUS}$ for the first horizontal line of the second frame to one group of the two groups (the group of the odd-numbered signal lines SL and the group of the even-numbered signal lines SL) of the N signal lines SL. The horizontal driver 8 maintains the electric potential (ground potential GND) of the other group of the two groups of the N signal lines SL.

The horizontal driver 8, for example, outputs the negative-polarity pixel signals $SIG_{MINUS}$ for the first horizontal line of the second frame to the group of the even-numbered signal lines SL (refer to the signal lines $SL_2$, $SL_4$, $SL_6$, ... in FIG. 24) out of the N signal lines SL. The horizontal driver 8 maintains the electric potential (ground potential GND) of the group of the odd-numbered signal lines SL (refer to the signal lines $SL_1$, $SL_3$, $SL_5$, . . . in FIG. 24) out of the N signal lines SL.

From timing $t_{90}$ to timing $t_{91}$, the COG 11 outputs the control signal $SEL_3$ (refer to FIG. 24) at a low level to the drive electrode driver 9. As a result, the switches $SW_{21}$ and $SW_{22}$ are turned off. Consequently, all the drive electrodes COML are brought into a floating state.

Referring back to FIG. 24, the signal lines $SL_1$ to $SL_{12}$ are capacitively coupled to the wires $ML_1$ to $ML_{12}$, respectively. As a result, the detection signals $SIG_{ML}$ are generated in the wires $ML_2$, $ML_4$, $ML_6$, $ML_8$, $ML_{10}$, and $ML_{12}$ due to the pixel signals $SIG_{MINUS}$ supplied to the signal lines $SL_2$, $SL_4$, $SL_6$, $SL_8$, $SL_{10}$, and $SL_{12}$ respectively. The COG 11 changes the control signal $SEL_4$ to a high level at a timing based on the timing signal HSYNC, for example, at timing $t_{90}$. As a result, the switches $SW_{31}$ to $SW_{42}$ are turned on at timing $t_{90}$. The detection circuits $INT_2$, $INT_4$, $INT_6$, $INT_8$, $INT_{10}$ and $INT_{12}$ read the detection signals $SIG_{ML}$ at timing $t_{90}$. The COF 12 performs sampling and A/D conversion on the detection signals $SIG_{ML}$, thereby obtaining the negative-polarity detection pixel data. The COF 12 may read the peak voltage of the detection signals $SIG_{ML}$, thereby obtaining the negative-polarity detection pixel data.

The period from timing $t_{91}$ to timing $t_{92}$ corresponds to the display writing (image display) period for the first horizontal line of the second frame.

At timing $t_{91}$, the COG 11 causes the horizontal driver 8 to output the pixel signals based on the image data for the first horizontal line of the second frame stored in the buffer 11a. The horizontal driver 8 maintains the electric potential (negative-polarity pixel signals $SIG_{MINUS}$ for the first horizontal line of the second frame) of one group of the two groups (the group of the odd-numbered signal lines SL and the group of the even-numbered signal lines SL) of the N signal lines SL. The horizontal driver 8 outputs the positive-polarity pixel signals $SIG_{PLUS}$ for the first horizontal line of the second frame to the other group of the two groups of the N signal lines SL.

The horizontal driver 8, for example, maintains the electric potential (negative-polarity pixel signals $SIG_{MINUS}$ for the first horizontal line of the second frame) of the group of the even-numbered signal lines SL (refer to the signal lines $SL_2$, $SL_4$, $SL_6$, . . . in FIG. 24) out of the N signal lines SL. The horizontal driver 8 outputs the positive-polarity pixel signals $SIG_{PLUS}$ for the first horizontal line of the second frame to the group of the odd-numbered signal lines SL (refer to the signal lines $SL_1$, $SL_3$, $SL_5$, . . . in FIG. 24) out of the N signal lines SL.

From timing $t_{91}$ to timing $t_{92}$, the COG 11 outputs the control signal $SEL_3$ (refer to FIG. 24) at a high level to the drive electrode driver 9. As a result, the switches $SW_{21}$ and $SW_{22}$ are turned on. The drive electrode driver 9 outputs the drive signals VCOM to all the drive electrodes COML. Consequently, an electric field is formed between the pixel electrodes PE (refer to FIG. 3) and the drive electrodes COML, thereby displaying an image.

The period after timing $t_{92}$ corresponds to a negative-polarity image detection and display writing (image display) period for the second horizontal line of the second frame.

At timing $t_{92}$, the host HST outputs image data for the second horizontal line of the second frame to the COG 11. The COG 11 temporarily stores the image data for the second horizontal line of the second frame supplied from the host HST in the buffer 11a (refer to FIG. 22).

The period from timing $t_{92}$ to timing $t_{93}$, which is a predetermined time after timing $t_{92}$, corresponds to a precharge period for the signal lines SL.

From timing $t_{92}$ to timing $t_{93}$, the horizontal driver 8 outputs the ground potential GND to one group of the two groups (the group of the odd-numbered signal lines SL and the group of the even-numbered signal lines SL) of the N signal lines SL. The horizontal driver 8 thus precharges the group of the odd-numbered or the even-numbered signal lines SL in the N signal lines SL with the ground potential GND. From timing $t_{92}$ to timing $t_{93}$, the horizontal driver 8 maintains the electric potential (positive-polarity pixel signals $SIG_{PLUS}$ for the first horizontal line of the second frame) of the other group of the two groups of the N signal lines SL.

The horizontal driver 8, for example, outputs the ground potential GND to the group of the even-numbered signal lines SL (refer to the signal lines $SL_2$, $SL_4$, $SL_6$, . . . in FIG. 24) out of the N signal lines SL. The horizontal driver 8 maintains the electric potential (positive-polarity pixel signals $SIG_{PLUS}$ for the first horizontal line of the second frame) of the group of the odd-numbered signal lines SL (refer to the signal lines $SL_1$, $SL_3$, $SL_5$, . . . in FIG. 24) out of the N signal lines SL.

The period from timing $t_{93}$ to timing $t_{94}$ corresponds to the negative-polarity image detection period for the second horizontal line of the second frame.

At timing $t_{93}$, the COG 11 causes the horizontal driver 8 to output the negative-polarity pixel signals based on the image data for the second horizontal line of the second frame stored in the buffer 11a. The horizontal driver 8 outputs the negative-polarity pixel signals $SIG_{MINUS}$ for the second horizontal line of the second frame to one group of the two groups (the group of the odd-numbered signal lines SL and the group of the even-numbered signal lines SL) of the N signal lines SL. The horizontal driver 8 maintains the electric potential (positive-polarity pixel signals $SIG_{PLUS}$ for the first horizontal line of the second frame) of the other group of the two groups of the N signal lines SL.

The horizontal driver 8, for example, outputs the negative-polarity pixel signals $SIG_{MINUS}$ for the second horizontal line of the second frame to the group of the even-numbered signal lines SL (refer to the signal lines $SL_2$, $SL_4$, $SL_6$, . . . in FIG. 24) out of the N signal lines SL. The horizontal driver 8 maintains the electric potential (positive-polarity pixel signals $SIG_{PLUS}$ for the first horizontal line of the second frame) of the group of the odd-numbered signal lines SL (refer to the signal lines $SL_1$, $SL_3$, $SL_5$, . . . in FIG. 24) out of the N signal lines SL.

From timing $t_{93}$ to timing $t_{94}$, the COG 11 outputs the control signal $SEL_3$ (refer to FIG. 24) at a low level to the drive electrode driver 9. As a result, the switches $SW_{21}$ and $SW_{22}$ are turned off. Consequently, all the drive electrodes COML are brought into a floating state.

Referring back to FIG. 24, the signal lines $SL_1$ to $SL_{12}$ are capacitively coupled to the wires $ML_1$ to $ML_{12}$, respectively. As a result, the detection signals $SIG_{ML}$ are generated in the wires $ML_2$, $ML_4$, $ML_6$, $ML_8$, $ML_{10}$, and $ML_{12}$ due to the pixel signals $SIG_{MINUS}$ supplied to the signal lines $SL_2$, $SL_4$, $SL_6$, $SL_8$, $SL_{10}$, and $SL_{12}$ respectively. The COG 11 changes the control signal $SEL_4$ to a high level at a timing based on the timing signal HSYNC, for example, at timing $t_{93}$. As a result, the switches $SW_{31}$ to $SW_{42}$ are turned on at timing $t_{93}$. The detection circuits $INT_2$, $INT_4$, $INT_6$, $INT_8$, $INT_{10}$ and $INT_{12}$ read the detection signals $SIG_{ML}$ at timing $t_{93}$. The COF 12 performs sampling and A/D conversion on the detection signals $SIG_{ML}$, thereby obtaining the negative-polarity detection pixel data. The COF 12 may read the peak voltage of the detection signals $SIG_{ML}$, thereby obtaining the negative-polarity detection pixel data.

The period after timing $t_{94}$ corresponds to a display writing (image display) period for the second horizontal line of the second frame.

At timing $t_{94}$, the COG 11 causes the horizontal driver 8 to output the pixel signals based on the image data for the second horizontal line of the second frame stored in the buffer 11a. The horizontal driver 8 maintains the electric potential (negative-polarity pixel signals $SIG_{MINUS}$ for the second horizontal line of the second frame) of one group of the two groups (the group of the odd-numbered signal lines SL and the group of the even-numbered signal lines SL) of the N signal lines SL. The horizontal driver 8 outputs the positive-polarity pixel signals $SIG_{PLUS}$ for the second horizontal line of the second frame to the other group of the two groups of the N signal lines SL.

The horizontal driver 8, for example, maintains the electric potential (negative-polarity pixel signals $SIG_{MINUS}$ for the second horizontal line of the second frame) of the group of the even-numbered signal lines SL (refer to the signal lines $SL_2$, $SL_4$, $SL_6$, . . . in FIG. 24) out of the N signal lines SL. The horizontal driver 8 outputs the positive-polarity pixel signals $SIG_{PLUS}$ for the second horizontal line of the second frame to the group of the odd-numbered signal lines SL (refer to the signal lines $SL_1$, $SL_3$, $SL_5$, . . . in FIG. 24) out of the N signal lines SL.

From timing $t_{94}$, the COG 11 outputs the control signal $SEL_3$ (refer to FIG. 24) at a high level to the drive electrode driver 9. As a result, the switches $SW_{21}$ and $SW_{22}$ are turned on. The drive electrode driver 9 outputs the drive signals VCOM at a low level (electric potential VCOMDC) to all the drive electrodes COML. Consequently, an electric field is formed between the pixel electrodes PE (refer to FIG. 3) and the drive electrodes COML, thereby displaying an image.

Similarly, the COG 11 and the COF 12 perform negative-polarity image detection and display writing (image display) of the third to M-th horizontal lines of the second frame.

As described above, the number of pieces of detection pixel data in one line of the detection image data is N. As illustrated in FIG. 25, the display apparatus 1 performs image detection on a line-by-line basis. Consequently, the detection image data includes M×N pieces of pixel data.

Illustration and explanation of the flowchart of the exemplary operation performed by the display apparatus according to the fourth embodiment are omitted because it is the same as the flowchart (refer to FIG. 13) of the second exemplary operation performed by the display apparatus according to the first embodiment.

Similarly to the first exemplary operation performed by the display apparatus according to the first embodiment, the display apparatus according to the fourth embodiment can perform image detection and image display on each of the L units (refer to FIG. 6). Illustration and explanation of the flowchart of the operation performed by the display apparatus according to the fourth embodiment in this case are omitted because it is the same as the flowchart (refer to FIG. 10) of the first exemplary operation performed by the display apparatus according to the first embodiment.

While the fourth embodiment describes a case where the present invention is applied to a lateral electric field mode liquid crystal display apparatus, the present invention is not necessarily applied thereto. The present invention is also applicable to a vertical electric field mode liquid crystal display apparatus.

Figure 26:
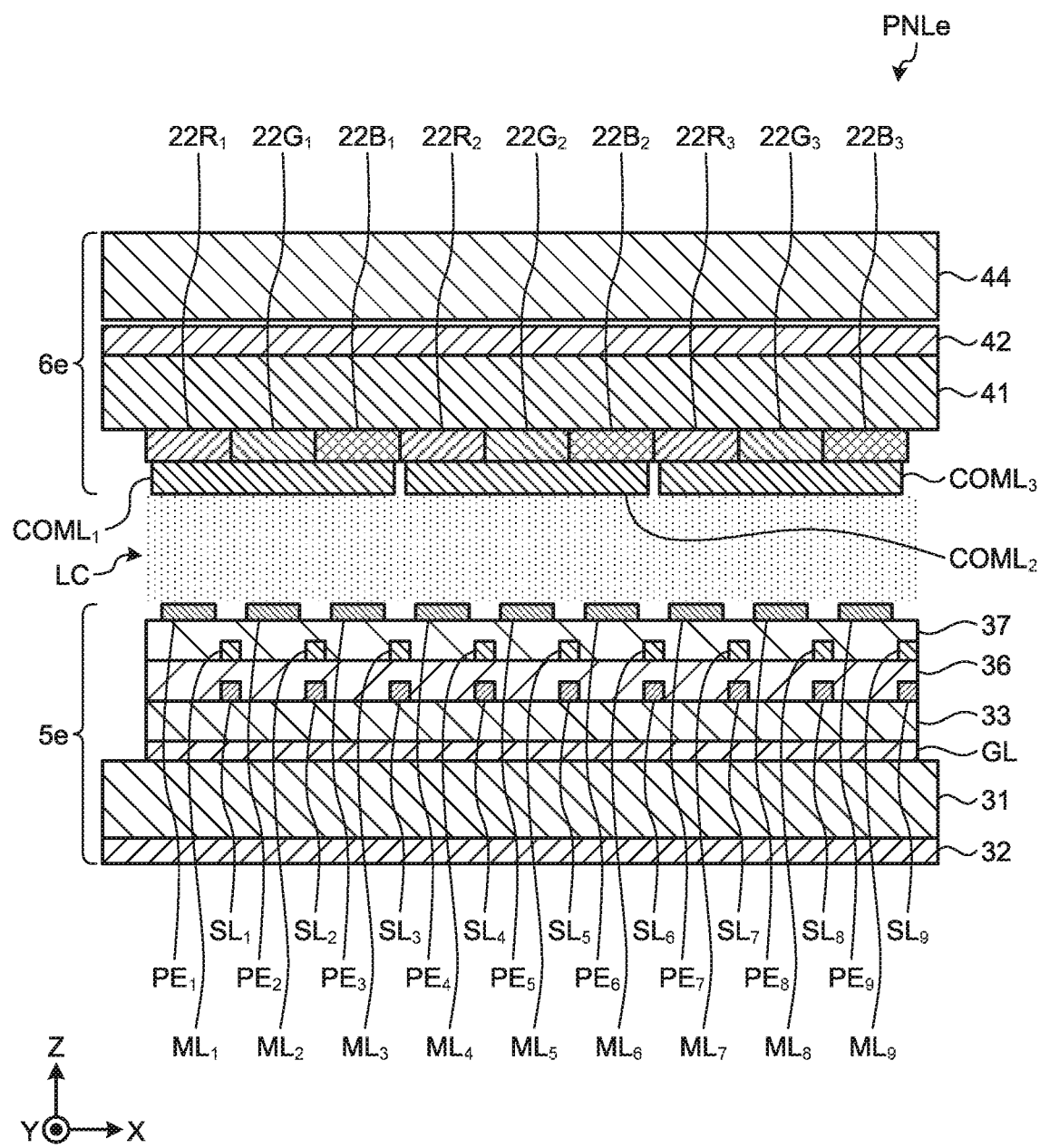
FIG. 26 is a schematic diagram of a sectional structure of a panel of the display apparatus according to a modification of the fourth embodiment.

FIG. 26 is a schematic diagram of a sectional structure of a panel of the display apparatus according to a modification of the fourth embodiment. FIG. 26 is a schematic diagram of a sectional structure of three pixels Pix.

A panel PNLe is an in-cell apparatus in which the detector DET is integrated with the display device DSP.

The panel PNLe includes a first substrate 5e, a second substrate 6e, and the liquid crystal LC. The second substrate 6e faces the first substrate 5e. The liquid crystal LC is disposed between the first substrate 5e and the second substrate 6e.

The first substrate 5e includes the substrate 31 serving as a translucent insulation substrate. The polarization plate 32 is disposed on the surface of the substrate 31 facing in the Z-direction.

The scanning line GL serving as a first metal layer is provided on the surface of the substrate 31 facing in the Z-direction. The scanning line GL extends in the X-direction (horizontal direction in FIG. 26). An insulation layer 33 is provided on the scanning line GL in the Z-direction. The TFT elements Tr (refer to FIG. 3), which are not illustrated in FIG. 26, may be provided between the scanning line GL and the insulation layer 33.

The signal lines $SL_1$ to $SL_9$ serving as the second metal layer are provided on the surface of the insulation layer 33 facing in the Z-direction. The signal lines $SL_1$ to $SL_9$ extend in the Y-direction (direction perpendicular to the plane of FIG. 26). An insulation layer 36 is provided in the Z-direction with respect to the insulation layer 33 and the signal lines $SL_1$ to $SL_9$.

The wires $ML_1$ to $ML_9$ serving as the third metal layer are provided on a surface of the insulation layer 36 facing in the Z-direction. The wires $ML_1$ to $ML_9$ are provided in the Z-direction with respect to the signal lines $SL_1$ to $SL_9$. The wires $ML_1$ to $ML_9$ extend in the Y-direction (direction perpendicular to the plane of FIG. 26). An insulation layer 37 is provided in the Z-direction with respect to the insulation layer 36 and the wires $ML_1$ to $ML_9$.

The pixel electrodes $PE_1$ to $PE_9$ serving as the transparent conductive film layer are provided on a surface of the insulation layer 37 facing in the Z-direction.

The configuration of the second substrate 6e is different from that of the second substrate 6a (refer to FIG. 14) according to the modification of the first embodiment in that no detection line RL is provided.

An electric field is formed between each of the pixel electrodes $PE_1$, $PE_2$, and $PE_3$ and the drive electrode $COML_1$. The electric field causes the molecules of the liquid crystal LC to rise and fall along the Z-direction, thereby rotating the polarization direction of light having passed through the polarization plate 32. An electric field is formed between each of the pixel electrodes $PE_4$, $PE_5$, and $PE_6$ and the drive electrode $COML_2$. The electric field causes the molecules of the liquid crystal LC to rise and fall along the Z-direction, thereby rotating the polarization direction of light having passed through the polarization plate 32. An electric field is formed between each of the pixel electrodes $PE_7$, $PE_8$, and $PE_9$ and the drive electrode $COML_3$. The electric field causes the molecules of the liquid crystal LC to rise and fall along the Z-direction, thereby rotating the polarization direction of light having passed through the polarization plate 32. In other words, the panel PNLe is a vertical electric field mode liquid crystal display apparatus.

The display apparatus according to the fourth embodiment has the following characteristics besides the characteristics of the display apparatus according to the first embodiment. The display apparatus according to the fourth embodiment also has characteristics other than those described below. The display apparatus according to the fourth embodiment requires no detection line RL. Consequently, the display apparatus according to the fourth embodiment can increase the transmittance of the image IMG (refer to FIG. 1) and improve the display quality. The display apparatus may supply a positive- or negative-polarity signal to at least one signal line SL and detect a detection signal with at least one wire ML corresponding to the at least one signal line SL supplied with the positive- or negative-polarity signal.

5. Fifth Embodiment

Figure 27:
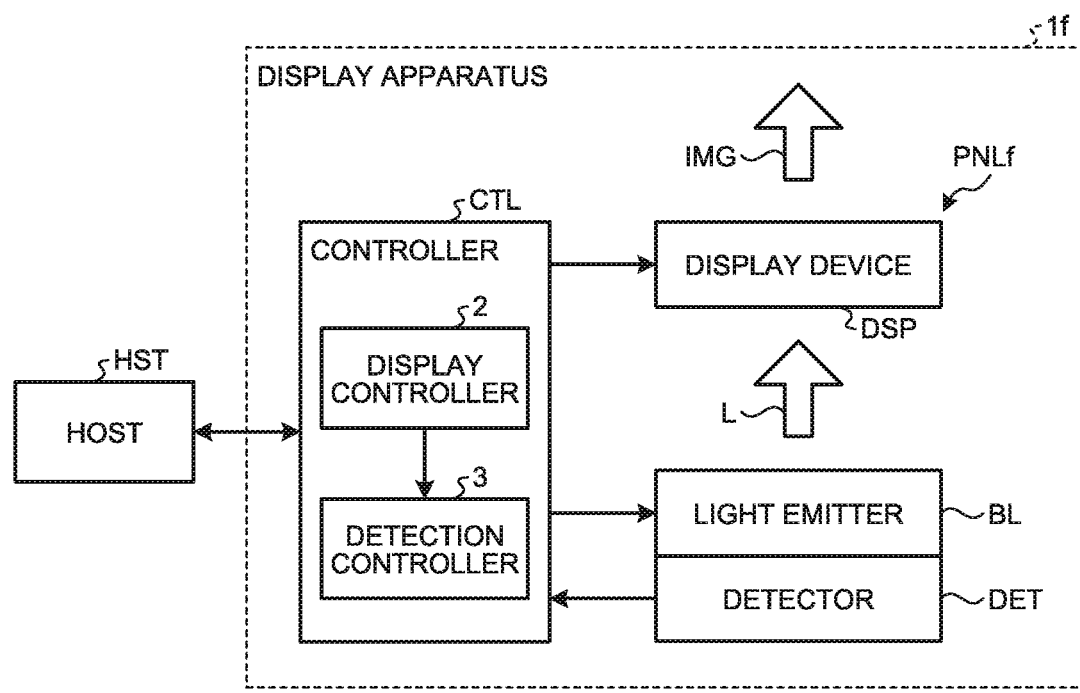
FIG. 27 is a block diagram of the configuration of a display apparatus according to a fifth embodiment.

FIG. 27 is a block diagram of the configuration of a display apparatus according to a fifth embodiment.

A display apparatus if according to the present embodiment includes a panel PNLf, the light emitter BL, the detector DET, and the controller CTL. The panel PNLf includes the display device DSP that displays an image.

The light emitter BL is disposed in the opposite direction of the Z-direction with respect to the panel PNLf. The light emitter BL outputs the light L in the Z-direction to irradiate the panel PNLf.

The display device DSP receives the light L output from the light emitter BL to display an image IMG in the Z-direction.

The detector DET electrically detects the image IMG displayed by the display device DSP. Specifically, the detector DET includes detection lines capacitively coupled to signal lines that supply pixel signals to pixels in the display device DSP. The detector DET generates detection signals in the detection lines due to the pixel signals.

The display apparatus if according to the present embodiment has the image display period for displaying an image and the image detection period for detecting an image. The display apparatus if according to the present embodiment employs a column inversion driving method of inverting the polarity of image signals alternately in columns (pixel columns) adjacent to each other, which will be described later. The image detection period includes a period for detecting a positive-polarity image and a period for detecting a negative-polarity image.

The light emitter BL and the detector DET may be integrated. Alternatively, the detector DET may be attached to the light emitter BL.

The following describes a specific exemplary configuration of the light emitter BL and the detector DET. The exemplary configuration below is given by way of example only, and the present invention is not limited thereto.

Figure 28:
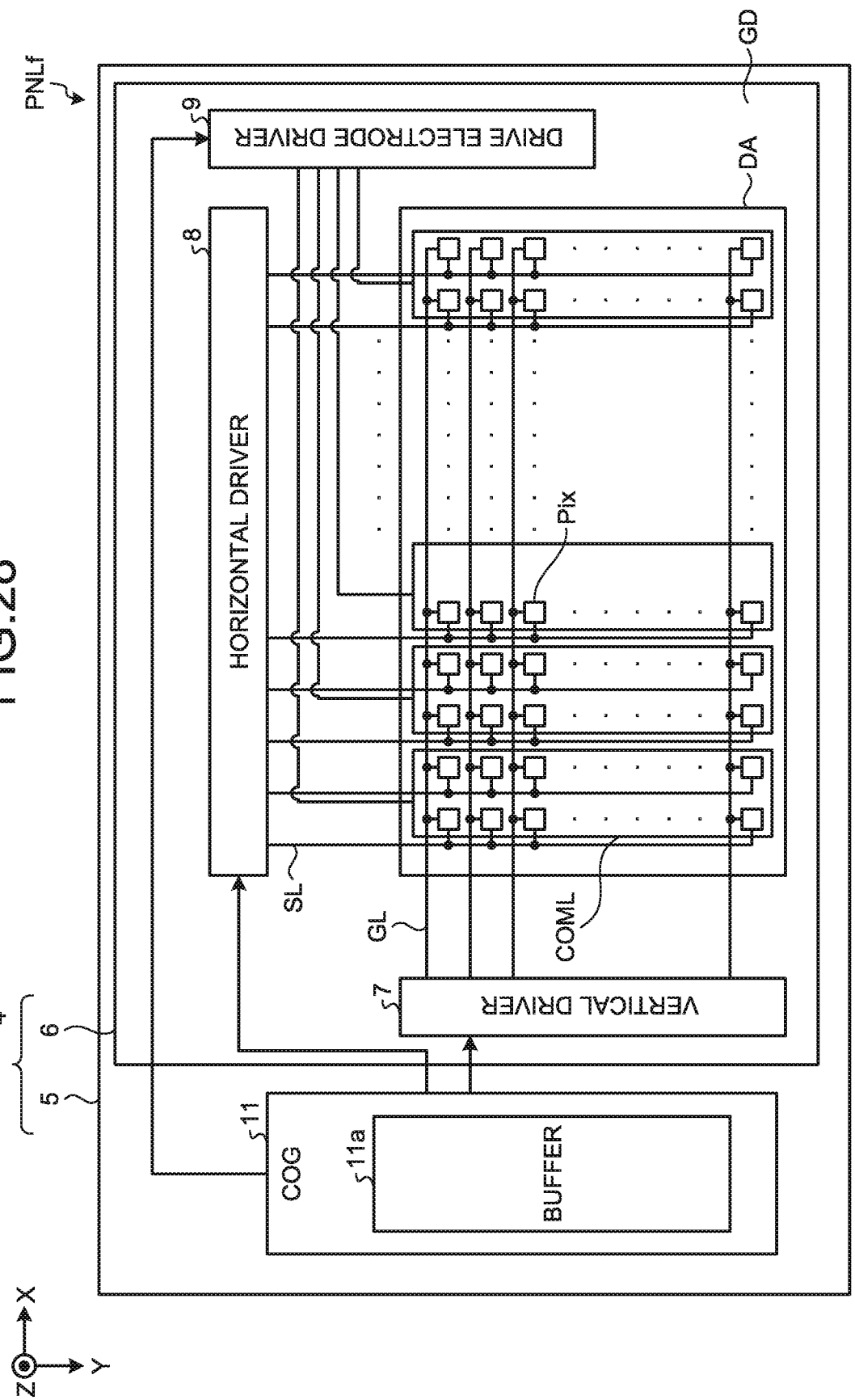
FIG. 28 is a diagram of the module configuration of the display apparatus according to the fifth embodiment.

FIG. 28 is a diagram of the module configuration of the display apparatus according to the fifth embodiment. The panel PNLf is different from the panel PNL (refer to FIG. 2) of the display apparatus according to the first embodiment in that neither the COF 12 nor the detection line RL is provided.

Figure 29:
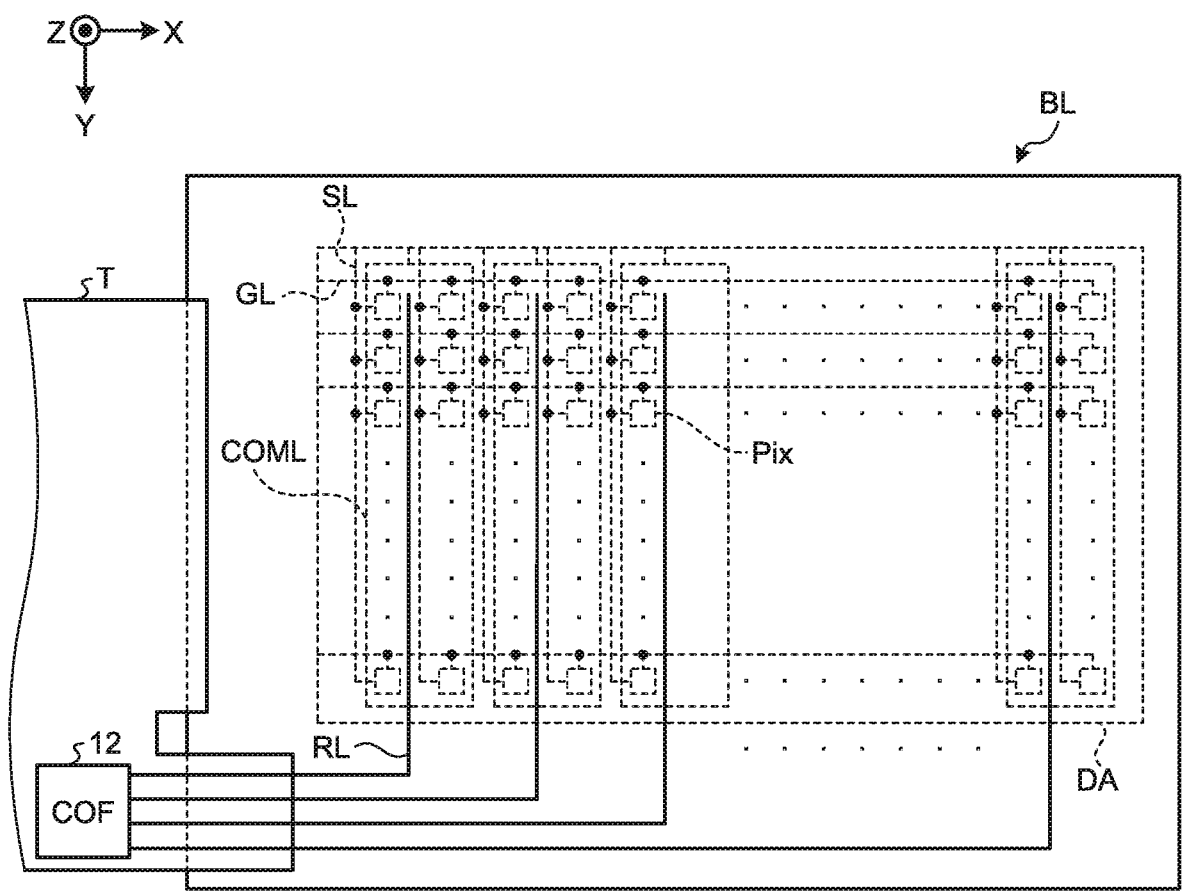
FIG. 29 is a diagram of the configuration of a light emitter of the display apparatus according to the fifth embodiment.

FIG. 29 is a diagram of the configuration of the light emitter of the display apparatus according to the fifth embodiment. The light emitter BL is disposed on a back surface side (a side facing in the opposite direction of the Z-direction) of the panel PNLf. In FIG. 29, the display area DA, the pixels Pix, the scanning lines GL, the signal lines SL, and the drive electrodes COML, which are the components included in the panel PNLf, are indicated by the dotted lines.

On the back surface side (the side facing in the opposite direction of the Z-direction) of the light emitter BL, the detection lines RL extending in the Y-direction are arranged one for every two columns of the pixels Pix such that the detection lines RL correspond to the respective drive electrodes COML. In other words, the number of detection lines RL is (N/2). The configuration described above is given by way of example only, and the detection lines RL are not necessarily arranged one for every two columns of the pixels Pix.

The COF 12 on the FPC T is coupled to the detection lines RL. The COF 12 outputs detection image data to the host HST based on the detection signals generated in the detection lines RL due to the pixel signals. The detection lines RL according to the present embodiment are arranged one for every two columns of the pixels Pix. The number of pieces of detection pixel data in one line of the detection image data is (N/2). The configuration described above is given by way of example only, and the detection lines RL are not necessarily arranged one for every two columns of the pixels Pix. The detection lines RL may be arranged one for every one or every three or more columns of the pixels Pix.

Figure 30:
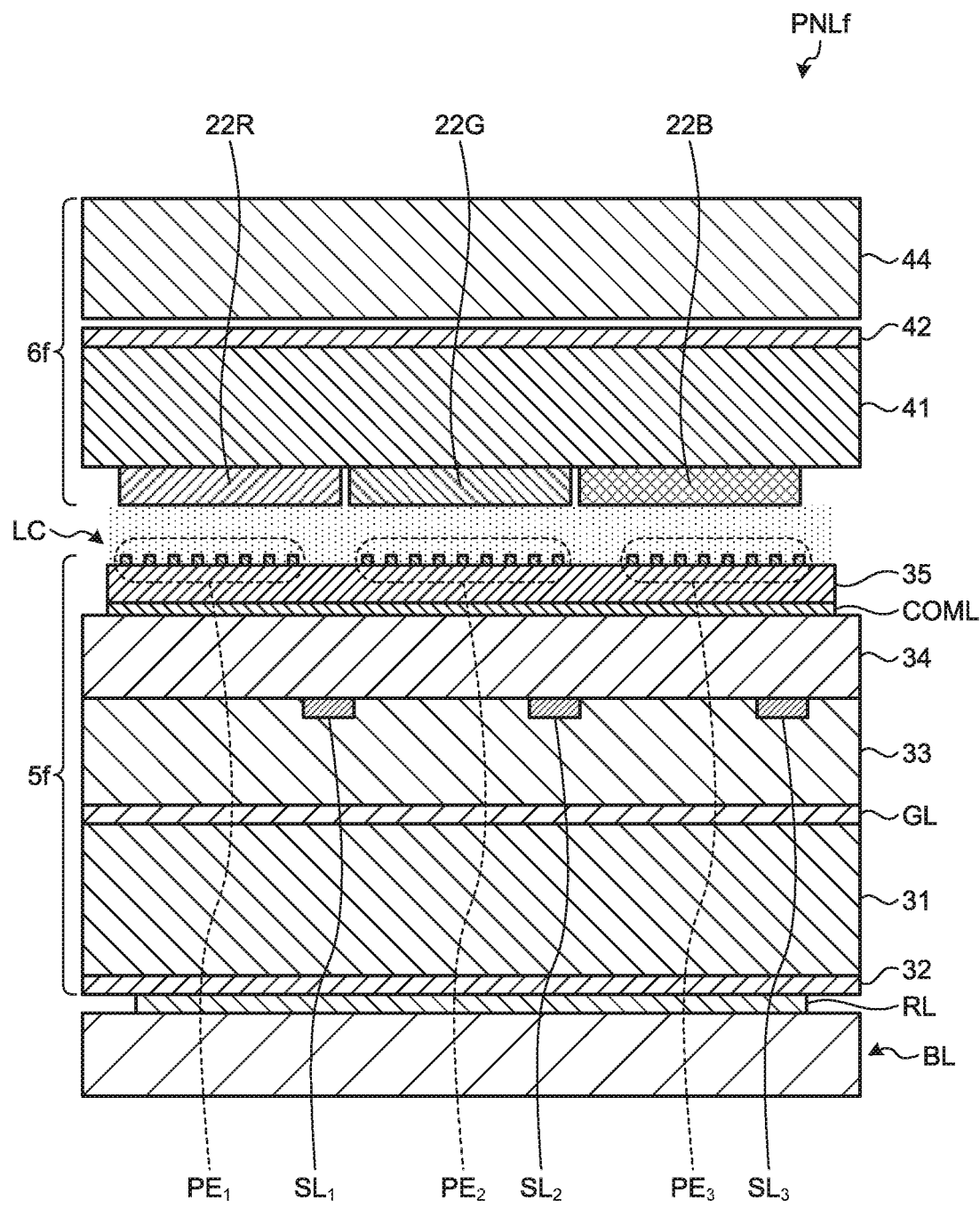
FIG. 30 is a schematic diagram of a first example of a sectional structure of the display apparatus according to the fifth embodiment.

FIG. 30 is a schematic diagram of a first example of a sectional structure of the display apparatus according to the fifth embodiment. FIG. 30 is a schematic diagram of a sectional structure of one pixel Pix.

The panel PNLf includes a first substrate 5f, a second substrate 6f, and the liquid crystal LC. The second substrate 6f faces the first substrate 5f. The liquid crystal LC is disposed between the first substrate 5f and the second substrate 6f. The configuration of the first substrate 5f is the same as that of the first substrate 5 (refer to FIG. 4) of the display apparatus according to the first embodiment.

The configuration of the second substrate 6f is different from that of the second substrate 6 (refer to FIG. 4) according to the first embodiment in that no detection line RL is provided.

The light emitter BL is provided in the opposite direction of the Z-direction with respect to the first substrate 5f. The detection line RL is provided in the Z-direction with respect to the light emitter BL. In other words, the detection line RL is provided between the polarization plate 32 and the light emitter BL. The detection line RL extends in the Y-direction (direction perpendicular to the plane of FIG. 30).

Figure 31:
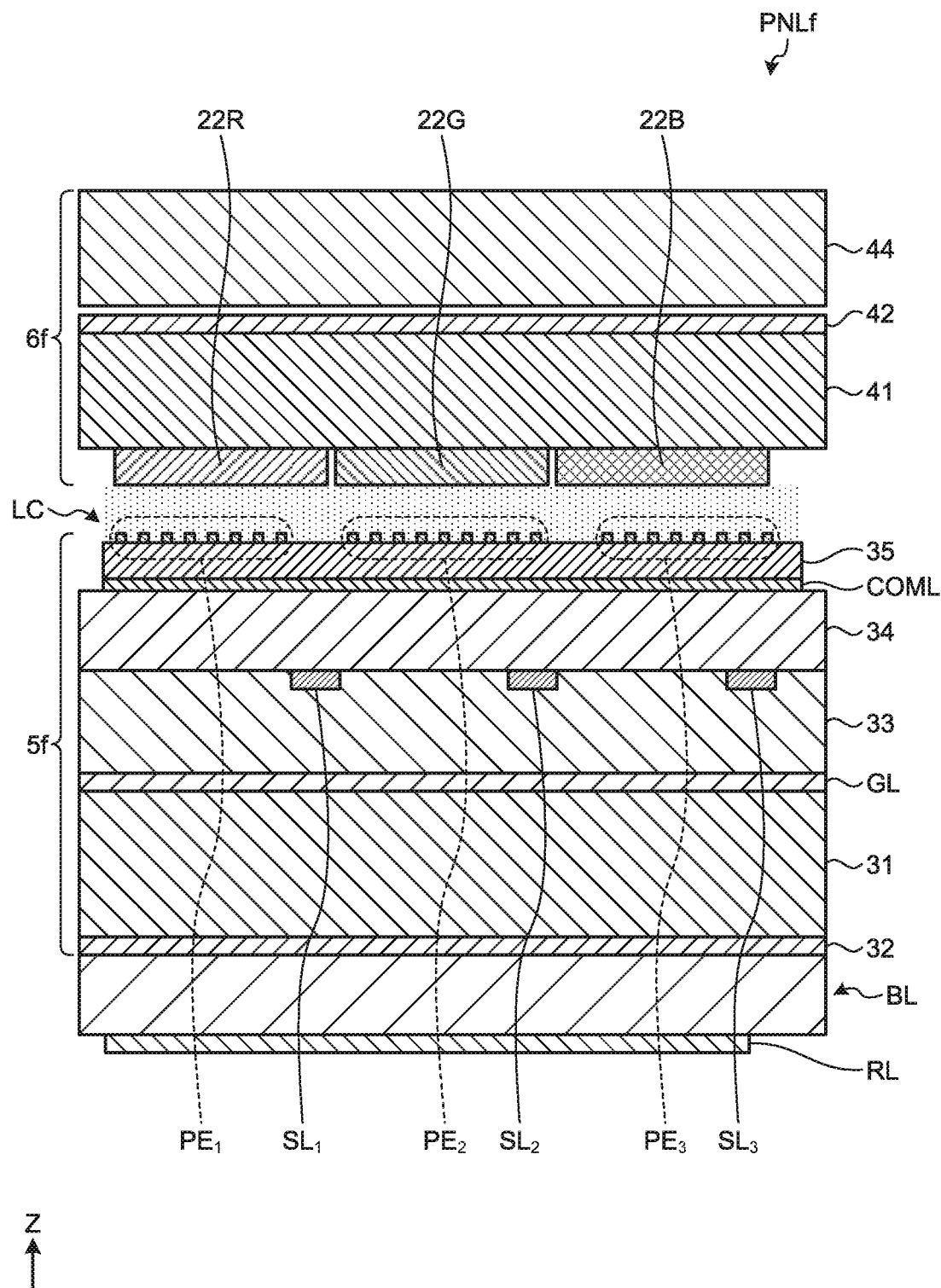
FIG. 31 is a schematic diagram of a second example of a sectional structure of the display apparatus according to the fifth embodiment.

FIG. 31 is a schematic diagram of a second example of a sectional structure of the display apparatus according to the fifth embodiment. FIG. 31 is a schematic diagram of a sectional structure of one pixel Pix.

The light emitter BL is provided in the opposite direction of the Z-direction with respect to the first substrate 5f. The detection line RL is provided in the opposite direction of the Z-direction with respect to the light emitter BL. The detection line RL extends in the Y-direction (direction perpendicular to the plane of FIG. 31).

Figure 32:
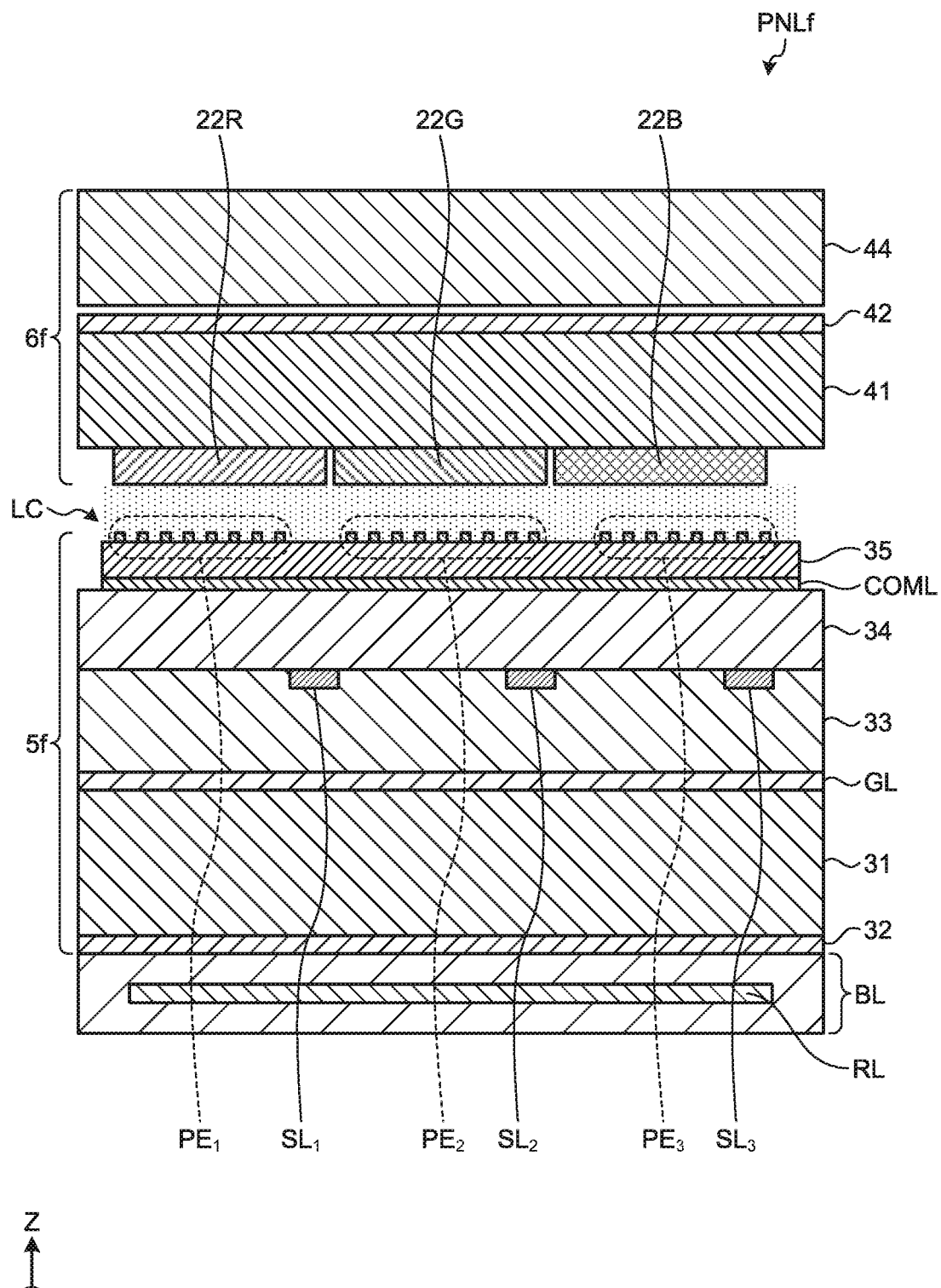
FIG. 32 is a schematic diagram of a third example of a sectional structure of the display apparatus according to the fifth embodiment.

FIG. 32 is a schematic diagram of a third example of a sectional structure of the display apparatus according to the fifth embodiment. FIG. 32 is a schematic diagram of a sectional structure of one pixel Pix.

The light emitter BL is provided in the opposite direction of the Z-direction with respect to the first substrate 5f. The detection line RL is provided in the light emitter BL. The detection line RL extends in the Y-direction (direction perpendicular to the plane of FIG. 32).

Figure 33:
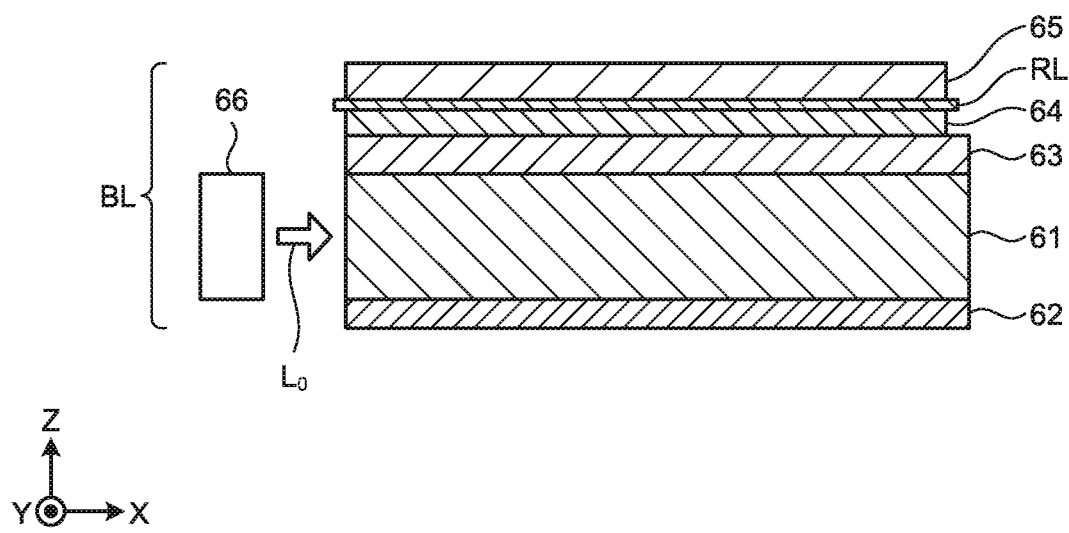
FIG. 33 is a schematic diagram of a first example of a sectional structure of the light emitter in the display apparatus according to the fifth embodiment.

FIG. 33 is a schematic diagram of a first example of a sectional structure of the light emitter in the display apparatus according to the fifth embodiment. The light emitter BL illustrated in FIG. 33 corresponds to that in the first example of the sectional structure of the display apparatus if illustrated in FIG. 30.

The light emitter BL includes a light guide plate 61 and a light source 66. The light source 66 is provided on the opposite side in the X-direction of the light guide plate 61. The light source 66 outputs light Lo in the X-direction. The light Lo travels in the X-direction and enters into the light guide plate 61 from its side surface. The light guide plate 61 guides the entering light Lo toward the panel PNLf, that is, in the Z-direction.

A reflective plate 62 is provided on a surface of the light guide plate 61 facing in the opposite direction of the Z-direction. The reflective plate 62 reflects, in the Z-direction, light output from the light guide plate 61 and traveling in the opposite direction of the Z-direction. With this mechanism, the reflective plate 62 can effectively direct the light Lo, which is output from the light source 66, toward the panel PNLf.

A diffusion film 63 is provided on a surface of the light guide plate 61 facing in the Z-direction. The diffusion film 63 diffuses the light output from the light guide plate 61 toward the panel PNLf, that is, in the Z-direction across the entire panel PNLf. The diffusion film 63 thus can equalize the luminance of the panel PNLf.

A first luminance enhancement film 64 is provided on a surface of the diffusion film 63 facing in the Z-direction. The first luminance enhancement film 64 is produced by uniformly and precisely forming an acrylic resin prism pattern on a surface of a translucent polyester, for example. The first luminance enhancement film 64 condenses the light output from the diffusion film 63 and traveling in the Z-direction toward a user of the display apparatus 1f, thereby increasing the front luminance. The first luminance enhancement film 64 can reflect unused light outside the viewing angle into the viewing angle again, thereby condensing the light at a suitable angle in the direction toward the user of the display apparatus 1f.

The detection line RL is provided on a surface of the first luminance enhancement film 64 facing in the Z-direction. The detection line RL extends in the Y-direction (direction perpendicular to the plane of FIG. 33).

A second luminance enhancement film 65 is provided on a surface of the detection line RL facing in the Z-direction. The second luminance enhancement film 65 is a reflective polarization film having a multilayered thin film structure, for example. The second luminance enhancement film 65 can brighten the screen of the panel PNLf without allowing the light output from the first luminance enhancement film 64 to be absorbed into the polarization plate 32 (refer to FIG. 31) of the panel PNLf.

Figure 34:
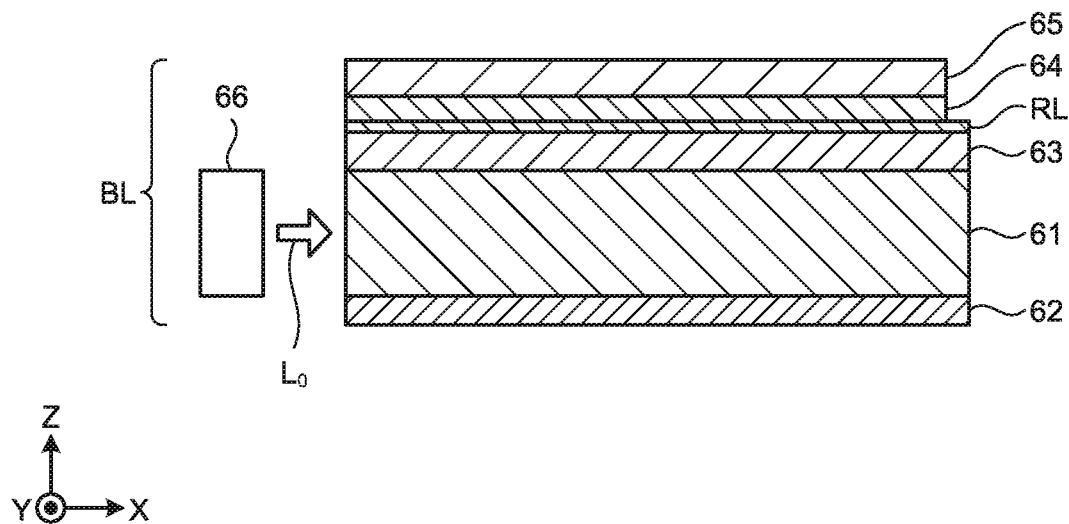
FIG. 34 is a schematic diagram of a second example of a sectional structure of the light emitter in the display apparatus according to the fifth embodiment.

FIG. 34 is a schematic diagram of a second example of a sectional structure of the light emitter in the display apparatus according to the fifth embodiment. The light emitter BL illustrated in FIG. 34 corresponds to that in the first example of the sectional structure of the display apparatus if illustrated in FIG. 30.

The detection line RL is provided on the surface of the diffusion film 63 facing in the Z-direction. The detection line RL extends in the Y-direction (direction perpendicular to the plane of FIG. 34).

The first luminance enhancement film 64 is provided in the Z-direction with respect to the detection line RL. The second luminance enhancement film 65 is provided on the surface of the first luminance enhancement film 64 facing in the Z-direction.

Figure 35:
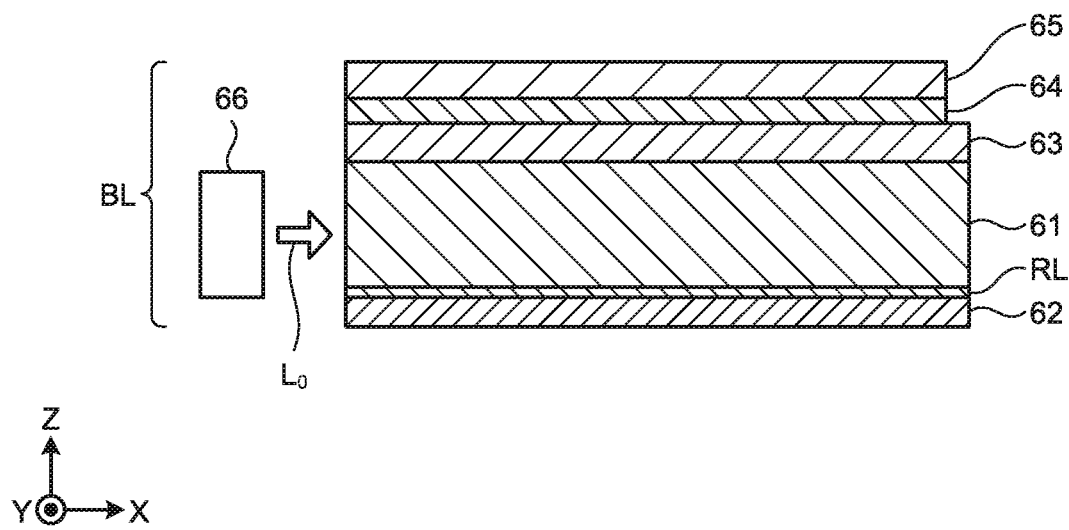
FIG. 35 is a schematic diagram of a third example of a sectional structure of the light emitter in the display apparatus according to the fifth embodiment.

FIG. 35 is a schematic diagram of a third example of a sectional structure of the light emitter in the display apparatus according to the fifth embodiment. The light emitter BL illustrated in FIG. 35 corresponds to that in the second example of the sectional structure of the display apparatus if illustrated in FIG. 31.

The detection line RL is provided on the surface of the light guide plate 61 facing in the Z-direction. The detection line RL extends in the Y-direction (direction perpendicular to the plane of FIG. 35). The reflective plate 62 is provided in the opposite direction of the Z-direction with respect to the detection line RL.

Figure 36:
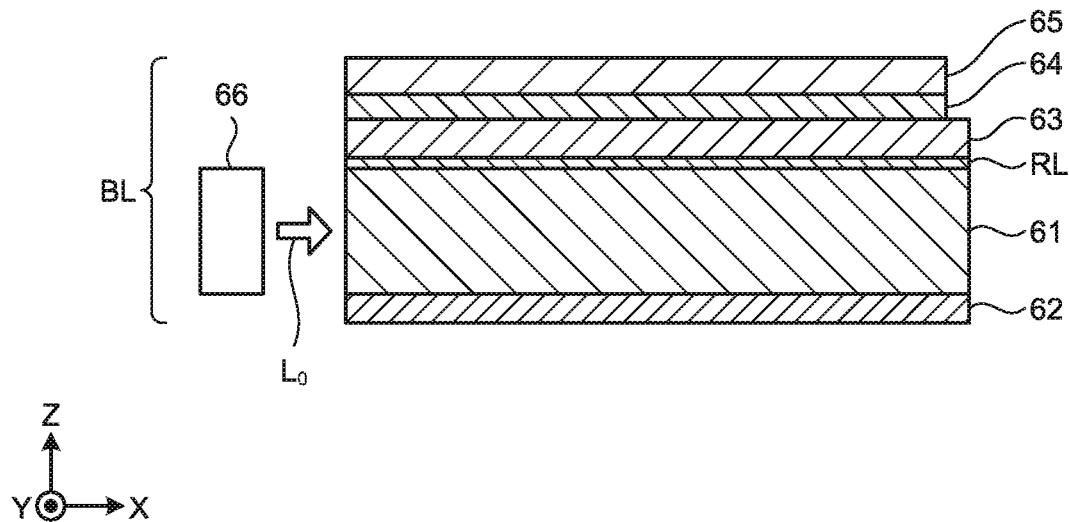
FIG. 36 is a schematic diagram of a fourth example of a sectional structure of the light emitter in the display apparatus according to the fifth embodiment.

FIG. 36 is a schematic diagram of a fourth example of a sectional structure of the light emitter in the display apparatus according to the fifth embodiment. The light emitter BL illustrated in FIG. 36 corresponds to that in the third example of the sectional structure of the display apparatus if illustrated in FIG. 32.

A reflective plate 62 is provided on the surface of the light guide plate 61 facing in the Z-direction. The reflective plate 62 reflects, in the Z-direction, light output from the light guide plate 61 and traveling in the opposite direction of the Z-direction. With this mechanism, the reflective plate 62 can effectively direct the light Lo, which is output from the light source 66, toward the panel PNLf.

The detection line RL is provided on the surface of the light guide plate 61 facing in the Z-direction. The detection line RL extends in the Y-direction (direction perpendicular to the plane of FIG. 36). The diffusion film 63 is provided in the Z-direction with respect to the detection line RL.

Illustration and explanation of the flowchart of the exemplary operation performed by the display apparatus according to the fifth embodiment are omitted because it is the same as the flowchart (refer to FIGS. 10 and 13) of the first and the second exemplary operations performed by the display apparatus according to the first embodiment.

The display apparatus according to the fifth embodiment has the following characteristics besides the characteristics of the display apparatus according to the first embodiment. The display apparatus according to the fifth embodiment also has characteristics other than those described below. The display apparatus according to the fifth embodiment includes the detection lines RL arranged in the opposite direction of the Z-direction with respect to the panel PNLf. In the display apparatus according to the fifth embodiment, the image IMG (refer to FIG. 1) does not pass through the detection lines RL. Consequently, the display apparatus according to the fifth embodiment can increase the transmittance of the image IMG and improve the display quality. The display apparatus may supply a positive- or negative-polarity signal to at least one signal line SL and detect a detection signal with at least one detection line RL corresponding to the at least one signal line SL supplied with the positive- or negative-polarity signal.

6. Sixth Embodiment

Figure 37:
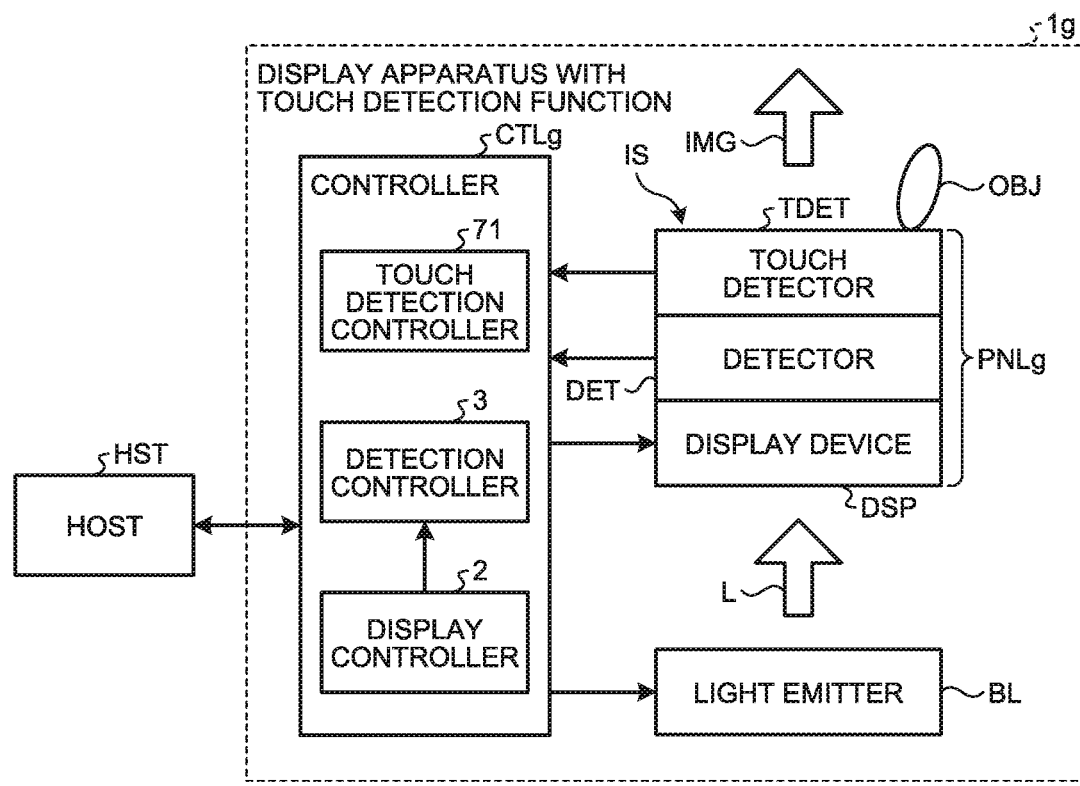
FIG. 37 is a block diagram of the configuration of a display apparatus with a touch detection function according to a sixth embodiment.

FIG. 37 is a block diagram of the configuration of a display apparatus with a touch detection function according to a sixth embodiment.

A display apparatus with a touch detection function 1g according to the present embodiment includes a panel PNLg, the light emitter BL, and a controller CTLg. The panel PNLg includes the display device DSP, the detector DET, and a touch detector TDET. The display device DSP displays an image. The detector DET detects an image. The touch detector TDET detects contact or proximity of an object to be detected OBJ with or to a touch detection surface IS.

The display apparatus with a touch detection function 1g according to the present embodiment has the image display period for displaying an image, the image detection period for detecting an image, and a touch detection period for detecting a touch. In this disclosure, a touch may be a state where an object to be detected is in contact with or proximity to a touch detection electrode or touch detection surface. The display apparatus with a touch detection function 1g according to the present embodiment employs a column inversion driving method of inverting the polarity of image signals alternately in columns (pixel columns) adjacent to each other, which will be described later. The image detection period includes a period for detecting a positive-polarity image and a period for detecting a negative-polarity image.

The display device DSP, the detector DET, and the touch detector TDET may be provided as an in-cell apparatus in which they are integrated. Alternatively, the display device DSP, the detector DET, and the touch detector TDET may be provided as an on-cell apparatus in which the detector DET and the touch detector TDET are mounted on the display device DSP.

The controller CTLg includes the display controller 2, the detection controller 3, and a touch detection controller 71. The display controller 2 controls the display device DSP and the light emitter BL. The detection controller 3 reads detection signals from the detector DET and outputs detection image data to the host HST based on the detection signals. The touch detection controller 71 controls touch detection.

The detection controller 3 and the touch detection controller 71 are an IC chip mounted on printed circuits (e.g., flexible printed circuits) coupled to the glass substrate of the display device DSP, for example.

Figure 38:
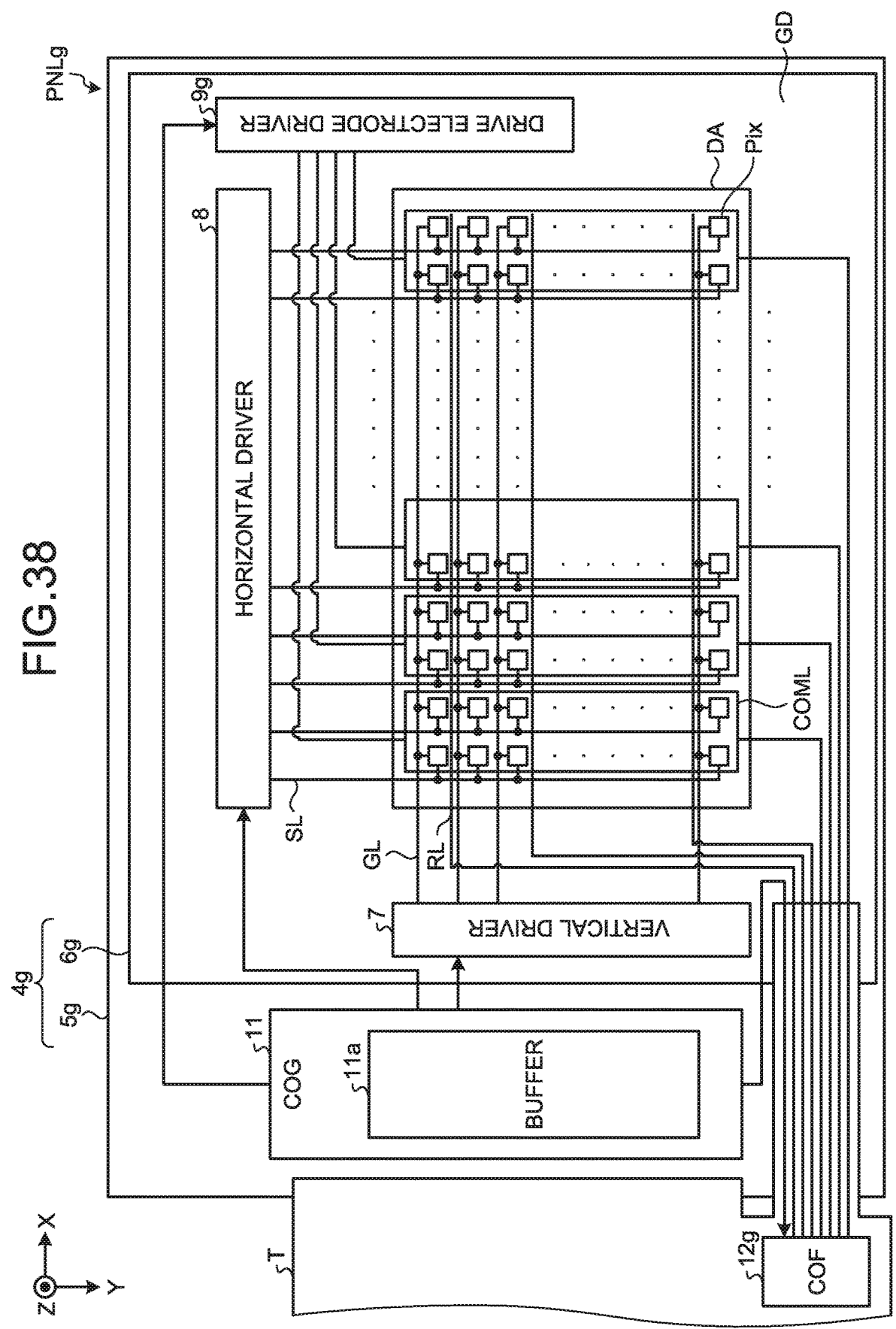
FIG. 38 is a diagram of the module configuration of the display apparatus with a touch detection function according to the sixth embodiment.

FIG. 38 is a diagram of the module configuration of the display apparatus with a touch detection function according to the sixth embodiment.

The panel PNLg includes a substrate 4g, a drive electrode driver 9g, and a COF 12g. The substrate 4g includes a first substrate 5g and a second substrate 6g. The second substrate 6g is disposed in the Z-direction with respect to the first substrate 5g and faces the first substrate 5g with a predetermined space interposed therebetween.

The configuration of the panel PNLg of the display apparatus with a touch detection function 1g according to the present embodiment is different from that of the panel PNLb (refer to FIG. 15) of the display apparatus according to the second embodiment in that the detection lines RL are provided to the second substrate 6g. The detection lines RL are arranged one for every two rows of the pixels Pix and extend in the X-direction. In other words, the number of detection lines RL is (M/2). The configuration described above is given by way of example only, and the detection lines RL are not necessarily arranged one for every two rows of the pixels Pix. The detection lines RL may be arranged one for every one or every three or more rows of the pixels Pix. The detection lines RL are coupled to the COF 12g.

The drive electrodes COML correspond to the detector DET illustrated in FIG. 37. The drive electrodes COML and the detection lines RL correspond to the touch detector TDET illustrated in FIG. 37. The COG 11, the vertical driver 7, the horizontal driver 8, and the drive electrode driver 9g correspond to the display controller 2 illustrated in FIG. 37. The COF 12g corresponds to the detection controller 3 and the touch detection controller 71 illustrated in FIG. 37.

Figure 39:
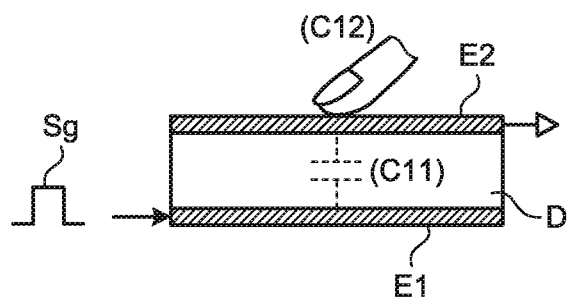
FIG. 39 is a diagram for explaining the basic principle of mutual capacitance touch detection and illustrates a state where an object to be detected is in contact with or in proximity to a touch detection electrode.
Figure 40:
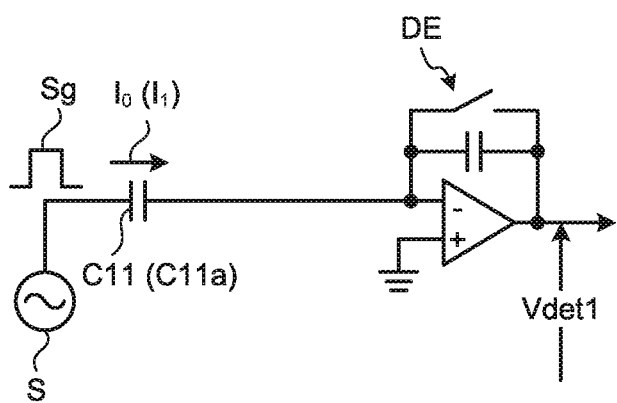
FIG. 40 is a diagram for explaining an example of an equivalent circuit in mutual capacitance touch detection.
Figure 41:
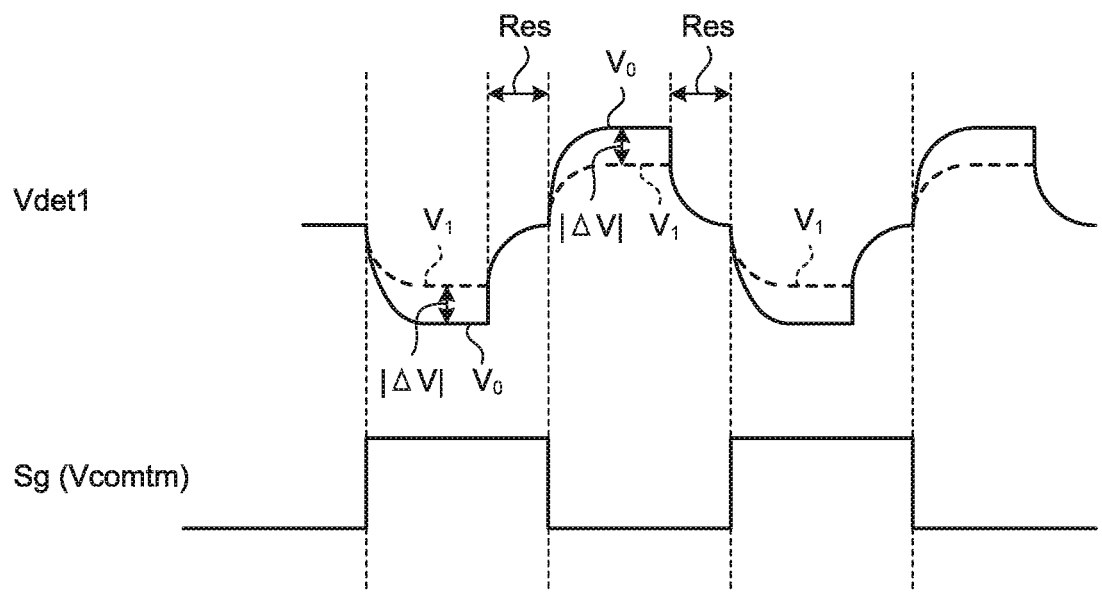
FIG. 41 is a diagram of an example of waveforms of a drive signal and a detection signal in mutual capacitance touch detection.

The following describes the basic principle of mutual capacitance touch detection performed by the display apparatus with a touch detection function 1g according to the present embodiment with reference to FIGS. 39 to 41.

FIG. 39 is a diagram for explaining the basic principle of mutual capacitance touch detection and illustrates a state where an object to be detected is in contact with or in proximity to a touch detection electrode. FIG. 40 is a diagram for explaining an example of an equivalent circuit in mutual capacitance touch detection. FIG. 41 is a diagram of an example of waveforms of a drive signal and a detection signal in mutual capacitance touch detection. FIG. 40 also illustrates a detection circuit.

As illustrated in FIG. 39, for example, a capacitance element C11 includes a pair of electrodes, that is, a drive electrode E1 and a touch detection electrode E2 facing each other with a dielectric D interposed therebetween. As illustrated in FIG. 40, a first end of the capacitance element C11 is coupled to an alternating-current (AC) signal source (drive signal source) S, and a second end thereof is coupled to a voltage detector (touch detector) DE. The voltage detector DE is an integration circuit included in the COF 12g, for example.

When the AC signal source S applies an AC rectangular wave Sg having a predetermined frequency (e.g., several kilohertz to several hundred kilohertz) to the drive electrode E1 (first end of the capacitance element C11), an output waveform (touch detection signal Vdet1) appears via the voltage detector DE coupled to the touch detection electrode E2 (second end of the capacitance element C11). The AC rectangular wave Sg corresponds to the touch detection drive signal Vcomtm, which will be described later.

In a state where an object to be detected is not in contact with nor in proximity to the touch detection electrode (non-contact state), an electric current $I_0$ depending on the capacitance value of the capacitance element C11 flows in association with charge and discharge of the capacitance element C11. As illustrated in FIG. 41, the voltage detector DE converts fluctuations in the electric current $I_0$ according to the AC rectangular wave Sg into fluctuations in the voltage (waveform $V_0$ indicated by the solid line).

By contrast, in a state where an object to be detected is in contact with or in proximity to the touch detection electrode (contact state), capacitance C12 formed by a finger is in contact with or in proximity to the touch detection electrode E2 as illustrated in FIG. 39. In the contact state, fringe capacitance between the drive electrode E1 and the touch detection electrode E2 is blocked by the finger. As a result, the capacitance element C11 acts as a capacitance element C11a having a capacitance value smaller than that of the capacitance element C11. In the equivalent circuit illustrated in FIG. 40, an electric current $I_1$ flows through the capacitance element C11a.

As illustrated in FIG. 41, the voltage detector DE converts fluctuations in the electric current $I_1$ in accordance with the AC rectangular wave Sg into fluctuations in the voltage (waveform $V_1$ indicated by the dotted line). In this case, the waveform $V_1$ has amplitude smaller than that of the waveform $V_0$. Consequently, an absolute value |ΔV| of the voltage difference between the waveform $V_0$ and the waveform $V_1$ varies depending on an effect of the object to be detected. To accurately detect the absolute value |ΔV| of the voltage difference between the waveform $V_0$ and the waveform $V_1$, the voltage detector DE preferably operates with a period Res for resetting charge and discharge of a capacitor in accordance with the frequency of the AC rectangular wave Sg by switching in the circuit.

Figure 42:
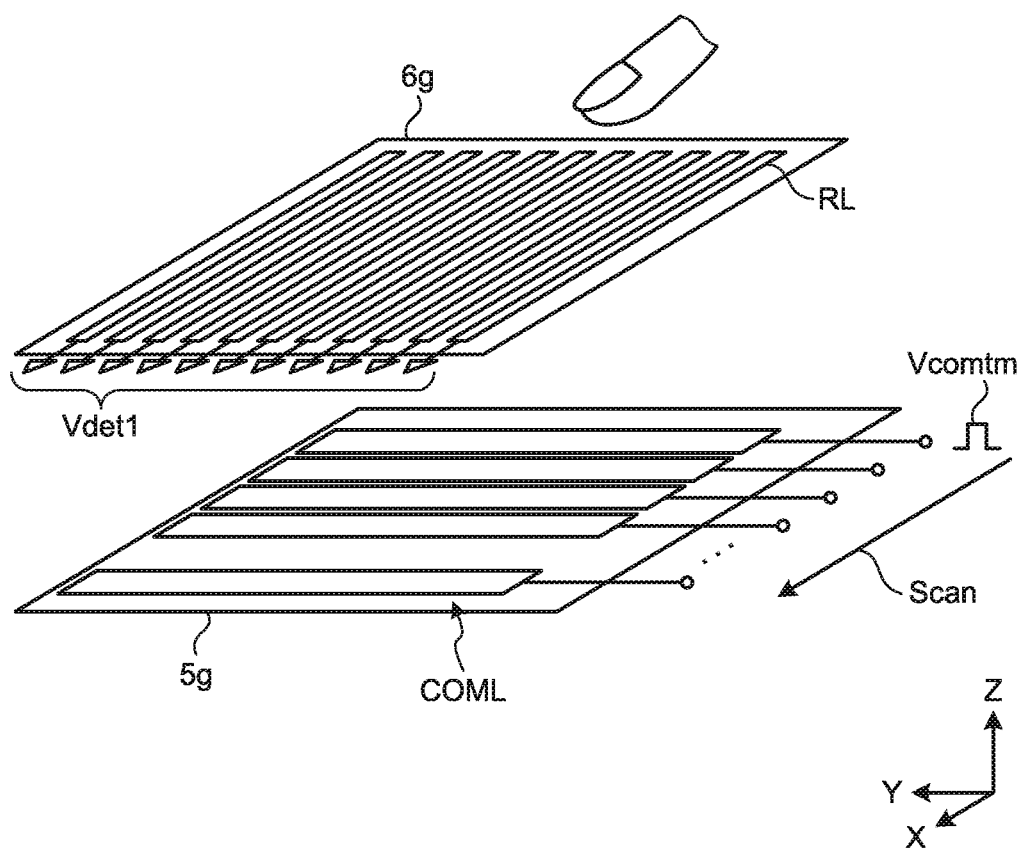
FIG. 42 is a perspective view of an exemplary configuration of drive electrodes and detection lines in the display apparatus with a touch detection function according to the sixth embodiment.

FIG. 42 is a perspective view of an exemplary configuration of the drive electrodes and the detection lines in the display apparatus with a touch detection function according to the sixth embodiment. The drive electrodes COML according to the present exemplary configuration serve not only as drive electrodes of the display device DSP but also as drive electrodes of the touch detector TDET.

The drive electrodes COML face the pixel electrodes PE (refer to FIG. 3) in a direction perpendicular to the surface of the first substrate 5g. The touch detector TDET includes the drive electrodes COML provided to the first substrate 5g and the detection lines RL provided to the second substrate 6g.

The detection lines RL have stripe electrode patterns extending in a direction intersecting the extending direction of the electrode patterns of the drive electrodes COML. The detection lines RL face the drive electrodes COML in the direction perpendicular to the surface of the first substrate 5g. The electrode patterns of the detection lines RL are coupled to the COF 12g.

The electrode patterns of the drive electrodes COML and those of the detection lines RL intersecting each other form capacitance at the intersections. In the touch detector TDET, the drive electrode driver 9g applies touch detection drive signals Vcomtm to the drive electrodes COML. As a result, the detection lines RL output touch detection signals Vdet1, and thus touch detection is performed.

In other words, the drive electrode COML corresponds to the drive electrode E1 in the basic principle of mutual capacitance touch detection illustrated in FIGS. 39 to 41, and the detection line RL corresponds to the touch detection electrode E2. The touch detector TDET detects a touch based on the basic principle.

As described above, the touch detector TDET includes the detection lines RL that generate mutual capacitance with either the pixel electrodes PE or the drive electrodes COML (e.g., the drive electrodes COML). Based on a change in the mutual capacitance, the touch detector TDET performs touch detection.

The electrode patterns of the drive electrodes COML and those of the detection lines RL intersecting each other serve as a mutual capacitive touch sensor formed in a matrix (row-column configuration). The COF 12g scans the entire input surface IS of the touch detector TDET, thereby detecting the position and the contact area where the object to be detected OBJ is in contact with or in proximity to the input surface IS.

Specifically, in a touch detection operation, the drive electrode driver 9g drives a plurality of drive electrode blocks in the touch detector TDET to sequentially linearly scan each of the drive electrode blocks in a time-division manner, each drive electrode block including a plurality of drive electrodes COML. As a result, each drive electrode block (one detection block) is sequentially selected in a scanning direction Scan. The touch detector TDET outputs the touch detection signals Vdet1 from the detection lines RL. The touch detector TDET thus performs touch detection on one detection block.

The detection lines RL or the drive electrodes COML (drive electrode blocks) do not necessarily have a shape divided into a plurality of stripe patterns. The detection lines RL or the drive electrodes COML (drive electrode blocks) may have a comb shape, for example. The detection lines RL or the drive electrodes COML (drive electrode blocks) simply need to have a shape divided into a plurality of parts. The shape of slits separating the drive electrodes COML from one another may be a straight line or a curved line.

In an example of an operating method employed by the display apparatus with a touch detection function 1g, the display apparatus with a touch detection function 1g performs a touch detection operation (the touch detection period) and a display operation (the image display period and the image detection period) in a time-division manner. The touch detection operation and the display operation may be performed in any division manner.

Figure 43:
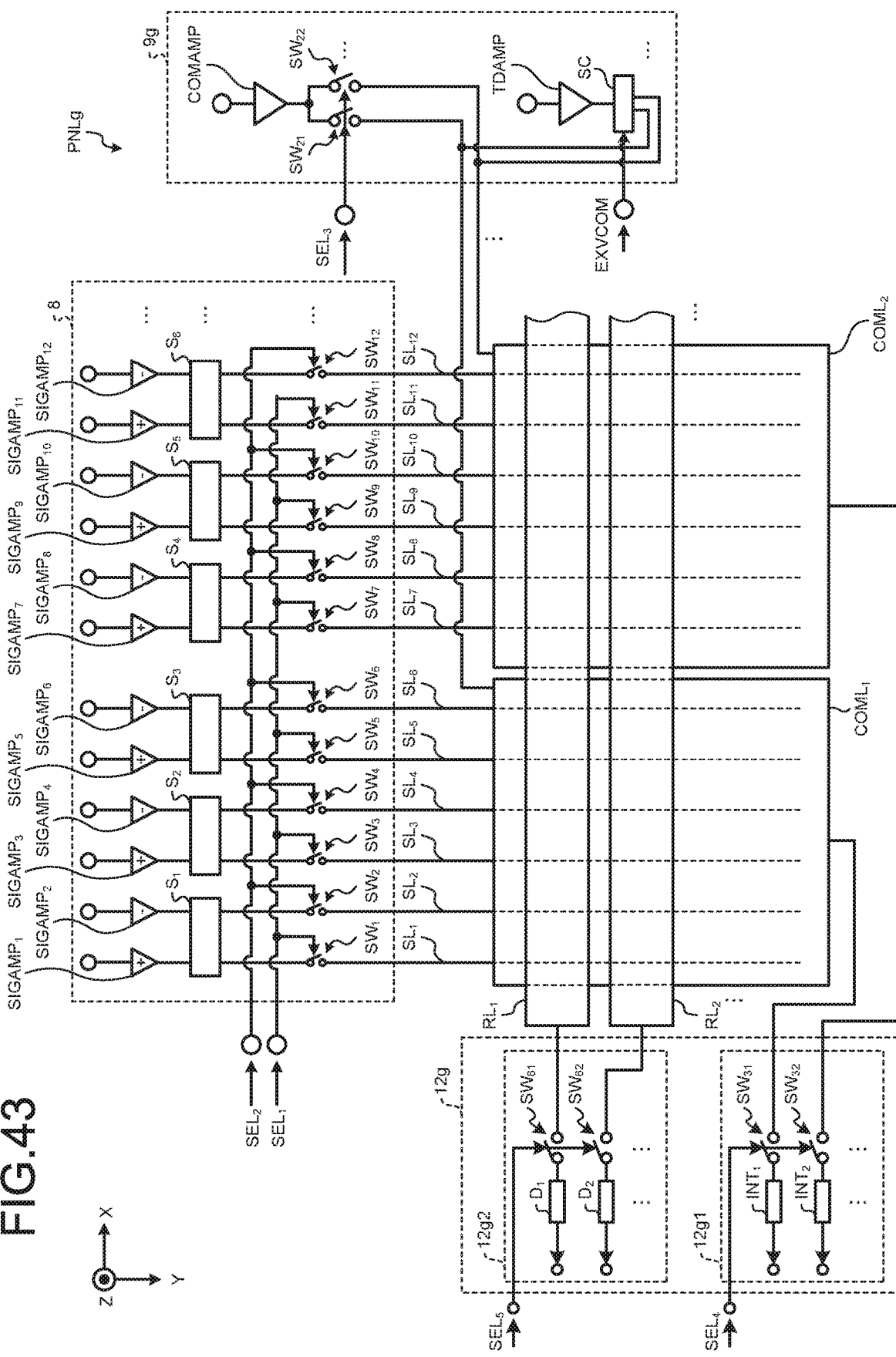
FIG. 43 is a diagram of the configuration of the horizontal driver, the drive electrode driver, and the COF of the display apparatus with a touch detection function according to the sixth embodiment.

FIG. 43 is a diagram of the configuration of the horizontal driver, the drive electrode driver, and the COF of the display apparatus with a touch detection function according to the sixth embodiment. FIG. 43 illustrates a portion of the horizontal driver 8 that drives the pixels Pix of four columns, a portion of the drive electrode driver 9g that drives the pixels Pix of four columns, a portion of the COF 12g that reads touch detection signals of two rows, and a portion of the COF 12g that reads detection signals of the pixels Pix of four columns.

The configuration of the panel PNLg of the display apparatus with a touch detection function 1g according to the present embodiment is different from that of the panel PNLb of the display apparatus according to the second embodiment in that the drive electrode driver 9g further includes a touch detection drive signal output amplifier TDAMP and a scanning circuit SC. The COF 12g includes a touch detection circuit 12g2 besides an image detection circuit 12g1. The circuit configuration of the image detection circuit 12g1 is the same as the circuit configuration (illustrated in FIG. 17) of the COF 12 of the display apparatus according to the second embodiment.

When a control signal EXVCOM is supplied from the COG 11 (refer to FIG. 38), the scanning circuit SC sequentially couples the touch detection drive signal output amplifier TDAMP to the drive electrodes COML. At a first touch detection timing, for example, the scanning circuit SC couples the touch detection drive signal output amplifier TDAMP to the first drive electrode block. At a second touch detection timing, the scanning circuit SC couples the touch detection drive signal output amplifier TDAMP to the second drive electrode block.

The touch detection circuit 12g2 includes detection circuits $D_1$ and $D_2$ serving as integration circuits. The integration circuits are each the detection circuit $INT_1$ or $INT_2$ illustrated in FIG. 17, for example. A switch $SW_{61}$ is disposed between the detection circuit $D_1$ and the detection line $RL_1$. When a control signal $SEL_5$ supplied from the COG 11 (refer to FIG. 38) is at a high level, the switch $SW_{61}$ electrically couples the detection circuit $D_1$ to the drive electrode $COML_1$. When the control signal $SEL_5$ is at a low level, the switch $SW_{61}$ cuts off electrical coupling between the detection circuit $D_1$ and the drive electrode $COML_1$.

In the image display period and the image detection period, the control signal $SEL_5$ is at a low level. As a result, the switch $SW_{61}$ cuts off electrical coupling between the detection circuit $D_1$ and the drive electrode $COML_1$. In the touch detection period, the control signal $SEL_5$ is at a high level. As a result, the switch $SW_{61}$ electrically couples the detection circuit $D_1$ to the drive electrode $COML_1$, thereby supplying the touch detection drive signal Vcomtm to the detection circuit $D_1$. The detection circuit $D_1$ compares the touch detection signal with a reference potential to read the touch detection signal.

A switch $SW_{62}$ is disposed between the detection circuit $D_2$ and the detection line $RL_2$. When the control signal $SEL_5$ supplied from the COG 11 (refer to FIG. 38) is at a high level, the switch $SW_{62}$ electrically couples the detection circuit $D_2$ to the drive electrode $COML_2$. When the control signal $SEL_5$ is at a low level, the switch $SW_{62}$ cuts off electrical coupling between the detection circuit $D_2$ and the drive electrode $COML_2$.

In the image display period and the image detection period, the control signal $SEL_5$ is at a low level. As a result, the switch $SW_{62}$ cuts off electrical coupling between the detection circuit Da and the drive electrode $COML_2$. In the touch detection period, the control signal $SEL_5$ is at a high level. As a result, the switch $SW_{62}$ electrically couples the detection circuit Da to the drive electrode $COML_2$, thereby supplying the touch detection drive signal Vcomtm to the detection circuit Da. The detection circuit Da compares the touch detection signal with a reference potential to read the touch detection signal.

Figure 44:
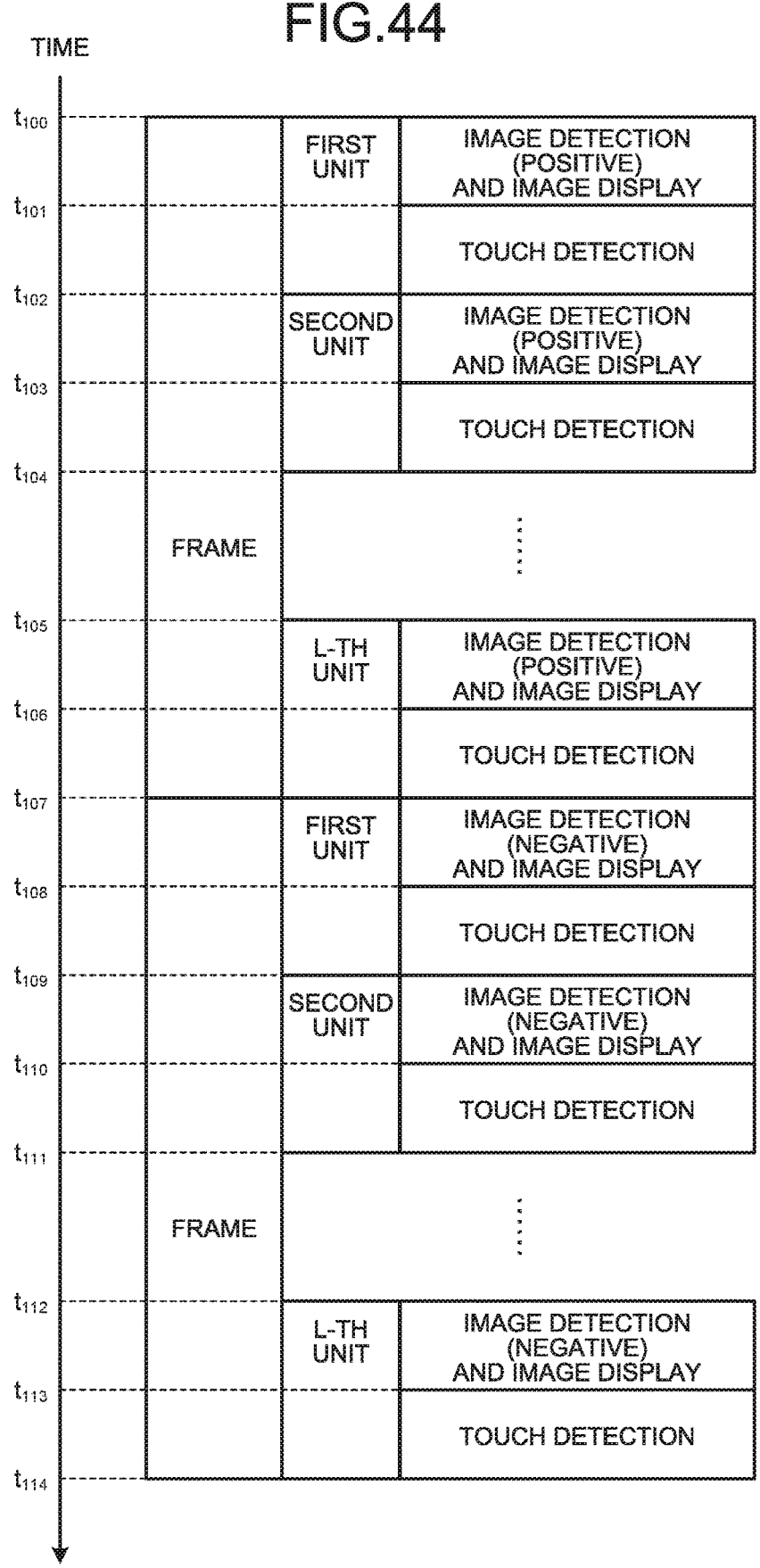
FIG. 44 is a diagram of an operating sequence in an exemplary operation performed by the display apparatus with a touch detection function according to the sixth embodiment.

6-1. Exemplary Operation Performed by the Display Apparatus According to the Sixth Embodiment FIG. 44 is a diagram of an operating sequence in an exemplary operation performed by the display apparatus with a touch detection function according to the sixth embodiment. FIG. 44 illustrates an operating sequence performed by the display apparatus with a touch detection function 1g on two frames. As illustrated in FIG. 44, the display apparatus with a touch detection function 1g sequentially performs control on the L units (refer to FIG. 6) from the first unit $U_1$ to the L-th unit $U_L$ in the first frame (from timing $t_{100}$ to timing $t_{107}$) and the second frame (from timing $t_{107}$ to timing $t_{114}$).

From timing $t_{100}$ to timing $t_{101}$, the display apparatus with a touch detection function 1g performs image detection (detection of the positive-polarity pixel signals) and image display for the first frame on the (M/L) horizontal lines included in the first unit $U_1$. In the image detection performed from timing $t_{100}$ to timing $t_{101}$, the display apparatus with a touch detection function 1g applies only the positive-polarity pixel signals to perform image detection (detection of the positive-polarity pixel signals). In the image display performed from timing $t_{100}$ to timing $t_{101}$, the display apparatus with a touch detection function 1g applies both the positive- and the negative-polarity pixel signals to display an image.

From timing $t_{101}$ to timing $t_{102}$, the display apparatus with a touch detection function 1g performs touch detection on the (M/L) horizontal lines included in the first unit $U_1$.

From timing $t_{102}$ to timing $t_{103}$, the display apparatus with a touch detection function 1g performs image detection (detection of the positive-polarity pixel signals) and image display for the first frame on the (M/L) horizontal lines included in the second unit $U_2$. In the image detection performed from timing $t_{102}$ to timing $t_{103}$, the display apparatus with a touch detection function 1g applies only the positive-polarity pixel signals to perform image detection (detection of the positive-polarity pixel signals). In the image display performed from timing $t_{102}$ to timing $t_{103}$, the display apparatus with a touch detection function 1g applies both the positive- and the negative-polarity pixel signals to display an image.

From timing $t_{103}$ to timing $t_{104}$, the display apparatus with a touch detection function 1g performs touch detection on the (M/L) horizontal lines included in the second unit $U_2$.

From timing $t_{104}$ to timing $t_{105}$, similarly to from timing $t_{102}$ to timing $t_{104}$, the display apparatus with a touch detection function 1g performs image display and image detection (detection of the positive-polarity pixel signals). From timing tins to timing $t_{106}$, the display apparatus with a touch detection function 1g performs image detection (detection of the positive-polarity pixel signals) and image display for the first frame on the (M/L) horizontal lines included in the L-th unit $U_L$. In the image detection performed from timing $t_{105}$ to timing $t_{106}$, the display apparatus with a touch detection function 1g applies only the positive-polarity pixel signals to perform image detection (detection of the positive-polarity pixel signals). In the image display performed from timing tins to timing $t_{106}$, the display apparatus with a touch detection function 1g applies both the positive- and the negative-polarity pixel signals to display an image. From timing $t_{106}$ to timing $t_{107}$, the display apparatus with a touch detection function 1g performs touch detection on the (M/L) horizontal lines included in the L-th unit $U_L$.

From timing $t_{107}$ to timing tog, the display apparatus with a touch detection function 1g performs image detection (detection of the negative-polarity pixel signals) and image display for the second frame on the (M/L) horizontal lines included in the first unit $U_1$. In the image detection performed from timing $t_{107}$ to timing tog, the display apparatus with a touch detection function 1g applies only the negative-polarity pixel signals to perform image detection (detection of the negative-polarity pixel signals). In the image display performed from timing $t_{107}$ to timing tog, the display apparatus with a touch detection function 1g applies both the positive- and the negative-polarity pixel signals to display an image.

From timing tog to timing $t_{109}$, the display apparatus with a touch detection function 1g performs touch detection on the (M/L) horizontal lines included in the first unit $U_1$.

From timing $t_{109}$ to timing $t_{110}$, the display apparatus with a touch detection function 1g performs image detection (detection of the negative-polarity pixel signals) and image display for the second frame on the (M/L) horizontal lines included in the second unit $U_2$. In the image detection performed from timing $t_{109}$ to timing $t_{110}$, the display apparatus with a touch detection function 1g applies only the negative-polarity pixel signals to perform image detection (detection of the negative-polarity pixel signals). In the image display performed from timing $t_{109}$ to timing $t_{110}$, the display apparatus with a touch detection function 1g applies both the positive- and the negative-polarity pixel signals to display an image.

From timing $t_{110}$ to timing $t_{111}$, the display apparatus with a touch detection function 1g performs touch detection on the (M/L) horizontal lines included in the second unit $U_2$.

From timing $t_{111}$ to timing $t_{112}$, similarly to from timing $t_{109}$ to timing $t_{111}$, the display apparatus with a touch detection function 1g performs image display and image detection (detection of the negative-polarity pixel signals). From timing $t_{112}$ to timing $t_{113}$, the display apparatus with a touch detection function 1g performs image detection (detection of the negative-polarity pixel signals) and image display for the second frame on the (M/L) horizontal lines included in the L-th unit $U_L$. In the image detection performed from timing $t_{112}$ to timing $t_{113}$, the display apparatus with a touch detection function 1g applies only the negative-polarity pixel signals to perform image detection (detection of the negative-polarity pixel signals). In the image display performed from timing $t_{112}$ to timing $t_{113}$, the display apparatus with a touch detection function 1g applies both the positive- and the negative-polarity pixel signals to display an image.

From timing $t_{113}$ to timing $t_{114}$, the display apparatus with a touch detection function 1g performs touch detection on the (M/L) horizontal lines included in the L-th unit $U_L$.

Figure 45:
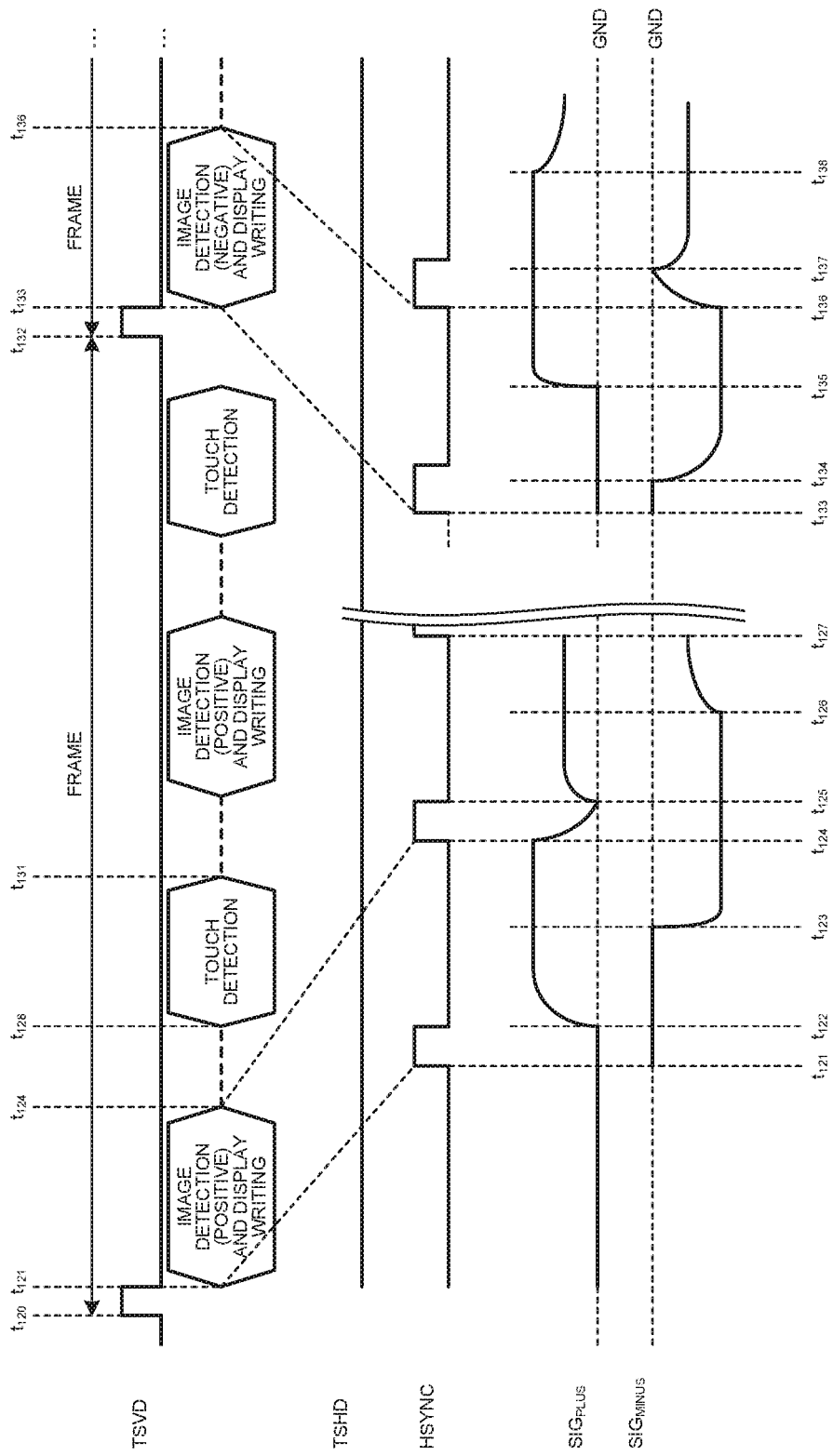
FIG. 45 is a diagram of an operating timing in an exemplary operation performed by the display apparatus with a touch detection function according to the sixth embodiment.

FIG. 45 is a diagram of an operating timing in an exemplary operation performed by the display apparatus with a touch detection function according to the sixth embodiment.

The period from timing $t_{120}$ of the first rising edge of the timing signal TSVD to timing $t_{132}$ of the second rising edge of the timing signal TSVD corresponds to the period of image detection, image display, and touch detection of the first frame. The period after timing $t_{132}$ of the second rising edge of the timing signal TSVD corresponds to the period of image detection, image display, and touch detection of the second frame.

The timing signal HSYNC for detection control output from the COG 11 to the COF 12g has the same frequency as that of the horizontal synchronization signal for display control for displaying an image on the display device DSP by the COG 11, for example.

During the entire period, the COG 11 outputs the control signals $SEL_1$ and $SEL_2$ (refer to FIG. 43) at a high level to the horizontal driver 8. As a result, the switches $SW_1$ to $SW_{12}$ are turned on.

The period from timing $t_{121}$ to timing $t_{124}$ corresponds to a positive-polarity image detection and display writing (image display) period for the first horizontal line of the first frame.

At timing $t_{121}$, the host HST outputs image data for the first horizontal line of the first frame to the COG 11. The COG 11 temporarily stores the image data for the first horizontal line of the first frame supplied from the host HST in the buffer 11a (refer to FIG. 38). The buffer 11a simply needs to have storage capacity large enough to store therein image data of one horizontal line.

The period from timing $t_{121}$ to timing $t_{122}$, which is a predetermined time after timing $t_{121}$, corresponds to a precharge period for the signal lines SL.

From timing $t_{121}$ to timing $t_{122}$, the horizontal driver 8 outputs the ground potential GND to all the signal lines SL, thereby precharging all the signal lines SL with the ground potential GND.

The period from timing $t_{122}$ to timing $t_{123}$ corresponds to the positive-polarity image detection period for the first horizontal line of the first frame.

At timing $t_{122}$, the COG 11 causes the horizontal driver 8 to output the positive-polarity pixel signals for the first horizontal line of the first frame based on the image data for the first horizontal line of the first frame stored in the buffer 11a. The horizontal driver 8 outputs the positive-polarity pixel signals $SIG_{PLUS}$ for the first horizontal line of the first frame to one group of the two groups (the group of the odd-numbered signal lines SL and the group of the even-numbered signal lines SL) of the N signal lines SL. The horizontal driver 8 maintains the electric potential (ground potential GND) of the other group of the two groups of the N signal lines SL.

The horizontal driver 8, for example, outputs the positive-polarity pixel signals $SIG_{PLUS}$ for the first horizontal line of the first frame to the group of the odd-numbered signal lines SL (refer to the signal lines $SL_1$, $SL_3$, $SL_5$, . . . in FIG. 43) out of the N signal lines SL. The horizontal driver 8 maintains the electric potential (ground potential GND) of the group of the even-numbered signal lines SL (refer to the signal lines $SL_2$, $SL_4$, $SL_6$, . . . in FIG. 43) out of the N signal lines SL.

From timing $t_{121}$ to timing $t_{123}$, the COG 11 outputs the control signal $SEL_3$ (refer to FIG. 43) at a low level to the drive electrode driver 9g. As a result, the switches $SW_{21}$ and $SW_{22}$ are turned off. Consequently, all the drive electrodes COML are brought into a floating state.

Referring back to FIG. 43, when the drive electrode $COML_1$ is in a floating state, the signal lines $SL_1$, $SL_3$, and $SL_5$ are capacitively coupled to the drive electrode $COML_1$.

As a result, the detection signal is generated in the drive electrode $COML_1$ due to the pixel signals $SIG_{PLUS}$ supplied to the signal lines $SL_1$, $SL_3$, and $SL_5$. The COG 11 changes the control signal $SEL_4$ to a high level at a timing based on the timing signal HSYNC, for example, at timing $t_{122}$. As a result, the switch $SW_{31}$ is turned on at timing $t_{122}$. The detection circuit $INT_1$ is the detection circuit $INT_1$ or $INT_2$ illustrated in FIG. 17, for example. The detection circuit $INT_1$ reads the detection signal at timing $t_{122}$. The COF 12g performs sampling and A/D conversion on the detection signal, thereby obtaining the positive-polarity detection pixel data. The detection signal is a spike signal similarly to that illustrated in FIG. 25 and other figures. The COF 12g may read the peak voltage of the detection signal, thereby obtaining the positive-polarity detection pixel data.

The period from timing $t_{123}$ to timing $t_{124}$ corresponds to the display writing (image display) period for the first horizontal line of the first frame.

At timing $t_{123}$, the COG 11 causes the horizontal driver 8 to output the pixel signals based on the image data for the first horizontal line of the first frame stored in the buffer 11a. The horizontal driver 8 maintains the electric potential (positive-polarity pixel signals $SIG_{PLUS}$ for the first horizontal line of the first frame) of one group of the two groups (the group of the odd-numbered signal lines SL and the group of the even-numbered signal lines SL) of the N signal lines SL. The horizontal driver 8 outputs the negative-polarity pixel signals $SIG_{MINUS}$ for the first horizontal line of the first frame to the other group of the two groups of the N signal lines SL.

The horizontal driver 8, for example, maintains the electric potential (positive-polarity pixel signals $SIG_{PLUS}$ for the first horizontal line of the first frame) of the group of the odd-numbered signal lines SL (refer to the signal lines $SL_1$, $SL_3$, $SL_5$, . . . in FIG. 43) out of the N signal lines SL. The horizontal driver 8 outputs the negative-polarity pixel signals $SIG_{MINUS}$ for the first horizontal line of the first frame to the group of the even-numbered signal lines SL (refer to the signal lines $SL_2$, $SL_4$, $SL_6$, . . . in FIG. 43) out of the N signal lines SL.

From timing $t_{123}$ to timing $t_{124}$, the COG 11 outputs the control signal $SEL_3$ (refer to FIG. 43) at a high level to the drive electrode driver 9g. As a result, the switches $SW_{21}$ and $SW_{22}$ are turned on. The drive electrode driver 9g outputs the drive signals VCOM to all the drive electrodes COML. Consequently, an electric field is formed between the pixel electrodes PE (refer to FIG. 3) and the drive electrodes COML, thereby displaying an image.

From timing $t_{123}$ to timing $t_{124}$, the COG 11 changes the control signal $SEL_4$ (refer to FIG. 43) to a low level. As a result, the switches $SW_{31}$ and $SW_{32}$ are turned off, whereby neither the detection circuit $INT_1$ nor the detection circuit $INT_2$ reads the drive signals VCOM.

The period from timing $t_{124}$ to timing $t_{127}$ corresponds to a positive-polarity image detection and display writing (image display) period for the second horizontal line of the first frame.

At timing $t_{124}$, the host HST outputs image data for the second horizontal line of the first frame to the COG 11. The COG 11 temporarily stores the image data for the second horizontal line of the first frame supplied from the host HST in the buffer 11a (refer to FIG. 38).

The period from timing $t_{124}$ to timing $t_{125}$, which is a predetermined time after timing $t_{124}$, corresponds to a precharge period for the signal lines SL.

From timing $t_{124}$ to timing $t_{125}$, the horizontal driver 8 outputs the ground potential GND to one group of the two groups (the group of the odd-numbered signal lines SL and the group of the even-numbered signal lines SL) of the N signal lines SL. The horizontal driver 8 thus precharges the group of the odd-numbered or the even-numbered signal lines SL in the N signal lines SL with the ground potential GND. From timing $t_{124}$ to timing $t_{125}$, the horizontal driver 8 maintains the electric potential (negative-polarity pixel signals $SIG_{MINUS}$ for the first horizontal line of the first frame) of the other group of the two groups of the N signal lines SL.

The horizontal driver 8, for example, outputs the ground potential GND to the group of the odd-numbered signal lines SL (refer to the signal lines $SL_1$, $SL_3$, $SL_5$, ... in FIG. 43) out of the N signal lines SL. The horizontal driver 8 maintains the electric potential (negative-polarity pixel signals $SIG_{MINUS}$ for the first horizontal line of the first frame) of the group of the even-numbered signal lines SL (refer to the signal lines $SL_2$, $SL_4$, $SL_6$, ... in FIG. 43) out of the N signal lines SL.

The period from timing $t_{125}$ to timing $t_{126}$ corresponds to the positive-polarity image detection period for the second horizontal line of the first frame.

At timing $t_{125}$, the COG 11 causes the horizontal driver 8 to output the positive-polarity pixel signals based on the image data for the second horizontal line of the first frame stored in the buffer 11a. The horizontal driver 8 outputs the positive-polarity pixel signals $SIG_{PLUS}$ for the second horizontal line of the first frame to one group of the two groups (the group of the odd-numbered signal lines SL and the group of the even-numbered signal lines SL) of the N signal lines SL. The horizontal driver 8 maintains the electric potential (negative-polarity pixel signals $SIG_{MINUS}$ for the first horizontal line of the first frame) of the other group of the two groups of the N signal lines SL.

The horizontal driver 8, for example, outputs the positive-polarity pixel signals $SIG_{PLUS}$ for the second horizontal line of the first frame to the group of the odd-numbered signal lines SL (refer to the signal lines $SL_1$, $SL_3$, $SL_5$, ... in FIG. 43) out of the N signal lines SL. The horizontal driver 8 maintains the electric potential (negative-polarity pixel signals $SIG_{MINUS}$ for the first horizontal line of the first frame) of the group of the even-numbered signal lines SL (refer to the signal lines $SL_2$, $SL_4$, $SL_6$, ... in FIG. 43) out of the N signal lines SL.

From timing $t_{125}$ to timing $t_{126}$, the COG 11 outputs the control signal $SEL_3$ (refer to FIG. 43) at a low level to the drive electrode driver 9g. As a result, the switches $SW_{21}$ and $SW_{22}$ are turned off. Consequently, all the drive electrodes COML are brought into a floating state.

Referring back to FIG. 43, when the drive electrode $COML_1$ is in a floating state, the signal lines $SL_1$, $SL_3$, and $SL_5$ are capacitively coupled to the drive electrode $COML_1$. As a result, the detection signal is generated in the drive electrode $COML_1$ due to the pixel signals $SIG_{PLUS}$ supplied to the signal lines $SL_1$, $SL_3$, and $SL_5$. The COG 11 changes the control signal $SEL_4$ to a high level at a timing based on the timing signal HSYNC, for example, at timing $t_{125}$. As a result, the switch $SW_{31}$ is turned on at timing $t_{125}$. The detection circuit $INT_1$ reads the detection signal at timing $t_{125}$. The COF 12g performs sampling and A/D conversion on the detection signal, thereby obtaining the positive-polarity detection pixel data. The COF 12g may read the peak voltage of the detection signal, thereby obtaining the positive-polarity detection pixel data.

The period from timing $t_{126}$ to timing $t_{127}$ corresponds to the display writing (image display) period for the second horizontal line of the first frame.

At timing $t_{126}$, the COG 11 causes the horizontal driver 8 to output the pixel signals based on the image data for the second horizontal line of the first frame stored in the buffer 11a. The horizontal driver 8 maintains the electric potential (positive-polarity pixel signals $SIG_{PLUS}$ for the second horizontal line of the first frame) of one group of the two groups (the group of the odd-numbered signal lines SL and the group of the even-numbered signal lines SL) of the N signal lines SL. The horizontal driver 8 outputs the negative-polarity pixel signals $SIG_{MINUS}$ for the second horizontal line of the first frame to the other group of the two groups of the N signal lines SL.

The horizontal driver 8, for example, maintains the electric potential (positive-polarity pixel signals $SIG_{PLUS}$ for the second horizontal line of the first frame) of the group of the odd-numbered signal lines SL (refer to the signal lines $SL_1$, $SL_3$, $SL_5$, ... in FIG. 43) out of the N signal lines SL. The horizontal driver 8 outputs the negative-polarity pixel signals $SIG_{MINUS}$ for the second horizontal line of the first frame to the group of the even-numbered signal lines SL (refer to the signal lines $SL_2$, $SL_4$, $SL_6$, ... in FIG. 43) out of the N signal lines SL.

From timing $t_{126}$ to timing $t_{127}$, the COG 11 outputs the control signal $SEL_3$ (refer to FIG. 43) at a high level to the drive electrode driver 9g. As a result, the switches $SW_{21}$ and $SW_{22}$ are turned on. The drive electrode driver 9g outputs the drive signals VCOM to all the drive electrodes COML. Consequently, an electric field is formed between the pixel electrodes PE (refer to FIG. 3) and the drive electrodes COML, thereby displaying an image.

From timing $t_{126}$ to timing $t_{127}$, the COG 11 changes the control signal $SEL_4$ (refer to FIG. 43) to a low level. As a result, the switch $SW_{31}$ is turned off, whereby the detection circuit $INT_1$ does not read the drive signals VCOM.

Similarly, the COG 11 and the COF 12g perform positive-polarity image detection and display writing (image display) of the third to M-th horizontal lines of the first frame.

The period from timing teas to timing $t_{131}$ corresponds to the touch detection period for the first unit $U_1$ of the first frame. The touch detection period will be described later in detail.

The period from timing $t_{133}$ to timing $t_{136}$ corresponds to a negative-polarity image detection and display writing (image display) period for the first horizontal line of the second frame.

At timing $t_{133}$, the host HST outputs image data for the first horizontal line of the second frame to the COG 11. The COG 11 temporarily stores the image data for the first horizontal line of the second frame supplied from the host HST in the buffer 11a (refer to FIG. 38). The buffer 11a simply needs to have storage capacity large enough to store therein image data of one horizontal line.

The period from timing $t_{133}$ to timing $t_{134}$, which is a predetermined time after timing $t_{133}$, corresponds to a precharge period for the signal lines SL.

From timing $t_{133}$ to timing $t_{134}$, the horizontal driver 8 outputs the ground potential GND to all the signal lines SL, thereby precharging all the signal lines SL with the ground potential GND.

The period from timing $t_{134}$ to timing $t_{135}$ corresponds to the negative-polarity image detection period for the first horizontal line of the second frame.

At timing $t_{134}$, the COG 11 causes the horizontal driver 8 to output the negative-polarity pixel signals for the first horizontal line of the second frame based on the image data for the first horizontal line of the second frame stored in the buffer 11a. The horizontal driver 8 outputs the negative-polarity pixel signals $SIG_{MINUS}$ for the first horizontal line of the second frame to one group of the two groups (the group of the odd-numbered signal lines SL and the group of the even-numbered signal lines SL) of the N signal lines SL. The horizontal driver 8 maintains the electric potential (ground potential GND) of the other group of the two groups of the N signal lines SL.

The horizontal driver 8, for example, outputs the negative-polarity pixel signals $SIG_{MINUS}$ for the first horizontal line of the second frame to the group of the even-numbered signal lines SL (refer to the signal lines $SL_2$, $SL_4$, $SL_6$, ... in FIG. 43) out of the N signal lines SL. The horizontal driver 8 maintains the electric potential (ground potential GND) of the group of the odd-numbered signal lines SL (refer to the signal lines $SL_1$, $SL_3$, $SL_5$, ... in FIG. 43) out of the N signal lines SL.

From timing $t_{134}$ to timing $t_{135}$, the COG 11 outputs the control signal $SEL_3$ (refer to FIG. 43) at a low level to the drive electrode driver 9g. As a result, the switches $SW_{21}$ and $SW_{22}$ are turned off. Consequently, all the drive electrodes COML are brought into a floating state.

Referring back to FIG. 43, when the drive electrode $COML_1$ is in a floating state, the signal lines $SL_2$, $SL_4$, and $SL_6$ are capacitively coupled to the drive electrode $COML_1$. As a result, the detection signal is generated in the drive electrode $COML_1$ due to the pixel signals $SIG_{MINUS}$ supplied to the signal lines $SL_2$, $SL_4$, and $SL_6$. The COG 11 changes the control signal $SEL_4$ to a high level at a timing based on the timing signal HSYNC, for example, at timing $t_{134}$. As a result, the switch $SW_{31}$ is turned on at timing $t_{134}$. The detection circuit $INT_1$ reads the detection signal at timing $t_{134}$. The COF 12g performs sampling and A/D conversion on the detection signal, thereby obtaining the negative-polarity detection pixel data. The COF 12g may read the peak voltage of the detection signal, thereby obtaining the negative-polarity detection pixel data.

The period from timing $t_{135}$ to timing $t_{136}$ corresponds to the display writing (image display) period for the first horizontal line of the second frame.

At timing $t_{135}$, the COG 11 causes the horizontal driver 8 to output the pixel signals based on the image data for the first horizontal line of the second frame stored in the buffer 11a. The horizontal driver 8 maintains the electric potential (negative-polarity pixel signals $SIG_{MINUS}$ for the first horizontal line of the second frame) of one group of the two groups (the group of the odd-numbered signal lines SL and the group of the even-numbered signal lines SL) of the N signal lines SL. The horizontal driver 8 outputs the positive-polarity pixel signals $SIG_{PLUS}$ for the first horizontal line of the second frame to the other group of the two groups of the N signal lines SL.

The horizontal driver 8, for example, maintains the electric potential (negative-polarity pixel signals $SIG_{MINUS}$ for the first horizontal line of the second frame) of the group of the even-numbered signal lines SL (refer to the signal lines $SL_2$, $SL_4$, $SL_6$, ... in FIG. 43) out of the N signal lines SL. The horizontal driver 8 outputs the positive-polarity pixel signals $SIG_{PLUS}$ for the first horizontal line of the second frame to the group of the odd-numbered signal lines SL (refer to the signal lines $SL_1$, $SL_3$, $SL_5$, ... in FIG. 43) out of the N signal lines SL.

From timing $t_{135}$ to timing $t_{136}$, the COG 11 outputs the control signal $SEL_3$ (refer to FIG. 43) at a high level to the drive electrode driver 9g. As a result, the switches $SW_{21}$ and $SW_{22}$ are turned on. The drive electrode driver 9g outputs the drive signals VCOM to all the drive electrodes COML. Consequently, an electric field is formed between the pixel electrodes PE (refer to FIG. 3) and the drive electrodes COML, thereby displaying an image.

From timing $t_{135}$ to timing $t_{136}$, the COG 11 changes the control signal $SEL_4$ (refer to FIG. 43) to a low level. As a result, the switches $SW_{31}$ and $SW_{32}$ are turned off, whereby neither the detection circuit $INT_1$ nor the detection circuit $INT_2$ reads the drive signals VCOM.

The period after timing $t_{136}$ corresponds to a negative-polarity image detection and display writing (image display) period for the second horizontal line of the second frame.

At timing $t_{136}$, the host HST outputs image data for the second horizontal line of the second frame to the COG 11. The COG 11 temporarily stores the image data for the second horizontal line of the second frame supplied from the host HST in the buffer 11a (refer to FIG. 38).

The period from timing $t_{136}$ to timing $t_{137}$, which is a predetermined time after timing $t_{136}$, corresponds to a precharge period for the signal lines SL.

From timing $t_{136}$ to timing $t_{137}$, the horizontal driver 8 outputs the ground potential GND to one group of the two groups (the group of the odd-numbered signal lines SL and the group of the even-numbered signal lines SL) of the N signal lines SL. The horizontal driver 8 thus precharges the group of the odd-numbered or the even-numbered signal lines SL in the N signal lines SL with the ground potential GND. From timing $t_{136}$ to timing $t_{137}$, the horizontal driver 8 maintains the electric potential (positive-polarity pixel signals $SIG_{PLUS}$ for the first horizontal line of the second frame) of the other group of the two groups of the N signal lines SL.

The horizontal driver 8, for example, outputs the ground potential GND to the group of the even-numbered signal lines SL (refer to the signal lines $SL_2$, $SL_4$, $SL_6$, ... in FIG. 43) out of the N signal lines SL. The horizontal driver 8 maintains the electric potential (positive-polarity pixel signals $SIG_{PLUS}$ for the first horizontal line of the second frame) of the group of the odd-numbered signal lines SL (refer to the signal lines $SL_1$, $SL_3$, $SL_5$, ... in FIG. 43) out of the N signal lines SL.

The period from timing $t_{137}$ to timing $t_{138}$ corresponds to the negative-polarity image detection period for the second horizontal line of the second frame.

At timing $t_{137}$, the COG 11 causes the horizontal driver 8 to output the negative-polarity pixel signals based on the image data for the second horizontal line of the second frame stored in the buffer 11a. The horizontal driver 8 outputs the negative-polarity pixel signals $SIG_{MINUS}$ for the second horizontal line of the second frame to one group of the two groups (the group of the odd-numbered signal lines SL and the group of the even-numbered signal lines SL) of the N signal lines SL. The horizontal driver 8 maintains the electric potential (positive-polarity pixel signals $SIG_{PLUS}$ for the first horizontal line of the second frame) of the other group of the two groups of the N signal lines SL.

The horizontal driver 8, for example, outputs the negative-polarity pixel signals $SIG_{MINUS}$ for the second horizontal line of the second frame to the group of the even-numbered signal lines SL (refer to the signal lines $SL_2$, $SL_4$, $SL_6$, ... in FIG. 43) out of the N signal lines SL. The horizontal driver 8 maintains the electric potential (positive-polarity pixel signals $SIG_{PLUS}$ for the first horizontal line of the second frame) of the group of the odd-numbered signal lines SL (refer to the signal lines $SL_1$, $SL_3$, $SL_5$, ... in FIG. 43) out of the N signal lines SL.

From timing $t_{137}$ to timing $t_{138}$, the COG 11 outputs the control signal $SEL_3$ (refer to FIG. 43) at a low level to the drive electrode driver 9g. As a result, the switches $SW_{21}$ and $SW_{22}$ are turned off. Consequently, all the drive electrodes COML are brought into a floating state.

Referring back to FIG. 43, when the drive electrode $COML_1$ is in a floating state, the signal lines $SL_2$, $SL_4$, and $SL_6$ are capacitively coupled to the drive electrode $COML_1$. As a result, the detection signal is generated in the drive electrode $COML_1$ due to the pixel signals $SIG_{MINUS}$ supplied to the signal lines $SL_2$, $SL_4$, and $SL_6$. The COG 11 changes the control signal $SEL_4$ to a high level at a timing based on the timing signal HSYNC, for example, at timing $t_{137}$. As a result, the switch $SW_{31}$ is turned on at timing $t_{137}$. The detection circuit $INT_1$ reads the detection signal at timing $t_{137}$. The COF 12g performs sampling and A/D conversion on the detection signal, thereby obtaining the negative-polarity detection pixel data. The COF 12g may read the peak voltage of the detection signal, thereby obtaining the negative-polarity detection pixel data.

The period after timing $t_{138}$ corresponds to a display writing (image display) period for the second horizontal line of the second frame.

At timing $t_{138}$, the COG 11 causes the horizontal driver 8 to output the pixel signals based on the image data for the second horizontal line of the second frame stored in the buffer 11a. The horizontal driver 8 maintains the electric potential (negative-polarity pixel signals $SIG_{MINUS}$ for the second horizontal line of the second frame) of one group of the two groups (the group of the odd-numbered signal lines SL and the group of the even-numbered signal lines SL) of the N signal lines SL. The horizontal driver 8 outputs the positive-polarity pixel signals $SIG_{PLUS}$ for the second horizontal line of the second frame to the other group of the two groups of the N signal lines SL.

The horizontal driver 8, for example, maintains the electric potential (negative-polarity pixel signals $SIG_{MINUS}$ for the second horizontal line of the second frame) of the group of the even-numbered signal lines SL (refer to the signal lines $SL_2$, $SL_4$, $SL_6$, . . . in FIG. 43) out of the N signal lines SL. The horizontal driver 8 outputs the positive-polarity pixel signals $SIG_{PLUS}$ for the second horizontal line of the second frame to the group of the odd-numbered signal lines SL (refer to the signal lines $SL_1$, $SL_3$, $SL_5$, . . . in FIG. 43) out of the N signal lines SL.

From timing $t_{138}$, the COG 11 outputs the control signal $SEL_3$ (refer to FIG. 43) at a high level to the drive electrode driver 9g. As a result, the switches $SW_{21}$ and $SW_{22}$ are turned on. The drive electrode driver 9g outputs the drive signals VCOM to all the drive electrodes COML. Consequently, an electric field is formed between the pixel electrodes PE (refer to FIG. 3) and the drive electrodes COML, thereby displaying an image.

Similarly, the COG 11 and the COF 12g perform negative-polarity image detection and display writing (image display) of the third to M-th horizontal lines of the second frame.

Figure 46:
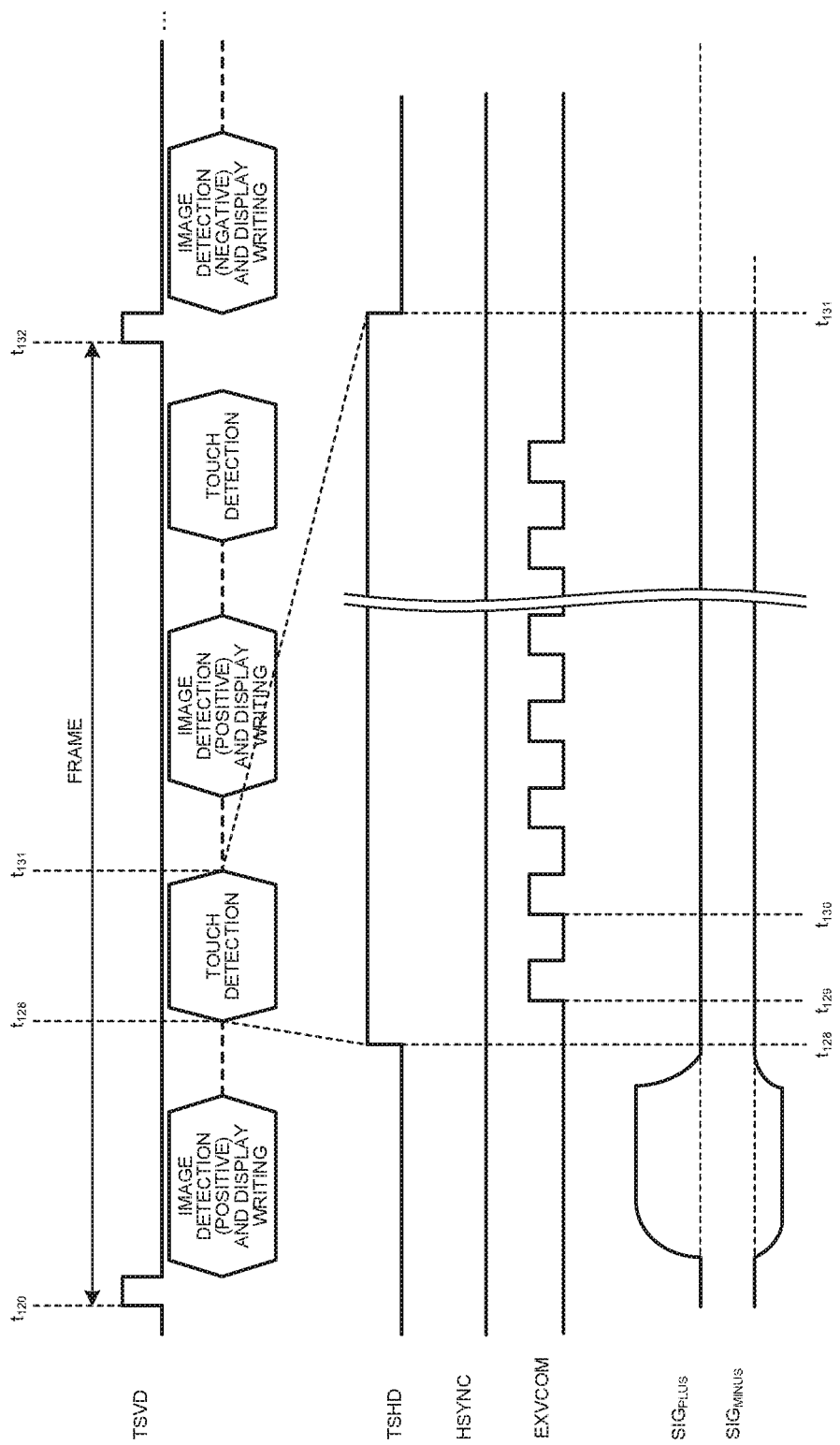
FIG. 46 is another diagram of the operating timing in the exemplary operation performed by the display apparatus with a touch detection function according to the sixth embodiment.

FIG. 46 is another diagram of the operating timing in the exemplary operation performed by the display apparatus with a touch detection function according to the sixth embodiment. FIG. 46 illustrates the period from timing $t_{128}$ to timing $t_{131}$ in FIG. 45, that is, the touch detection period for the first unit $U_1$ of the first frame in greater detail.

The timing signal TSHD for touch detection control output from the COG 11 to the COF 12g indicates the image display period, the image detection period, and the touch detection period. In the image display period and the image detection period, the COG 11 outputs the timing signal TSHD at a low level to the COF 12g. In the touch detection period, the COG 11 outputs the timing signal TSHD at a high level to the COF 12g.

The period from timing $t_{129}$ of the first rising edge of the control signal EXVCOM output from the COG 11 to the drive electrode driver 9g to timing too of the second rising edge of the control signal EXVCOM corresponds to the touch detection period for the first drive electrode block (one detection block). The period after timing $t_{130}$ of the second rising edge of the control signal EXVCOM corresponds to the touch detection period for the second and subsequent drive electrode blocks.

When receiving the control signal EXVCOM at timing $t_{129}$, the scanning circuit SC (refer to FIG. 43) couples the touch detection drive signal output amplifier TDAMP to the first drive electrode block. The touch detection drive signal output amplifier TDAMP outputs the touch detection drive signal Vcomtm to the first drive electrode block.

From timing teas to timing $t_{131}$, the COG 11 outputs the control signal $SEL_5$ (refer to FIG. 43) at a high level to the COF 12g. As a result, the switches $SW_{61}$ and $SW_{62}$ are turned on. The detection circuit $D_1$ reads the touch detection signals at timing teas. The COF 12g performs sampling and A/D conversion on the touch detection signals, thereby obtaining touch detection data. The COF 12g may read the peak voltage of the touch detection signals, thereby obtaining the touch detection data.

Similarly, the COG 11 and the COF 12g perform touch detection on the second and subsequent drive electrode blocks.

Figure 47:
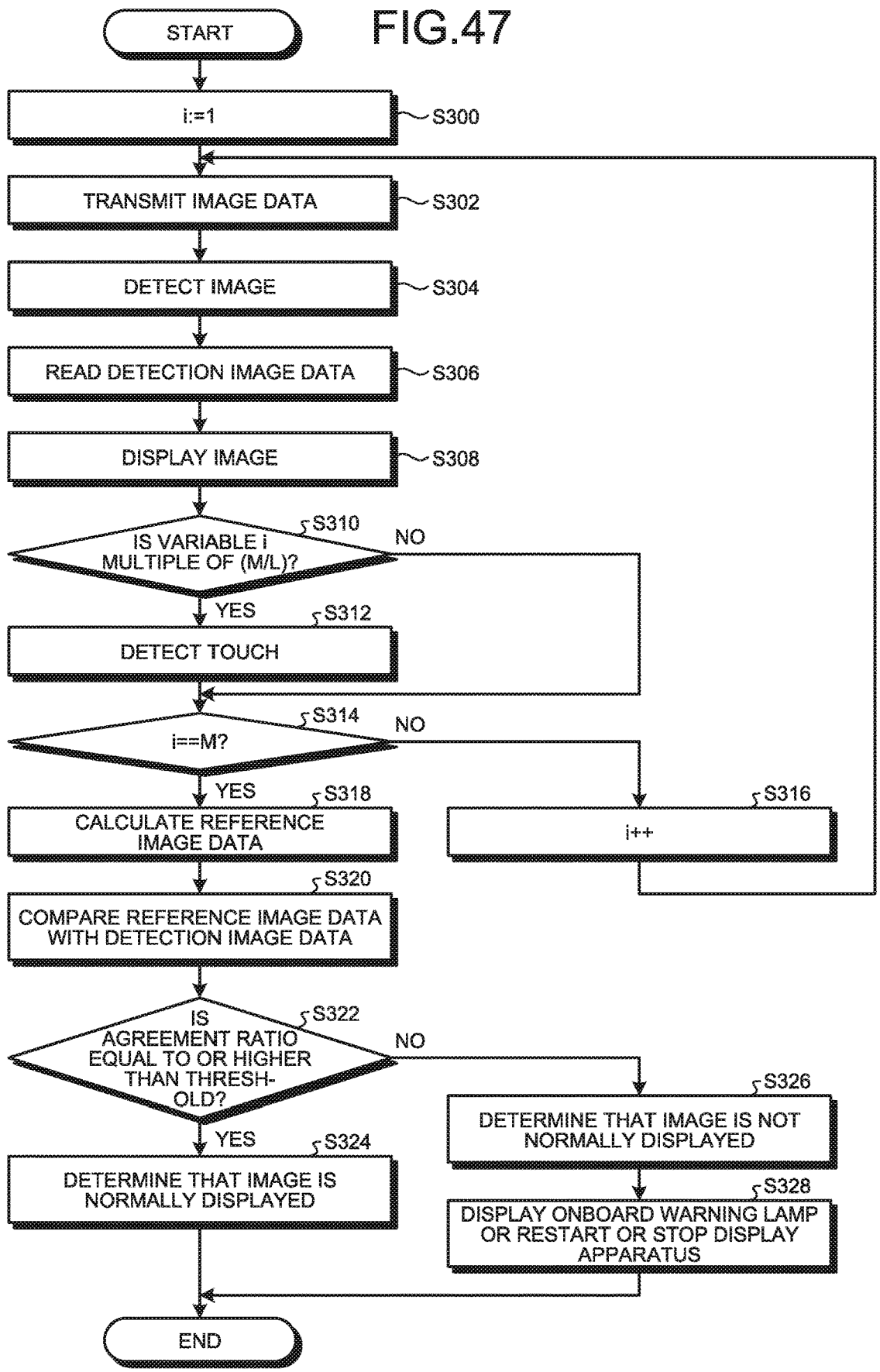
FIG. 47 is a flowchart of an operation in an exemplary operation performed by the display apparatus according to the sixth embodiment.

FIG. 47 is a flowchart of an operation in an exemplary operation performed by the display apparatus according to the sixth embodiment. The display apparatus with a touch detection function 1g performs the operation illustrated in FIG. 47 on a frame-by-frame basis.

Explanation of the processing from Step S300 to Step S308 is omitted because it is the same as the processing from Step S200 to Step S208 of the flowchart illustrated in FIG. 13 according to the first embodiment.

At Step S310, the host HST determines whether the variable i is equal to a multiple of (M/L), that is, whether image detection and image display for one unit is finished. If the host HST determines that the variable i is equal to a multiple of (M/L) (Yes at Step S310), the host HST performs the processing at Step S312. If the host HST determines that the variable i is not equal to a multiple of (M/L) (No at Step S310), the host HST performs the processing at Step S314.

At Step S312, the COG 11 and the COF 12g detect a touch. The COG 11 and the COF 12g divide a plurality of drive electrode blocks into L groups. The COG 11 and the COF 12g drive a group corresponding to the number of the unit subjected to image detection and image display, thereby detecting a touch.

Explanation of the processing from Step S314 to Step S328 is omitted because it is the same as the processing from Step S210 to Step S224 of the flowchart illustrated in FIG. 13 according to the first embodiment.

The panel PNLg of the display apparatus with a touch detection function 1g according to the sixth embodiment is applicable to a lateral electric field mode liquid crystal display apparatus (refer to FIG. 4) and a vertical electric field mode liquid crystal display apparatus (refer to FIG. 14).

The display apparatus with a touch detection function 1g according to the sixth embodiment has the following characteristics besides the characteristics of the display apparatus according to the first embodiment. The display apparatus with a touch detection function according to the sixth embodiment also has characteristics other than those described below. The display apparatus with a touch detection function 1g according to the sixth embodiment can perform touch detection besides image detection. The display apparatus may supply a positive-or negative-polarity signal to at least one signal line SL and detect a detection signal with at least one drive electrode COML corresponding to the at least one signal line SL supplied with the positive- or negative-polarity signal.

7. Seventh Embodiment

Figure 48:
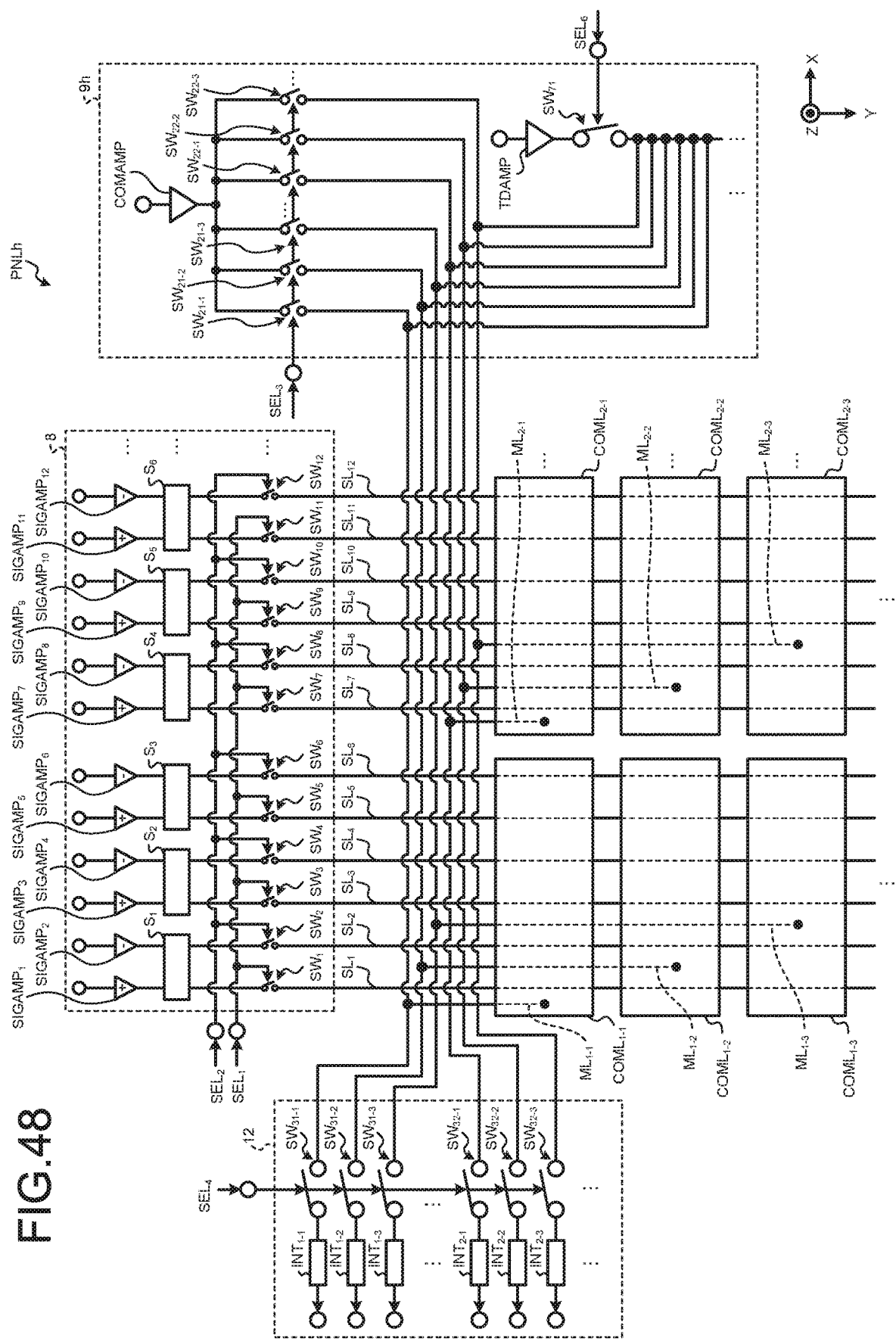
FIG. 48 is a diagram of the configuration of the horizontal driver, the drive electrode driver, and the COF of a display apparatus with a touch detection function according to a seventh embodiment.

FIG. 48 is a diagram of the configuration of the horizontal driver, the drive electrode driver, and the COF of a display apparatus with a touch detection function according to a seventh embodiment. FIG. 48 illustrates a portion of the horizontal driver 8 that drives the pixels Pix of four columns, a portion of a drive electrode driver 9h that drives the pixels Pix of four columns, and a portion of the COF 12 that reads detection signals of the pixels Pix of four columns in a panel PNLh.

The configuration of the panel PNLh of the display apparatus with a touch detection function according to the present embodiment is different from that of the panel PNLc (refer to FIG. 21) of the display apparatus according to the third embodiment in that the drive electrode driver 9h further includes the touch detection drive signal output amplifier TDAMP and a switch $SW_{71}$.

When a control signal $SEL_6$ supplied from the COG 11 is at a high level, the switch $SW_{71}$ electrically couples the touch detection drive signal output amplifier TDAMP to the drive electrodes COML. When the control signal $SEL_6$ is at a low level, the switch $SW_{71}$ cuts off electrical coupling between the touch detection drive signal output amplifier TDAMP and the drive electrodes COML. In the touch detection period, the control signal $SEL_6$ is at a high level. As a result, the switch $SW_{71}$ electrically couples the touch detection drive signal output amplifier TDAMP to the drive electrodes COML, thereby supplying touch detection drive signals Vcomts to the drive electrodes COML. In the image display period and the image detection period, the control signal $SEL_6$ is at a low level. As a result, the switch $SW_{71}$ cuts off electrical coupling between the touch detection drive signal output amplifier TDAMP and the drive electrodes COML, thereby supplying no touch detection drive signal Vcomts to the drive electrodes COML. While the touch detection drive signal output amplifier TDAMP in FIG. 48 supplies the touch detection drive signals Vcomts to all the drive electrodes COML, the configuration is not limited thereto. A plurality of switches may be provided between the touch detection drive signal output amplifier TDAMP and the respective drive electrodes COML. With this configuration, the touch detection drive signal output amplifier TDAMP may sequentially supply the touch detection drive signal Vcomts to the drive electrodes COML individually. Alternatively, a plurality of touch detection drive signal output amplifiers TDAMP may be provided for the respective drive electrodes COML. With this configuration, the touch detection drive signal output amplifiers TDAMP may drive the respective drive electrodes COML simultaneously to perform detection. Still alternatively, the drive electrodes COML may be divided into a plurality of drive electrode blocks, and a plurality of touch detection drive signal output amplifiers TDAMP may be provided for the respective drive electrode blocks. With this configuration, the touch detection drive signal output amplifiers TDAMP may drive the drive electrodes COML in units of blocks to perform detection. Each of the touch detection drive signal output amplifiers TDAMP may sequentially supply the touch detection drive signal Vcomts to a plurality of drive electrodes COML in a corresponding one of the drive electrode blocks. Alternatively, the touch detection drive signal output amplifier TDAMP may supply the touch detection drive signals Vcomts to all the drive electrodes COML in the corresponding one drive electrode blocks.

The following describes the basic principle of self-capacitance touch detection performed by the display apparatus with a touch detection function according to the present embodiment with reference to FIGS. 49 to 52.

Figure 49:
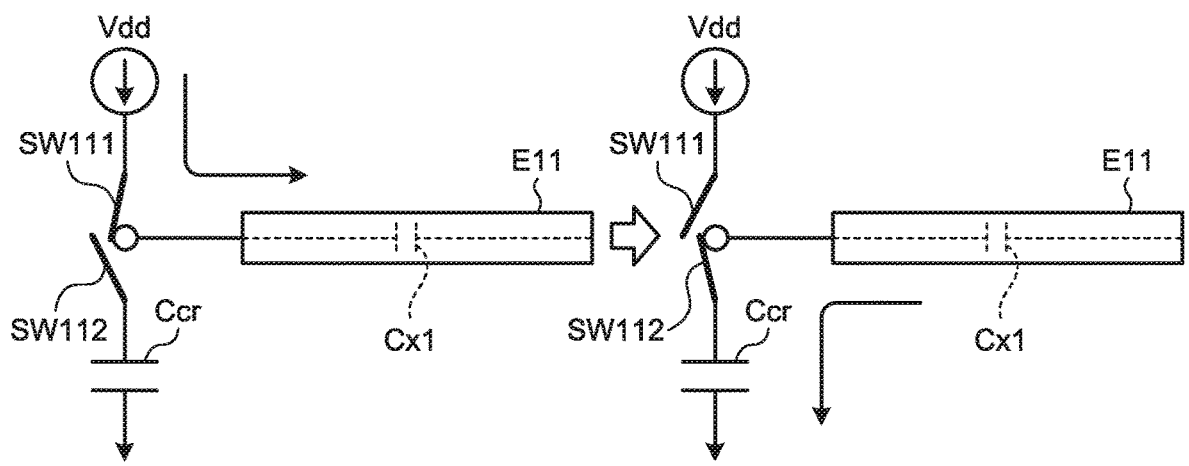
FIG. 49 is a diagram for explaining the basic principle of self-capacitance touch detection and illustrates a state where an object to be detected is neither in contact with nor in proximity to a detection electrode.
Figure 50:
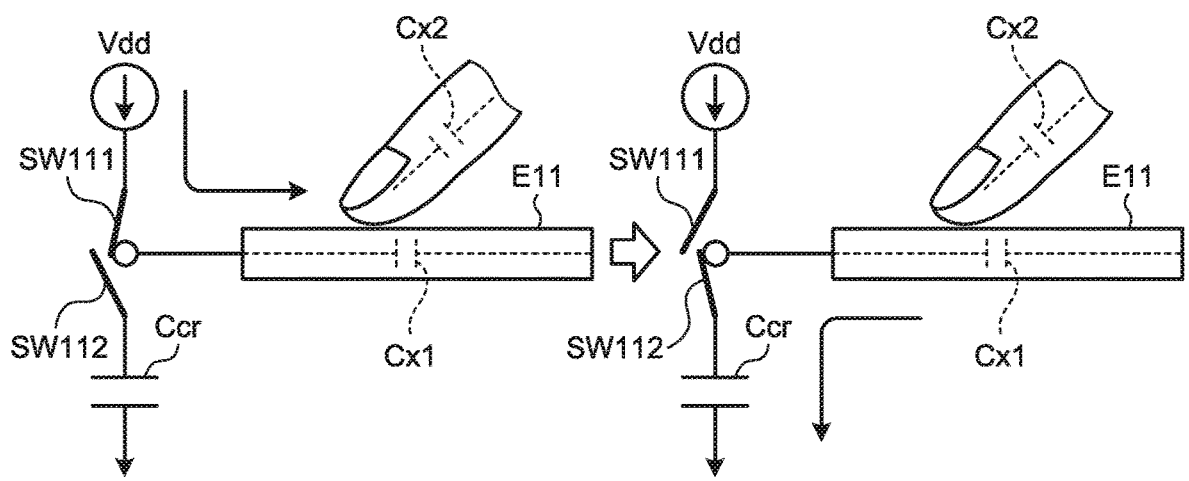
FIG. 50 is a diagram for explaining the basic principle of self-capacitance touch detection and illustrates a state where an object to be detected is in contact with or in proximity to the detection electrode.
Figure 51:
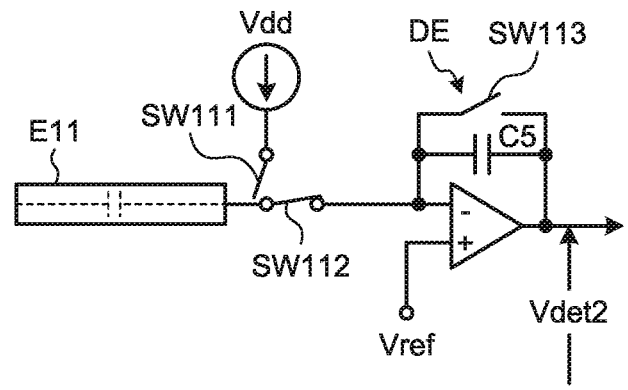
FIG. 51 is a diagram for explaining an example of an equivalent circuit in self-capacitance touch detection.
Figure 52:
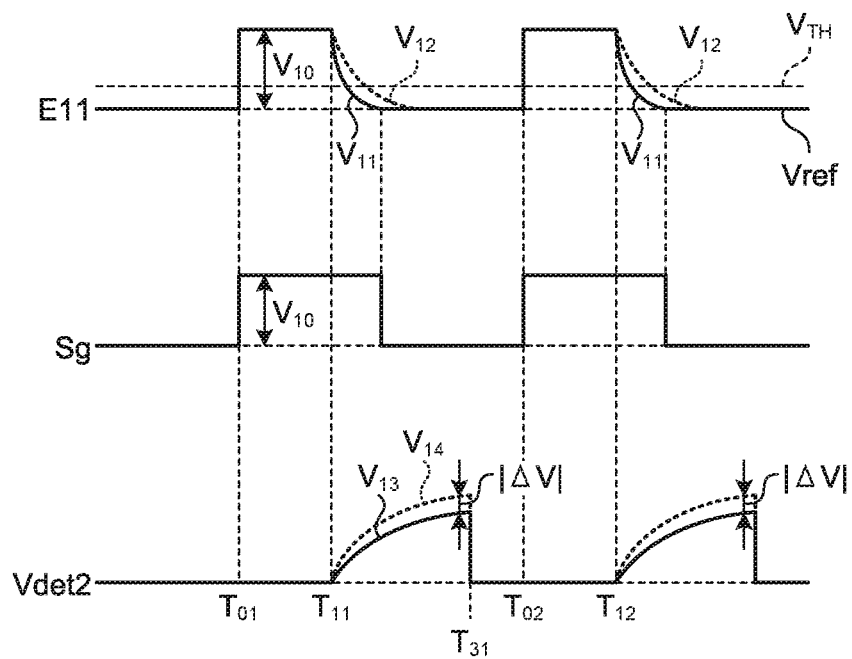
FIG. 52 is a diagram of an example of waveforms of a drive signal and a detection signal in self-capacitance touch detection.

FIG. 49 is a diagram for explaining the basic principle of self-capacitance touch detection and illustrates a state where an object to be detected is neither in contact with nor in proximity to a detection electrode. FIG. 50 is a diagram for explaining the basic principle of self-capacitance touch detection and illustrates a state where an object to be detected is in contact with or in proximity to the detection electrode. FIG. 51 is a diagram for explaining an example of an equivalent circuit in self-capacitance touch detection. FIG. 52 is a diagram of an example of waveforms of a drive signal and a detection signal in self-capacitance touch detection.

In the left figure in FIG. 49, an object to be detected is neither in contact with nor in proximity to a detection electrode, and a detection electrode E11 is coupled to a power source Vdd by a switch SW111 and is not coupled to a capacitor Ccr by a switch SW112. In this state, capacitance Cx1 in the detection electrode E11 is charged. In the right figure in FIG. 49, coupling between the power source Vdd and the detection electrode E11 is cut off by the switch SW111, and the detection electrode E11 is coupled to the capacitor Ccr by the switch SW112. In this state, an electric charge of the capacitance Cx1 is discharged via the capacitor Ccr.

In the left figure in FIG. 50, an object to be detected is in contact with or in proximity to the detection electrode, and the detection electrode E11 is coupled to the power source Vdd by the switch SW111 and is not coupled to the capacitor Ccr by the switch SW112. In this state, capacitance Cx2 generated by the object to be detected in proximity to the detection electrode E11 is also charged besides the capacitance Cx1 in the detection electrode E11. In the right figure in FIG. 50, coupling between the power source Vdd and the detection electrode E11 is cut off by the switch SW111, and the detection electrode E11 is coupled to the capacitor Ccr by the switch SW112. In this state, an electric charge of the capacitance Cx1 and an electric charge of the capacitance Cx2 are discharged via the capacitor Ccr.

Because of the capacitance Cx2, the voltage change characteristics of the capacitor Ccr in discharging (the state where an object to be detected is in contact with or in proximity to the detection electrode) illustrated in the right figure in FIG. 50 are clearly different from those of the capacitor Ccr in discharging (the state where an object to be detected is neither in contact with nor in proximity to the detection electrode) illustrated in the right figure in FIG. 49. Consequently, in the self-capacitance method, whether an object to be detected is in contact with or in proximity to the detection electrode is determined using the fact that the voltage change characteristics of the capacitor Ccr vary depending on the presence of the capacitance Cx2.

Specifically, an AC rectangular wave Sg (corresponding to the touch detection drive signal Vcomts, refer to FIG. 52) having a predetermined frequency (e.g., several kilohertz to several hundred kilohertz) is applied to the detection electrode E11. A voltage detector DE illustrated in FIG. 51 converts fluctuations in the electric current depending on the AC rectangular wave Sg into fluctuations in the voltage (waveforms $V_{13}$ and $V_{14}$). The voltage detector DE corresponds to the detection circuits $INT_{1-1}$, $INT_{1-2}$, ... included in the COF 12 illustrated in FIG. 48, for example. The voltage detector DE is the detection circuit $INT_1$ or $INT_2$ illustrated in FIG. 17, for example.

As described above, the detection electrode E11 can be cut off from another element by the switch SW111 and the switch SW112. As illustrated in FIG. 52, the voltage level of the AC rectangular wave Sg rises to a level corresponding to voltage $V_{10}$ at time $T_{01}$. At this time, the switch SW111 is in an on state, and the switch SW112 is in an off state. As a result, the voltage of the detection electrode E11 also rises to voltage $V_{10}$.

Subsequently, the switch SW111 is turned off before time $T_{11}$. While the detection electrode E11 is in a floating state at this time, the electric potential of the detection electrode E11 is maintained at $V_{10}$ by the capacitance Cx1 (refer to FIG. 49) of the detection electrode E11 or capacitance (Cx1+Cx2, refer to FIG. 50) obtained by adding the capacitance Cx2 to the capacitance Cx1 of the detection electrode E11, the capacitance Cx2 being generated by an object to be detected in contact with or in proximity to the detection electrode. Subsequently, a switch SW113 is turned on before time $T_{11}$ and turned off after a predetermined time has elapsed, thereby resetting the voltage detector DE. With this reset operation, the touch detection signal Vdet as the output voltage of the voltage detector DE is made substantially equal to the reference potential Vref.

Subsequently, when the switch SW112 is turned on at time $T_{11}$, the voltage of an inversion input end of the voltage detector DE rises to the voltage $V_{10}$ equal to that of the detection electrode E11. Subsequently, the voltage of the inversion input end of the voltage detector DE falls to the reference potential Vref according to a time constant of the capacitance Cx1 (or Cx1+Cx2) of the detection electrode E11 and capacitance C5 in the voltage detector DE. At this time, the electric charge accumulated in the capacitance Cx1 (or Cx1+Cx2) of the detection electrode E11 moves to the capacitance C5 in the voltage detector DE. As a result, a touch detection signal Vdet2 as the output voltage of the voltage detector DE rises.

When an object to be detected is not in proximity to the detection electrode E11, the touch detection signal Vdet2 as the output voltage of the voltage detector DE is represented by the waveform $V_{13}$ indicated by the solid line, and Vdet2=Cx1×$V_{10}$/C5 is satisfied.

When capacitance generated by an effect of an object to be detected is added, the touch detection signal Vdet2 as the output voltage of the voltage detector DE is represented by the waveform $V_{14}$ indicated by the dotted line, and Vdet2=(Cx1+Cx2)×$V_{10}$/C5 is satisfied. Subsequently, at time $T_{31}$ after the electric charge in the capacitance Cx1 (or Cx1+Cx2) of the detection electrode E11 sufficiently moves to the capacitance C5, the switch SW112 is turned off, and the switch SW111 and the switch SW113 are turned on. With this operation, the electric potential of the detection electrode E11 is reduced to a low level equal to that of the AC rectangular wave Sg, and the voltage detector DE is reset. The timing to turn on the switch SW111 may be any timing after the turning off of the switch SW112 and before time $T_{02}$. The timing to reset the voltage detector DE may be any timing after the turning off of the switch SW112 and before time $T_{12}$.

The operation described above is repeated at a predetermined frequency (e.g., several kilohertz to several hundred kilohertz). As a result, it can be determined whether an object to be detected is present (whether a touch is made) based on the absolute value |ΔV| of the difference between the waveform $V_{13}$ and the waveform $V_{14}$. As illustrated in FIG. 52, when an object to be detected is not in contact with or in proximity to the detection electrode, the electric potential of the detection electrode E11 is represented by a waveform $V_{11}$. By contrast, when the capacitance Cx2 generated by an effect of an object to be detected is added, the electric potential is represented by a waveform $V_{12}$. It may be determined whether an external proximity object is present (whether a touch is made) by measuring a time until when the waveforms $V_{11}$ and $V_{12}$ fall to a predetermined threshold voltage VIE.

In the present embodiment, the drive electrodes COML of the panel PNLh are supplied with electric charges according to the touch detection drive signals Vcomts supplied from the drive electrode driver 9h. The drive electrodes COML perform self-capacitance touch detection and output the touch detection signals Vdet2.

The drive electrodes COML according to the present embodiment correspond to the detector DET and the touch detector TDET (refer to FIG. 37).

Illustration and explanation of the flowchart of the operation performed by the display apparatus with a touch detection function according to the seventh embodiment are omitted because it is the same as the flowchart (refer to FIG. 47) of the operation performed by the display apparatus with a touch detection function 1g according to the sixth embodiment.

The panel PNLh of the display apparatus with a touch detection function according to the seventh embodiment is applicable to a lateral electric field mode liquid crystal display apparatus (refer to FIG. 20) and to a vertical electric field mode liquid crystal display apparatus.

The display apparatus with a touch detection function according to the seventh embodiment has the following characteristics besides the characteristics of the display apparatus according to the third embodiment. The display apparatus with a touch detection function according to the seventh embodiment also has characteristics other than those described below. The display apparatus with a touch detection function according to the seventh embodiment can perform touch detection besides image detection. The display apparatus may supply a positive-or negative-polarity signal to at least one signal line SL and detect a detection signal with at least one drive electrode COML corresponding to the at least one signal line SL supplied with the positive- or negative-polarity signal.

8. Eighth Embodiment

Figure 53:
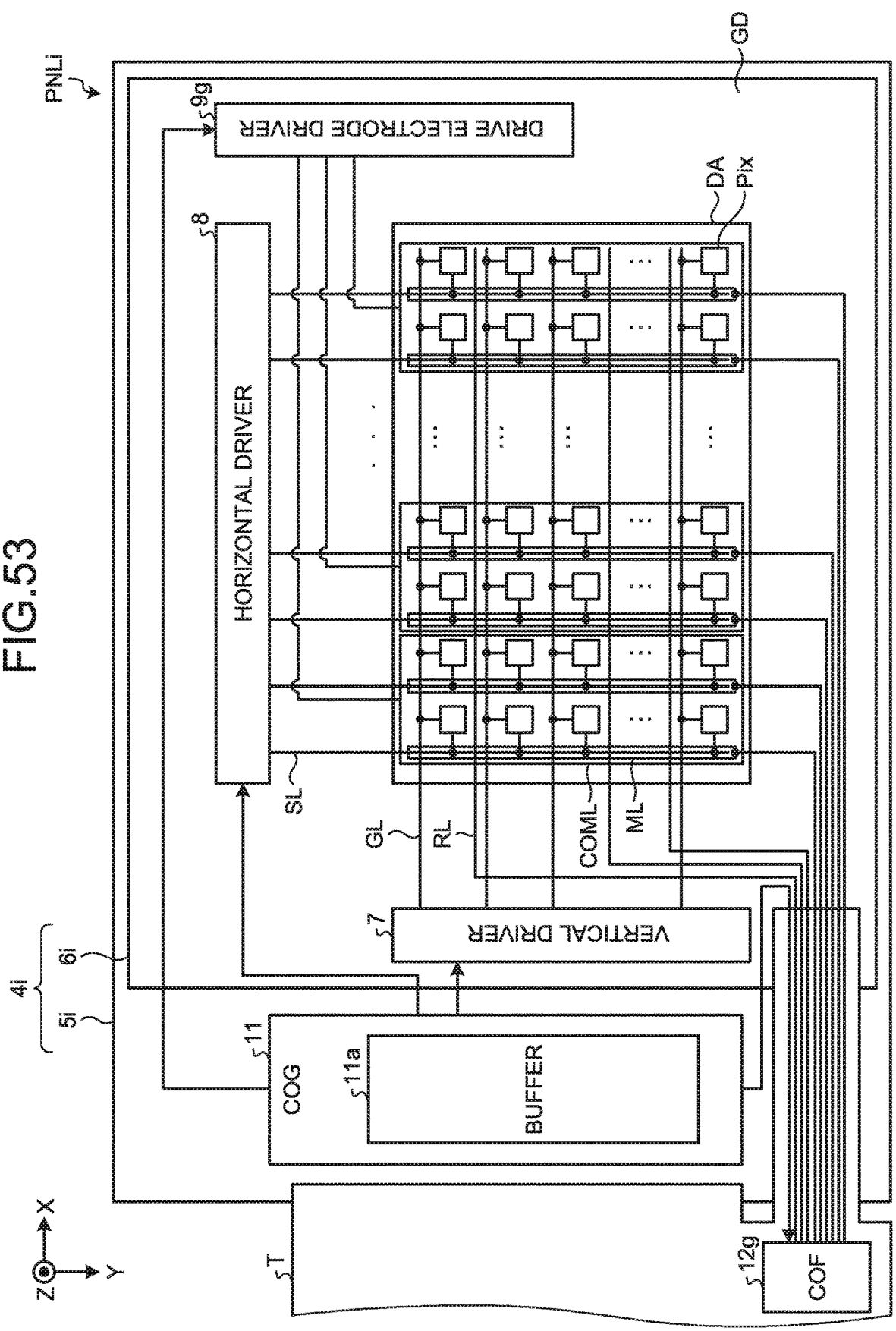
FIG. 53 is a diagram of the module configuration of a display apparatus with a touch detection function according to an eighth embodiment.

FIG. 53 is a diagram of the module configuration of a display apparatus with a touch detection function according to the eighth embodiment.

A panel PNLi includes a substrate 4i, the drive electrode driver 9g, and the COF 12g. The substrate 4i includes a first substrate 5i and a second substrate 6i. The second substrate 6i is disposed in the Z-direction with respect to the first substrate 5i and faces the first substrate 5i with a predetermined space interposed therebetween.

The configuration of the panel PNLi of the display apparatus with a touch detection function according to the present embodiment is different from that of the panel PNLd (refer to FIG. 22) of the display apparatus according to the fourth embodiment in that the detection lines RL are provided to the second substrate 6i. The detection lines RL are arranged one for every two rows of the pixels Pix and extend in the X-direction. In other words, the number of detection lines RL is (M/2).

Figure 54:
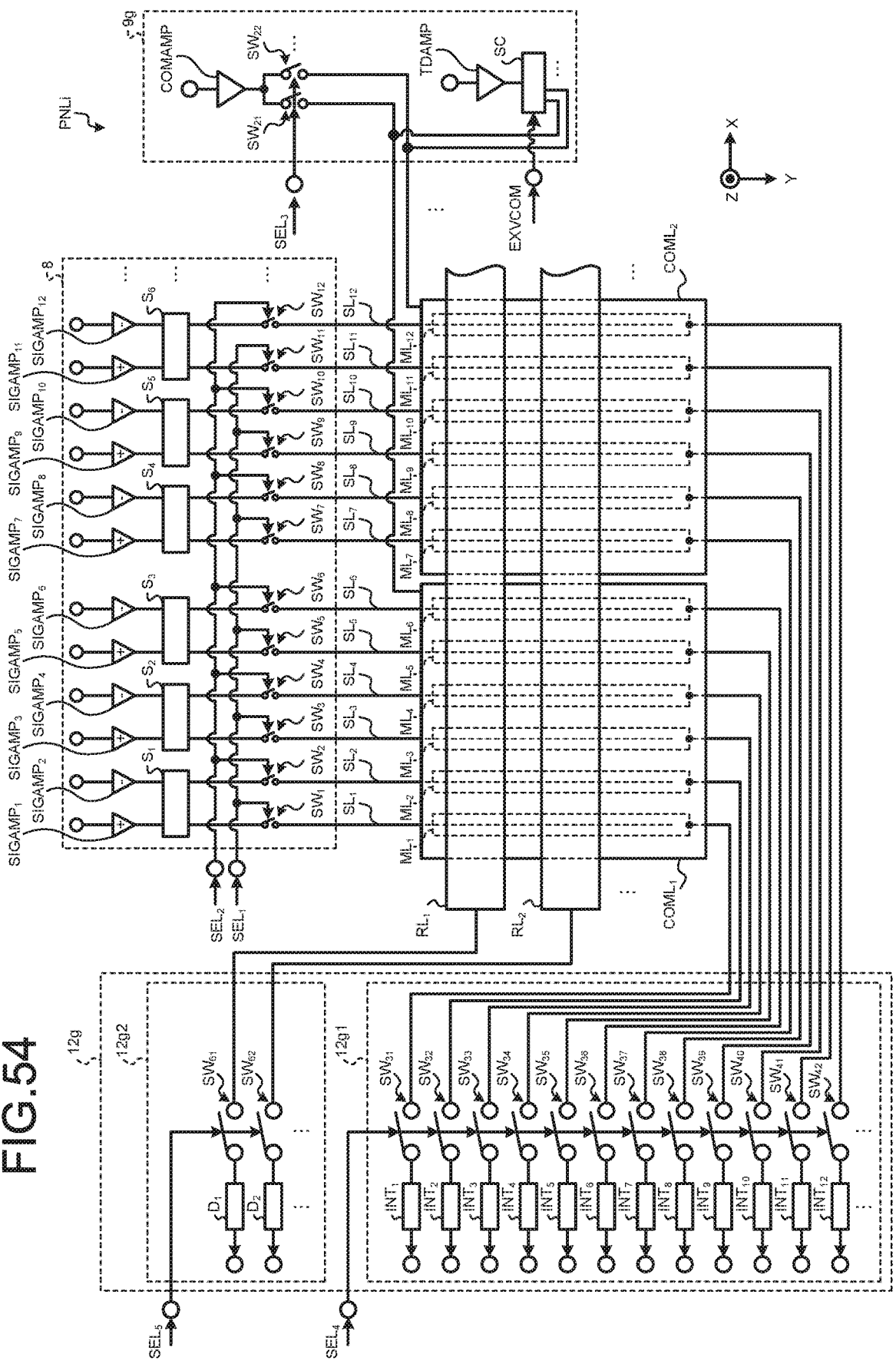
FIG. 54 is a diagram of the configuration of the horizontal driver, the drive electrode driver, and the COF of the display apparatus with a touch detection function according to the eighth embodiment.

FIG. 54 is a diagram of the configuration of the horizontal driver, the drive electrode driver, and the COF of the display apparatus with a touch detection function according to the eighth embodiment. FIG. 54 illustrates a portion of the horizontal driver 8 that drives the pixels Pix of four columns, a portion of the drive electrode driver 9g that drives the pixels Pix of four columns, and a portion of the COF 12g that reads detection signals of the pixels Pix of four columns.

Explanation of the configuration of the drive electrode driver 9g, the COF 12g, and the detection lines RL is omitted because it is the same as that of the sixth embodiment (refer to FIG. 43).

The display apparatus with a touch detection function according to the eighth embodiment has the following characteristics besides the characteristics of the display apparatus according to the fourth embodiment. The display apparatus with a touch detection function according to the eighth embodiment also has characteristics other than those described below. The display apparatus with a touch detection function according to the eighth embodiment can perform touch detection besides image detection.

The display apparatus may supply a positive- or negative-polarity signal to at least one signal line SL and detect a detection signal with at least one detection line RL corresponding to the at least one signal line SL supplied with the positive- or negative-polarity signal.

9. Ninth Embodiment

Figure 55:
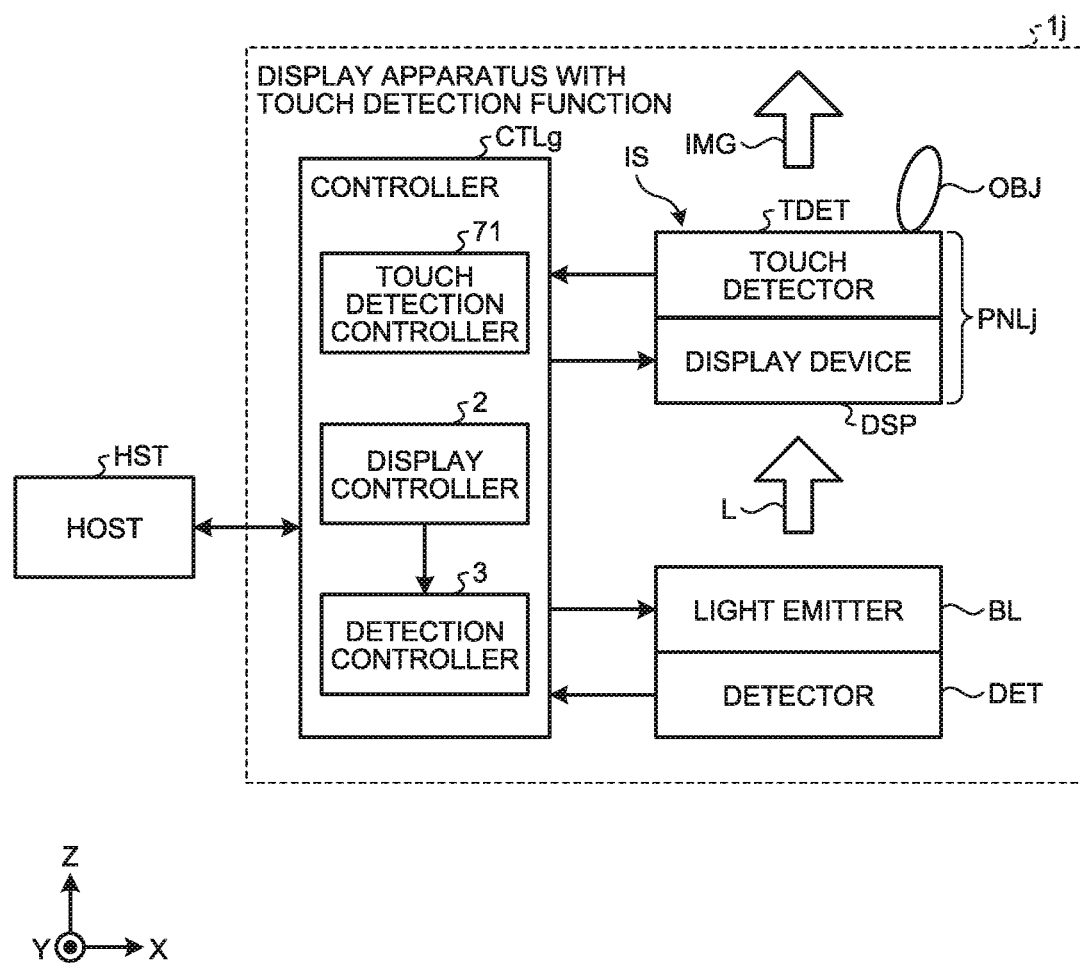
FIG. 55 is a block diagram of the configuration of a display apparatus with a touch detection function according to a ninth embodiment.

FIG. 55 is a block diagram of the configuration of a display apparatus with a touch detection function according to a ninth embodiment.

The configuration of a display apparatus with a touch detection function 1j according to the present embodiment is different from that of the display apparatus with a touch detection function 1g according to the sixth embodiment in that a panel PNLj includes the display device DSP and the touch detector TDET. The display device DSP displays an image. The touch detector TDET detects contact or proximity of the object to be detected OBJ with or to the touch detection surface IS. The detector DET is provided to the light emitter BL.

Figure 56:
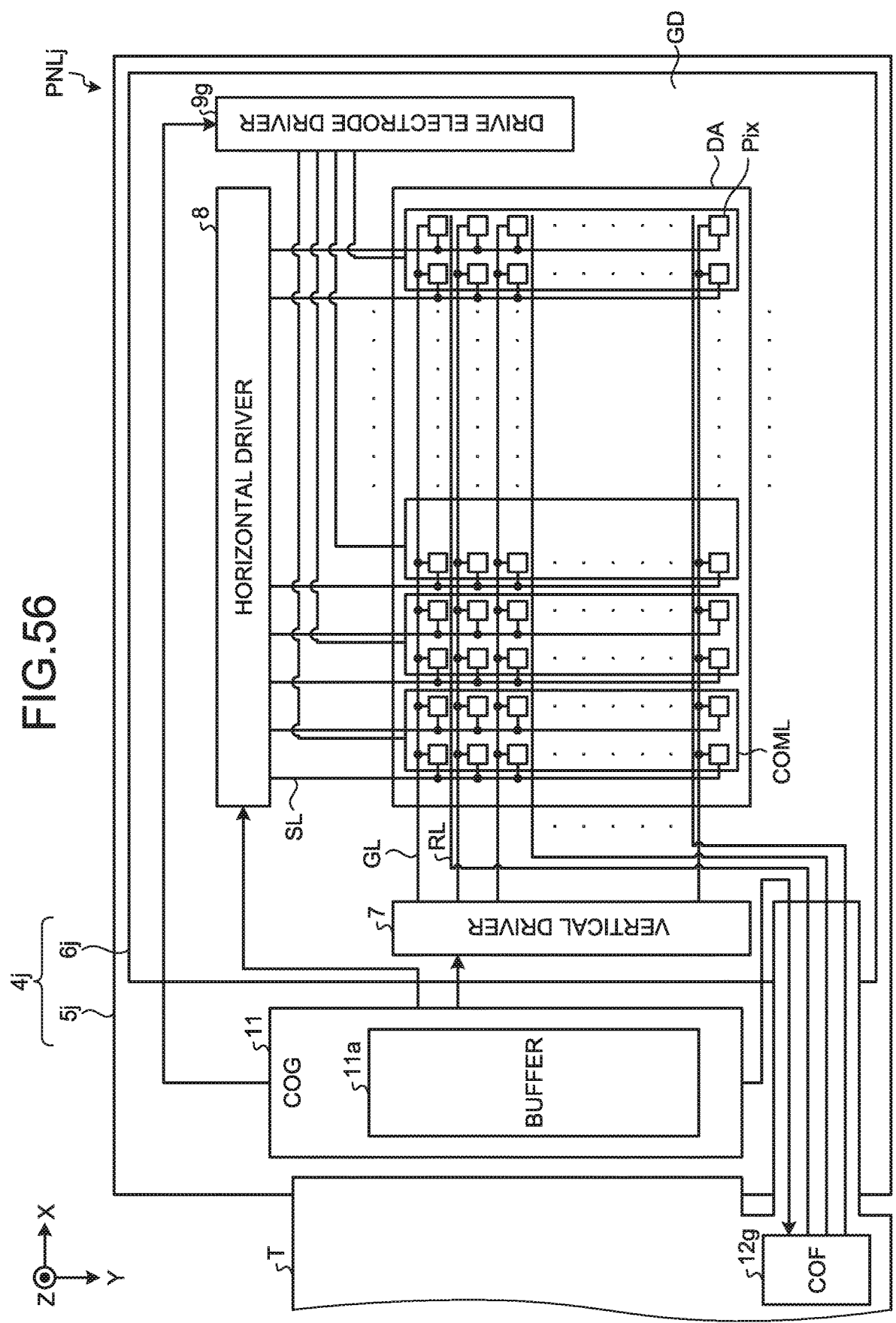
FIG. 56 is a diagram of the module configuration of the display apparatus with a touch detection function according to the ninth embodiment.

FIG. 56 is a diagram of the module configuration of the display apparatus with a touch detection function according to the ninth embodiment.

The panel PNLj of the display apparatus with a touch detection function 1j according to the present embodiment includes a substrate 4j. The substrate 4j includes a first substrate 5j and a second substrate 6j. The configuration of the panel PNLj is different from that of the panel PNLg (refer to FIG. 38) of the display apparatus according to the sixth embodiment in that the drive electrodes COML are not coupled to the COF 12g.

The detection lines RL according to the present embodiment correspond to the touch detector TDET illustrated in FIG. 55.

Illustration and explanation of the configuration of the light emitter BL and the detector DET in the display apparatus with a touch detection function 1j according to the present embodiment are omitted because it is the same as that of the light emitter BL and the detector DET in the display apparatus with a touch detection function if according to the fifth embodiment (refer to FIGS. 29 to 36).

The display apparatus with a touch detection function according to the ninth embodiment has the following characteristics besides the characteristics of the display apparatus according to the fifth embodiment. The display apparatus with a touch detection function according to the ninth embodiment can perform touch detection besides image detection.

The display apparatus may supply a positive- or negative-polarity signal to at least one signal line SL and detect a detection signal with at least one detection line RL corresponding to the at least one signal line SL supplied with the positive- or negative-polarity signal.

While exemplary embodiments according to the present invention have been described, the embodiments are not intended to limit the invention. The contents disclosed in the embodiments are given by way of example only, and various modifications may be made without departing from the spirit of the invention. Appropriate changes made without departing from the spirit of the invention naturally fall within the technical scope of the invention.

What is claimed is:

1. A control circuit for a display apparatus comprising:
a buffer configured to temporarily store therein externally-supplied image data; and
a controller configured to output pixel signals to signal lines of the display apparatus based on the image data stored in the buffer and read detection signals generated in detection conductors which extend along the signal lines of the display apparatus due to the pixel signals, wherein
the detection conductors are arranged in a direction in which drive electrodes extending along the signal lines are arranged, and in which the signal lines are arranged,
the pixel signals include respective image data provided to respective pixels by the signal lines, which are different from the drive electrodes and the detection conductors,
the drive electrodes are different from the detection conductors,
the drive electrodes are configured to generate an electric field on pixels and cause the pixels to display an image based on the pixel signals, and
the drive electrodes are driven in a first time period and the detection signals read in the detection conductors are read in a second time period different from the first time period.

2. A control circuit for a display apparatus comprising:
a buffer configured to temporarily store therein externally-supplied image data; and
a controller configured to output pixel signals to signal lines of the display apparatus based on the image data stored in the buffer and read detection signals generated in common electrodes of the display apparatus due to the pixel signals, wherein
the common electrodes extend along the signal lines and also serve as a plurality of drive electrodes configured to generate an electric field on pixels and cause the pixels to display an image based on the pixel signals,
the pixel signals include respective image data provided to respective pixels by the signal lines, which are different from the common electrodes, and
the common electrodes are driven in a first time period and the detection signals read in the common electrodes are read in a second time period different from the first time period.

3. The control circuit for the display apparatus according to claim 2,
wherein the common electrodes are disposed in a layer different from a layer of the signal lines and extend in an extending direction of the signal lines.

4. The control circuit for the display apparatus according to claim 3,
wherein the common electrodes are disposed in a layer different from a layer of the signal lines and disposed in a matrix in a display area provided with pixels.

5. A control circuit for a display apparatus comprising:
a buffer configured to temporarily store therein externally-supplied image data;
a controller configured to output pixel signals to signal lines of the display apparatus based on the image data stored in the buffer and read detection signals generated in detection conductors of the display apparatus due to the pixel signals; and
a touch detector configured to detect contact or proximity of an object to be detected.

6. The control circuit for the display apparatus according to claim 5,
wherein the detection conductors also serve as a plurality of drive electrodes configured to generate an electric field on pixels of the display apparatus and cause the pixels to display an image, and
wherein the detection conductors also serve as a plurality of touch drive electrodes configured to detect contact or proximity of the object to be detected.

7. The control circuit for the display apparatus according to claim 6,
wherein the detection conductors are disposed in a layer different from a layer of the signal lines and extend in an extending direction of the signal lines.

8. The control circuit for the display apparatus according to claim 7,
wherein the touch detector includes a plurality of touch detection lines extending in a direction intersecting the detection conductors, and
wherein the controller detects contact or proximity of the object to be detected based on mutual capacitance between the detection conductors and the touch detection lines.

9. The control circuit for the display apparatus according to claim 6,
wherein the detection conductors are disposed in a layer different from a layer of the signal lines and disposed in a matrix in a display area provided with the pixels.

10. The control circuit for the display apparatus according to claim 9,
wherein the controller detects contact or proximity of the object to be detected based on self-capacitance of the detection conductors.

11. The control circuit for the display apparatus according to claim 5,
wherein the display apparatus further comprises a first substrate and a second substrate facing the first substrate,
wherein the signal lines are provided to the first substrate, and
wherein the detection conductors are provided to the second substrate.

12. The control circuit for the display apparatus according to claim 7,
wherein the display apparatus further comprises a first substrate and a second substrate facing the first substrate, and
wherein the signal lines and the detection conductors are provided to the first substrate.

13. The control circuit for the display apparatus according to claim 5,
wherein the display apparatus further comprises a light emitter configured to irradiate pixels, and
wherein the detection conductors are provided on a first side of the light emitter facing the pixels, on a second side of the light emitter opposite to the first side, or in the light emitter.

14. The control circuit for the display apparatus according to claim 5,
wherein a frame period for performing display and detection and detecting a touch on one frame includes a plurality of horizontal periods and a touch detection period, each horizontal period including a detection period and a display period,
wherein the controller outputs the pixel signals to the signal lines and reads the detection signals in the detection period, and then outputs the pixel signals to the signal lines and causes the pixels to perform display in the display period, and
wherein the controller outputs touch detection signals to the detection conductors and detects contact or proximity of the object to be detected in the touch detection period.

* * * * *